United States Patent
Karampatsis et al.

(10) Patent No.: US 11,924,680 B2
(45) Date of Patent: Mar. 5, 2024

(54) USER-PLANE CONGESTION MANAGEMENT

(71) Applicant: InterDigital Patent Holdings, Inc., Wilmington, DE (US)

(72) Inventors: Dimitrios Karampatsis, Ruislip (GB); Samian Kaur, Plymouth Meeting, PA (US); Pascal M. Adjakple, Great Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/841,215

(22) Filed: Jun. 15, 2022

(65) Prior Publication Data
US 2023/0048559 A1 Feb. 16, 2023

Related U.S. Application Data

(63) Continuation of application No. 15/928,876, filed on Mar. 22, 2018, now abandoned, which is a
(Continued)

(51) Int. Cl.
*H04L 47/00* (2022.01)
*H04L 47/22* (2022.01)
(Continued)

(52) U.S. Cl.
CPC ......... *H04W 28/0289* (2013.01); *H04L 47/22* (2013.01); *H04L 47/32* (2013.01);
(Continued)

(58) Field of Classification Search
None
See application file for complete search history.

(56) References Cited

U.S. PATENT DOCUMENTS

| 6,865,185 B1 | 3/2005 | Patel et al. |
| 6,868,061 B1 | 3/2005 | Kilkki et al. |

(Continued)

FOREIGN PATENT DOCUMENTS

| CN | 102026303 A | 4/2011 |
| CN | 102300264 A | 12/2011 |

(Continued)

OTHER PUBLICATIONS

"English Language Abstract", Japanese Patent Application No. 2001-78260, Mar. 23, 2001, 1 page.
(Continued)

*Primary Examiner* — Gerald A Smarth
(74) *Attorney, Agent, or Firm* — Flaster Greenberg, P.C.

(57) ABSTRACT

Methods, apparatuses and systems for user-plane congestion management are provided. Among these method, apparatuses and systems is a method, implementable by a base station (and/or a serving gateway), for mitigating user plane congestion. The method may include sending a congestion indication to a core network; receiving a general packet radio system (GPRS) tunneling protocol (GTP) packet including an first internet protocol (IP) packet associated with a first flow within a bearer; obtaining, from a header of the GTP packet, an indicator indicative of a priority of the IP packet, wherein the indicator was inserted into the header of the GTP packet by the core network responsive to the congestion indication; and dropping any of the GTP packet and the first IP packet on condition that a priority of a second IP packet associated with second flow within the bearer takes precedence over the priority of the first IP packet.

16 Claims, 46 Drawing Sheets

Related U.S. Application Data continuation of application No. 14/759,818, filed as application No. PCT/US2014/011099 on Jan. 10, 2014, now Pat. No. 9,973,966.

(60) Provisional application No. 61/806,807, filed on Mar. 29, 2013, provisional application No. 61/751,550, filed on Jan. 11, 2013.

(51) Int. Cl.
    *H04L 47/32* (2022.01)
    *H04W 28/02* (2009.01)
    *H04W 72/566* (2023.01)

(52) U.S. Cl.
    CPC ... *H04W 28/0252* (2013.01); *H04W 28/0268* (2013.01); *H04W 72/569* (2023.01)

(56) References Cited

U.S. PATENT DOCUMENTS

| | | |
|---|---|---|
| 6,937,566 B1 | 8/2005 | Forslow et al. |
| 7,324,553 B1 | 1/2008 | Varier et al. |
| 8,130,655 B2 | 3/2012 | Foottit et al. |
| 8,185,152 B1 | 5/2012 | Goldner et al. |
| 8,346,225 B2 | 1/2013 | Raleigh et al. |
| 8,416,690 B2 | 4/2013 | Zhao et al. |
| 8,422,448 B2 * | 4/2013 | Chu .................. H04W 76/10 370/328 |
| 8,681,739 B1 | 3/2014 | Zhao et al. |
| 8,743,829 B2 | 6/2014 | Guan et al. |
| 9,014,116 B2 | 4/2015 | Sridhar et al. |
| 9,197,378 B2 | 11/2015 | Ikeda et al. |
| 9,225,726 B2 | 12/2015 | Liang et al. |
| 9,585,054 B2 | 2/2017 | Ahmad et al. |
| 9,973,966 B2 | 5/2018 | Karampatsis et al. |
| 2002/0114305 A1 | 8/2002 | Oyama et al. |
| 2004/0132436 A1 | 7/2004 | Dupont et al. |
| 2004/0166835 A1 | 8/2004 | Johansson et al. |
| 2004/0205752 A1 | 10/2004 | Chou et al. |
| 2004/0215828 A1 | 10/2004 | Li et al. |
| 2005/0058131 A1 | 3/2005 | Samuels et al. |
| 2005/0271048 A1 | 12/2005 | Casey |
| 2006/0165103 A1 | 7/2006 | Trudeau et al. |
| 2007/0097926 A1 | 5/2007 | Liu et al. |
| 2007/0259673 A1 | 11/2007 | Willars et al. |
| 2008/0020775 A1 | 1/2008 | Willars et al. |
| 2008/0212583 A1 | 9/2008 | Rey et al. |
| 2008/0214189 A1 | 9/2008 | Taaghol et al. |
| 2009/0069025 A1 | 3/2009 | Pischella et al. |
| 2009/0199268 A1 | 8/2009 | Ahmavaara et al. |
| 2009/0253433 A1 | 10/2009 | Voyer et al. |
| 2009/0279522 A1 | 11/2009 | Leroy et al. |
| 2009/0300207 A1 | 12/2009 | Giaretta et al. |
| 2009/0305701 A1 | 12/2009 | Giaretta et al. |
| 2010/0034089 A1 | 2/2010 | Kovvali et al. |
| 2010/0039991 A1 | 2/2010 | Godin et al. |
| 2010/0040024 A1 | 2/2010 | Wu et al. |
| 2010/0067400 A1 | 3/2010 | Dolganow et al. |
| 2010/0080172 A1 | 4/2010 | Jin et al. |
| 2010/0081444 A1 | 4/2010 | Jin et al. |
| 2010/0188977 A1 | 7/2010 | Rochon |
| 2010/0195503 A1 | 8/2010 | Raleigh et al. |
| 2010/0208698 A1 | 8/2010 | Lu et al. |
| 2010/0208706 A1 | 8/2010 | Hirano et al. |
| 2010/0216462 A1 | 8/2010 | Aso et al. |
| 2010/0216484 A1 | 8/2010 | Zhou et al. |
| 2011/0007706 A1 | 1/2011 | Shaikh et al. |
| 2011/0032819 A1 | 2/2011 | Schliwa-Bertling et al. |
| 2011/0038304 A1 | 2/2011 | Lin et al. |
| 2011/0044279 A1 | 2/2011 | Johansson et al. |
| 2011/0055572 A1 | 3/2011 | Vogt et al. |
| 2011/0090794 A1 | 4/2011 | Cherian et al. |
| 2011/0103260 A1 | 5/2011 | Jeyatharan et al. |
| 2011/0158090 A1 * | 6/2011 | Riley .................. H04L 12/1403 370/230 |
| 2011/0158171 A1 | 6/2011 | Centonza et al. |
| 2011/0170408 A1 | 7/2011 | Furbeck et al. |
| 2011/0170410 A1 | 7/2011 | Zhao et al. |
| 2011/0170517 A1 | 7/2011 | Bakker et al. |
| 2011/0194535 A1 | 8/2011 | Johansson et al. |
| 2011/0216680 A1 | 9/2011 | Vogt et al. |
| 2011/0274042 A1 | 11/2011 | Diachina et al. |
| 2011/0280130 A1 | 11/2011 | Foottit et al. |
| 2012/0002608 A1 | 1/2012 | Vesterinen et al. |
| 2012/0030331 A1 | 2/2012 | Karampatsis |
| 2012/0039175 A1 | 2/2012 | Sridhar et al. |
| 2012/0039304 A1 | 2/2012 | Kim et al. |
| 2012/0044804 A1 | 2/2012 | Rahman et al. |
| 2012/0069797 A1 | 3/2012 | Lim et al. |
| 2012/0079559 A1 | 3/2012 | Reznik et al. |
| 2012/0117220 A1 | 5/2012 | Mariblanca Nieves et al. |
| 2012/0147750 A1 | 6/2012 | Pelletier et al. |
| 2012/0173661 A1 | 7/2012 | Mahaffey et al. |
| 2012/0178416 A1 | 7/2012 | Miklos et al. |
| 2012/0188895 A1 | 7/2012 | Punz et al. |
| 2012/0196644 A1 | 8/2012 | Scherzer et al. |
| 2012/0201137 A1 | 8/2012 | Le Faucheur et al. |
| 2012/0246325 A1 | 9/2012 | Pancorbo et al. |
| 2012/0257499 A1 | 10/2012 | Chatterjee et al. |
| 2012/0327779 A1 | 10/2012 | Gell et al. |
| 2012/0314568 A1 | 12/2012 | Tan et al. |
| 2012/0324100 A1 | 12/2012 | Tomici et al. |
| 2013/0021916 A1 | 1/2013 | Zhou et al. |
| 2013/0028193 A1 | 1/2013 | Rommer et al. |
| 2013/0051282 A1 | 2/2013 | Lim et al. |
| 2013/0058275 A1 | 3/2013 | Melia et al. |
| 2013/0083650 A1 | 4/2013 | Taleb et al. |
| 2013/0083773 A1 | 4/2013 | Watfa et al. |
| 2013/0114408 A1 | 5/2013 | Sastry et al. |
| 2013/0121206 A1 | 5/2013 | Turanyi et al. |
| 2013/0166623 A1 | 6/2013 | Stanwood et al. |
| 2013/0170350 A1 | 7/2013 | Sarkar et al. |
| 2013/0195204 A1 | 8/2013 | Reznik et al. |
| 2013/0201824 A1 | 8/2013 | Venkatachalam et al. |
| 2013/0223395 A1 | 8/2013 | Warken et al. |
| 2013/0242754 A1 | 9/2013 | Shaikh et al. |
| 2013/0279521 A1 * | 10/2013 | Perez Martinez .. H04L 41/5029 370/468 |
| 2014/0003391 A1 | 1/2014 | Vesterinen et al. |
| 2014/0004815 A1 * | 1/2014 | Shaw .................. H04M 15/853 455/405 |
| 2014/0022900 A1 | 1/2014 | Salot et al. |
| 2014/0126362 A1 | 5/2014 | Ogura et al. |
| 2014/0219248 A1 | 8/2014 | Reddiboyana et al. |
| 2014/0233390 A1 | 8/2014 | Schmid et al. |
| 2014/0254368 A1 | 9/2014 | Zhang et al. |
| 2014/0335791 A1 | 11/2014 | Kim et al. |
| 2014/0341109 A1 | 11/2014 | Cartmell et al. |
| 2015/0016299 A1 | 1/2015 | Zhang et al. |
| 2015/0180945 A1 | 6/2015 | Hall et al. |
| 2015/0333991 A1 | 11/2015 | Liu et al. |
| 2016/0112896 A1 | 4/2016 | Karampatsis et al. |

FOREIGN PATENT DOCUMENTS

| | | | |
|---|---|---|---|
| EP | 2170002 A2 | 3/2010 | |
| EP | 2192799 A1 | 6/2010 | |
| EP | 2448194 A1 | 5/2012 | |
| EP | 2605501 A1 * | 6/2013 | ......... H04L 12/1407 |
| EP | 2624503 A1 * | 8/2013 | ............. H04L 12/14 |
| JP | 2001078260 A | 3/2001 | |
| JP | 2002532960 A | 10/2002 | |
| JP | 2006101400 A | 4/2006 | |
| JP | 2011525319 A | 9/2011 | |
| JP | 2013530640 A | 7/2013 | |
| WO | WO 20041084500 A1 | 9/2004 | |
| WO | WO 2010022374 A1 | 2/2010 | |
| WO | WO 2010072652 A1 | 7/2010 | |
| WO | WO 2010080966 A1 | 7/2010 | |
| WO | WO 2010102652 A1 | 9/2010 | |
| WO | WO 2010121191 A1 | 10/2010 | |
| WO | WO 2011025438 A1 | 3/2011 | |
| WO | WO 2011039985 A1 | 4/2011 | |
| WO | WO 2011069096 A2 | 6/2011 | |

(56) References Cited

FOREIGN PATENT DOCUMENTS

| WO | WO 2011149533 A1 | 12/2011 | | |
|---|---|---|---|---|
| WO | WO 2012018824 A1 | 2/2012 | | |
| WO | WO 2012033774 A2 | 3/2012 | | |
| WO | WO-2012041150 A1 | * 4/2012 | ......... | H04L 12/1407 |
| WO | WO 2013134669 A1 | 9/2013 | | |

OTHER PUBLICATIONS

"3rd Generation Partnership Project 2; cdma2000 Packet Data Services; Wireless Local Area Network (WLAN) Interworking Access to Operator Service and Mobility", 3GPP2 TS X.S0028-200-0 V1.0, Mar. 2007, 56 pages.

"3rd Generation Partnership Project; Technical Specification Group Core Network and Terminals; Access Network Discovery and Selection Function (ANDSF) Management Object (MO) (Release 10)", 3GPP TS 24.312 V10.2.1, Apr. 2011, 153 pages.

"3rd Generation Partnership Project; Technical Specification Group Core Network and Terminals; Access Network Discovery and Selection Function (ANDSF) Management Object (MO) (Release 11)", 3GPP TS 24.312 V11.5.0, Dec. 2012, 173 pages.

"3rd Generation Partnership Project; Technical Specification Group Core Network and Terminals; Access Network Discovery and Selection Function (ANDSF); Management Object (MO); Release 10", 3GPP TS 24.312 V10.3.0, Jun. 2011, 155 pages.

"3rd Generation Partnership Project; Technical Specification Group Core Network and Terminals; Access to the 3GPP Evolved Package Core (EPC) via non-3GPP access networks; Stage 3 (Release 10)", 3GPP TS 24.302 V10.4.0, Jun. 2011, 58 pages.

"3rd Generation Partnership Project; Technical Specification Group Core Network and Terminals; Access to the 3GPP Evolved Packet Core (EPC) via non-3GPP access networks; Stage 3 (Release 10)", 3GPP TS 24.302 V10.3.1, Apr. 2011, 57 pages.

"3rd Generation Partnership Project; Technical Specification Group Core Network and Terminals; Access to the 3GPP Evolved Packet Core (EPC) via non-3GPP access networks; Stage 3 (Release 10)", 3GPP TS 24.302 V10.7.0, Mar. 2012, 58 pages.

"3rd Generation Partnership Project; Technical Specification Group Core Network and Terminals; Access to the 3GPP Evolved Packet Core (EPC) via non-3GPP access networks; Stage 3 (Release 11)", 3GPP TS 24.302 V11.3.0, Jun. 2012, 60 pages.

"3rd Generation Partnership Project; Technical Specification Group Core Network and Terminals; Access to the 3GPP Evolved Packet Core (EPC) via non-3GPP access networks; Stage 3 (Release 11)", 3GPP TS 24.302 V11.7.0, Jun. 2013, 61 pages.

"3rd Generation Partnership Project; Technical Specification Group Core Network and Terminals; Access to the 3GPP Evolved Packet Core (EPC) via non-3GPP access networks; Stage 3 (Release 12)", 3GPP TS 24.302 V12.1.0, Jun. 2013, 68 pages.

"3rd Generation Partnership Project; Technical Specification Group Core Network and Terminals; Access to the 3GPP Evolved Packet Core (EPC) via non-3GPP access networks; Stage 3 (Release 8)", 3GPP TS 24.302 V8.10.0, Sep. 2011, 50 pages.

"3rd Generation Partnership Project; Technical Specification Group Core Network and Terminals; Access to the 3GPP Evolved Packet Core (EPC) via non-3GPP access networks; Stage 3 (Release 9)", 3GPP TS 24.302 V9.7.0, Sep. 2011, 53 pages.

"3rd Generation Partnership Project; Technical Specification Group Core Network and Terminals; IP multimedia call control protocol based on Session Initiation Protocol (SIP) and Session Description Protocol (SOP); Stage 3 (Release 10)", 3GPP TS 24.229 V10.3.0, Mar. 2011, 702 pages.

"3rd Generation Partnership Project; Technical Specification Group Core Network and Terminals; Non-Access-Stratum (NAS) protocol for Evolved Packet System (EPS); Stage 3 (Release 11)", 3GPP TS 24.301 V11.3.0, Jun. 2012, 335 pages.

"3rd Generation Partnership Project; Technical Specification Group Core Network and Terminals; Non-Access-Stratum (NAS) protocol for Evolved Packet System (EPS); Stage 3 (Release 10)", 3GPP TS 24.301 V10.7.0, Jun. 2012, 322 pages.

"3rd Generation Partnership Project; Technical Specification Group Core Network and Terminals; Non-Access-Stratum (NAS) protocol for Evolved Packet System (EPS); Stage 3 (Release 10)", 3GPP TS 24.301 V10.11.0, Jun. 2013, 322 pages.

"3rd Generation Partnership Project; Technical Specification Group Core Network and Terminals; Non-Access-Stratum (NAS) protocol for Evolved Packet System (EPS); Stage 3 (Release 11)", 3GPP TS 24.301 V11. 7.0, Jun. 2013, 345 pages.

"3rd Generation Partnership Project; Technical Specification Group Core Network and Terminals; Non-Access-Stratum (NAS) protocol for Evolved Packet System (EPS); Stage 3 (Release 12)", 3GPP TS 24.301 V12.1.0, Jun. 2013, 350 pages.

"3rd Generation Partnership Project; Technical Specification Group Core Network and Terminals; Non-Access-Stratum (NAS) protocol for Evolved Packet System (EPS); Stage 3 (Release 8)", 3GPP TS 24.301 V8.10.0, Jun. 2011, 277 pages.

"3rd Generation Partnership Project; Technical Specification Group Core Network and Terminals; Non-Access-Stratum (NAS) protocol for Evolved Packet System (EPS); Stage 3 (Release 9)", 3GPP TS 24.301 V9.10.0, Jun. 2012, 300 pages.

"3rd Generation Partnership Project; Technical Specification Group Core Network and Terminals; Non-Access-Stratum (NAS) protocol for Evolved Packet System (EPS); Stage 3 (Release 9)", 3GPP TS 24.301 V9.11.0, Mar. 2013, 300 pages.

"3rd Generation Partnership Project; Technical Specification Group Core Network and Terminals; Policy and Charging Control over Gx!Sd reference point (Release 11)", 3GPP TS 29.212 V11.1.0, Jun. 2011, 152 pages.

"3rd Generation Partnership Project; Technical Specification Group Core Network and Terminals; Proxy Mobile 1Pv6 (PMIPv6) based Mobility and Tunnelling protocols; Stage 3 (Release 10)", 3GPP TS 29.275 V10.2.0, Jun. 2011, 72 pages.

"3rd Generation Partnership Project; Technical Specification Group Core Network and Terminals; Proxy Mobile 1Pv6 (PMIPv6) based Mobility and Tunnelling protocols; Stage 3 (Release 9)", 3GPP TS 29.275 V9.5.0, Jun. 2011, 71 pages.

"3rd Generation Partnership Project; Technical Specification Group Core Network and Terminals; Proxy Mobile 1Pv6 (PMIPv6) based Mobility and Tunnelling protocols; Stage 3 (Release 9)", 3GPP TS 29.275 V9.2.0, Jun. 2010, 74 pages.

"3rd Generation Partnership Project; Technical Specification Group Core Network and Terminals; User Data Convergence (UDC); Technical realization and information flows; Stage 2 (Release 10)", 3GPP TS 23.335 V10.0.0, Mar. 2011, 39 pages.

"3rd Generation Partnership Project; Technical Specification Group Core Network and Terminals; User Data Convergence (UDC); Technical realization and information flows; Stage 2 (Release 11)", 3GPP TS 23.335 V11.0.0, Sep. 2012, 39 pages.

"3rd Generation Partnership Project; Technical Specification Group Core Network and Terminals; User Data Convergence (UDC); Technical realization and information flows; Stage 2 (Release 9)", 3GPP TS 23.335 V9.3.0, Dec. 2010, 39 pages.

"3rd Generation Partnership Project; Technical Specification Group Radio Access Network; Evolved Universal Terrestrial Radio Access Network (E-UTRAN); S1 Application Protocol (S1AP) (Release 10)", 3GPP TS 36.413 V10.6.0, Jun. 2012, 255 pages.

"3rd Generation Partnership Project; Technical Specification Group Radio Access Network; Evolved Universal Terrestrial Radio Access Network (E-UTRAN); S1 Application Protocol (S1AP) (Release 11)", 3GPP TS 36.413 V11.0.0, Jun. 2012, 258 pages.

"3rd Generation Partnership Project; Technical Specification Group Radio Access Network; Evolved Universal Terrestrial Radio Access Network (E-UTRAN); S1 Application Protocol (S1AP) (Release 11)", 3GPP TS 36.413 V11.4.0, Jun. 2013, 274 pages.

"3rd Generation Partnership Project; Technical Specification Group Radio Access Network; Evolved Universal Terrestrial Radio Access Network (E-UTRAN); S1 Application Protocol (S1AP) (Release 8)", 3GPP TS 36.413 V8.10.0, Jun. 2010, 217 pages.

"3rd Generation Partnership Project; Technical Specification Group Radio Access Network; Evolved Universal Terrestrial Radio Access

(56) References Cited

OTHER PUBLICATIONS

Network (E-UTRAN); S1 Application Protocol (S1AP) (Release 10)", 3GPP TS 36.413 V10.5.0, Mar. 2012, 255 pages.
"3rd Generation Partnership Project; Technical Specification Group Radio Access Network; Evolved Universal Terrestrial Radio Access Network (E-UTRAN); S1 Application Protocol (S1AP) (Release 9)", 3GPP TS 36.413 V9.8.0, Dec. 2011, 243 pages.
"3rd Generation Partnership Project; Technical Specification Group Radio Access Network; Physical layer; Measurements (FOO) (Release 10)", 3GPP TS 25.215 V10.0.0, Mar. 2011, 23 pages.
"3rd Generation Partnership Project; Technical Specification Group SA; Feasibility Study on User Plane Congestion Management (Release 12)", 3GPP TR 22.805 V0.3.1, May 2012, 32 pages.
"3rd Generation Partnership Project; Technical Specification Group SA; Feasibility Study on User Plane Congestion Management (Release 12)", 3GPP TR 22.805 V1.0.0, Jun. 2012, 32 pages.
"3rd Generation Partnership Project; Technical Specification Group Services and System Aspects; 3GPP System Architecture Evolution (SAE); Security aspects of non-3GPP accesses (Release 10)", 3GPP TS 33.402 V10.3.0, Mar. 2012, 52 pages.
"3rd Generation Partnership Project; Technical Specification Group Services and System Aspects; 3GPP system to Wireless Local Area Network (WLAN) interworking; System description (Release 9)", 3GPP TS 23.234 V9.0.0, Dec. 2009, 84 pages.
"3rd Generation Partnership Project; Technical Specification Group Services and System Aspects; Architecture enhancements for non-3GPP accesses (Release 1O)", 3GPP TS 23.402 V10.3.0, Mar. 2011, 227 pages.
"3rd Generation Partnership Project; Technical Specification Group Services and System Aspects; Architecture enhancements for non-3GPP accesses (Release 1O)", 3GPP TS 23.402 V10.1.0, Sep. 2010, 227 pages.
"3rd Generation Partnership Project; Technical Specification Group Services and System Aspects; Architecture enhancements for non-3GPP accesses (Release 1O)", 3GPP TS 23.402 V10.2.1, Jan. 2011, 228 pages.
"3rd Generation Partnership Project; Technical Specification Group Services and System Aspects; Architecture enhancements for non-3GPP accesses (Release 1O)", 3GPP TS 23.402 V10.7.0, Mar. 2012, 232 pages.
"3rd Generation Partnership Project; Technical Specification Group Services and System Aspects; Architecture enhancements for non-3GPP accesses (Release 1O)", 3GPP TS 23.402 V10.8.0, Sep. 2012, 232 pages.
"3rd Generation Partnership Project; Technical Specification Group Services and System Aspects; Architecture enhancements for non-3GPP accesses (Release 11)", 3GPP TS 23.402 V11.3.0, Jun. 2012, 252 pages.
"3rd Generation Partnership Project; Technical Specification Group Services and System Aspects; Architecture enhancements for non-3GPP accesses (Release 11)", 3GPP TS 23.402 V11.7.0, Jun. 2013, 252 pages.
"3rd Generation Partnership Project; Technical Specification Group Services and System Aspects; Architecture enhancements for non-3GPP accesses (Release 12)", 3GPP TS 23.402 V12.1.0, Jun. 2013, 254 pages.
"3rd Generation Partnership Project; Technical Specification Group Services and System Aspects; Architecture enhancements for non-3GPP accesses (Release 8)", 3GPP TS 23.402 V8.10.0, Mar. 2012, 199 pages.
"3rd Generation Partnership Project; Technical Specification Group Services and System Aspects; Architecture enhancements for non-3GPP accesses (Release 9)", 3GPP TS 23.402 V9.5.0, Jun. 2010, 200 pages.
"3rd Generation Partnership Project; Technical Specification Group Services and System Aspects; Architecture enhancements for non-3GPP accesses (Release 9)", 3GPP TS 23.402 V9.12.0, Mar. 2012, 200 pages.

"3rd Generation Partnership Project; Technical Specification Group Services and System Aspects; Data Identification in ANDSF (DIDA) (Release 11)", 3GPP TR 23.8xy VO. 1.0, Apr. 2011, 8 pages.
"3rd Generation Partnership Project; Technical Specification Group Services and System Aspects; Feasibility study on 3GPP system to Wireless Local Area Network (WLAN) interworking (Release 9)", 3GPP TR 22.934 V9.0.0, Dec. 2009, 30 pages.
"3rd Generation Partnership Project; Technical Specification Group Services and System Aspects; Feasibility study on 3GPP system to Wireless Local Area Network (WLAN) interworking (Release 9)", 3GPP TR 22.934 V9.1.0, Sep. 2010, 30 pages.
"3rd Generation Partnership Project; Technical Specification Group Services and System Aspects; Feasibility study on user plane congestion management (Release 12)", 3GPP TR 22.805 V12.1.0, Dec. 14, 2012, 36 pages.
"3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP TS 23.401 V10.0.0, Jun. 2010, 261 pages.
"3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP TS 23.401 V10.4.0, Jun. 2011, 281 pages.
"3rd Generation Partnership Project; Technical Specification Group Services and System Aspects; General Packet Radio Service (GPRS) enhancements for Evolved Universal Terrestrial Radio Access Network (E-UTRAN) access (Release 9)", 3GPP TS 23.401 V9.5.0, Jun. 2010, 259 pages.
"3rd Generation Partnership Project; Technical Specification Group Services and System Aspects; General Packet Radio Se/Vice (GPRS); Service description; Stage 2 (Release 9)", 3GPP TS 23.060 V9.5.0, Jun. 2010, 298 pages.
"3rd Generation Partnership Project; Technical Specification Group Services and System Aspects; Generic Authentication Architecture (GAA); Access to network application functions using Hypetiext Transfer Protocol over Transportation Layer Security (HTTPS)", 3GPP TS 33.222 V10.0.1, Dec. 2011, 22 pages.
"3rd Generation Partnership Project; Technical Specification Group Services and System Aspects; Generic Authentication Architecture (GAA); Generic Bootstrapping Architecture (GBA) (Release 10)", 3GPP TS 33.220 V10.1.0, Mar. 2012, 75 pages.
"3rd Generation Partnership Project; Technical Specification Group Services and System Aspects; Generic Authentication Architecture (GAA); Support for subscriber certificates (Release 10)", 3GPP TS 33.221 V10.0.0, Mar. 2011, 25 pages.
"3rd Generation Partnership Project; Technical Specification Group Services and System Aspects; IP flow mobility and seamless Wireless Local Area Network (WLAN) offload; Stage 2 (Release 10)", 3GPP TS 23.261 V10.0.0, Jun. 10, 2010, 20 pages.
"3rd Generation Partnership Project; Technical Specification Group Services and System Aspects; IP flow mobility and seamless Wireless Local Area Network (WLAN) offload; Stage 2 (Release 10)", 3GPP TS 23.261 V10.2.0, Mar. 2012, 22 pages.
"3rd Generation Partnership Project; Technical Specification Group Services and System Aspects; IP flow mobility and seamless Wireless Local Area Network (WLAN) offload; Stage 2 (Release 10)", 3GPP TS 23.261 V10.1.0, Sep. 2010, 22 pages.
"3rd Generation Partnership Project; Technical Specification Group Services and System Aspects; IP flow mobility and seamless Wireless Local Area Network (WLAN) offload; Stage 2 (Release 11)", 3GPP TS 23.261 V11.0.0, Sep. 2012, 22 pages.
"3rd Generation Partnership Project; Technical Specification Group Services and System Aspects; IP Flow Mobility and seamless WLAN offload; Stage 2 (Release 10)", 3GPP TS 23.261 V0.3.0, Mar. 2010, 20 pages.
"3rd Generation Partnership Project; Technical Specification Group Services and System Aspects; IP Multimedia Subsystem (IMS); Stage 2 (Release 11)", 3GPP TS 23.228 V11.0.0, Mar. 2011, 272 pages.
"3rd Generation Partnership Project; Technical Specification Group Services and System Aspects; Mobility between 3GPP-Wireless

(56) References Cited

OTHER PUBLICATIONS

Local Area Network (WLAN) interworking and 3GPP systems (Release 10)", 3GPP TS 23.327 V10.0.0, Mar. 2011, 27 pages.
"3rd Generation Partnership Project; Technical Specification Group Services and System Aspects; Mobility between 3GPP-Wireless Local Area Network (WLAN) interworking and 3GPP systems (Release 9)", 3GPP TS 23.327 V9.0.0, Dec. 2009, 27 pages.
"3rd Generation Partnership Project; Technical Specification Group Services and System Aspects; Multi access PON connectivity and IP flow mobility (Release 9)", 3GPP TS 23.861 V1.3.0, Sep. 2009, 49 pages.
"3rd Generation Partnership Project; Technical Specification Group Services and System Aspects; Network based IP flow mobility (Release 12)", 3GPP TR 23.861 V1.7.0, Nov. 2012, 79 pages.
"3rd Generation Partnership Project; Technical Specification Group Services and System Aspects; Policy and charging control architecture (Release 10)", 3GPP TS 23.203 V10.0.0, Jun. 2010, 126 pages.
"3rd Generation Partnership Project; Technical Specification Group Services and System Aspects; Policy and charging control architecture (Release 1O)", 3GPP TS 23.203 V10.7.0, Jun. 2012, 131 pages.
"3rd Generation Partnership Project; Technical Specification Group Services and System Aspects; Policy and charging control architecture (Release 10)", 3GPP TS 23.203 V10.8.0, Sep. 2012, 131 pages.
"3rd Generation Partnership Project; Technical Specification Group Services and System Aspects; Policy and charging control architecture (Release 11)", 3GPP TS 23.203 V11.1.0, Mar. 2011, 136 pages.
"3rd Generation Partnership Project; Technical Specification Group Services and System Aspects; Policy and charging control architecture (Release 11)", 3GPP TS 23.203 V11.2.0, Jun. 2011, 142 pages.
"3rd Generation Partnership Project; Technical Specification Group Services and System Aspects; Policy and charging control architecture (Release 11)", 3GPP TS 23.203 V11.3.0, Sep. 2011, 167 pages.
"3rd Generation Partnership Project; Technical Specification Group Services and System Aspects; Policy and charging control architecture (Release 11)", 3GPP TS 23.203 V11.6.0, Jun. 2012, 177 pages.
"3rd Generation Partnership Project; Technical Specification Group Services and System Aspects; Policy and charging control architecture (Release 11)", 3GPP TS 23.203 V11.10.0, Jun. 2013, 182 pages.
"3rd Generation Partnership Project; Technical Specification Group Services and System Aspects; Policy and charging control architecture (Release 12)", 3GPP TS 23.203 V12.1.0, Jun. 2013, 189 pages.
"3rd Generation Partnership Project; Technical Specification Group Services and System Aspects; Policy and charging control architecture (Release 7)", 3GPP TS 23.203 V7.14.1, Jul. 2012, 76 pages.
"3rd Generation Partnership Project; Technical Specification Group Services and System Aspects; Policy and charging control architecture (Release 8)", 3GPP TS 23.203 V8.14.0, Jun. 2012, 116 pages.
"3rd Generation Partnership Project; Technical Specification Group Services and System Aspects; Policy and charging control architecture (Release 9)", 3GPP TS 23.203 V9.5.0, Jun. 2010, 123 pages.
"3rd Generation Partnership Project; Technical Specification Group Services and System Aspects; Policy and charging control architecture (Release 9)", 3GPP TS 23.203 V9.12.0, Jun. 2012, 124 pages.
"3rd Generation Partnership Project; Technical Specification Group Services and System Aspects; Study on Policy solutions and enhancements (Release 10)", 3GPP TR 23.813 V0.5.0, Feb. 2011, 40 pages.
"3rd Generation Partnership Project; Technical Specification Group Services and System Aspects; Study on Policy solutions and enhancements (Release 11)", 3GPP TR 23.813 V11.0.0, Jun. 2011, 41 pages.
"3rd Generation Partnership Project; Technical Specification Group Services and System Aspects; System Enhancements for User Plane Congestion Management (Release 12)", 3GPP TR 23.705 V0.5.0, Jun. 2013, 32 pages.
"CN Aspects of Se/Vice Identification for RRC Improvements in Geran", 3GPP Tdoc C4-112729, 3GPP TSG CT WG4 Meeting #55, San Francisco, US, Nov. 14-18, 2011, 5 pages.
"Communication pursuant to Article 94(3) EPC", European Patent Application No. 13 708 293.9-1857, dated Dec. 23, 2016, 4 pages.
"Email Thread Re: [MEXT] Text for Binding Update Race condition issue", Mobile 1Pv6 Extensions, Apr. 6, 2009, 5 pages.
"English Language Abstract", Chinese Patent Application No. 102026303, Apr. 20, 2011, 1 page.
"English Language Abstract", Chinese Patent Application No. 102300264, Dec. 28, 2011, 1 page.
"Examination Notification", Taiwanese Patent Application No. 102125682, dated Oct. 14, 2016, 3 pages.
"Examination Notification", Taiwanese Patent Application No. 102105530, dated Oct. 16, 2016, 9 pages.
"Examination Notification (English Translation)", Taiwanese Patent Application No. 102125682, dated Oct. 14, 2016, 3 pages.
"Examination Notification (English Translation)", Taiwanese Patent Application No. 102105530, dated Oct. 16, 2016, 7 pages.
"First Notification of Office Action", Chinese Patent Application No. 201380038480.4, dated Jul. 24, 2017, 19 pages.
"First Notification of Office Action (English Translation)", Chinese Patent Application No. 201380038480.4, dated Jul. 24, 2017, 12 pages.
"International Preliminary Report on Patentability from the International Preliminary Examining Authority", International Application No. PCT/US2014!011099, dated Jan. 16, 2015, 16 pages.
"International Search Report and the Written Opinion of the International Searching Authority", International Application No. PCT/US2013!026550, dated May 21, 2013, 10 pages.
"International Search Report and Written Opinion of the International Search Authority", International Application No. PCTIUS2012!057068, dated Feb. 8, 2013, 14 pages.
"International Search Report and Written Opinion of the International Searching Authority", International Application No. PCTIUS2014!011099, dated Apr. 15, 2014, 12 pages.
"International Search Report and Written Opinion of the International Searching Authority", International Application No. PCT/US2012!033560, dated Jul. 19, 2012, 14 pages.
"International Search Report and Written Opinion of the International Searching Authority", International Application No. PCTIUS2011!050577, dated Sep. 19, 2012, 18 pages.
"Invitation to Pay Additional Fees and Partial International Search", International Application No. PCT/US2013/046174, dated Oct. 10, 2013, 5 pages.
"Invitation to Pay Additional Fees and Partial International Search", International Application No. PCTIUS2011!050577, dated Jan. 19, 2012, 6 pages.
"Invitation to Pay Additional Fees and Partial International Search", International Application No. PCT/US2013/051029, dated Nov. 27, 2013, 7 pages.
"New WID for Data identification in ANDSF", 3GPP Tdoc SP-110084, 3GPP TSG SA Meeting #51 Kansas City, USA, Mar. 21-23, 2011, 5 pages.
"Non-Final Office Action", U.S. Appl. No. 151056,512, dated Jan. 26, 2018, 27 pages.
"Notice of Allowance", U.S. Appl. No. 141376,973, dated Jun. 21, 2017, 6 pages.
"Notice of Allowance", U.S. Appl. No. 14n59,818, dated Nov. 22, 2017, 9 pages.
"Official Notice of Rejection", Japanese Patent Application No. 2015-523244, dated Feb. 2, 2016, 6 pages.
"Official Notice of Rejection", Japanese Patent Application No. 2014-557858, dated Jan. 24, 2017, 9 pages.
"Official Notice of Rejection (English Translation)", Japanese Patent Application No. 2014-557858, dated Jan. 24, 2017, 11 pages.
"Official Notice of Rejection (English Translation)", Japanese Patent Application No. 2015-523244, dated Feb. 2, 2016, 7 pages.

(56) References Cited

OTHER PUBLICATIONS

"English Language Abstract", Japanese Patent Application No. 2006-101400, dated Apr. 13, 2006, 1 page.
"U.S. Appl. No. 121684,227", filed Jan. 8, 2010.
"U.S. Appl. No. 131446, 685", filed Apr. 13, 2012.
"United States Notice of Allowance", U.S. Appl. No. 131820, 724, dated Jul. 23, 2015, 20 pages.
"United States Office Action", U.S. Appl. No. 141759,818 (parent US02), dated Jan. 11, 2017, 13 pages.
"United States Office Action", U.S. Appl. No. 131944,077, dated Mar. 26, 2015, 13 pages.
"United States Office Action", U.S. Appl. No. 151427,523, dated May 3, 2017, 16 pages.
"United States Office Action", U.S. Appl. No. 141376,973, dated Aug. 15, 2016, 18 pages.
"United States Office Action", U.S. Appl. No. 131820, 724, dated Jan. 16, 2015, 20 pages.
"United States Office Action", United States Office Action U.S. Appl. No. 131446,685, dated Jan. 2, 2015, 23 pages.
"United States Office Action", U.S. Appl. No. 151056,512, dated Feb. 1, 2017, 24 pages.
"United States Office Action", U.S. Appl. No. 131944,077, dated Jun. 16, 2016, 25 pages.
"United States Office Action", U.S. Appl. No. 141376,973, dated Mar. 30, 2016, 36 pages.
"United States Office Action", U.S. Appl. No. 141408, 133, dated Jun. 22, 2017, 53 pages.
"WID for Study on User plane congestion management", 3GPP Tdoc S2-113383, 3GPP SA WG2 Meeting #85 Naantali, Finland, Jul. 11-15, 2011, 5 pages.
"WID for Study on User plane congestion management", 3GPP Tdoc S2-113752, 3GPP SA WG2 Meeting #85 Naantali, Finland, Jul. 11-15, 2011, 5 pages.
"Written Opinion of the International Preliminary Examining Authority", International Application No. PCT/US2013!026SSO, dated Jun. 3, 2014, 10 pages.
"Written Opinion of the International Preliminary Examining Authority", International Application No. PCTIUS2012/0S7068, dated Oct. 17, 2013, 7 pages.
Alcatel-Lucent, "Policy based terminal triggered, ANDSF decided access selection", 3GPP Tdoc S2-0816S8, 3GPP TSG SA WG2 Architecture—S2 Meeting #63, Athens, Greece, Feb. 18-22, 2008, 6 pages.
Bernardos, C.J., "Proxy Mobile 1Pv6 Extensions to Support Flow Mobility", draft-bernardos-netext-pmipv6-flowmob-03 (work in progress), Mar. 14, 2011, 20 pages.
China Mobile, "Interface/Network Selection based on UE detected Network Information", 3GPP Tdoc S2-113264; 3GPP SA WG2 Meeting #86, Naantali, Finland, Jul. 11-1S, 2011, 2 pages.
China Mobile, et al., "Policy control based on network condition", 3GPP Tdoc S2-10S228, 3GPP TSG WG2 Meeting #81, Prague, Czech Republic, Oct. 11-1S, 2010, 4 pages.
Das, S., et al., "DHCPv4 and DHCPv6 Options for Access Network Discovery and Selection Function (ANDSF) Discovery", The Internet Engineering Task Force (IETF) Request for Comment (RFC) 61S3, Feb. 2011, 7 pages.
Huawei, "Discussion on H(e)NB LIPA/SIPTO management requirements", 3GPP Tdoc SS-101780, 3GPP TSG-SAS (Telecom Management) SAS Meeting #72, Jul. 12-16, 2010, 3 pages.
12R, "e1CIC for HeNB UL and MUE DL based on HeNB UL Measurement", 3GPP Tdoc R1-104732, 3GPP TSG RAN WG1 Meeting #62;, Madrid, Spain, Aug. 23-27, 2010, S pages.
IEEE, "Patt 11: Wireless LAN Medium Access Control (MAC) and Physical Layer (PHY) Specifications, Amendment 9: Interworking with External Networks", IEEE Std 802.11u-2011, Feb 2S, 2011, 208 pages.
ITU-T, "Opinion model for video-telephony applications", ITU-T Recommendation G. 1070, Apr. 2007, 28 pages.

Johnson, D., et al., "Mobility Support in 1Pv6", The Internet Engineering Task Force (IETF) Request for Comment (RFC) 377S, Jun. 2004, 16S pages.
Kddi, et al., "P-CR to TR 22.80S on Section 6 Potential Requirements", 3GPP Tdoc S1-121074; 3GPP TSG-SA WG1 Meeting #S8, Seville, Spain, May 7-11, 2012, 6 pages.
Kddi, "UPCON solution framework for RAN user plane congestion", 3GPP Tdoc S2-130287, 3GPP SA WG2 Meeting #9S, Prague, Czech Republic, Jan. 28-Feb. 1, 2013, 4 Pages.
LG Electronics, "Traffic steering across multiple PON connections over 3GPP access", 3GPP Tdoc S2-105026, 3GPP TSG SA WG2 Meeting # 81 Prague, Czech Republic, Oct. 11-15, 2010, 5 Pages.
Mark, Brian, et al., • Multipath Flow Routing Approach for Increasing Throughput in the Internet, George Mason University, Dept. of Electrical and Computer Engineering, Aug. 2007, 4 pages.
Melia, T., "Logical Interface Support for multi-mode IP Hosts", draft-me/ia-netext-logica/- interface-suppoti-01, Jul. 5, 2010, 20 pages.
NEC, NTT Docomo, et al., "Use Cases for User Plane Congestion Management (UPCON)", 3GPP Tdoc S1-113149, Sep. 6, 2011, 11 pages.
Nokia Siemens Networks, "On X2 Signaling for TOM e/CIC in Macro+Pico Scenarios", 3GPP Tdoc R3-103555, 3GPP TSG RAN WG3 #70 Meeting, Jacksonville, United States, Nov. 15-19, 2010, 4 pages.
NTT Docomo, "Considering RAT Congestion Scenario in UPCON SID", SA WG2, Tdoc S2-113253, Meeting #86, Naantali, Finland, Jul. 11-15, 2011, 2 pages.
Open Mobile Alliance, "OMA Device Management Representation Protocol", OMA-TS- DM_RepPro-V2_0-20101011-D, Oct. 11, 2010, 76 pages.
Qualcomm Inc., et al., "Congestion in Multiple Access Communication Schemes", 3GPP Tdoc S1-121111; 3GPP TSG-SA WG1 Meeting #58, Seville, Spain, May 7-11, 2012, 5 pages.
Shehada, Mohammed, "Overview of 3GPP Study Item UPCON: User Plane Congestion Control (TR 22.805 V0.2.0 (2012-02))", 38th Meeting of the VDE11TG group 5.2.4 "Mobility in IP-based networks", Mar. 13, 2012, 19 pages.
Sklower, "The PPP Multi/ink Protocol (MP)", The Internet Engineering Task Force (IETF) Request for Comment (RFC) 1990, Aug. 1996, 23 pages.
Soliman, H., et al., "Flow Bindings in Mobile /Pv6 and NEMO Basic Support", draft- ietf- mext-flow-binding-01 (work in progress), Feb. 13, 2009, 31 pages.
Soliman, H., et al., "Flow Bindings in Mobile /Pv6 and NEMO Basic Support", draft- ietf- mext-flow-binding-04 (work in progress), Nov. 9, 2009, 37 pages.
Soliman, H., et al., "Flow Bindings in Mobile /Pv6 and NEMO Basic Support", draft- ietf- mext-flow-binding-06 (work in progress), Mar. 1, 2010, 39 pages.
Soliman, H., "Mobile /Pv6 Support for Dual Stack Hosts and Routers", The Internet Engineering Task Force (IETF) Request for Comment (RFC) 5555, Jun. 2009, 41 pages.
Tansir, Ahmed, et al., "Multi Access Data Network Connectivity and IP Flow Mobility in Evolved Packet System (EPS)", Wireless Communications and Networking Conference (WCNC) 2010, IEEE, Piscataway, NJ; USA, Apr. 18, 2010, 6 pages.
Tsirtsis, G., et al., "Traffic Selectors for Flow Bindings", draft-ietf-mext-binary-ts-02 (work in progress), Dec. 16, 2009, 18 Pages.
Tsirtsis, G., et al., "Traffic Selectors for Flow Bindings", draft-ietf-mext-binary-ts-04 (work in progress), Feb. 26, 2010, 19 pages.
Wakikawa, Ryuji, et al., "Multiple Care-of Addresses Registration", The Internet Engineering Task Force (IETF) Request for Comment (RFC) 5648, Oct. 2009, 36 pages.
CN 102026303 A, "English Language Abstract", Chinese Patent Application No. 102300264; "First Notification of Office Action (English Translation)", Chinese Patent Application No. 201380038480. 4.
JP 2011525319 A, Official Notice of Rejection (English Translation), Japanese Patent Application No. 2014-557858; US-2009/0300207.

(56) References Cited

OTHER PUBLICATIONS

CN 102300264 A, "English Language Abstract", Chinese Patent Application No. 102300264; "First Notification of Office Action (English Translation)", Chinese Patent Application No. 201380038480.4.

JP 2013530640 A, Official Notice of Rejection (English Translation), Japanese Patent Application No. 2015-523244; WO-2011/149533.

* cited by examiner

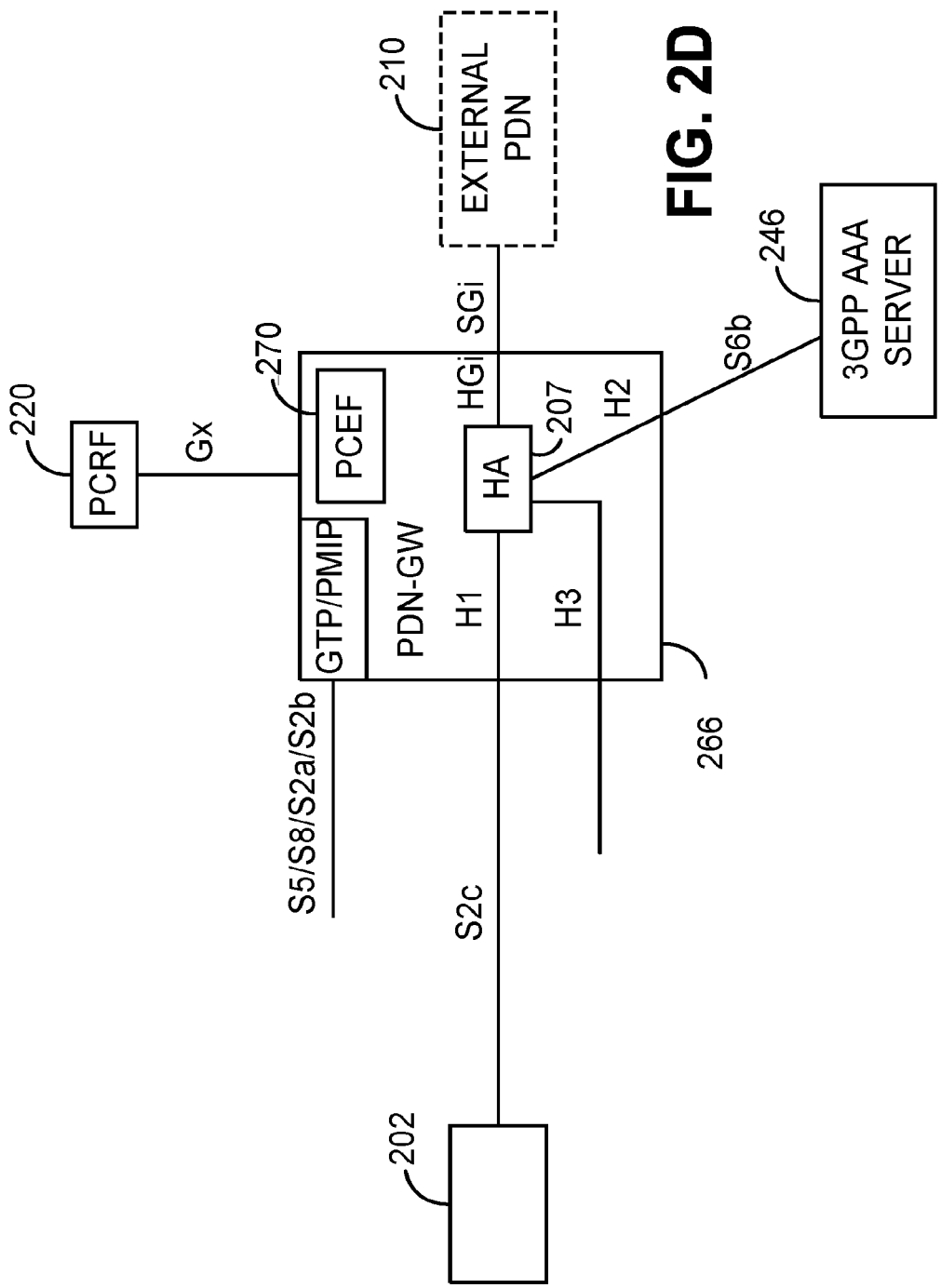

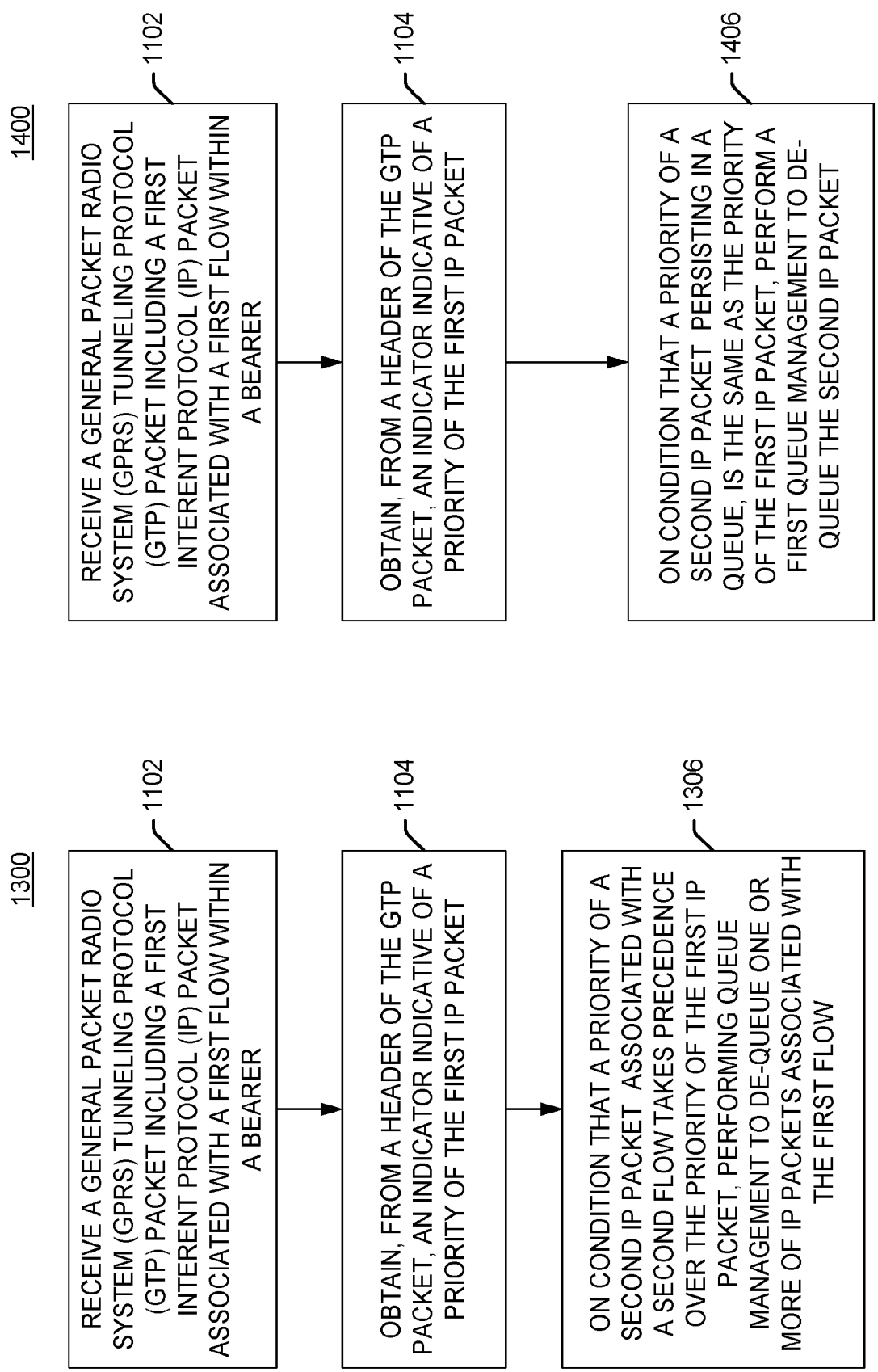

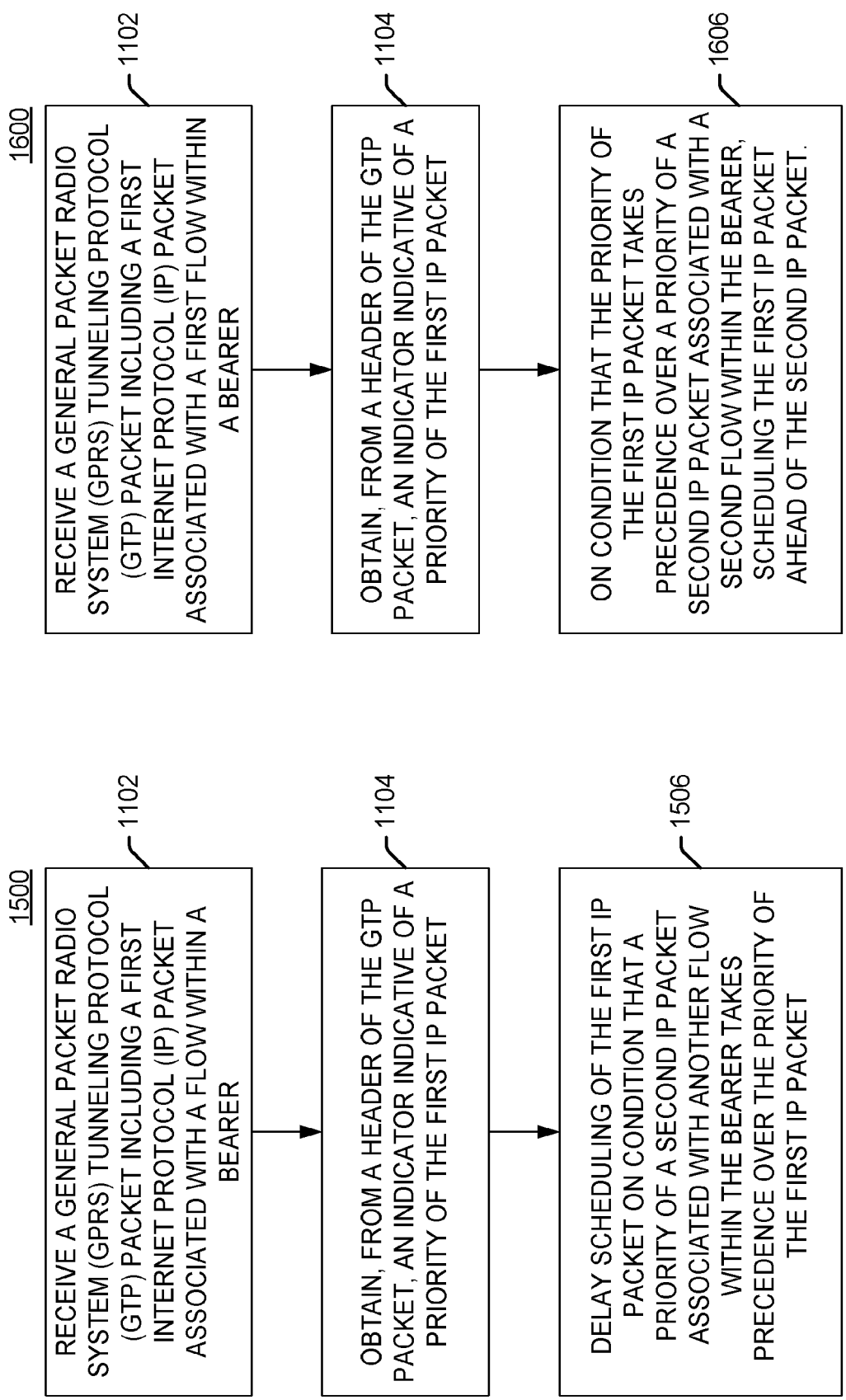

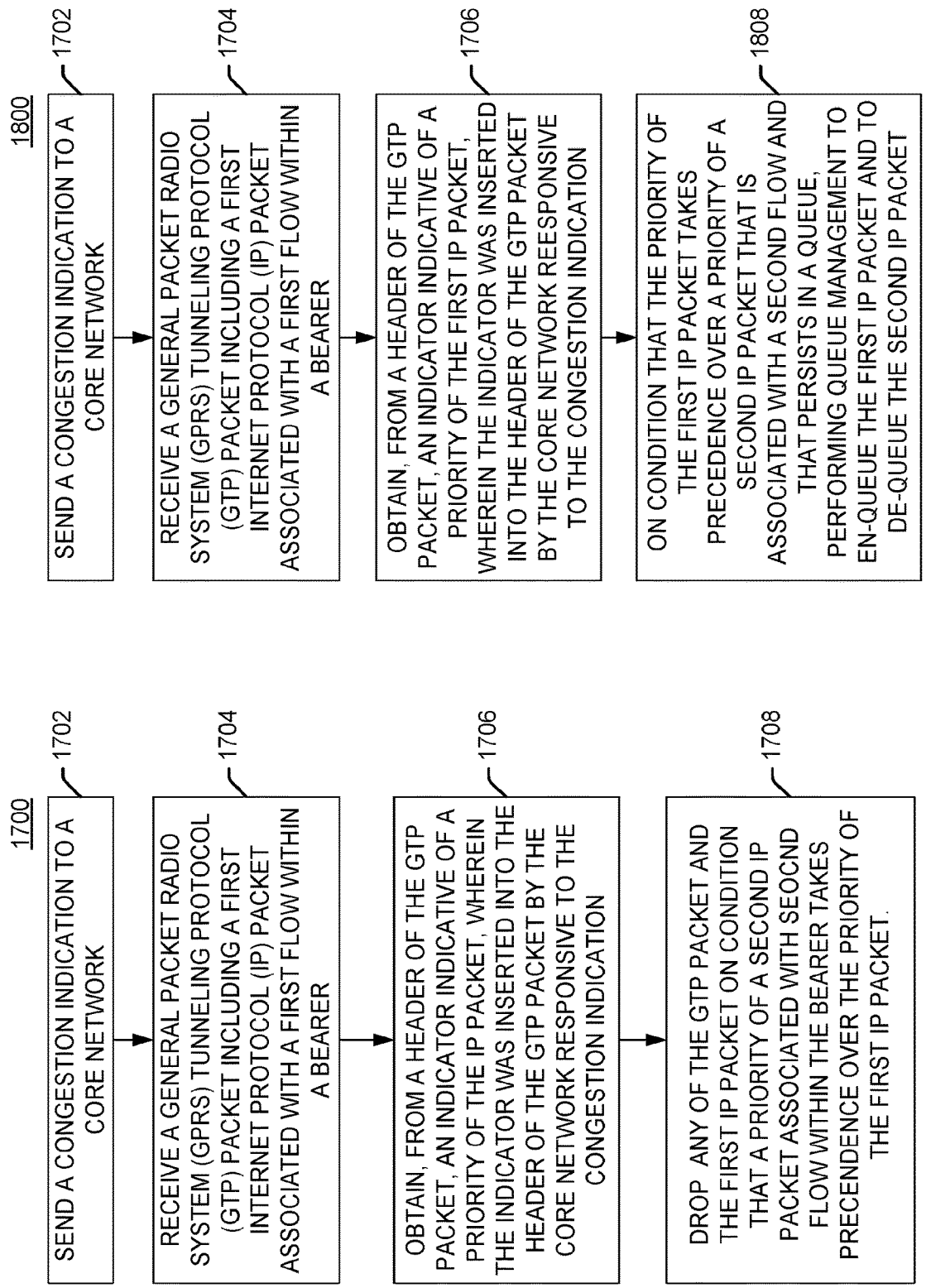

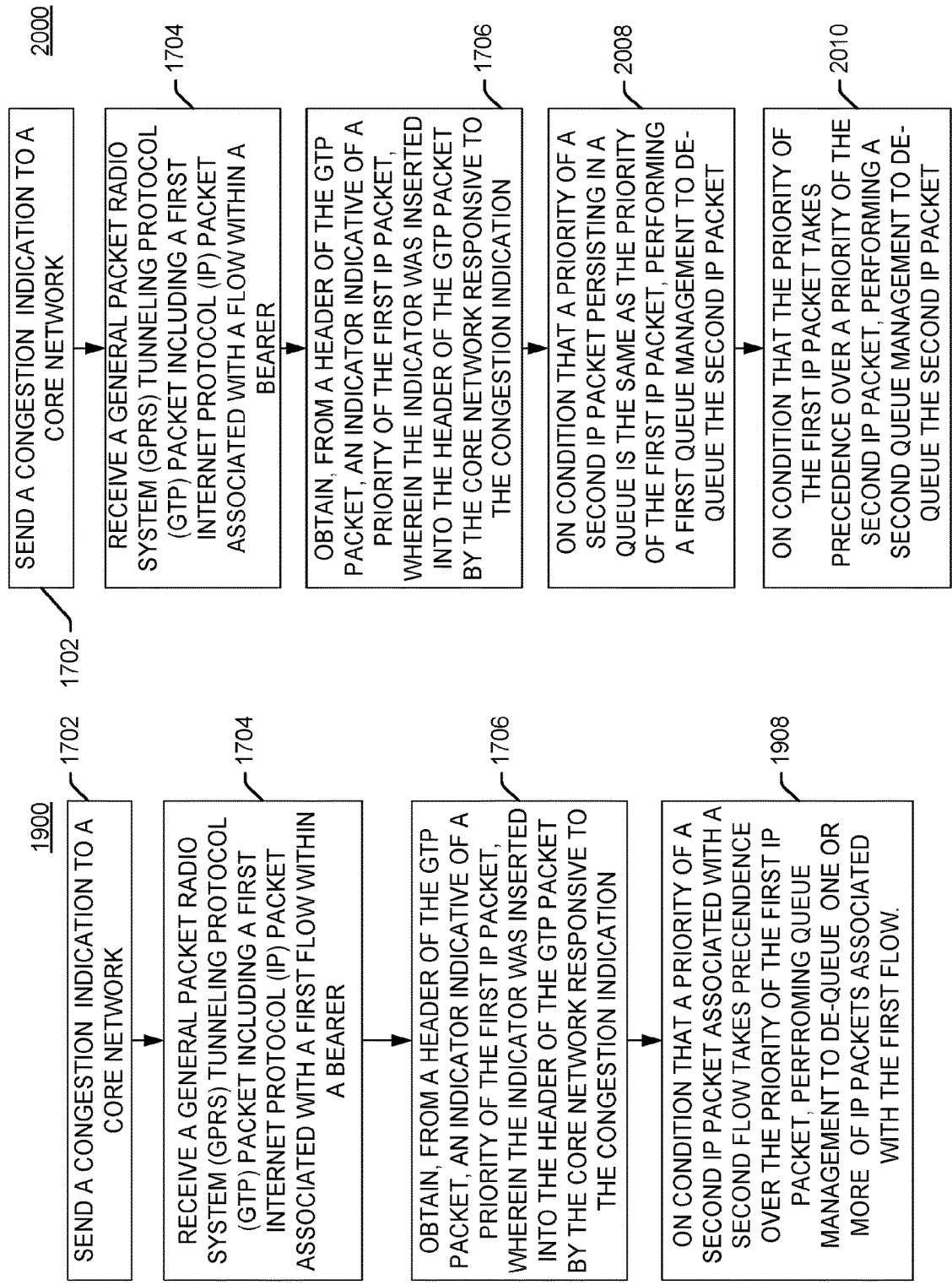

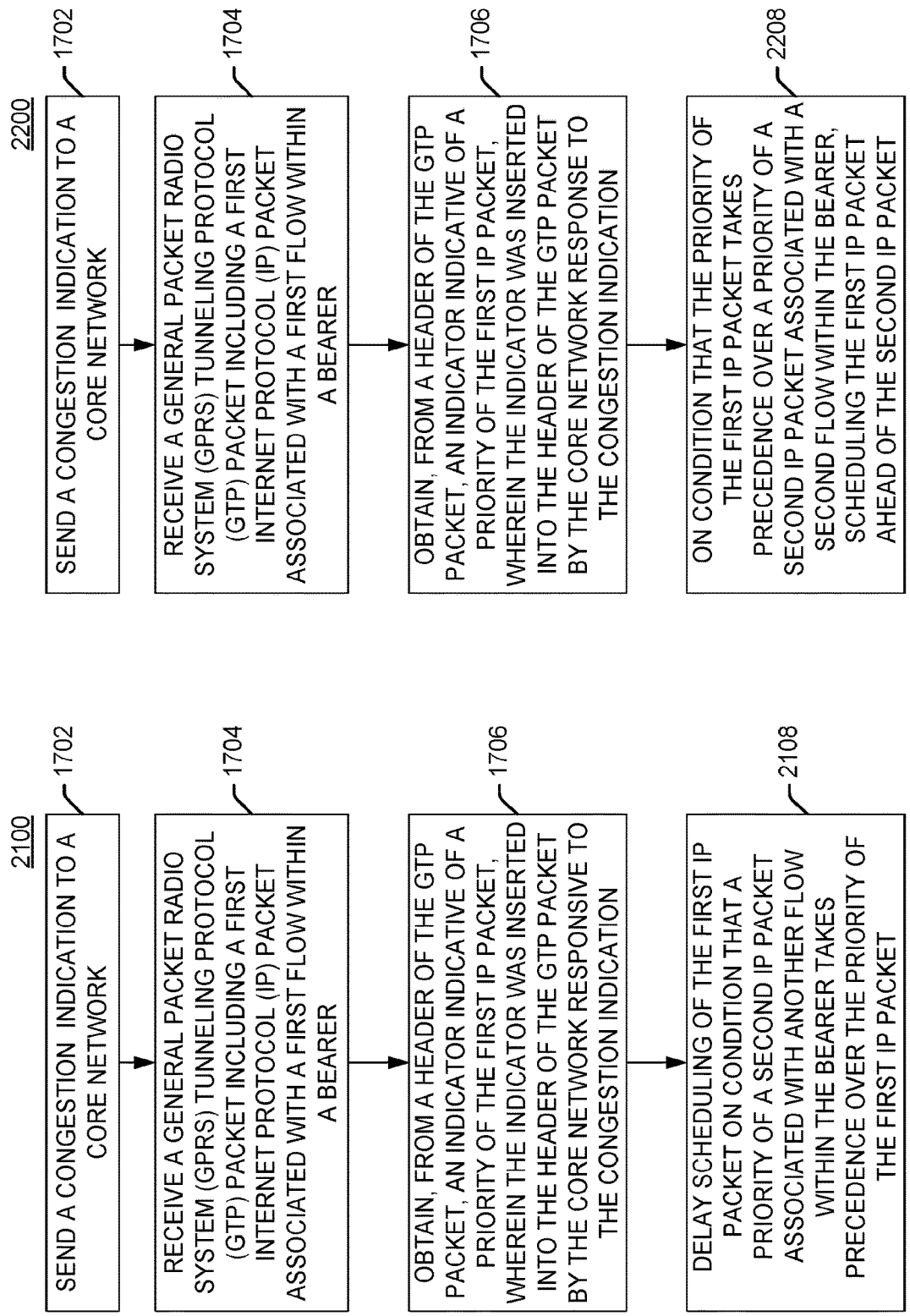

USER-PLANE CONGESTION MANAGEMENT

CROSS REFERENCE TO RELATED APPLICATIONS

This application is a continuation of U.S. patent application Ser. No. 15/928,876, filed Mar. 22, 2018, which is a continuation of U.S. Patent Application No. 14/759,818, filed Jul. 8, 2015, now issued U.S. Pat. No. 9,973,966, which is the National Stage Application of International PCT Application No. PCT/US2014/011099, filed Jan. 10, 2014, and claims the benefit of U.S. Provisional Application No. 61/806,807, filed Mar. 29, 2013, and U.S. Provisional Application No. 61/751,550, filed Jan. 11, 2013, the contents of each of which are incorporated by reference herein.

BACKGROUND

Field

This application is related to wireless communications.

Related Art

In recent years, demand for mobile wireless media has steadily increased, and its growth is predicted to increase with the new infrastructure of the Long Term Evolution (LTE) and/or LTE advanced network that offers significantly higher user data rates. Although present-day wireless networks have increased capacity, and smart phones are now capable of generating and/or displaying the media, actually transporting various types of the media across these advanced wireless communication networks has become challenging, and the management of resources in the wireless network to accommodate transmission of the media is a difficult task.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein:

FIGS. 2A-2G are block diagrams illustrating an example of a communications system and examples of default and dedicated bearers established the communications system;

FIGS. 11-22 are flow diagrams illustrating examples of flows directed to mitigating user plane congestion;

DETAILED DESCRIPTION

Figure 1A:
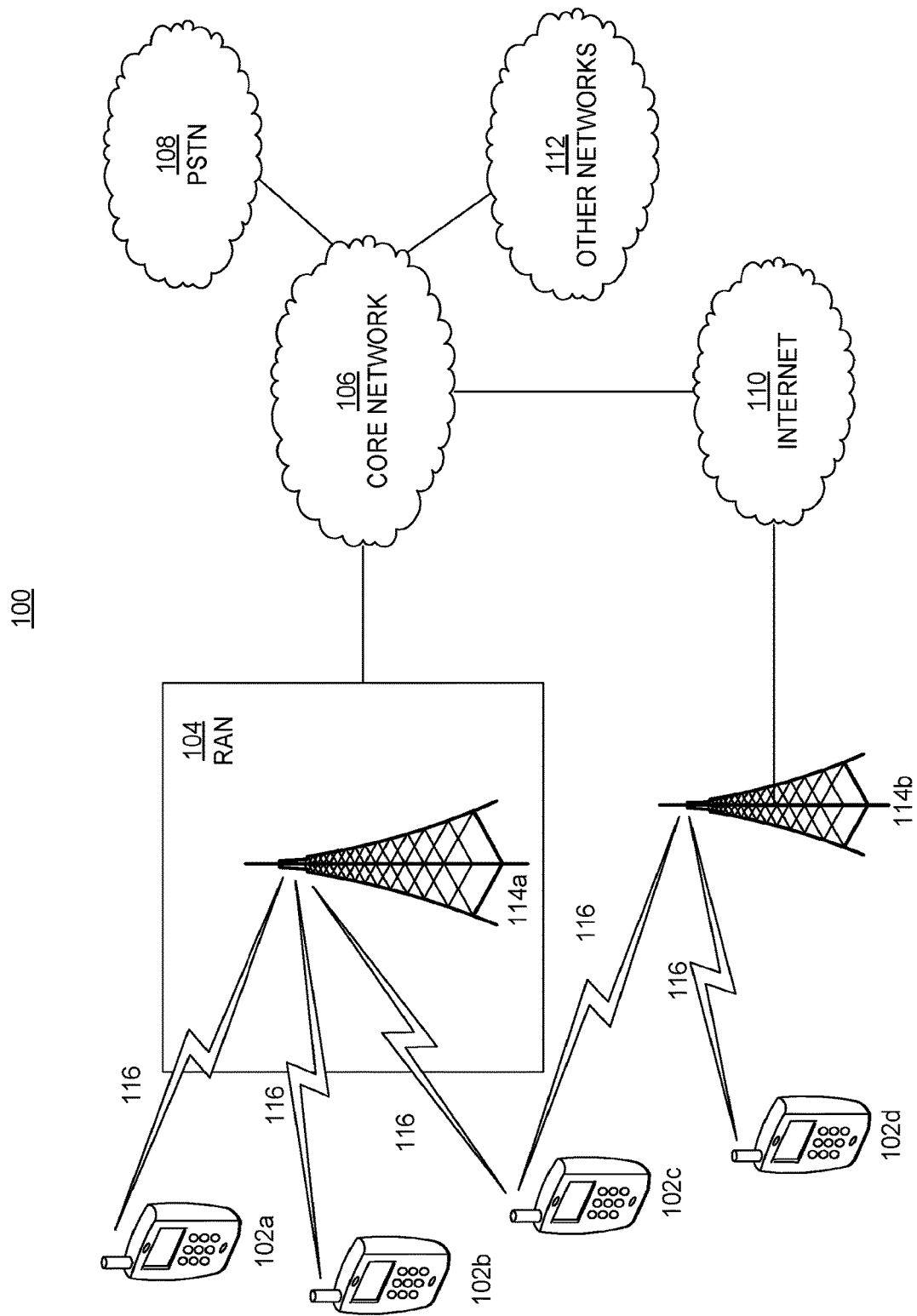
FIG. 1A is a system diagram of an example communications system in which one or more disclosed embodiments may be implemented.

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Example Communications System

The methods, apparatuses and systems provided herein are well-suited for communications involving both wired and wireless networks. Wired networks are well-known. An overview of various types of wireless devices and infrastructure is provided with respect to FIGS. 1A-1E, where various elements of the network may utilize, perform, be arranged in accordance with and/or be adapted and/or configured for the methods, apparatuses and systems provided herein.

FIGS. 1A-1E (collectively "FIG. 1") are block diagrams illustrating an example communications system 100 in which one or more disclosed embodiments may be implemented. The communications system 100, for example, may be suitable for implementing and/or carrying out, for example, any of bandwidth management ("BWM"), bandwidth aggregation ("BWA"), flow management, internet protocol ("IP") flow mobility ("IFOM"), and the like to IP traffic that may be carried over, across and/or among (collectively "among") multiple accesses and/or access systems; some, all or none of which use different access technologies. The IFOM may be based on over IP-level protocols. Such over IP-level protocols may include, for example, general-packet-radio service ("GPRS") tunneling protocol ("GTP"), and/or protocols based and/or built on Mobile-IP ("MIP"), such as, for example, dual-stack MIP version 6 ("DSMIPv6") and proxy MIP version 6 ("PMIPv6").

In general, the communications system 100 defines an architecture that supports multiple access systems over which multiple wireless users may access and/or exchange (e.g., send and/or receive) content, such as voice, data, video, messaging, broadcast, etc. The architecture also supports having two or more of the multiple access systems use and/or be configured in accordance with different access technologies. This way, the communications system 100 may service both wireless users capable of using a single access technology, and wireless users capable of using multiple access technologies.

The multiple access systems may include respective accesses; each of which may be, for example, an access network, access point and the like. In various embodiments, all of the multiple accesses may be configured with and/or employ the same radio access technologies ("RATs"). Some or all of such accesses ("single-RAT accesses") may be owned, managed, controlled, operated, etc. by either (i) a single mobile network operator and/or carrier (collectively "MNO") or (ii) multiple MNOs. In various embodiments, some or all of the multiple accesses may be configured with and/or employ different RATs. These multiple accesses ("multi-RAT accesses") may be owned, managed, controlled, operated, etc. by either a single MNO or multiple MNOs.

The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals, and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, a terminal or like-type device capable of receiving and processing compressed video communications, or like-type device.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), Node-B (NB), evolved NB (eNB), Home NB (HNB), Home eNB (HeNB), enterprise NB ("ENT-NB"), enterprise eNB ("ENT-eNB"), a site controller, an access point (AP), a wireless router, a media aware network element (MANE) and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
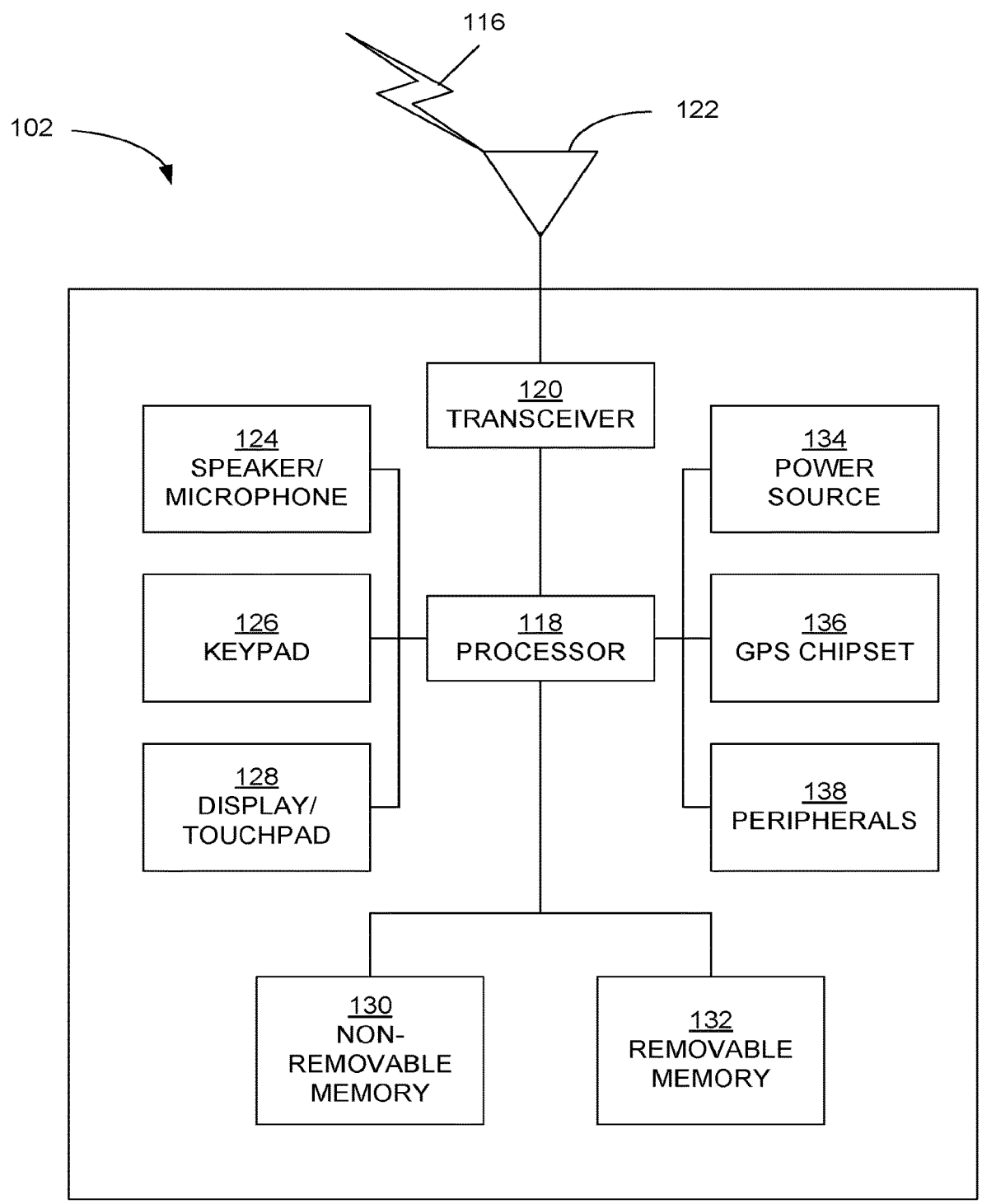
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a graphics processing unit (GPU), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
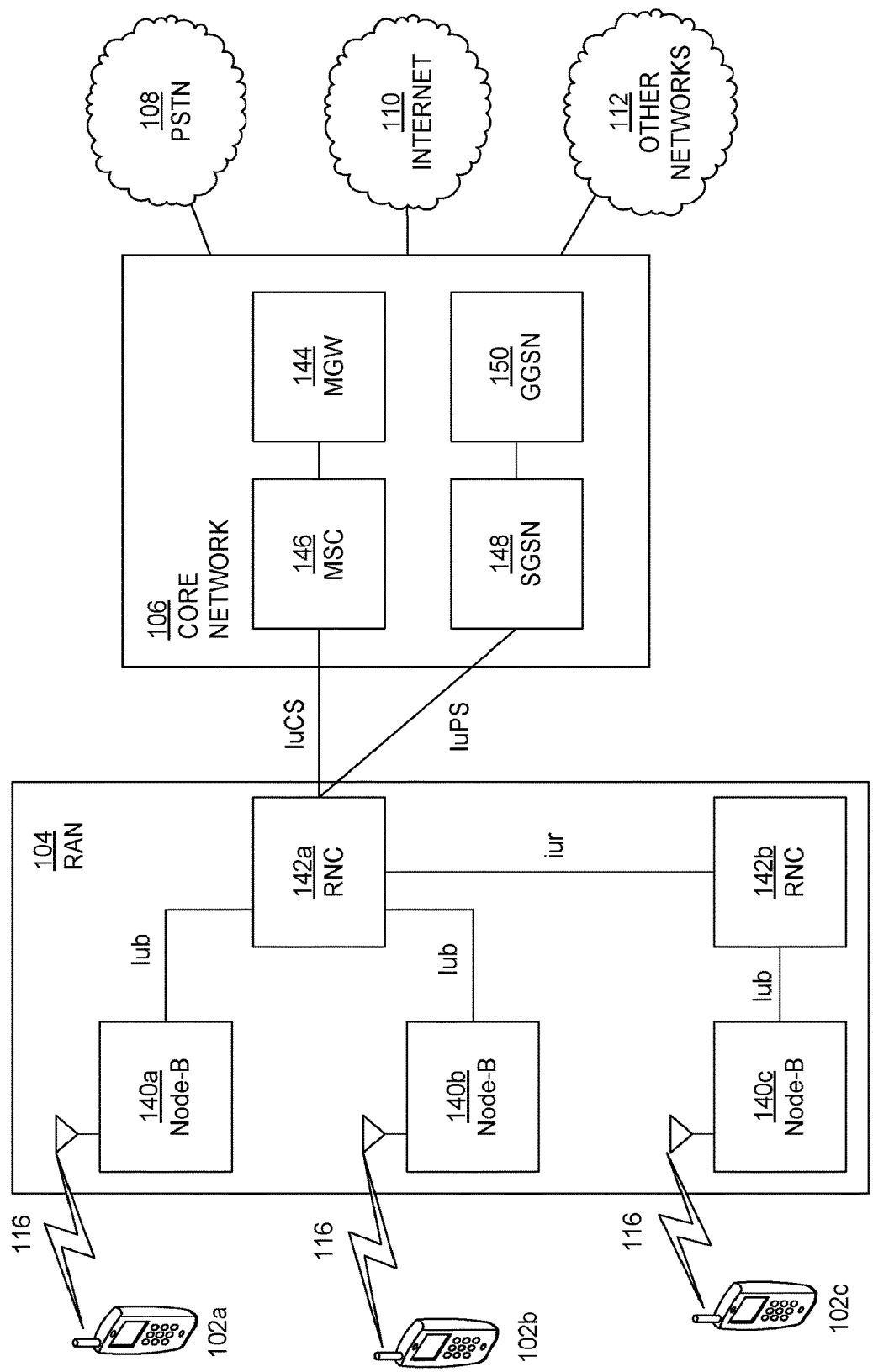
FIGS. 1C, 1D, and 1E are system diagrams of example radio access networks and example core networks that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
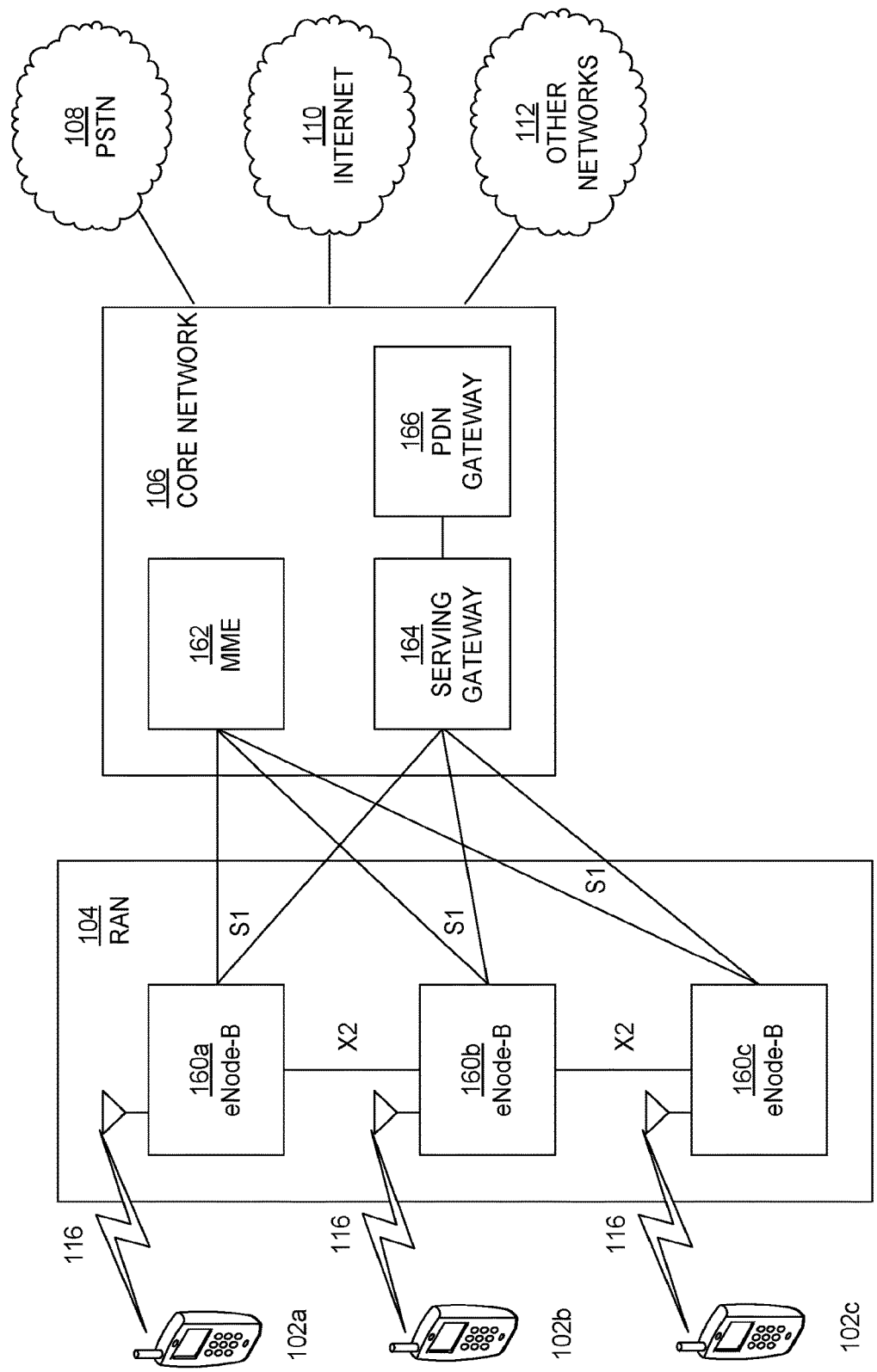

FIG. 1D is a system diagram of the RAN 104 and the core network 106 according to another embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode Bs 160a, 160b, 160c, though it will be appreciated that the RAN 104 may include any number of eNode Bs while remaining consistent with an embodiment. The eNode Bs 160a, 160b, 160c may each include one or more transceivers for communicating with the WTRUs 102a, 102b, 102c over the air interface 116. In one embodiment, the eNode Bs 160a, 160b, 160c may implement MIMO technology. Thus, the eNode B 160a, for example, may use multiple antennas to transmit wireless signals to, and receive wireless signals from, the WTRU 102a.

Each of the eNode Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode Bs 160a, 160b, 160c may communicate with one another over an X2 interface.

The core network 106 shown in FIG. 1D may include a mobility management gateway (MME) 162, a serving gateway (SGW) 164, and a packet data network (PDN) gateway (PGW) 166. While each of the foregoing elements are depicted as part of the core network 106, it will be appreciated that any one of these elements may be owned and/or operated by an entity other than the core network operator.

The MME 162 may be connected to each of the eNode Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular SGW during an initial attach of the WTRUs 102a, 102b, 102c, and the like. The MME 162 may also provide a control plane function for switching between the RAN 104 and other RANs (not shown) that employ other radio technologies, such as GSM or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The SGW 164 may also be connected to the PGW 166, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
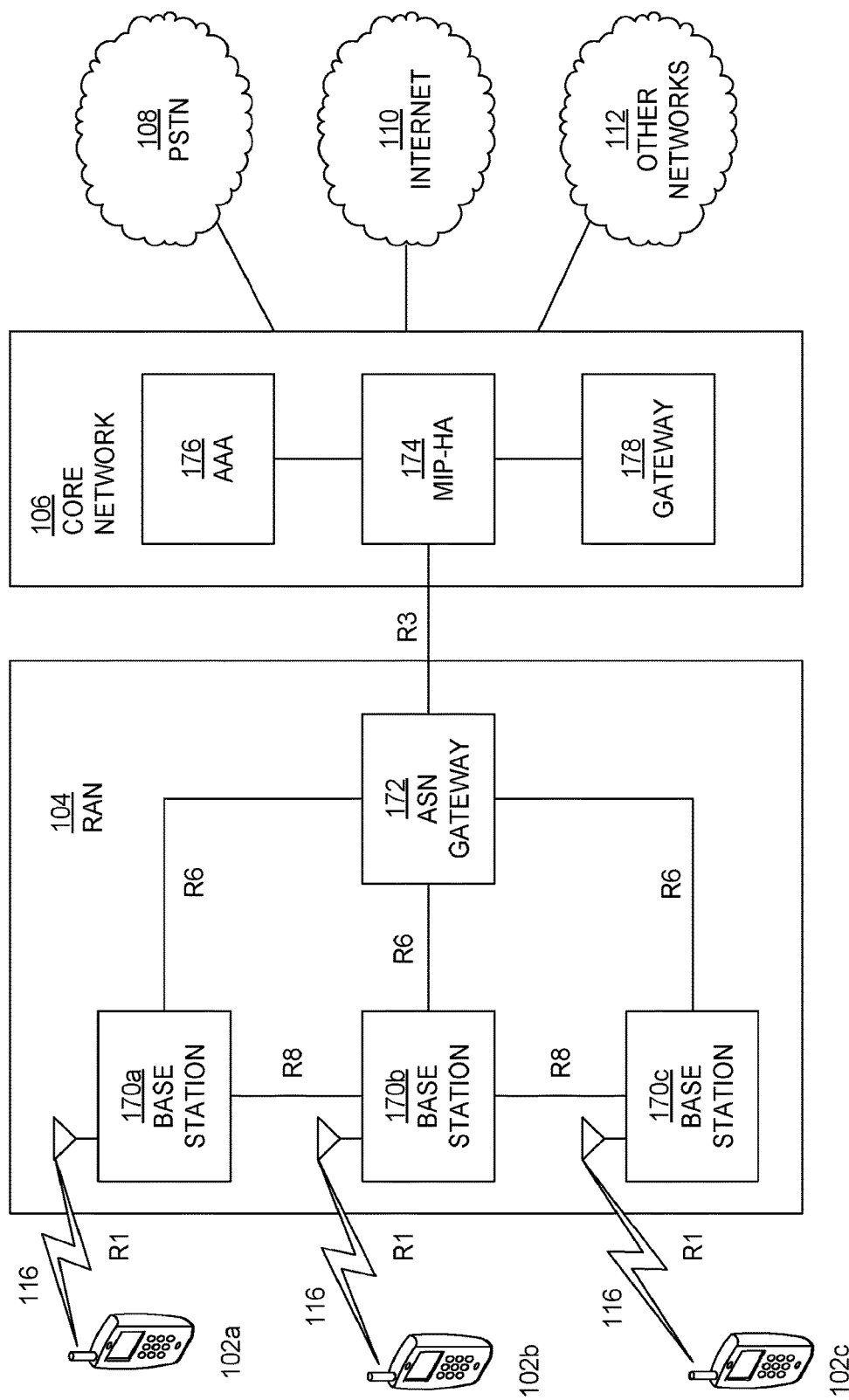

FIG. 1E is a system diagram of the RAN 104 and the core network 106 according to another embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1E, the RAN 104 may include base stations 170a, 170b, 170c, and an ASN gateway 172, though it will be appreciated that the RAN 104 may include any number of base stations and ASN gateways while remaining consistent with an embodiment. The base stations 170a, 170b, 170c may each be associated with a particular cell (not shown) in the RAN 104 and may each include one or more transceivers for communicating with the WTRUs 102a, 102b, 102c over the air interface 116. In one embodiment, the base stations 170a, 170b, 170c may implement MIMO technology. Thus, the base station 170a, for example, may use multiple antennas to transmit wireless signals to, and receive wireless signals from, the WTRU 102a. The base stations 170a, 170b, 170c may also provide mobility management functions, such as handoff triggering, tunnel establishment, radio resource management, traffic classification, quality of service (QoS) policy enforcement, and the like. The ASN gateway 172 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 170a, 170b, 170c may be defined as an R8 reference point that includes protocols for facilitating WTRU handovers and the transfer of data between base stations. The communication link between the base stations 170a, 170b, 170c and the ASN gateway 172 may be defined as an R6 reference point. The R6 reference point may include protocols for facilitating mobility management based on mobility events associated with each of the WTRUs 102a, 102b, 102c.

As shown in FIG. 1E, the RAN 104 may be connected to the core network 106. The communication link between the RAN 14 and the core network 106 may defined as an R3 reference point that includes protocols for facilitating data transfer and mobility management capabilities, for example. The core network 106 may include a mobile IP home agent (MIP-HA) 174, an authentication, authorization, accounting (AAA) server 176, and a gateway 178. While each of the foregoing elements are depicted as part of the core network 106, it will be appreciated that any one of these elements may be owned and/or operated by an entity other than the core network operator.

The MIP-HA 174 may be responsible for IP address management, and may enable the WTRUs 102a, 102b, 102c to roam between different ASNs and/or different core networks. The MIP-HA 174 may provide the WTRUs 102a, 102b, 102c with access to packet-switched networks, such as the Internet 11, to facilitate communications between the WTRUs 102a, 102b, 102c and IP-enabled devices. The AAA server 176 may be responsible for user authentication and for supporting user services. The gateway 178 may facilitate interworking with other networks. For example, the gateway 178 may provide the WTRUs 102a, 102b, 102c with access to circuit-switched networks, such as the PSTN 108, to facilitate communications between the WTRUs 102a, 102b, 102c and traditional land-line communications devices. In addition, the gateway 178 may provide the WTRUs 102a, 102b, 102c with access to the networks 112, which may include other wired or wireless networks that are owned and/or operated by other service providers.

Although not shown in FIG. 1E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

FIGS. 2A-2G are block diagrams illustrating an example of a communications system 200 and examples of default and dedicated bearers 205, 207 established in the communications system 200. The communications system 200 may be a multiple access system, and may be configured as provided above with respect to the communications system 100 of FIGS. 1A-1D. The communications system 200, for example, may include a WTRU 202 (e.g., a UE) and a network 203.

The network 203 may include a RAN 204 (FIG. 2B), a core network (not shown) and one or more PDNs, such as an internet 210. The RAN 204 may include a base station 260 (e.g., an eNode B). The WTRU 202 and the base station 260 may implement a radio technology such as E-UTRA, and may establish an air interface using LTE, LTE-A and/or other protocol(s) of like-type wireless communications standards. The core network may include an MME 262, a SGW 264, a PGW 266, a home subscriber server (HSS) and/or a subscriber profile repository (SPR) (collectively "HSS/SPR") 218, a Policy and Charging Control (PCC) architecture shown generally as 219, an access network discovery and selection function (ANDSF) 222, and other elements (not shown). The core network (and its constituent elements) may be formed in accordance with the system architecture evolution (SAE) as promulgated by the Third Generation Partnership Project (3GPP) for LTE, LTE-A and/or like-type communications standards. The core network may be, for example, an evolved packet core (EPC). Details of the core networks and/or communications systems, any of which may be representative of the communications system 200 and/or elements thereof, may be found in U.S. patent application Ser. No. 13/446,685, filed 13 Apr. 2012, which is incorporated herein by reference.

In general, the default bearer 205 is assigned to the WTRU 202 and established when the WTRU 202 first attaches to the network 203. The default bearer 205 remains assigned to the WTRU 202, and may persist while the WTRU 202 is attached to the network 203. Associated with the default bearer 205 is an IP address, which is implicitly assigned to the WTRU 202 (e.g., via a default evolved-packet-system (EPS) bearer activation). Although only one default bearer is shown, multiple default bearers may be assigned to the WTRU 202; each of which has carries its own (e.g., separate) IP address. Not all of the multiple default bearers need to be assigned when the WTRU 202 first attaches to the network. Typically, one default bearer is assigned when the WTRU first attaches to the network 203 and additional default bearers may be established at a later time. In some embodiments, a maximum of eleven (11) default bearers with the WTRU 202 may be established.

The dedicated bearer 207 acts as an additional bearer on top of the default bearer 205, and. is linked to the default bearer 205. The dedicated bearer 207 does not require a IP address separate from the IP address of the default bearer 205; which IP address is implicitly assigned to the WTRU 202 via, for example, a dedicated EPS bearer activation. Although only one dedicated bearer is shown, multiple dedicated bearers linked to the default bearer 205 may be assigned to the WTRU 202. In embodiments where multiple default bearers are assigned to the WTRU 202, one or more dedicated bearers may be established and linked to such multiple default bearers.

In terms of QoS, the default bearer 205 and the dedicated bearer 207 may provide for traffic differentiation based on respective levels or classes of service (each a "QoS class"). The default bearer 205 is typically configured for best effort class(es) of service, and the dedicated bearer 207 is typically configured for better than best effort class(es) of service. To facilitate providing such classes of service, the dedicated bearer 207 may be configured as a guaranteed bit rate (GBR) bearer, and the default bearer 205 may be configured as a non-GBR bearer. In general, a non-GBR bearer may be best suited for handling best-effort classes of service traffic, such as for file downloads, email and internet browsing, and a GBR bearer may be best suited for better than best effort classes of service (e.g., real-time) traffic, such as for conversational voice and video. Although it may be configured as a non-GBR bearer, the default bearer 205 may handle better than best effort classes of service traffic. The dedicated bearer 207 may handle best effort classes of service traffic notwithstanding that is may be configured as a GBR bearer.

The network 203 may reserve a minimum amount of bandwidth ("bandwidth allocation") for the dedicated bearer 207, and the dedicated bearer 207 may consume resources of the base station 260 regardless of whether it is used or not. If implemented properly, the dedicated bearer 207 should not experience packet loss in the network 203, including in the RAN 204 and the core network, due to congestion. The dedicated bearer 207 may be defined with (e.g., low) latency and jitter tolerances that are typically needed for real-time services.

The network 203 does not make a specific bandwidth allocation reservation for the default bearer 205. The default bearer 205 may experience packet loss when the network 203 is congested or otherwise resource constrained. A maximum bit rate (MBR) is not specified on a per-bearer basis for the default bearer 205 and/or any other default bearers. An aggregate maximum bit rate (AMBR) may be specified on a per-subscriber basis for all of the default bearers assigned to such subscriber.

Each of the default and dedicated bearers 205, 207 is associated with a set of QoS parameters ("bearer-level QoS parameters") for conveying one or more properties of a transport channel associated therewith. These properties may include, for example, bit rates, packet delay, packet loss, bit error rate and a scheduling policy of the base station 260. The bearer-level QoS parameters of the default bearer 205 ("default-bearer QoS parameters") may be assigned by the network 203, and/or based on subscription information maintained in (and retrievable from) the HSS/SPR 218. The default-bearer QoS parameters may include a QoS class indicator (QCI), and an allocation and retention priority (ARP).

The bearer-level QoS parameters of the dedicated bearer 207 ("dedicated-bearer QoS parameters") may include a QCI, an ARP, a GBR and a MBR. A decision to establish or modify the dedicated bearer 207 (or any other dedicated bearer) may be taken up by the core network, and the dedicated-bearer QoS parameters may be assigned by the core network (e.g., the MME 262). The values of the dedicated-bearer QoS parameters are generally not modified by the MME 262, and may be forwarded transparently to the base station 260 and/or other element of the RAN. The MME 262 may reject establishment of the dedicated bearer 207 (or any other dedicated bearer).

The default-bearer and dedicated-bearer QCIs may be used to specify how IP packets received on the respective default and dedicated bearers 205, 207 are treated. For example, the default-bearer QCI and dedicated-bearer QCI may be set to different values; each of which may be indicative of, and/or operate as a reference to, a set of attributes associated with the corresponding QoS class. The respective sets of attributes may impact several node-specific parameters, such as link layer configuration, scheduling weights and queue management, in different ways, and in turn, impact packet forwarding of traffic traversing each of the default and dedicated bearers 205, 207 handled by edge and/or intermediate nodes (e.g., the PGW 266 and/or the base station 260, respectively) of the network 203. Traffic differentiation between the default bearer 205 and the dedicated bearer 207 may be implemented by assigning different QoS classes to them, using different values for the QCIs, for instance.

3GPP has defined nine (9) different QCIs; each of which is indicative of one of nine (9) different QoS classes. Table 1 (below) lists the 9 QCIs along with corresponding attributes associated with each of the QCI types.

TABLE 1

3GPP QCIs and Corresponding Attributes

| QCI | Resource Type | Priority | Packet Delay Budget (NOTE 1) | Packet Error Loss Rate (NOTE 2) | Example Services |
|---|---|---|---|---|---|
| 1 | GBR | 2 | 100 ms | $10^{-2}$ | Conversational Voice |
| 2 | | 4 | 150 ms | $10^{-3}$ | Conversational Video (Live Streaming) |
| 3 | | 3 | 50 ms | $10^{-3}$ | Real Time Gaming |
| 4 | | 5 | 300 ms | $10^{-6}$ | Non-Conversational Video (Buffered Streaming) |
| 5 | Non-GBR | 1 | 100 ms | $10^{-6}$ | IMS Signalling |
| 6 | | 6 | 300 ms | $10^{-6}$ | Video (Buffered Streaming) TCP-based (e.g., www, e-mail, chat, ftp, p2p file sharing, progressive video, etc.) |
| 7 | | 7 | 100 ms | $10^{-3}$ | Voice, Video (Live Streaming) Interactive Gaming |
| 8 | | 8 | 300 ms | $10^{-6}$ | Video (Buffered Streaming) TCP-based (e.g., www, e-mail, chat, ftp, p2p file sharing, progressive video, etc.) |
| 9 | | 9 | | | |

QCIs 5-9 (non-GBR) may be assigned to the default bearer 205, and QCIs 1-4 (GBR) may be assigned to the dedicated bearer 207. Not all of the QCIs and/or QoS classes need to be adopted and/or deployed. For example, an operator transitioning to or otherwise implementing QoS in the network 203 might initially deploy only basic service classes, such as voice, control signaling and best-effort data, and later introduce dedicated bearers offering premium services, such as high-quality conversational video.

All traffic mapped to the default and dedicated bearers 205, 207 may receive the same bearer level packet forwarding treatment. For example, traffic mapped to the default and dedicated bearers 205, 207 may receive the bearer level packet forwarding treatment in accordance with respective QoS classes as indicated by respective QCIs assigned to such default and dedicated bearers 205, 207.

The communications system 200 may be suitable for implementing and/or carrying out any of BWM, BWA, flow management, IFOM and the like to IP traffic that may be carried over among multiple accesses and/or access systems, some, all or none of which use different access technologies. As shown in FIGS. 2C-G, the communications system 200 may include the WTRU 202 and network 203. The network 203 may include a 3GPP access 204₁, a trusted non-3GPP access 204₂, an untrusted non-3GPP access 204₃, a HA 207, the HSS/SPR 218, the PCC system 219, the ANDSF 222, a network monitoring and control function ("NMCF") 224, an evolved PDG ("ePDG") 226, a 3GPP AAA server 246, the SGW 264, the PGW 266 and a retransmission coordination function ("RCF") 268.

The PCC system 219 may support both 3GPP networks and non-3GPP networks interfacing with the network 203. The PCC system 219 may also support dynamic PCC for IFOM among multiple simultaneous 3GPP and non-3GPP access connections, e.g., among any of the 3GPP access 204₁, trusted non-3GPP access 204₂, and untrusted non-3GPP access 204₃ (collectively "accesses 204₁₋₃"). The PCC system 219 may include, as a baseline, the 3GPP PCC architecture due to, for example, general acceptance of such framework by non-3GPP and fixed broadband networks and 3GPP, but the concepts may be applied to other architectures as well. The PCC system 219 may include elements in addition to, in lieu of and/or different from elements of the 3GPP PCC architecture.

The PCC system 219 may handle policy and charging for the IMS over operator IP networks, for example, QoS policy control and flow-based charging. The PCC system 219 may also handle policy and charging for non-IMS services, including over-the-top (OTT) services (e.g., video streaming services on the Internet). In various embodiments, preconfigured PCC rules may be used on specific types of IP traffic identified via packet inspection (e.g., deep packet inspection (DPI)) and/or some other technique or method.

The PCC system 219 may perform QoS policy control. The QoS policy control may be used to ensure that delivery of one or more specified sets of IP user plane packets (each a "service data flow" (SDF)), is maintained at or above a GBR (if specified), and/or to ensure that such delivery does not exceed a specified MBR. In various embodiments, the GBR may be used to allocate network resources, while the MBR may be used to enforce the maximum bit rate that each of the SDFs may consume. Each of the SDFs may be identified by a 5-tuple. The 5-tuple may include, for example, a source IP address, a destination IP address, a source port number, a destination port number, and a transport protocol (e.g., transmission control protocol (TCP), user datagram protocol (UDP), etc.). The SDFs may be identified by other identifiers or combination of identifiers.

The PCC policy rules may be maintained in a policy and charging rules function (PCRF) 220 and enforced by a policy charging and enforcement function (PCEF) 270. The PCEF 270 may be a function of, or collocated in the PGW 266 (or, alternatively, in a GGSN of a packet-switched core network ("PS CN")). The PCEF 270 may reside in the user plane, and may function to ensure that the PCC policy rules are followed. The PCEF 270 may apply, for example, (i) QoS policies related to gating (block/allow) and traffic shaping (reduce the bandwidth) (collectively "traffic shaping"), and (ii), online and offline charging policies. The QoS policies may be at the SDF level or other level of granularity. The online and offline charging policies may be obtained from an online charging system (OCS) 221 and an offline charging system (OFCS) 223.

The PCC system 219 may include several interfaces and/or reference points. These interfaces and/or reference points may include, for example, an Rx reference point and a Gx reference point. The Rx reference point may, for example, employ a Diameter protocol. The Rx reference point resides between an application function (AF) 272 and the PCRF 220. The AF 272 may be a third party application server. This reference point may enable transport of application level session information from AF 272 to PCRF 220. Such information may include, for example: IP filter information to identify a SDF for policy control and/or differentiated charging and media/application bandwidth requirements for QoS control. For sponsored data connectivity, such information may include: the sponsor's identification, optionally, a usage threshold and whether the PCRF 220 reports such events to the AF 272, and/or information identifying an application service provider and application, for example, SDFs, Application ID, and the like. The Rx reference point may enable AF subscription to notifications on IP CAN bearer level events, for example, signaling path status of an AF session, in the IP CAN.

The Rx reference point may allow an application function (AF) 272 in the PDNs to provide information to the PCRF 220. The PCRF 220 may use the information as input to PCC rule generation. The provided information may include SDF information. The SDF information may include QoS requirements and/or parameters, for example.

The PCRF 220 may receive, from the AF 272, a request containing media level information about a flow. The PCRF 220 may analyze offered characteristics (set forth in the request) against operator defined policy, and authorize a certain QoS reservation and/or reject the request from the AF 272. The PCRF 220 may download service-related and/or subscriber-related information from the HSS/SPR 218. The PCRF 220 may also provide rules (e.g., PCC rules, event report triggers, etc.) to the PCEF 270. Some PCC rules may be pre-configured, and the PCEF 270 may apply these rules to specific types of IP traffic. The specific types of IP traffic may be identified by way of packet inspection, for example.

The PCRF 220 may have dynamic control over PCC and/or application detection and control (ADC) behavior at the PCEF 270. Such dynamic control may be enabled by the Gx reference point. The Gx reference point may enable the signaling of PCC/ADC decision, which may govern the PCC/ADC behavior. The Gx reference point may support one or more of the following functions: establishment of Gx session (corresponding to an IP CAN session, for example) by the PCEF 270; requests for PCC/ADC decision from the PCEF 270 to the PCRF 220; provisioning of IP flow mobility routing information from PCEF 270 to PCRF 220; provisioning of PCC/ADC decision from the PCRF 220 to the PCEF 270; reporting of the start and the stop of a detected applications and/or transfer of SDF descriptions and application instance identifiers for detected applications from the PCEF 270 to the PCRF 220; reporting of the accumulated usage of network resources on a per IP-CAN session basis from the PCEF 270 to the PCRF 220; delivery of IP CAN session specific parameters from the PCEF 270 to the PCRF 220 or, if Gxx is deployed, from the PCRF 220 to the PCEF 2710 per corresponding request; negotiation of IP CAN bearer establishment mode (UE-only or UE/NW); and termination of a Gx sessions (corresponding to an IP CAN session, for example) by the PCEF 270 or the PCRF 220. The PCRF decision to terminate a Gx session may be based on operator policies. It may only occur in rare situations (for example, the removal of a WTRU subscription) to avoid service interruption due to the termination of the IP CAN session.

An Sp reference point may reside between the SPR 218 and the PCRF 220. The Sp reference point may allow the PCRF 220 to request subscription information related to the IP CAN transport level policies from the SPR 218 based on a subscriber ID (e.g., an international mobile subscriber identity (IMSI)), a PDN identifier and possibly other IP CAN session attributes. The Sp reference point may allow the SPR 218 to notify the PCRF 220 when the subscription information has been changed. The SPR 218 may stop transmitting the updated subscription information when a cancellation notification request has been received from the PCRF 220.

A Gy reference point may resides between the OCS 221 and the PCEF 270. The Gy reference point may allow online credit control for service data flow based charging. For a visited access, a visited Private Land Mobile Network (PLMN) may use an OCS proxy between the PCEF 270 and the OCS 221.

A Sy reference point may reside between the PCRF 220 and the OCS 221. The Sy reference point may enable transfer of policy counter status information relating to subscriber spending from the OCS 221 to the PCRF 220. The Sy reference point may support one or more of the following functions: requests for reporting of policy counter status information from PCRF 220 to OCS 221; subscribing to, or unsubscribing from, spending limit reports (i.e. notifications of policy counter status changes); reporting of policy counter status information from the OCS 221 to the PCRF 220 pursuant a PCRF request; notification of spending limit reports from the OCS 221 to PCRF 220; and cancellation of spending limit reporting from the PCRF 220 to the OCS 221.

A Gz reference point may reside between the PCEF 270 and the OFCS 223. The Gz reference point may enable transport of service data flow based offline charging information.

In addition to using GPRS Tunneling Protocol (GTP) to provide access to the PGW 266 (or, a GGSN), the PCC architecture 219 may use Internet Engineering Task Force (IETF) based Mobile IP (MIP) protocols (e.g., any of MIPv4, PMIPv6 and DSMIPv6). The MIP protocols may facilitate convergence of various types of accesses, such as, for example, the trusted non-3GPP access $204_2$, untrusted non-3GPP access $204_3$, and other systems, such as 3GPP2, WLAN, and WiMAX (not shown) with the non-3GPP systems. To facilitate the use of MIP protocols that do not support the QoS-related signaling inherent in GTP, the PCC architecture 219 may include a Bearer Binding and Event Reporting Function (BBERF) 274. The BBERF 274 may include an interface, for example, a Diameter-based Gxx interface, for QoS information conveyed to and/or from the PCRF 220. The Gxx reference point may correspond to the Gxa and Gxc. The Gxx reference point may enable the PCRF 220 to have dynamic control over the BBERF behavior. The Gxx reference point may support the one or more of the following functions: establishment of a Gxx session by the BBERF 274; termination of a Gxx session by BBERF 274 and/or PCRF 220; establishment of a Gateway Control Session by the BBERF 274; termination of a Gateway Control Session by the BBERF 274 or the PCRF 220; requests for QoS decisions from the BBERF 274 to the PCRF 220; provisioning of QoS decisions from the PCRF 220 to the BBERF 274; delivery of IP CAN-specific parameters from the PCRF 220 to the BBERF 274, or from the BBERF 274 to the PCRF 220; and negotiation of IP CAN bearer establishment mode (UE-only and UE/NW). A QoS control decision may consist of zero or more QoS rule(s) and IP CAN attributes.

The PCC architecture 219 may also support access to home services or direct local services when roaming in a visited Private Land Mobile Network (PLMN) (not shown). This support may be enabled by PCC policy peering between Home and Visited PCRFs. Such peering may be carried out via a Diameter-based S9 interface, for example. The S9 reference point may reside between a PCRF in the HPLMN (H PCRF) and a PCRF in the VPLMN (V PCRF). For roaming with a visited access (PCEF and, if applicable, BBERF in the visited network), the S9 reference point may enable the H PCRF to (via the V PCRF): have dynamic PCC control, including the PCEF and, if applicable, BBERF, and, if applicable, TDF, in the VPLMN; deliver or receive IP CAN-specific parameters from both the PCEF and, if applicable, BBERF, in the VPLMN; serve Rx authorizations and event subscriptions from an AF in the VPLMN; and receive Application Identifier, service flow descriptions, if available, and application detection start/stop event triggers report. For roaming with a home routed access, the S9 may enable the H PCRF to provide dynamic QoS control policies from the HPLMN, via a V PCRF, to a Bearer Binding and Event Reporting Function (BBERF) in the VPLMN.

Although not shown, the core network may include a User Data Repository (UDR), instead of the HSS/SPR 218, to store PCC related subscription data, if, for example, a User Data Convergence (UDC) architecture is employed. A Ud reference point may reside between the UDR and the PCRF 220. The Ud reference point may act as an application front-end. The Ud reference point may be used by the PCRF 220 to access PCC related subscription data when stored in the UDR.

The PCC architecture 219 may include a Traffic Detection Function (TDF) 276. The TDF 276 may perform application traffic detection, notification, and policy control. The PCC architecture 219 may support an SPR-based architecture for roaming with home-routed access, which may be facilitated by S9 roaming interfaces and the TDF 276. An Sd reference point may reside between the PCRF 220 and the TDF 276. The Sd reference point may enable the PCRF to possess dynamic control over the ADC behavior at the TDF 276. The Sd reference point may enable the signaling of ADC decisions, which govern the ADC behavior. The Sd reference point may support one or more of the following functions: establishment of TDF session between the PCRF 220 and the TDF 276; termination of a TDF session between the PCRF 220 and the TDF 276; provisioning of ADC decisions from the PCRF 220 (e.g., for application traffic detection and enforcement at the TDF 276); requests for ADC decisions from the TDF 276 to the PCRF 220; reporting of the start and the stop of a detected applications and transfer of SDF descriptions and/or application instance identifiers for detected applications from the TDF 276 to the PCRF 220; reporting of the accumulated usage of network resources on a per TDF session basis from the TDF 276 to the PCRF 220; and requests for. and delivery of, IP CAN session specific parameters between the PCRF 220 and the TDF 276.

The PCC architecture 219 may handle multiple simultaneous access connections, and support for DSMIPv6 based Internet Protocol (IP) flow mobility (IFOM), including both WTRU-initiated and/or network-initiated IFOM. The support for such IFOM may involve the PCEF 270 keeping the PCRF 220 up to date about a current routing address and IFOM routing rules for each IP flow. The IFOM routing rules may include information that the PCRF 220 may use to install, in the PCEF 270, the QoS rules for SDFs subject to flow mobility. The IFOM routing rules may be provided to the PCRF 220 from the PCEF 270 during session establishment or modification. The PCEF 270 may derive the IFOM routing rules based on flow binding information received from the WTRU 202.

The PCC architecture 219 may also include an Event Reporting Function (ERF). The ERF may perform event trigger detection. The ERF, for example, may report an event to the PCRF 220 responsive to the event matching the event trigger. The ERF may be integrated into, integral to, combined with co-located with any of the PCEF 270, BBERF 274 and TDF 276 for solicited application reporting (if applicable).

The PCRF 220 may accept input for PCC decision-making from any of the PCEF 270, BBERF 274, TDF 276, the HSS/SPR 218, AF 272, and itself. One or more PCC policy rules, QoS control rules, IP-CAN bearer/session policy information rules, usage monitoring control information rules, IFOM routing rules and application detection and control (ADC) rules may be handled by the PCC architecture 219. For example, the SDFs may be mapped to PCC policy rules sent to the PCEF 270. These PCC policy rules may include a rule name, a service identifier, one or more SDF filters, precedence, gate status (open/closed), QoS parameters, charging key (rating group), other charging parameters, and the like.

The QoS control rules sent to BBERF 274 may include a subset of the PCC policy rules. As an example, the QoS control rules may include the rule name, one or more of the SDF filters, the precedence and the QoS parameters. Alternatively, the QoS control rules may be the same as the PCC policies rules. The QoS parameters provided in both of the PCC policy rules and the QoS control rules may include one or more QCIs, one or more subordinate QCIs ("sub-QCIs"), reserved bit rates for guaranteed bearers, maximum bit rates for best effort bearers, allocation/retention priority (ARP), APN-Aggregated Maximum Bit Rate (AMBR), and the like. The QoS parameters may include other parameters, as well.

Bearer binding may involve association of PCC policy rules to an access bearer. For GTP-based access, both charging and QoS rule enforcement may be carried out by the PCEF 270. For PMIPv6 access, the QoS information might not be conveyed using GTP-based protocols. A Diameter-based control protocol may be used over the Gxx interface instead to convey the QoS rules to the BBERF 274. In various embodiments, the bearer binding may occur in the BBERF 274, but charging and/or gating may be carried out in the PCEF 270.

The ANDSF 222 may provide interworking (e.g., 3GPP/non-3GPP interworking) information for the WTRU 202 over an IP-based S14 interface, for example. In general, the ANDSF 222 may enable a carrier to balance subscribers among the available accesses using best access selection criteria based on current requirements of the WTRU 202. The ANDSF 222 may provide support for IFOM, as currently standardized using DSMIPv6 or otherwise.

The ANDSF 222 may assist the WTRU 202 in discovery of non-3GPP accesses, if any. The ANDSF 222 may provide the WTRU 202 with rules for policing the connection to these networks, such as, inter-system mobility policies (ISMP) and inter-system routing policies (ISRP) using, for example, a management object (MO) (hereinafter "ANDSF MO"). The relation between the ISMP, the ISRP and discovery information may be that (i) the ISMP prioritize different accesses when the WTRU 102 is not capable of connecting to the core network through multiple accesses, (ii) the ISRP indicate how to distribute traffic among available accesses when the WTRU 202 is capable of connecting to the core network through the multiple accesses (e.g., the WTRU 202 is configured for IFOM, MAPCON, non-seamless WLAN offload or any combination of these capabilities); and (iii) and the discovery information provides further information for the WTRU 202 to access the different accesses defined in the ISMP and/or the ISRP.

The ISMP may enable IP flow level control. The ISMP may be provided by a MNO, and may be defined per access point name (APN), per IP flow class under any APN or per IP flow class under a specific APN. The ISMP may be defined in other ways, as well. The IP flow class may be identified via any of a media type (e.g., audio), IMS Communication Service Identifier (e.g., MMTEL) for IMS applications and respective 5-tuple (e.g., IP source address, IP destination address, source port, destination port, protocol type) for any type of application. The 5-tuple may include wildcard values in any of the possible fields. For example, the ANDSF 222 may indicate that a given (e.g., a 3GPP) access has a highest priority access for a given IP flow class, and another (e.g., an untrusted-non-3GPP) access has a highest priority access for another IP flow class. For example, the ANDSF 222 may indicate that 3GPP access $204_1$ has a highest priority access for a given IP flow class, and the untrusted-non-3GPP access $204_3$ has a highest priority access for another IP flow class.

The ISRP may provide the capability to identify traffic based on types of information, including extrinsic information available to the WTRU 202, such as the APN, and IP packet header information. The IP packet header information may include, for example, transport protocol, destination port and destination IP address.

The ANDSF 222 may also be adapted to perform traffic identification and/or record traffic-identification information. Identification of the traffic may be based on (i) throughput (e.g., identifying traffic based on the total amount of data sent/received); (ii) an application (e.g., identifying traffic based on an application ID/name/etc.); (iii) content type (e.g., identifying traffic based on the type of content (e.g. video, audio, data, control, etc.); and (iv) destination domain (e.g., identifying traffic based on the destination domain, such as the fully qualified destination name (FQDN) in the web request). The traffic-detection information may be stored in the ANDSF MO along with other ANDSF information described herein and/or set forth in 3GPP TS 24.312.

The ANDSF 222 may receive from the WTRU 202 an indication of its capability to support ISMP and/or ISRP when, for example, the WTRU 202 is in the process of establishing a connection. The ANDSF 222 may provide the policies (e.g., the ISMP and/or ISRP) to the WTRU 202, and, based on the provided policies, the WTRU 202 may request the PGW 266 (e.g., a home agent (HA) per DSMIPv6-based IFOM) to route IP flows to various accesses; as appropriate. (e.g., the HA 207 per DSMIPv6-based IFOM) to route IP flows to the 3GPP access $204_1$, trusted non-3GPP access $204_2$, and/or untrusted non-3GPP access $204_3$; as appropriate.

In various embodiments, the communications system 200 may include support (e.g., any of an interface or reference point) for establishing and/or exploiting interaction (direct or otherwise) between the PCC system 219 and ANDSF 222 including, for example, handling of potential policy-related conflicts. The ANDSF 222, PCC system 219 and functionality provided herein may include elements and functions to permit interaction between the ANDSF 222 and PCC system 219 to facilitate policy-based flow management among any of the accesses $204_{1-3}$. The policy-based flow management may allow MNOs to provide users with an expected quality of experience ("QoE").

The expected QoE may be obtained through, for example, one or more polices ("BWM policies") for managing bandwidth among any of the accesses $204_{1-3}$. Some or all of the BWM policies may be configured to make flexible and/or efficient use of network resources. The interaction may be manifested as control plane functionality (e.g., signaling) between ANDSF 222 and entities of the PCC system 219, such as, for example, between the ANDSF 222 and the PCRF 220. The control plane signaling may subsequently affect user plane paths delivering data services.

Depending on capabilities of the WTRU 202 and network, policy-based traffic management may be employed to 1) identify and segregate IP data flows ("IP flows") based on a type of service in use (e.g., "flow identification" and "flow filtering", respectively), and/or 2) assign specific flows or sub-flows over at least two of the accesses $204_{1-3}$ simultaneously ("flow routing" and "sub-flow routing", respectively).

Mobility signaling may be used to provide routing information to the network (e.g., PGW/HA 266/207 in the EPC network 203), resulting in possible establishment, modification, or deletion of bearers carrying IP flows. The PCC signaling may be used to provide QoS rules and event report triggers to the appropriate gateways (e.g., PGW/PCEF 266/ 270 in the EPC network 203) at a SDF or other level based on a current routing of IP flows.

In addition to WTRU-initiated mobility signaling to the DSMIPv6 Home Agent (HA) 207 to trigger the PCEF-to-PCRF PCC signaling, signaling between the WTRU 202 and ANDSF 222, and between the ANDSF 222 and PCRF 220 may be carried out. For example, measurements or metrics about (e.g., performance of) the network (e.g., local operating environments) may be collected by the WTRU 202 and/or by one or more RANs. These measurements and/or metrics (collectively "measurements") may be extracted from RAT drivers, application statistics, etc., for example.

Once collected, various reporting mechanism may be used by the WTRU 202 and/or RANs to report the measurements to any of the ANDSF 222 and PCRF 220. As an example, the measurements may be reported back to the ANDSF 222 by storing the measurements in the ANDSF MO ("UE-MO") at the WTRU 202, and synchronizing the ANDSF MO ("NETWORK-MO") at the ANDSF 222 using any of a push and/or pull model.

To facilitate reporting the measurements along with other information (e.g., policy information) to the PCRF 220, the PCRF 220 may establish a connection (direct or otherwise) with the ANDSF 222 over a defined interface. This interface may be defined in accordance with a standardized or proprietary protocol. For example, the interface may be defined in accordance with any of a Diameter protocol, Diameter application and a protocol based on the Diameter protocol. Alternatively the interface may be defined in accordance with a device management (DM) protocol, such as, for example, Open-Mobile Alliance (OMA) DM protocol. The PCRF 220 may also establish a connection with the WTRU 202 via the connection with the ANDSF 222.

Although the PGW 266 includes the functionality of HA 207, as shown in FIG. 2D, such functionality of the HA 207 may be implemented as a stand-alone entity or as an entity of the EPC network 203 other than the PGW 266. As an alternative, the functionality of the HA 207 may be distributed among a number of entities of the EPC network 203. As another alternative, the HA 207 may be co-located with any of the PGW 266 and another entity of the EPC network 203 (not shown).

The EPC network 203 may define a 3GPP access system 205$_1$, a trusted-non-3GPP-access system 205$_2$ (e.g., a 1evDo access system) and an untrusted-non-3GPP-access system 205$_3$ (e.g., a WLAN access system). As shown, the 3GPP access system 205$_1$ may include the 3GPP access 204$_1$, the SGW 264 and the PGW 266. The trusted-non-3GPP-access system 205$_2$ may include the trusted non-3GPP access 204$_2$, and the PGW 266. The trusted non-3GPP access 204$_2$ may include an access gateway ("AGW") 275 communicatively coupled with the PGW 266 and one or more of the base stations of the trusted non-3GPP access 204$_2$ (not shown). The untrusted-non-3GPP-access system 205$_3$ may include the untrusted non-3GPP access 204$_3$, the ePDG 226 and the PGW 366.

The WTRU 202 may exchange DSMIP signaling messages with the HA 207 via any of the 3GPP access system 205$_1$, trusted-non-3GPP-access system 205$_2$ and untrusted-non-3GPP-access system 205$_3$. The DSMIP signaling messages may be carried via an S2c interface or any other suitable interface.

The NMCF 224 may obtain performance metrics associated with any of the accesses 204$_{1-3}$. The NMCF 224 may, for example, collect performance metrics, such as, congestion (user-plane or otherwise), connectivity, loading, latency, etc. associated with local radio and/or backhaul links, via interfaces on the accesses 204$_{1-3}$. Alternatively, the NMCF 224 may garner the performance metrics from one or more network condition reports (e.g., radio reports) associated with the accesses 204$_{1-3}$. The network condition reports may emanate from any of (i) the WTRU(s) 202 ("WTRU network condition report(s)"); (ii) the untrusted non-3GPP access 204$_3$ ("untrusted-access network condition report(s)"), trusted non-3GPP access 204$_2$ ("trusted-access network condition report(s)") and the 3GPP access 204$_1$ ("3GPP network condition report(s)"). The NMCF 224 may receive the network condition reports directly from the WTRUs 202 and/or the accesses 204$_{1-3}$. Alternatively and/or additionally, the NMCF 224 may receive the network condition reports by way of one or more network entities, such as any of the PCRF 220, ANDSF 222, HSS/SPR 218 and PGW 266.

The WTRU network condition reports, individually or collectively, may include one or more of the performance metrics associated with one or more of the accesses 204$_{1-3}$, as detected, measured or otherwise obtained by the WTRUs 202. The WTRU network condition reports, individually or collectively, may include, in addition to or in lieu of such performance metrics, information from which one or more performance metrics may be derived, generated or otherwise obtained (hereinafter "performance information").

The untrusted-access network condition reports, individually or collectively, may include one or more of the performance metrics and/or performance information associated with the untrusted non-3GPP access 204$_3$, as detected, measured or otherwise obtained by one or more BSs (e.g., WLAN APs) of the untrusted non-3GPP access 204$_3$. The trusted-access network condition reports may include one or more of the performance metrics and/or performance information associated with the trusted non-3GPP access 204$_2$, as detected, measured or otherwise obtained by one or more BSs (e.g., H/E(e)NBs) of the trusted non-3GPP access 204$_2$. The 3GPP-RAN reports, individually or collectively, may include one or more of the performance metrics and/or performance information associated with the 3GPP access 204$_1$, as detected, measured or otherwise obtained by one or more BSs (e.g., NBs and/or eNBs) of the 3GPP access 204$_1$.

For scalability, the performance metrics, performance information and/or the network condition reports may be aggregated by network edge nodes (aggregation points) for exchange with the NMCF 224. In various embodiments, the ePDG 226 may be the aggregation point for the performance metrics, performance information and/or network condition reports associated with the untrusted non-3GPP access 204$_3$. The AGW 275 may be the aggregation point for the performance metrics, performance information and/or network condition reports associated with the trusted non-3GPP access 204$_2$. The SGW 264 may be the aggregation point for the performance metrics, performance information and/or network condition reports associated with the 3GPP access 204$_1$. Aggregation may be carried out using, for example, an OMA-type interface. The OMA-type interface may permit exchange of the performance metrics, performance information and/or network condition reports, including, for example, alarm notifications.

In various embodiments, the NMCF 224 may obtain the performance metrics, performance information and/or network condition reports on a real-time and/or a near real-time basis. The real-time and/or near real-time basis may allow for decisions to be made more accurately than those made using a non-real-time and/or non-near-real-time basis.

The NMCF 224 may use probing and/or passive monitoring techniques to collect, derive, generate or otherwise obtain the performance metrics. The NMCF 224 may, for example, probe and/or passively monitor the performance information and/or network condition reports, and generate performance metrics based, at least in part, on the performance information and/or network condition reports. The NMCF 224 may evaluate the performance metrics, and provide the performance metrics and/or an evaluation of the performance metrics to various entities of the communications system 100. For example, the NMCF 224 may monitor and generate, from the performance information and/or network condition reports, performance metrics related to packet retransmissions ("retransmission metrics") for any of the accesses 204$_{1-3}$. Such retransmission metrics may include, for example, statistics related to the packet retransmissions, such as, a number or rate of the packet transmissions.

The NMCF 224 may also send the retransmission metrics to the RCF 268 responsive to such metrics (e.g., the number or rate of retransmissions) for any of the accesses 204$_{1-3}$ exceeding, approaching and/or satisfying a threshold ("retransmission threshold"). The retransmission threshold may be and/or be based on a maximum number or rate of retransmissions, and may be defined by a MNO. Values of the retransmission threshold may be defined as policies per access in the PCRF 220. The performance metrics related to packet retransmission may be sent on a per access basis or otherwise.

The RCF 268 may receive the retransmission metrics the NCMF 224 and may decide whether or not to switch retransmitted packets from one of the accesses 204$_{1-3}$ to another. When the number of retransmissions on any of the accesses 204$_{1-3}$ exceeds, approaches and/or satisfies the retransmission-threshold policy value, the RCF 268 may decide to re-route one or more retransmitted packets from one of the accesses 204$_{1-3}$ to another. The RCF 268 may make such decision based on a comparison of values of the retransmission threshold of each of the accesses and values of the retransmission metrics. The RCF 268 may use retransmission rates (e.g., as defined by MNO policies in the PCRF 220). The RCF 268 may receive values of the retransmission threshold of each of the accesses and values of the retransmission metrics as policies. As an example, if the untrusted-3GPP (e.g., a 2 Mbps Wi-Fi) access 204$_3$ is transmitting packets of 1000 bits, and the retransmission threshold of 250 retransmissions per second is satisfied (i.e., a large number of packets are retransmitted), the RCF 268 may decide to switch the packets to any of the 3GPP access 204$_1$ and trusted non-3GPP access 204$_2$, exhibiting a lower retransmission rate.

In cellular systems, advanced retransmission technologies, e.g., chase combining or incremental redundancy, may enable a high probability of successful retransmissions. Since such technologies might not be deployed in WLAN systems, the RCF 268 may decide when retransmission packet traffic may be switched from one of the accesses 204$_{1-3}$ to another with support of (i) operator-based policies stored in the PCRF 220, and (ii) any of the performance metrics, performance information and network condition reports sent from the NMCF 224.

The NMCF 224 may provide any of the performance metrics, performance information and/or network condition reports to the PCEF 270. The NMCF 224 may directly exchange such information with the PCRF 220 via an interface defined between the NMCF 224 and PCRF 220. This interface may be, for example, an S7a interface. The S7a interface may be based on (e.g., a modification of) a S7/Gx reference point. Alternatively, may be a S7/Gx reference point.

The NMCF 224 may provide any of the performance metrics, performance information and/or network condition reports to the ANDSF 222. The NMCF 224 may directly exchange such information with the ANDSF 222 via an interface defined between the NMCF 224 and ANDSF 222, such as, for example, an S7a interface.

The NMCF 224 may also send to the ANDSF 222 information for updating, modifying or otherwise adapting one or more policies ("policy-adapting information"), including, for example, WTRU-specific policies, based on the performance metrics, performance information and/or network condition reports. The WTRU 202 may request the policy-adapting information from the ANDSF 222, or, alternatively, the policy-adapting information may be pushed to the WTRU 202 based on some event trigger and/or via synchronization.

Alternatively, the NMCF 224 may send the policy-adapting information to the SPR 218, if, for example, a direct interface between NMCF 224 and ANDSF 222 is not available. The SPR 218 may provide the policy-adapting information to the ANDSF 222 so as to allow to the ANDSF 222 to modify the policies, including the WTRU-specific policies, based on the performance metrics (e.g., current network loads). An interface between ANDSF 222 and SPR 218 may be realized as a manifestation of the Ud interface. The interface between the NMCF 224 and PCRF may 220 also be realized via Ud interface (not shown) or an S7a interface, for example.

The AGW may include the BBERF 274 to facilitate using PMIPv6 between the PGW 266 and given (e.g., non-3GPP) accesses. As another alternative, the BBERF 274 may be disposed in the SGW 264 to facilitate using PMIPv6 between the PGW 266 and a given (e.g., 3GPP) access.

Figure 2A:
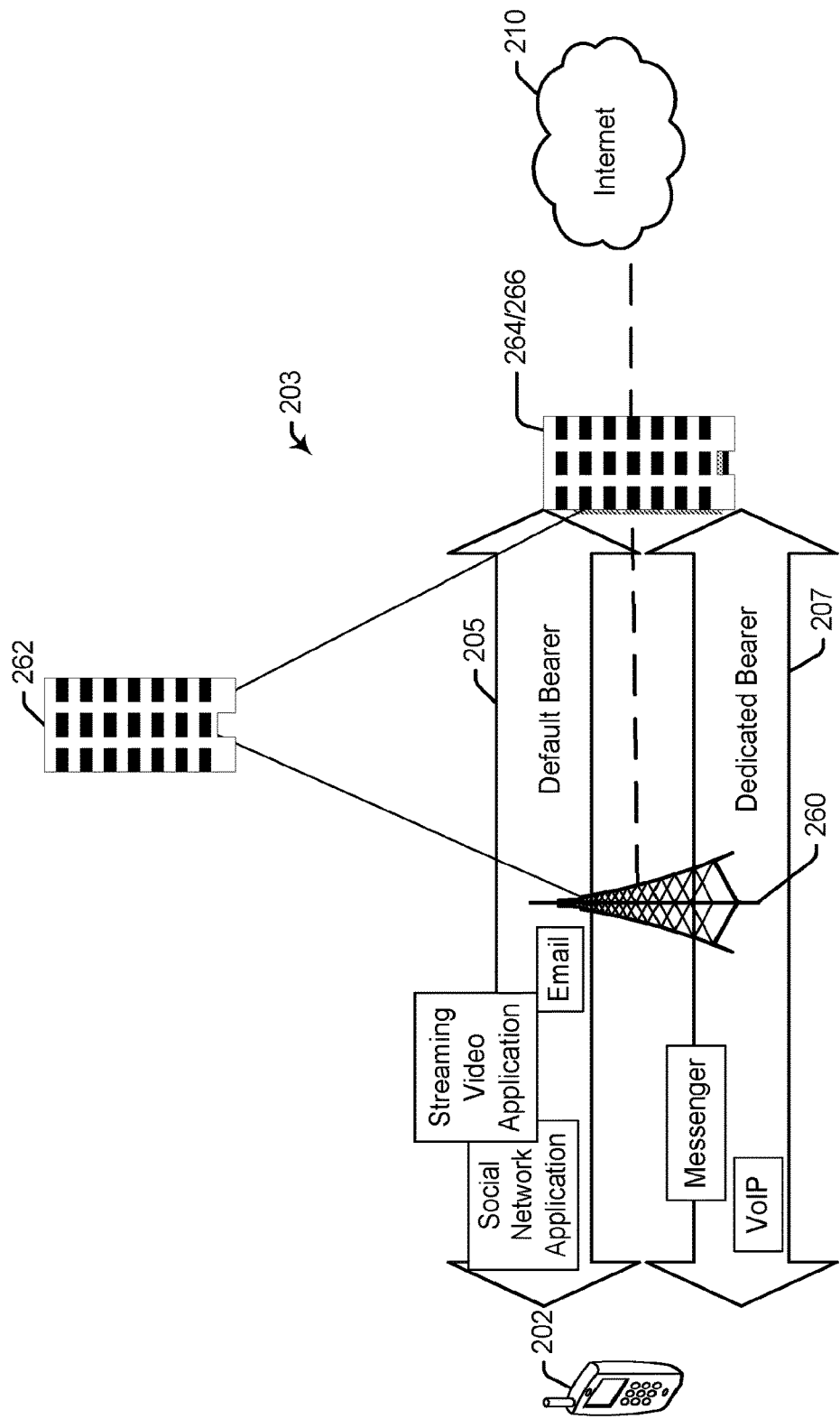
Figure 2B:
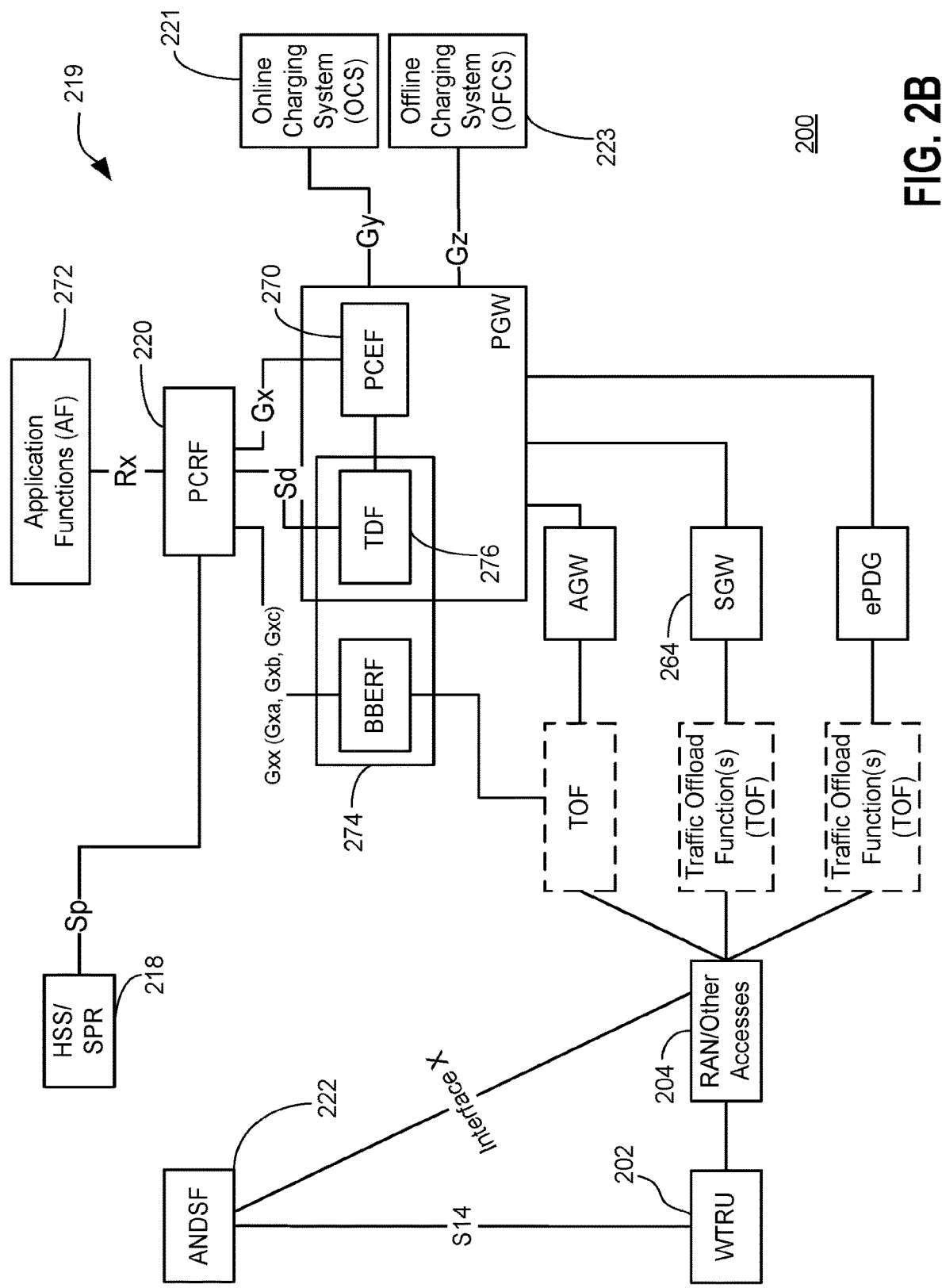
Figure 2C:
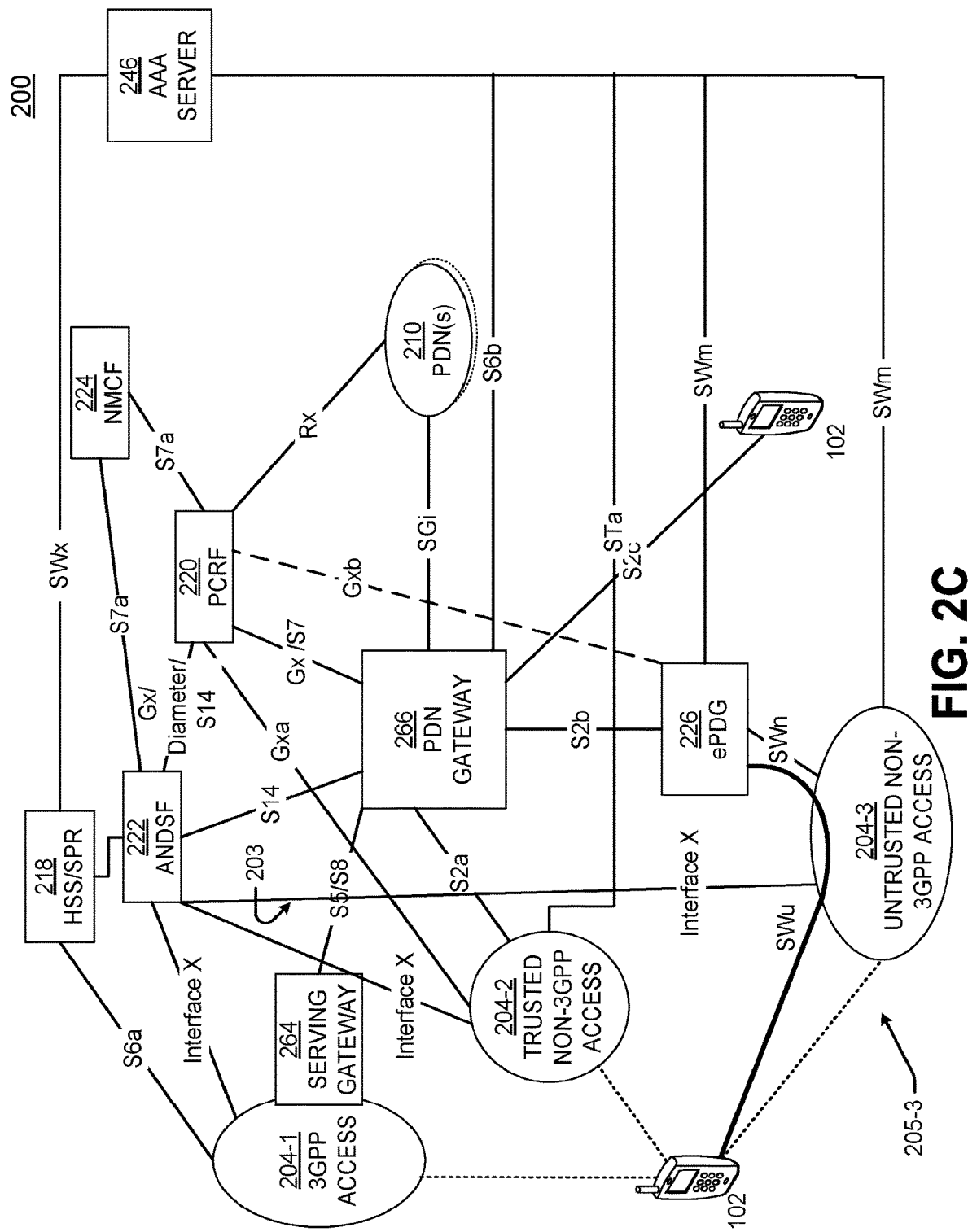
Figure 2E:
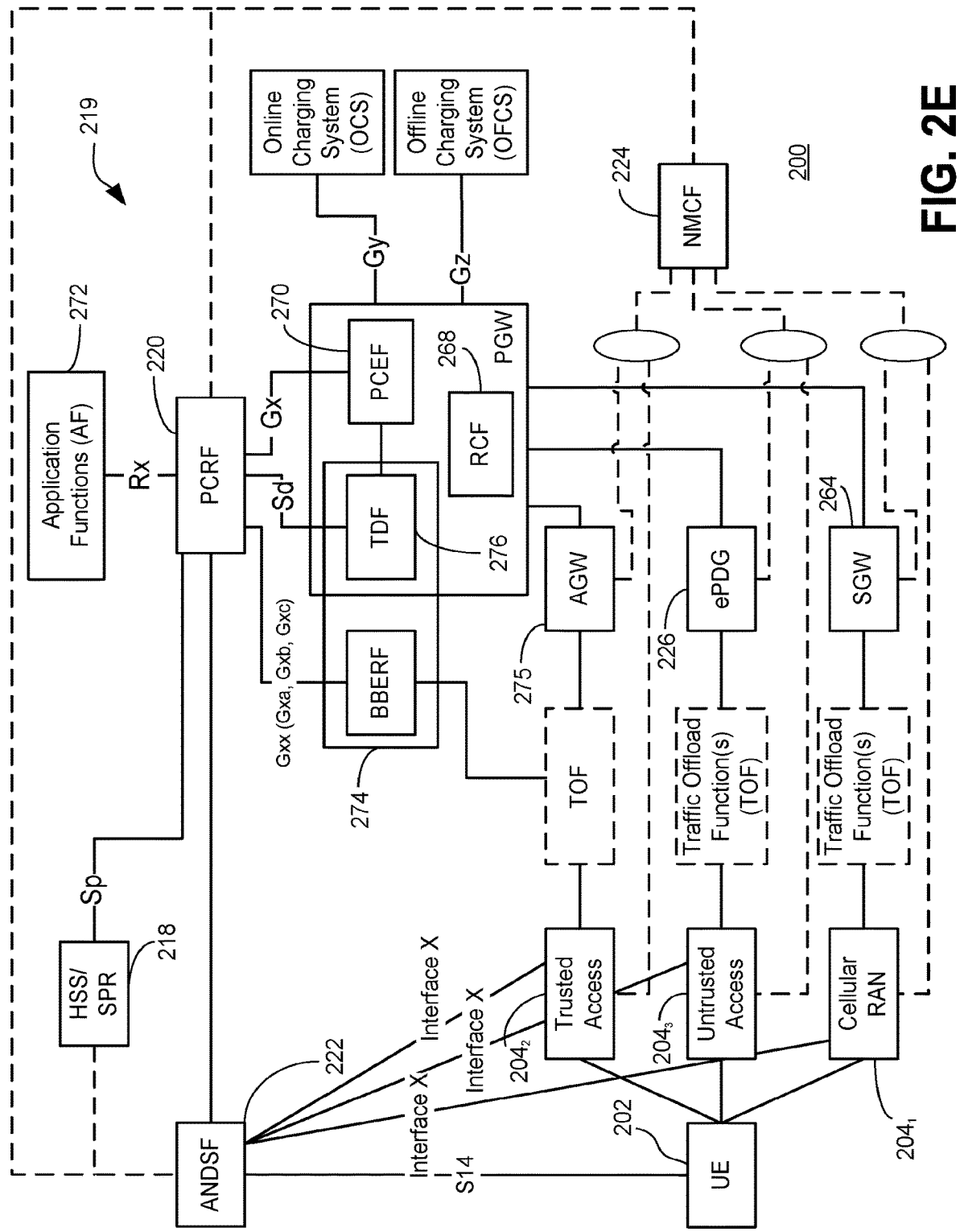
Figure 2F:
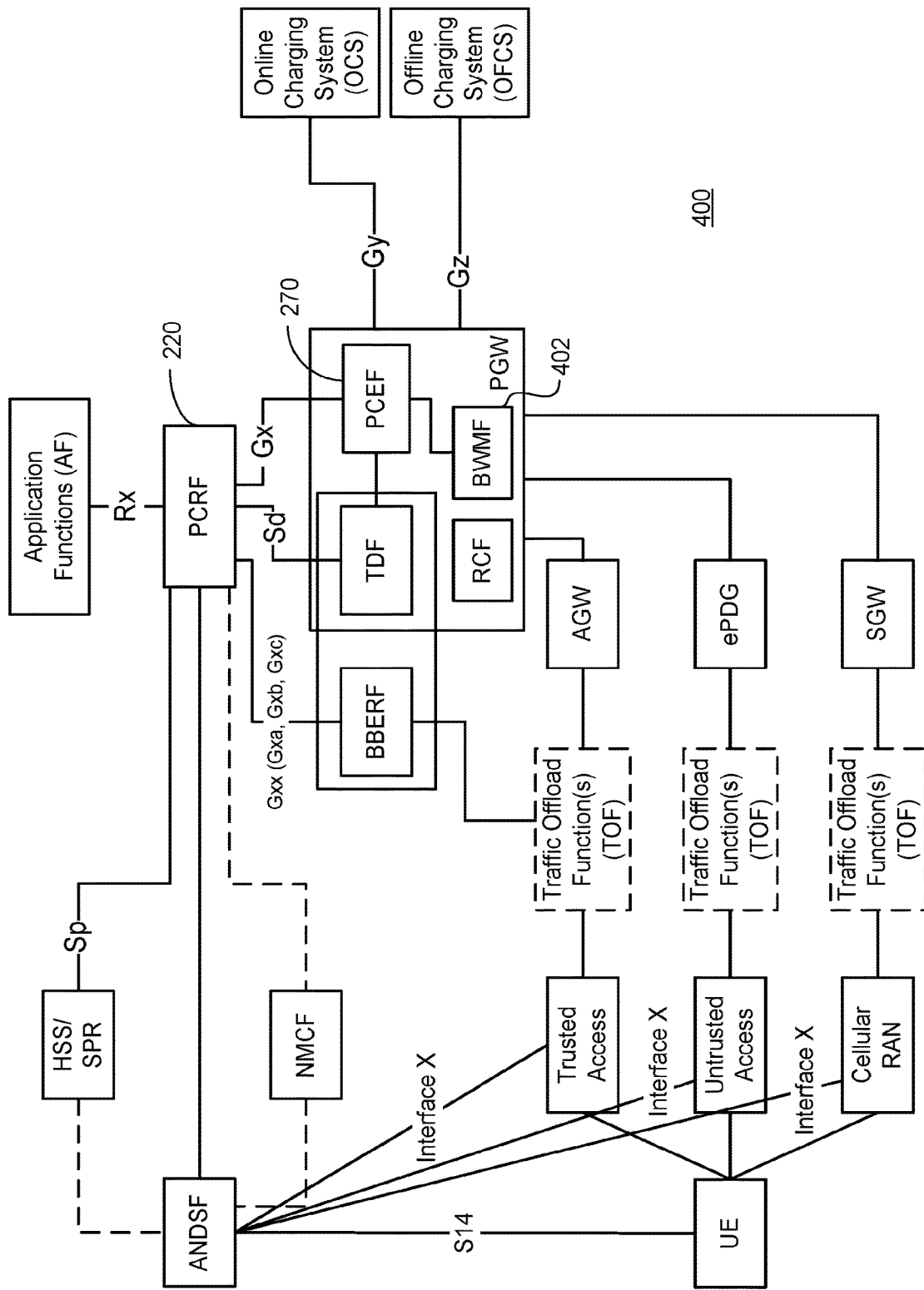

As shown in FIG. 2F, the Gx reference point between the PCRF 220 and PCEF 270 may be adapted to support BWM-based policies. For network-initiated BWM, rules may include IP flow identification requirements and flow mobility and/or aggregation policies.

The PCEF 270 may be adapted to support interaction with a Bandwidth Management Function (BWMF) 402. The adapted PCEF 270 may use information from the BWMF 402 to dynamically establish, modify, or release bearers of the accesses 204$_{1-3}$ ("multi-RAT bearers") being used by the WTRU 202 based on the policy rules provided by the PCRF 220.

The BWMF 402 may include inputs that may enable the PCEF 270 to enforce the BWM policies among any of the accesses 204$_{1-3}$. The BWMF 402 may perform packet-based measurements from any of the accesses 204$_{1-3}$ routes (e.g., by monitoring the GTP traffic). The BWMF 402 may also receive input from the NCMF 224. The BWMF 224 may provide the inputted performance metrics, performance information and/or network condition reports to the PCEF 270, enabling it to modify allowed QoS associated with each RAT based on the BWM policies.

Figure 2G:
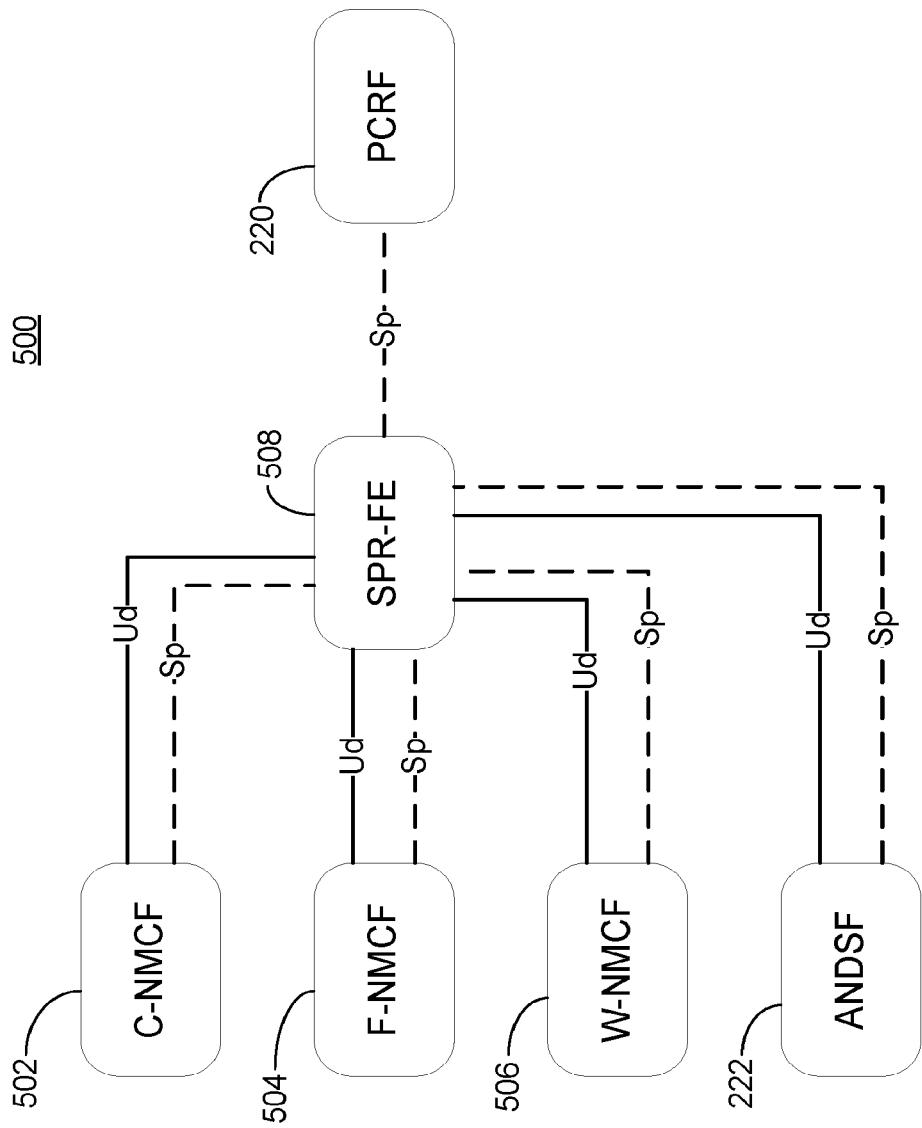

The NCMF 224 shown in FIGS. 2C-F may be a multi-RAT functional entity in that it stores and processes information regarding both the Femto/Macro-Cellular networks as well as Wi-Fi network conditions. FIG. 2G is a block diagram illustrating an example of a distributed NMCF 500. As shown, the distributed NMCF 500 may include separate functions for the cellular and Wi-Fi networks, for example, C-NMCF 502 and W-NMCF 504 respectively. Each of the C-NMCF 502 and W-NMCF 504 may communicate with the PGW 266 using interfaces similar to those between the NCMF 224 and PGW 266 of FIGS. 2C-F.

Alternatively, the C-NMCF 502 and W-NMCF 504 may communicate using the interface used for direct communication between NCMF 224 and the PCRF 220. Direct communication may be replaced by communication via the SPR 218 as an intermediary. The NCMF 224 may support an Ud interface to SPR 218, which in turn may communicate with the PCRF 220 via a Sp interface. Such indirect communication may be used where a single Multi-RAT NCMF is replaced by multiple single-RAT NMCFs, namely, C-NMCF 502 and W-NCMF 504.

The ANDSF 222 may store information regarding various Wi-Fi APs ("WAPs") and geo-locates them at a cell-ID level. Here, a number of enhancements are disclosed that may make the information in the ANDSF database dynamic to keep track of changes in the network environment as well as to make it capable of handling both Wi-Fi and Femto network environments.

The ANDSF 222 may be made more dynamic by obtaining inputs from F-NCMF 506 and W-NCMF 504, which may report the turning on and/or off of Femto-APs (FAPs) and Wi-Fi APs (WAPs) of the trusted non-3GPP access 204$_2$ and the untrusted non-3GPP access 204$_3$, respectively.

In addition to on/off status, the FAP information may also include additional parameters, such as those indicating the access mode (e.g. hybrid vs. Open), etc. To accommodate such additional fields of information, the format of the data stored in the ANDSF 222 may be suitably configured. The ANDSF 222 may obtain these inputs using direct interfaces or via the SPR-Front End ("SPR-FE") 508 (e.g., as illustrated in FIG. 2G).

The various NMCFs 502-506 and/or the ANDSF 222 may report any of the performance metrics, performance information and network condition reports to the PCRF 220 via the SPR-FE 508 using, for example, the Ud interface. The ANDSF 222 may also support the Sp interface, which may allow it to directly query SPR-FE 506 and/or obtain any of the performance metrics, performance information and network condition reports from the various NMCFs 502-506. Also, each of the NMCFs 502-506 may support a Sp interface, as well, allowing the NMCFs 502-506 to query and receive information back from the SPR-FE 508.

In various embodiments, information for storage in an ANDSF client of the WTRU 202 may be supplied to the WTRU 202 by the network as follows. The ANDSF 222 may trigger a network-initiated PDP context activation, followed by transfer of updated information to the WTRU 202. To facilitate this, an interface between ANDSF 222 and SGW 265 may be established. The ANDSF 222 may also communicate the trigger information via the PCRF 220, using interfaces illustrated in FIG. 5.

Provided below are examples of a sets of BWM policies that may be provided to various network components in an evolved multi-RAT mobile network, such as in any of the communications systems 100 and 200. A first set of policies may include policies provided to WTRUs. These policies may provide a network with control over how a WTRU makes decisions that it is "free to make." The policies provided to WTRUs may also provide a network operator with control over behavior of the WTRUs at all times. These policies provided to WTRUs may be provided to the WTRUs via an ANDSF. A second set of policies may include policies residing in the network's own PCRF and/or PCEF (e.g., policies describing how a network controls its own operation).

One aspect of WTRU-decision making is whether the WTRU 202 makes decisions per connection or whether a finer (per flow) granularity is supported. For per-connection decisions, the policy may contain one or more elements, including, for example, any of a policy owner; policy access characteristics; policy activation time (e.g., immediate, for new sessions only, etc.); policy persistence (e.g., overwrite default; revert to default after timeout expiry, etc.); user permissions, policy granularity (e.g., per connection or flow based); flow identification process and policy properties.

The policy owner may be, for example, a network issuing the policy. The policy owner may be used as a criterion for looking up a policy when connected to this network. The policy access characteristics may specify under which condition(s) the policy is to be used when connecting to the policy owner. Examples of the policy access characteristics may include (i) "always", (ii) "when macro-BS connection is the only one available", and (iii) "when a trusted Wi-Fi AP is available", (iv) etc.

The flow identification process may be used if flow-based policy granularity is used. The flow identification process may specify how "hard" the WTRU 202 should try to identify the flow. Example settings of the flow identification process may include packet inspection level (the packet inspection level may be commonly understood by a WTRU 202 and the network); use of well-known port mappings (e.g., TCP port 80 is always HTTP); use of deep packet inspection (if available) and identification of application sub-flows.

The policy properties may include properties to be used for per connection granularity. The policy properties may also be used as a "default" policy for flow-based granularity. Examples of properties of the policy properties may include (i) which initial connection to use (e.g., Cellular, Wi-Fi, peer-to-peer or Bluetooth), and (ii) which access procedure to configure (e.g., network-controlled mobility, mobile IP, BW aggregation, static TCP/IP, etc.).

If flow-based policies are used, for each flow, a sub-policy may be provided that may include a flow description and/or policy properties. A flow description may include a flow name (e.g., HTTP, video, voice, VoIP, etc.) and/or a flow identifier. The flow identifier may include a destination port used (e.g., TCP Port 80 for HTTP) or a DPI signature; for example. The policy properties may be the same as for a master policy, which may include, for example, which initial connection to use (e.g., Cellular, Wi-Fi, peer-to-peer or Bluetooth) and which access procedure to configure (e.g., network-controlled mobility, mobile IP, BW aggregation, static TCP/IP, etc.).

If flow-based policies are used, the policy framework may allow for the WTRU 202 to not be able to identify all (or many) flows. A default policy may be provided. The default policy may be explicit provided (e.g., using a flow-specific policy with "default" in a flow description). Alternatively, the master policy may include policy properties that are treated as default.

Policies in the network may be structured around the WTRU 202 or around flows. WTRU-centric policies may apply to all flows associated with a WTRU 202. Flow-based policies may apply to all flows or to a particular type of flow associated with any WTRU 202. Examples of WTRU-centric policies and associated parameters that may be defined for controlling multi-RAT BWM-enabled behavior in macro and CGW environments may include any of a policy activation time (e.g., immediate, for new sessions only, etc.); policy persistence (e.g., overwrite default, revert to default after timer expiry, etc.); user permissions; BWM flow mobility thresholds; BWM flow aggregation thresholds; and RCF retransmission thresholds.

The BWM flow mobility policies may include any of a WTRU identity (e.g., IMSI); WTRU priority for uplink and downlink (e.g., high, low, or the like); service classification and/or identification requirements (e.g., video based on specified IP address, flash videos based on DPI, etc.); preferred access per service for uplink and downlink (e.g., cellular, Wi-Fi, etc.); minimum QoS per IP flow (e.g., bit rate, packet latency, packet loss, etc.); and maximum QoS per IP flow (e.g., bit rate, packet latency, packet loss, etc.).

The BWM flow aggregation policies may include any of a WTRU identify (e.g., IMSI); WTRU priority (e.g., high, low, or the like); service classification and/or identification requirements (e.g., video based on specified IP address, flash videos based on DPI, etc.); minimum QoS per service (e.g., bit rate, packet latency, packet loss, etc.); and maximum QoS per service (e.g., bit rate, packet latency, packet loss, etc.). Execution of these policies may assume that any BWM-enabled capabilities have been communicated between the WTRU 202 and the macro/CGW systems, either explicitly or implicitly.

Each of the SDFs may represent IP packets related to a user service. The SDFs are bound to specific bearers based on policies defined by the network operator. This binding may occur at the WTRU 202 and the base station 260. The binding for each of the SDFs may be carried out using a traffic flow template (TFT). Each TFT may include packet filtering information for identifying and mapping packets to specific bearers. The packet filtering information may be configurable by the network operator, and may include the 5-tuple identifying the corresponding SDF. The dedicated bearer 207 is associated with a TFT. The default bearer 205 may (but need not) be associated with a TFT.

Figure 3:
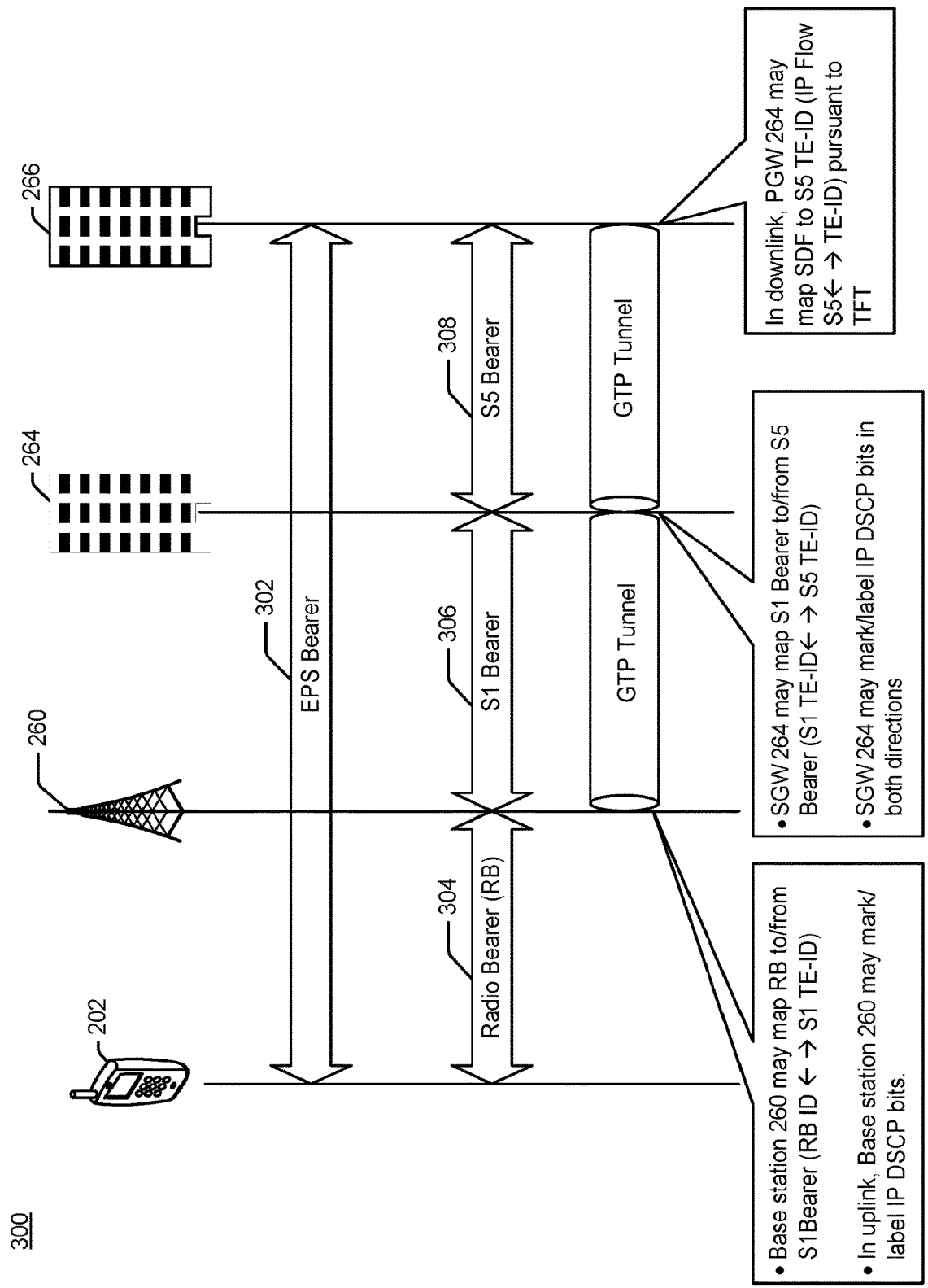
FIG. 3 is a block diagram illustrating an example of an end-to-end mapping of an EPS bearer to a radio bearer (RB), S1 bearer and a S5 bearer.

FIG. 3 is a block diagram illustrating an example of an end-to-end mapping 300 of an EPS bearer 302 to a radio bearer (RB) 304, S1 bearer 306 and a S5 bearer 308. For convenience, the end-to-end mapping is described with reference to the communication system 200 of FIG. 2. A downlink TFT function and an uplink TFT function are shown in FIG. 3. In the downlink, the PGW 266 may map downlink traffic to a TFT mapped to the S5 bearer 308. In the uplink; the base station 260 may map the RB 302 to the S1 bearer 306.

The PGW 266 may map the bearers to the underlying transport network. The transport network may be Ethernet based, and may use multiprotocol label switching (MPLS), for example. The transport network may not be aware of the bearers (including the bearer structures and/or constructs), and may use other (e.g., standard) IP QoS techniques, such as differentiated services (DiffServ).

The base station 260 may play a significant role in end-to-end QoS and policy enforcement. The base station 260 may perform uplink and downlink rate policing, along with RF radio resource scheduling. The base station 260 may use ARP when allocating resources to bearers (e.g., the default and dedicated bearers 205, 207). The base station 260, like the PGW 266, may map bearer traffic to the underlying IP transport network. The WTRU 202 may also play a role in the end-to-end QoS and policy enforcement. For example, the WTRU 202 may perform an initial mapping of SDFs to the bearers in the uplink direction.

As noted, the transport network (e.g., switches, routers and the like) may be unaware of the bearers, and may use diffServ for QoS. To facilitate bearer-level QoS, the base station 260 and the PGW 266 may map the bearer level QoS parameters (e.g., QCIs) to respective DiffServ code point (DSCP) values. The mapping of bearer level QoS parameters (e.g., QCI) to IP network QoS framework (e.g., DSCP) may be implemented in various ways. The following DSCP per-hop behavior is defined to provide guidelines for such mapping function:

| Assured Forwarding (AF) | Video Conferencing, streaming, client-server transactions |
| --- | --- |
| Expedited Forwarding (EF) | VoIP |
| Default Forwarding (DF) | Undifferentiated applications |
| Best Effort Class Stream | Any flow with no bandwidth assurance (e.g., Low-priority Data). |

Hierarchical Traffic Differentiation

Provided herein are methods, apparatuses and systems for performing hierarchical traffic differentiation and/or employing hierarchical traffic differentiation to, for example, handle congestion and/or to manage user quality of experience (QoE). Performing the hierarchical traffic differentiation may include differentiating or otherwise classifying (collectively "differentiating") traffic (e.g., flows) mapped to, or within, a bearer formed in accordance with a QoS class into multiple traffic sub-classes.

Each traffic sub-class may be configured with one or more attributes for differentiating its class of traffic from another traffic sub-class and/or one or more policies with rules for how to handle policing and scheduling for its sub-class of traffic. These attributes may include one or more characteristics attributed to the class of traffic, such as, for example, a relative priority with respect to the other traffic sub-classes, a share of the QoS parameters, etc. The attributes may include one or more characteristics of, or one or more criteria for identifying and/or indicating, the traffic that qualifies for classification under the corresponding traffic sub-class. For example, each traffic sub-class may have a criterion that the traffic has a particular traffic profile to qualify for its classification. Alternatively and/or additionally, each traffic sub-class may have a criterion that the traffic include an indication indicating that the traffic is classified as, or qualifies for classification under such traffic sub-class. Alternatively and/or additionally, each traffic sub-class may have a criterion that the traffic includes an indication indicating one or more of the characteristics attributed to the class of traffic, such as, for example, the relative priority of the traffic sub-class.

The methods, apparatuses and systems provided herein for performing hierarchical traffic differentiation and/or employing hierarchical traffic differentiation may be applicable to and/or useful for various scenarios or use cases, including those provided below. In the description that follows, the terms "QoS class(es)" and "QCI level(s)" are used interchangeably without loss of generality and/or differences there between. Similarly, the terms "traffic sub-class(es)" and "intra-QCI level(s)" are used interchangeably without loss of generality and/or differences there between. In addition, the terms "traffic" and "flow" are used interchangeably without loss of generality and/or differences there between.

Traffic of (e.g., OTT) applications having the same QCI may be treated the same in terms of QoS, packet forwarding, etc. In some instances, unacceptable and/or undesired delays for real-time and/or other better than best effort traffic may be experienced during periods of congestion in the network 203. As described in more detail below, performing hierarchical traffic differentiation and/or employing hierarchical traffic differentiation to police (e.g., filter) and/or adjust scheduling of differentiated traffic based on a prioritization of, and/or policies for managing, the traffic sub-classes (intra-QCI level) may mitigate congestion and/or enhance the QoE of the real-time and/or other better than best effort traffic. Policing and scheduling strategies that employ the hierarchical traffic differentiation may be employed as available bandwidth for users in the mobile network changes due to interference, fading and competition from other user traffic.

An application may source different types of traffic; all of which have the same application id. In legacy methods, apparatus and systems, the TFT defined for the bearer may map all of the different types of traffic of the application to a single bearer at the PGW 266 (downlink) and/or the WTRU 202 (uplink). As an example, an application (e.g., a Skype application) may source voice and other audio, video, text and/or keep-alive messaging. Intermediate network nodes (e.g., the base station 260) might not be able to distinguish the different types of traffic in the same bearer (from one another) and/or make corresponding traffic prioritization decisions in view of the all of the different types of traffic of the application being mapped to a single bearer. Differentiating traffic based on granularity below (e.g., finer than) the QCI level may allow, for example, the voice traffic of the application to be prioritized over video and/or other type of traffic in the same bearer. These and other appropriate decisions may be made in response to temporary bandwidth drop; for example dropping the video and/or other type of traffic so as to provide good audio quality and/or prevent call drop.

When the WTRU 202 is in connected mode, certain applications may only source intermittent traffic (e.g., Skype keep-alive messaging). The network operator may prefer to use the default bearer 205 to carry such traffic. The operator may also prefer to use the default bearer 205 for short duration videos (e.g., a small YouTube video) or other short-duration session traffic in view of the cost/benefit of establishing and tearing down the dedicated bearer 207 for such sessions. To facilitate the preference of using the default bearer 205 over the dedicated bearer 207 for better than best effort services and/or using the default bearer 205 exclusively, differentiation of the traffic within the default bearer 205, e.g., for load balancing and scheduling at the RAN and the core network, may be carried out by differentiating the traffic based on granularity below (e.g., finer than) the QCI level. For example, in case of congestion, the base station 260 may perform active queue management and make a decision to drop traffic that exceeds the queue buffer size, based on the traffic profile. Before making the decision on which traffic to drop, the base station 260 may determine if any of the traffic is classified in accordance with one or more intra-QCI levels, and if so, may make appropriate drop decisions based on such determination.

Figures 4, 5:
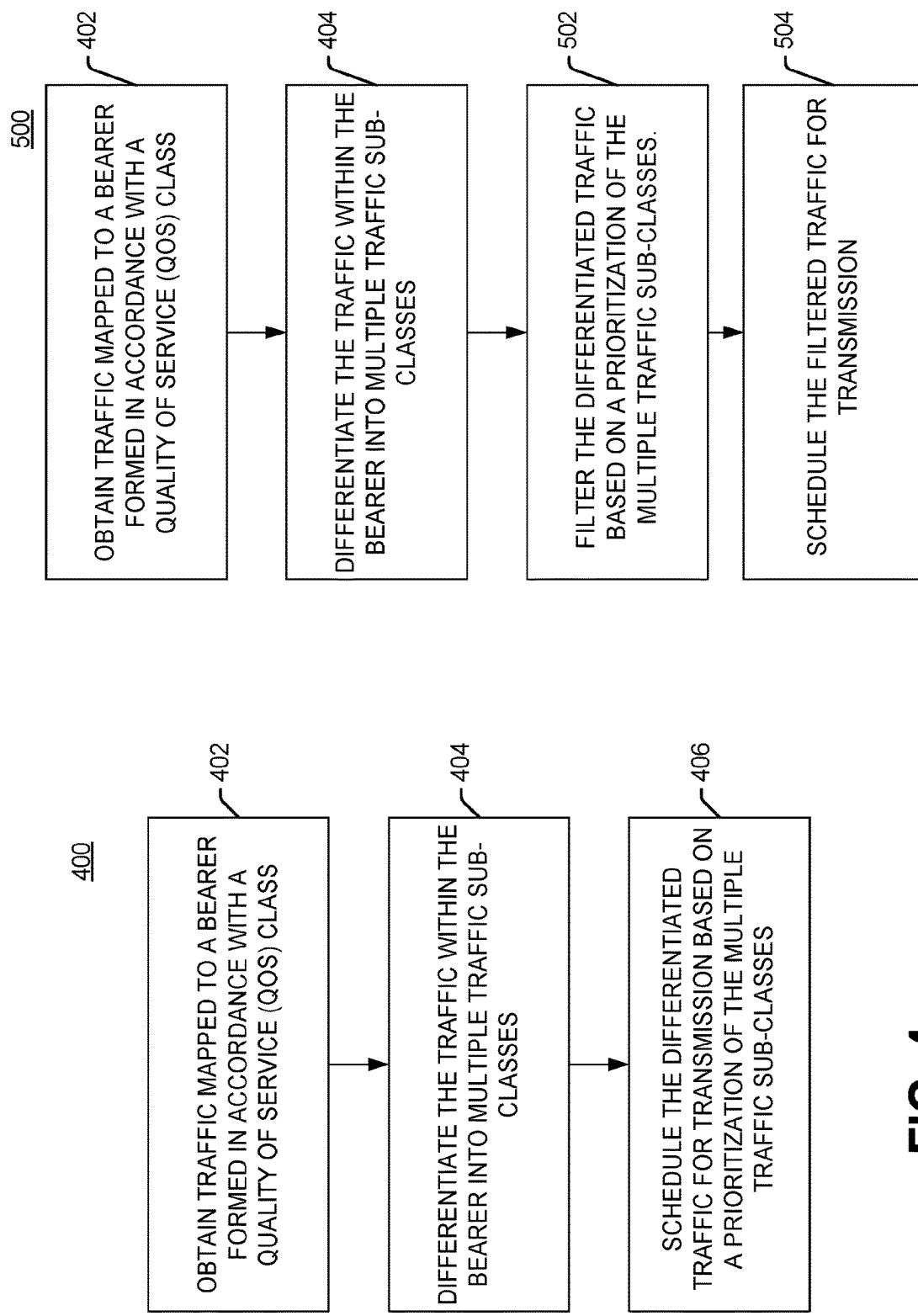
FIGS. 4-8 are flow diagrams illustrating examples of flows directed to hierarchical traffic differentiation.

Referring now to FIG. 4, a flow diagram illustrating an example of a flow 400 directed to hierarchical traffic differentiation is shown. The flow 400 may be carried out to, for example, handle congestion and/or to manage user QoE.

At process block 402, traffic mapped to a bearer formed in accordance with a QoS class (QCI level) is obtained. At process block 404, the traffic within the bearer is differentiated into multiple traffic sub-classes (intra-QCI levels). Differentiating the traffic within the bearer into multiple traffic sub-classes may include obtaining an indication of which traffic sub-class of the multiple traffic sub-classes to assign a packet of the traffic to.

In an embodiment, the packet may include the indication, and obtaining the indication may include performing packet inspection of the packet to reveal the indication. The indication may be disposed in various locations within the packet. For example, the packet may include a header, and the header may include the indicator. The header may be, or be in accordance with, the GTP, for instance.

In an embodiment, obtaining the indication may include performing packet inspection of the packet to obtain information about the packet, and deriving the indication based on the obtained information. The obtained information may include, for example, an application-specific signature for distinguishing different types of traffic.

In an embodiment, obtaining the indication may include receiving the indication via signaling (e.g., signaling separate from the packet).

In an embodiment, the indication may be indicative of a priority of the traffic sub-class to assign the packet to. In an embodiment, the packet may include a QCI corresponding to the QoS class. In an embodiment, the indicator may be a sub-QCI.

In an embodiment, the indication may be indicative of a policy rule to be applied to the traffic sub-class to handle the packet to. In an embodiment, the policy rule may include parameters to use for policing and/or scheduling packets of the traffic sub-class.

At process block 406, the differentiated traffic is scheduled for transmission based on a prioritization of the multiple traffic sub-classes. Scheduling the differentiated traffic may include adjusting a scheduled time of transmission of a packet the differentiated traffic based on the prioritization of the multiple traffic sub-classes. The scheduling of the differentiated may be carried out in view of a lack of resources and/or congestion. The congestion may include, for example, user plane congestion occurring in the RAN.

Although not shown, the differentiated traffic may be filtered based on the prioritization of the multiple traffic sub-classes, in lieu of, in addition to or in combination with the scheduling of the differentiated traffic. In an embodiment, filtering the differentiated traffic may include filtering a packet from the differentiated traffic based on the packet being assigned to a traffic sub-class of the multiple traffic sub-classes having a priority less than a priority of at least one other traffic sub-class of the multiple traffic classes. In an embodiment, the packet may be filtered from the differentiated traffic based on the packet being assigned to a traffic sub-class of the multiple traffic sub-classes having a priority less than a priority of each of the multiple traffic classes. In an embodiment, the packet may be filtered from the differentiated traffic based on the packet being assigned to a traffic sub-class of the multiple traffic sub-classes having a priority in the order of precedence of the prioritization that is below a priority at which packets of the differentiated traffic are not filtered from the differentiated traffic.

The flow 400 may be carried out by various entities of the communications system 200 of FIGS. 2A-2G, such as the WTRU 202 and/or various nodes of the network 203, including, for example, the base station 260, SGW 264, PGW 266 and other data plane network elements and/or nodes. The flow 700 may be carried out in other communications systems, as well.

FIG. 5 is a flow diagram illustrating an example of a flow 500 directed to hierarchical traffic differentiation. The flow 500 may be carried out to, for example, handle congestion and/or to manage user QoE. The flow 500 of FIG. 5 is similar to the flow 400 of FIG. 4, except as described herein.

At process block 502, the differentiated traffic is filtered based on the prioritization of the multiple traffic sub-classes. In an embodiment, filtering the differentiated traffic may include filtering a packet from the differentiated traffic based on the packet being assigned to a traffic sub-class of the multiple traffic sub-classes having a priority less than a priority of at least one other traffic sub-class of the multiple traffic classes. In an embodiment, the packet may be filtered from the differentiated traffic based on the packet being assigned to a traffic sub-class of the multiple traffic sub-classes having a priority less than a priority of each of the multiple traffic classes. In an embodiment, the packet may be filtered from the differentiated traffic based on the packet being assigned to a traffic sub-class of the multiple traffic sub-classes having a priority in the order of precedence of the prioritization that is below a priority at which packets of the differentiated traffic are not filtered from the differentiated traffic. The filtering of the differentiated traffic may be carried out in view of lack of resources and/or congestion. The congestion may include user plane congestion.

At process block 504, the filtered traffic is scheduled for transmission. In an embodiment, scheduling the filtered traffic for transmission may be based on the prioritization of the multiple traffic sub-classes. This may include adjusting a scheduled time of transmission of a packet the filtered traffic based on the prioritization of the multiple traffic sub-classes.

The flow 500 may be carried out by various entities of the communications system 200 of FIGS. 2A-2B, such as the WTRU 202 and/or various nodes of the network 203, including, for example, the base station 260, SGW 264, PGW 266 and other data plane network elements and/or nodes. The flow 500 may be carried out in other communications systems, as well.

Figures 6, 7:
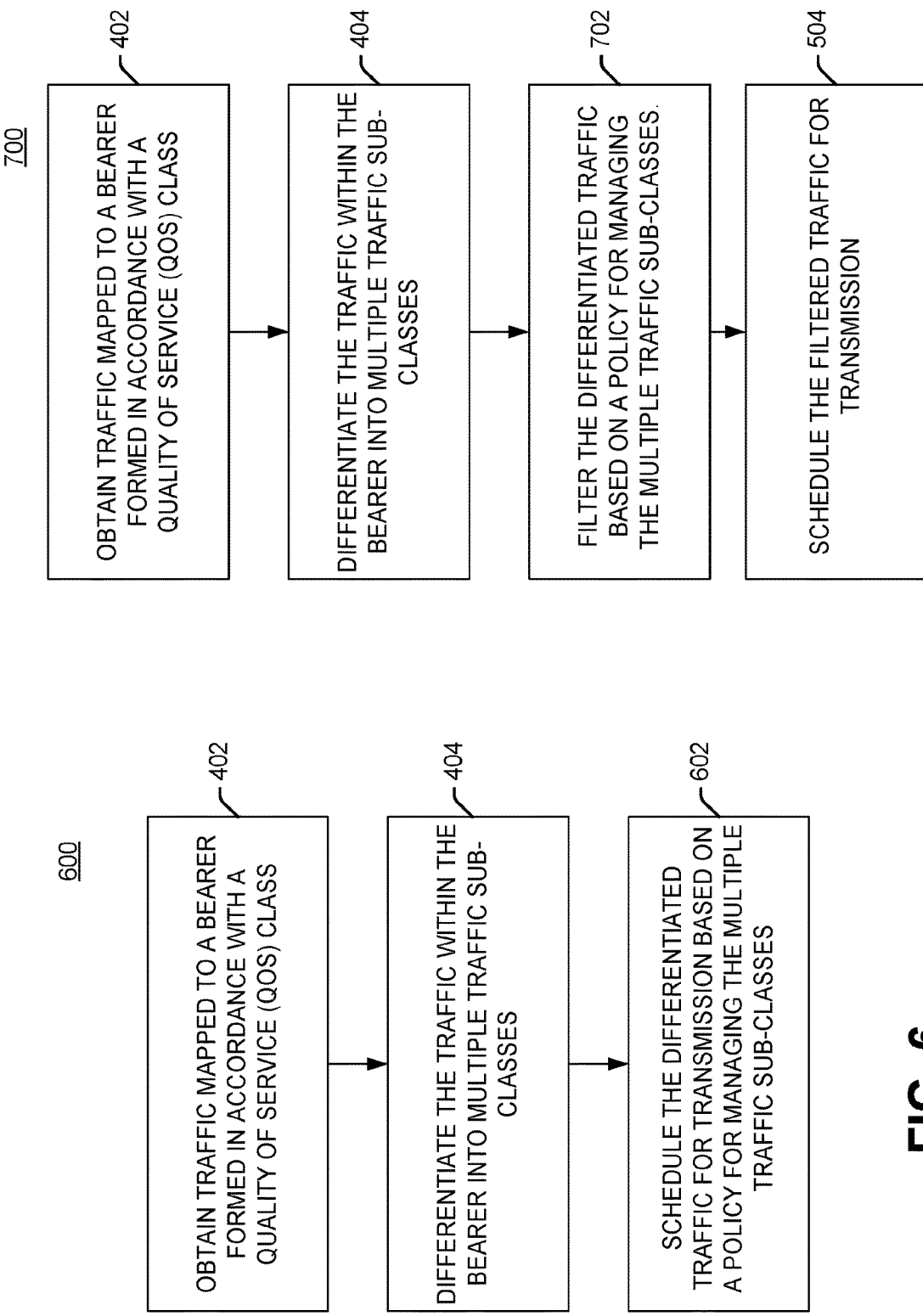

FIGS. 6 and 7 are flow diagrams illustrating examples of flows 600 and 700 directed to hierarchical traffic differentiation. Each of the flows 600 and 700 may be carried out to, for example, handle congestion and/or to manage user QoE. The flows 600 and 700 of FIGS. 6 and 7 are similar to the flows 400 and 500 of FIGS. 4 and 5, respectively, except that the scheduling and/or filtering of the differentiated traffic is based (at least in part) on respective polices for managing the multiple traffic sub-classes, such as, for example, applicable policies provided infra and/or supra.

The flows 600 and 700 may be carried out by various entities of the communications system 200 of FIGS. 2A-2B, such as the WTRU 202 and/or various nodes of the network 203, including, for example, the base station 260, SGW 264, PGW 266 and other data plane network elements and/or nodes. The flows 600 and 700 may be carried out in other communications systems, as well.

Figure 8:
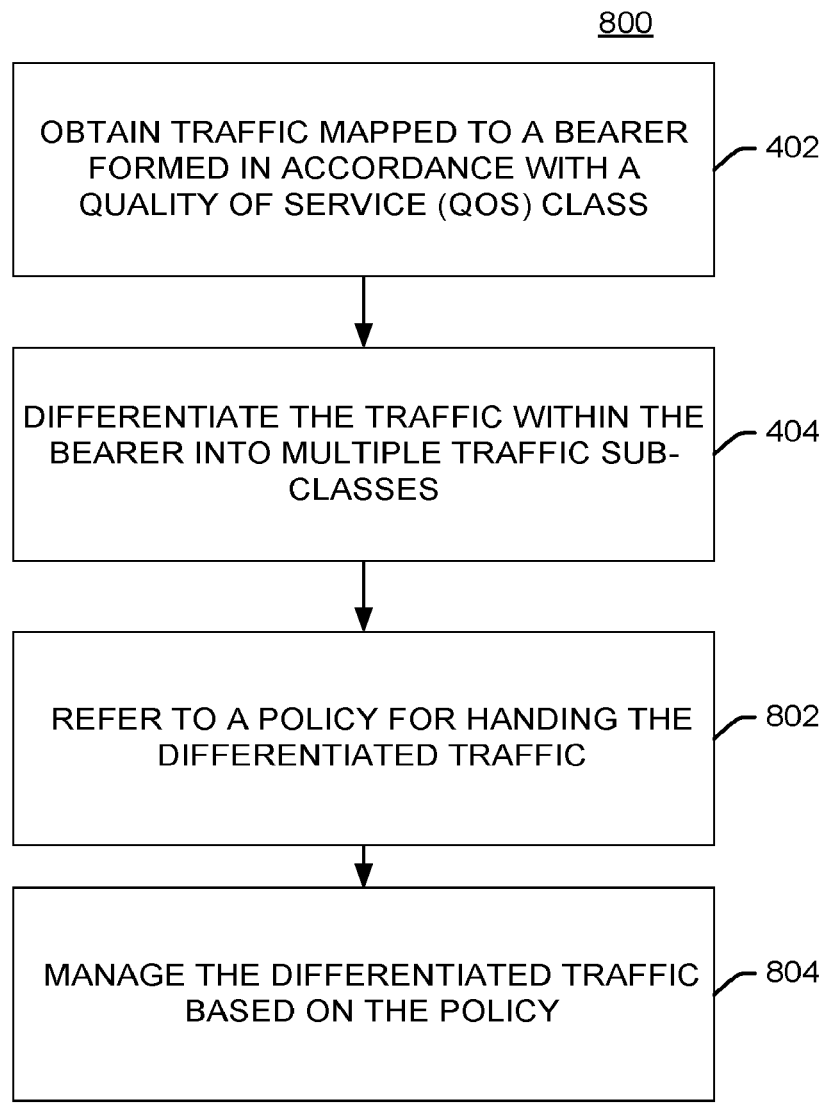

FIG. 8 is a flow diagram illustrating an example of a flow 800 directed to hierarchical traffic differentiation. The flow 800 may be carried out to, for example, handle congestion and/or to manage user QoE. The flow 800 of FIG. 8 is similar to the flows 400, 500, 600 and 700 of FIGS. 4-7, except as described herein.

At process block 802, a policy for handing the differentiated traffic is referred to. At process block 804, the differentiated traffic is managed based on the policy. The policy may be any of the policies for handling differentiated traffic provided infra and/or supra (e.g., in a policy table described below). In an embodiment, the policy may include one or more conditions derived from user subscription information. The policy may include one or more conditions derived from operator policies. The policy may include other conditions, as well.

The flow 800 may be carried out by various entities of the communications system 200 of FIGS. 2A-2B, such as the WTRU 202 and/or various nodes of the network 203, including, for example, the base station 260, SGW 264, PGW 266 and other data plane network elements and/or nodes. The flow 800 may be carried out in other communications systems, as well.

Among the methods, apparatuses and systems for performing hierarchical traffic differentiation and/or employing hierarchical traffic differentiation are methods, apparatuses and systems for carrying out the hierarchical traffic differentiation using a tree-based structure and/or methodology. The tree-based structure and/or methodology may include, for each or any QCI level, one or more subordinate or intra-QCI level identifiers ("sub-QCIs"). These sub-QCIs may be associated with respective priorities of sub-flows of a flow and/or traffic sub-classes to assign the sub-flows to.

Also among the methods, apparatuses and systems are methods, apparatuses and systems in which the TFT may be extended to include the application-specific signature for distinguishing the different types of traffic. The application-specific signature may be available in the user profile or UE context (for, e.g., HSS), and installed in the core network nodes (e.g., a PCEF) and the RAN nodes (e.g., the UE).

These nodes may be provisioned with, and maintain, respective policy tables. Each of these with policy tables may include rules for handling specific sub-flows within a bearer, their relative priority with respect to each other, their share of the QoS parameters, etc.

Intermediate nodes (e.g., the eNode B) may be configured to detect which of the sub-flows each packet belongs to. The intermediate nodes, which have the capability to perform DPI, may be configured with the application signatures. Alternatively, the application signatures might only installed in edge nodes; which nodes may perform DPI to determine the sub-QCI of each packet and forward the information along with the user-plane packet node. The intermediate nodes may recover the sub-QCI value associated with each user-plane packet, and may use the policy table to determine the handling for the packet.

To facilitate the using the tree-based structure and/or methodology, the network and/or the RAN layers may be configured to handle interactions between application and the core network so as to provide the traffic at a granularity attendant to the sub-QCI level, and handle creation and/or removal of dedicated EPS and radio bearers in accordance with such QoS differentiation.

Flow Labeling for Fine Traffic Differentiation
Tree-Shaped Priority Mapping

The PCC system 219 may provide mapping of flows (as identified by TFTs) to QCIs. Table 1 shows QCI characteristics that may be used for mapping flows to the specified QCIs. A sub-QCI (or intra-QCI level) label or indication may be assigned and/or applied to the flows based on sub-priorities of the sub-flows within each flow and/or on the traffic sub-classes to assign the sub-flows to. Such sub-QCI labeling may be implemented using a tree-based priority mapping structure. The sub-QCI labels may exist on the tree-based priority mapping structure as leaves subordinate to the QCIs. In the downlink, the PGW 266 may be provisioned with mapping rules to support the sub-QCI labels and/or the tree-based priority mapping structure. In the uplink, the base station 260 (e.g., eNodeB) may be provisioned with mapping rules to support the sub-QCI labels and/or the tree-based priority mapping structure. Table 2 (below) lists the 9 QCIs, corresponding attributes of each of the QCI types, and example sub-QCI labels for the 9 QCIs.

TABLE 2

QCIs, Corresponding Attributes and Example sub-QCI labels

| QCI | Resource Type | Priority | Packet Delay Budget (NOTE 1) | Packet Error Loss Rate (NOTE 2) | Sub-QCI | Example Services |
|---|---|---|---|---|---|---|
| 1 | GBR | 2 | 100 ms | $10^{-2}$ | Sub-QCI = 1<br>Sub-QCI = 2 | Conversational Voice |
| 2 | | 4 | 150 ms | $10^{-3}$ | Sub-QCI = 1<br>Sub-QCI = 2 | Conversational Video (Live Streaming) |
| 3 | | 3 | 50 ms | $10^{-3}$ | Sub-QCI = 1<br>Sub-QCI = 2 | Real Time Gaming |
| 4 | | 5 | 300 ms | $10^{-6}$ | Sub-QCI = 1<br>Sub-QCI = 2 | Non-Conversational Video (Buffered Streaming) |
| 5 | Non-GBR | 1 | 100 ms | $10^{-6}$ | Sub-QCI = 1<br>Sub-QCI = 2 | IMS Signalling |
| 6 | | 6 | 300 ms | $10^{-6}$ | Sub-QCI = 1<br>Sub-QCI = 2 | Video (Buffered Streaming) |

TABLE 2-continued

QCIs, Corresponding Attributes and Example sub-QCI labels

| QCI | Resource Type | Priority | Packet Delay Budget (NOTE 1) | Packet Error Loss Rate (NOTE 2) | Sub-QCI | Example Services |
|---|---|---|---|---|---|---|
| | | | | | | TCP-based (e.g., www, e-mail, chat, ftp, p2p file sharing, progressive video, etc.) |
| 7 | | 7 | 100 ms | $10^{-3}$ | Sub-QCI = 1<br>Sub-QCI = 2 | Voice,<br>Video (Live Streaming)<br>Interactive Gaming |
| 8 | | 8 | 300 ms | $10^{-6}$ | Sub-QCI = 1<br>Sub-QCI = 2<br>Sub-QCI = 3<br>Sub-QCI = 4 | Video (Buffered Streaming)<br>TCP-based (e.g., www, e-mail, chat, ftp, p2p file sharing, progressive video, etc.) |
| 9 | | 9 | | | | |

The base station 260 and/or any intermediate node may extract the sub-QCI information from the user-plane packet (e.g., from a header of a GTP packet). Alternatively, the base station 260 and/or any intermediate node may derive the sub-QCI information using an application signature along with performing deep packet inspection. The base station 260 and/or any intermediate node may use the sub-QCI information for scheduling or RRM decisions. The base station 260 and/or any intermediate node may use the sub-QCI information to decide which frames may be dropped due to congestion, pursuant to active queue management (for e.g. Random Early Detection (RED)) or the like.

The sub-QCI information may provide and/or convey relative priority, and/or drop precedence, of packets within the same bearer/QCI class. In various embodiments, a certain sub-QCI may be associated with individual MBR, or a wildcard to indicate the associated traffic/sub-flow may use any left-over resources not consumed by other higher-precedence sub-flows.

In various embodiments, the sub-QCI (intra-QCI level) prioritization along with associated application signature may be provided by the HSS for each UE context, and may be installed in the network nodes (e.g., the PGW 266, PCEF 270, base station 260, MME 262, etc) during WTRU 202 configuration/attach procedures. This may make configuration information available when a default bearer is created, to allow demarcation of traffic within a default bearer.

The application signature may include new or additional parameters added to the TFT rules to differentiate sub-flows within a flow, and may use existing or new packet inspection (DPI) rules. As an example, sub-categorization of Skype application may be defined to map voice with sub-QCI 1, video with sub-QCI 2 and text data with sub-QCI 3.

Mapping Function for Sub-Flow Traffic Differentiation

The sub-QCI information may be used at the edge and/or intermediate network nodes (e.g., the PGW 266 and/or base station 260, respectively) to map packets to particular sub-flows by performing packet inspection (DPI). The rules provided at the edge and/or intermediate network nodes to map certain sub-flows of traffic belonging to a certain flow (QCI) may be configured during WTRU configuration (e.g., configured by the MME 262 to the base station 260 in the UE (WTRU) context), or specifically configured when an EPS bearer is configured.

The rules may be installed by default in the edge nodes (e.g., the PGW 260, PCEF 270, etc.) or any intermediate nodes per application. As an example, rules for handling 2 sub-priorities may be installed for application traffic of a video application. Table 3 (below) illustrates such rules applied to a particular instance of a QCI and corresponding sub-QCIs.

TABLE 3

| QCI = 2<br>(Conversational<br>Video) | I-frame/IDR-<br>frame<br>P-frame | Priority = 0<br>Priority = 1 | TFT Rule<br>(UDP Port = x)<br>TFT Rule<br>(UDP Port = y) |
|---|---|---|---|

As another example, the sub-priorities may be applied to the different temporal layers in Hierarchical-P coded video. Table 4 (below) illustrates such sub-priorities applied to the different temporal layers in Hierarchical-P coded video for a particular instance of a QCI and corresponding sub-QCIs.

TABLE 4

| QCI = 2<br>(Conversional<br>Video) | Temporal Layer 0<br>Temporal Layer 1<br>Temporal Layer 2 | Sub-Priority = 0<br>Sub-Priority = 1<br>Sub-Priority = 2 | TFT Rule<br>(UDP Port = x)<br>TFT Rule<br>(UDP Port = y)<br>TFT Rule<br>(UDP Port = z) |
|---|---|---|---|

For conversational video flows with all P-Frames with a single layer video CODEC, prioritization may be performed based on the variation of importance of the video content. Such importance may be based on that some frames (even for all P-Frame single layer coding), if lost, can have a larger impact on the end user QoE than others.

The traffic mapping information (e.g., TFT filters for GPRS and EPS) that the PCRF 220 provides to the PGW 266 may include the TFT rules, e.g. the UDP port number for a real-time protocol (RTP) session indicates the sub-stream, and the corresponding rules may be installed in the PCEF 270.

The individual sub-QCI information may be added to an IP-CAN session during a create packet data protocol (PDP) Context Request/EPC Bearer Create Request, which may include specific QoS requirements and traffic mapping information (e.g., a TFT). A Create PDP Context Response message, indicating that a new PDP context is created, is sent to the SGW 264 (or a SGSN (not shown)). The response may include any changes in QoS according to bearer binding and policy enforcement.

The WTRU 202 may use the uplink TFT and downlink TFT to associate EPS bearer activation or modification procedures to an application and to traffic flow aggregates of the application. The PGW 266 may, in the Create Dedicated Bearer Request and the Update Bearer Request messages, provide (e.g., all) available traffic flow description information (e.g., source and destination IP address and port numbers and the protocol information).

The sub-QCI and application signatures may be added to TFT rules as follows:

The sub-QCI policy provisioning may be at the dynamic PCC or static PCC rules. If dynamic PCC is deployed, then the PCRF 220 may send a PCC decision provision with sub-QCI mapping information to the PGW 266. If dynamic PCC is not deployed, the PGW 266 may apply local QoS policy.

The PGW 266 may use the QoS policy to assign the EPS Bearer QoS (e.g., it may assign values to the bearer-level QoS parameters, such as the QCI, sub-QCI, ARP, GBR and MBR).

The base station 260 may map the EPS Bearer QoS to the RB QoS. The base station 260 may signal a RRC Connection Reconfiguration (Radio Bearer QoS, Session Management Request, EPS RB Identity) message to the WTRU 202. The WTRU may store the QoS Negotiated, Radio Priority, Packet Flow Id and TI, which it received in the Session Management Request, for use when accessing via GERAN or UTRAN. The WTRU non-access stratum (NAS) may store the EPS Bearer Identity and links the dedicated bearer to the default bearer indicated by the Linked EPS Bearer Identity (LBI). The WTRU 202 may use the uplink packet filter (UL TFT) including the sub-QCI to determine the mapping of traffic flows to the RB. The WTRU 202 may provide the EPS Bearer QoS parameters to the application handling the traffic flow.

Alternatively, the sub-QCI and application signatures mapping function rules may be added to the UE context in the UE subscription profile and installed and/or removed in network nodes during UE (WTRU) configuration and/or reconfiguration procedures (for e.g. UE attach procedure). The WTRU 202 may add sub-QCIs, as appropriate, to the TFTs and/or the IP flows in the uplink based on policies provided by the ANDSF 222 via, for example, the S14 reference point. Alternatively and/or additionally, the WTRU 202 may add sub-QCIs, as appropriate, to the TFTs and/or the IP flows in the uplink or based on UE (WTRU) pre-configuration, such as, for example, policies installed in memory (e.g., at a universal integrated circuit card (UICC)) of the WTRU 202.

Network Procedures to Handle Legacy Flows and New Flows Concurrently

The network may handle legacy flows and new flows concurrently. During the EPS bearer setup process, the PCRF 220 may derive the QoS rules for a particular SDF. The SDF that receives QoS rules having a QCI without a sub-QCI is referred to herein as a legacy flow. The SDF that receives QoS rules having a QCI and a sub-QCI is referred to herein as a new flow. The PCRF 220 may pass the QoS rules and information extracted by the AF 272 to the PCEF 270, which may handle both types of flows according to the QoS rules.

Any of the core network node and/or edge network nodes (e.g., the PGW 266) may first perform service differentiation at the QCI level for all flows. If active queue management is to be carried out for any flow, the network node to perform active queue management may determine whether the flow has a sub-flow policy defined and signature available. If such flow is a new flow, the network node may use the sub-QCI information (e.g., the sub-QCI information set forth in Table 2) for finer service differentiation. Otherwise, the network node (e.g., the PGW 266) may use the QCI level granularity.

Sub-QCI Identification in User Plane Packets

The edge nodes, such as the PGW 266 for downlink (DL) and the base station 260 for the uplink (UL), may associate each user-plane frame with the associated sub-QCI, so that intermediate nodes can apply applicable policy rules to handle each packet appropriately. The association may be presented using any of the field values in a header (e.g., GTP header), e.g., spare values in the GTP header, or using a hash function to compute a unique TEID defined by combining and/or multiplexing the QCI and sub-QCI. Alternatively, the value may be embedded in the payload of the GTP packet, e.g., the ToS field in the IP header, may carry information regarding the sub-QCI of the flow.

The use of sub-QCI may allow the network 203 to select only a subset of the packets to serve in the event of network congestion. Other mechanisms may be used together with the use of the sub-QCI. For example, the network 203 may perform admission control, i.e., which EPS bearer setup request should be granted based on the network resource availability and the user subscription service. Another example is access control. Before the WTRU 202 requests to establish an EPS bearer, it may need to connect to the base station 260. The request may be made via a RRC Connection Request message sent from the WTRU 202 to the base station 260. When the base station makes a decision whether or not to accept the request, the base station 260 can take into account network resource availability; e.g., if the wireless channel is heavily loaded, the base station 260 may reject the request; otherwise, the base station may accept the request.

RAN User Plane Congestion

RAN user plane congestion may occur when demand for RAN resources exceeds available RAN capacity to deliver the user data for a period of time. RAN user plane congestion may lead to, for example, packet drops or delays, and may or may not result in degraded end-user experience. Short-duration traffic bursts may be a normal condition at any traffic load level, and is generally not considered as RAN user plane congestion. Likewise, a high-level of utilization of RAN resources (based on operator configuration) may be considered a normal mode of operation, and is generally not considered as RAN user plane congestion. RAN user plane congestion may include user plane congestion that occurs over an air interface (e.g., LTE-Uu), in the radio node (e.g., eNB) and/or over the backhaul interface between RAN and CN (e.g., S1-U).

Figure 9:
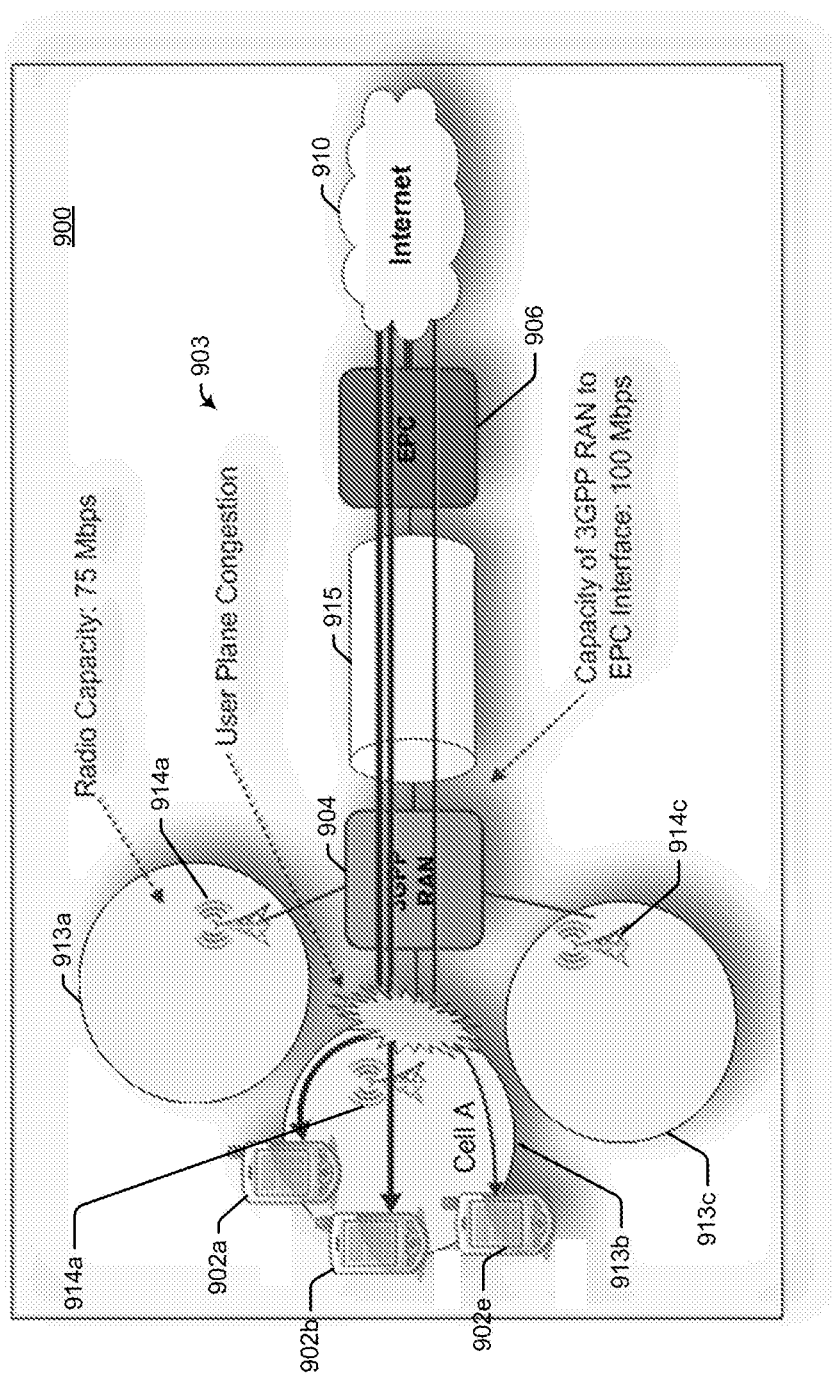
FIG. 9 is a block diagram illustrating an example of a communications system in which user plane congestion may occur in a particular cell.

FIG. 9 is a block diagram illustrating example communications system 900 in which user plane congestion may occur in a particular cell. The user plane congestion in the cell may occur pursuant to traffic volume exceeding a capacity of the cell. The communications system 900 may include three WTRUs 902a, 902b and 902c (collectively "WTRUs 902") and a network (shown generally) 903. The network 903 may include a 3GPP RAN 904; a core network (shown as "EPC") 906, three cells, namely, cells 913a, 913b and 913c; and a PDN (e.g., internet) 910. The cells 913a, 913b and 913c may include respective base stations (e.g., eNodeBs) 914a, 914b and 914c.

Each of the cells 913a, 913b and 913c may have, for example, a radio capacity of 75 Mbps. An interface between the 3GPP RAN and the core network 906 ("3GPP-RAN-to-EPC interface") 915 may have, for example, a capacity of 100 Mbps. The radio capacity and the 3GPP-RAN-to-EPC interface capacity are provided as examples only, and may be different from those provided.

As shown, each of the WTRUs 902a, 902b and 902c may be connected and/or associated with the network 903 via the cell base station 914b. When, for example, the user plane traffic with the WTRUs 902a, 902b total the radio capacity of the base station 914b and the WTRU 902c attempts to generate user plane traffic, user plane congestion may occur.

Figure 10:
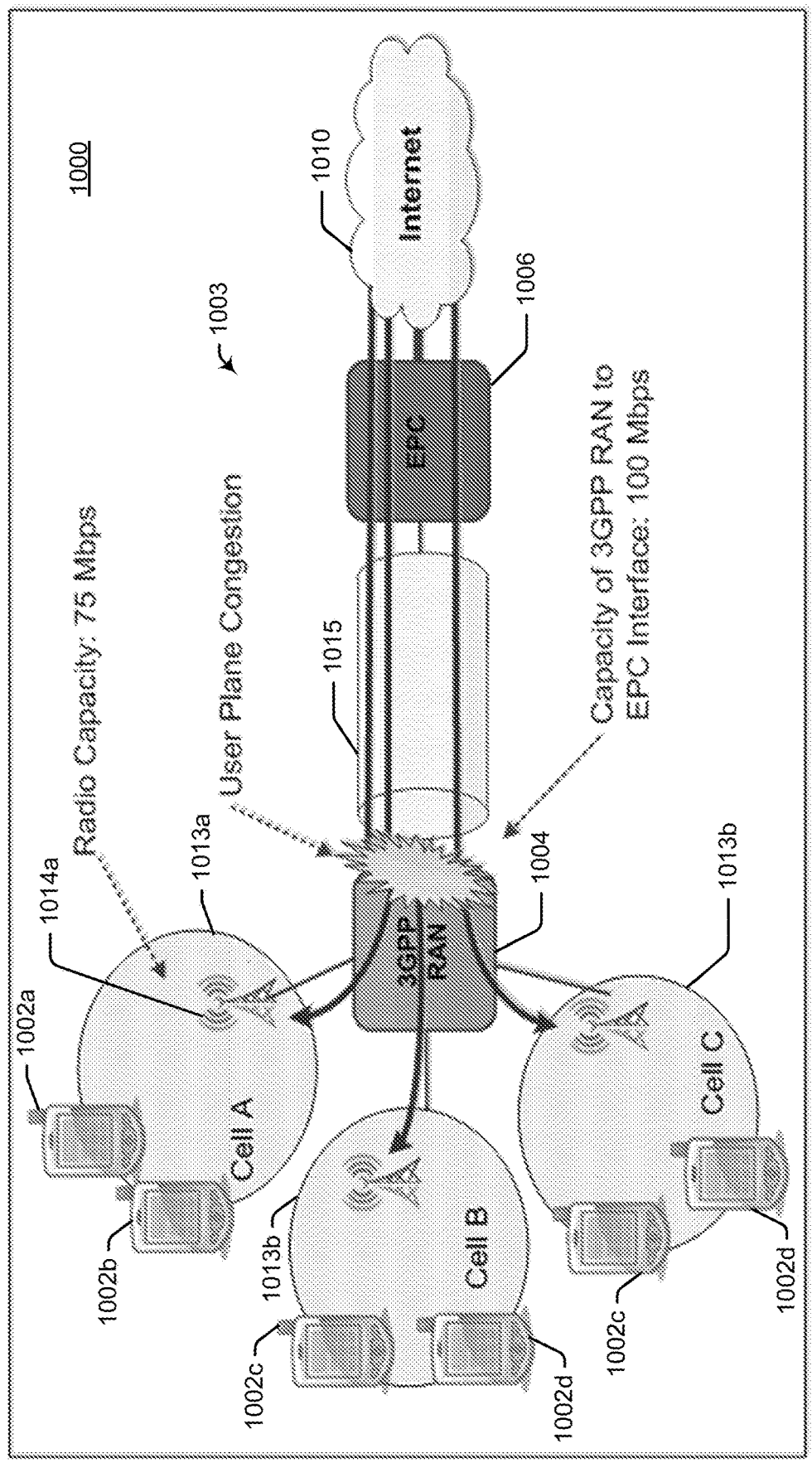
FIG. 10 is a block diagram illustrating an example of a communications system in which user plane congestion may occur in a particular cell.

FIG. 10 is a block diagram illustrating an example communications system 1000 in which user plane congestion may occur in a particular cell. The user plane congestion in the cell may occur pursuant to traffic volume exceeding a capacity of the an 3GPP-RAN-to-EPC interface. The communications system 1000 may include six WTRUs 1002a, 1002b, 1002c, 1002d, and 1002e, 1002f, (collectively "WTRUs 1002") and a network (shown generally) 1003. The network 1003 may include a 3GPP RAN 1004; a core network (shown as "EPC") 1006, three cells, namely, cells 1013a, 1013b and 1013c; and a PDN (e.g., internet) 1010. The cells 1013a, 1013b and 1013c may include respective base stations (e.g., eNodeBs) 2314a, 2314b and 2314c.

Each of the cells 1013a, 1013b and 1013c may have, for example, a radio capacity of 75 Mbps. The 3GPP-RAN-to-EPC 1015 interface may have, for example, a capacity of 100 Mbps. The radio capacity and the 3GPP-RAN-to-EPC interface capacity are provided as examples only, and may be different from those provided.

When the user plane data/traffic volume of all the WTRUs 1002 being served by cells 1013a, 1013b and 1013c totals more than the capacity of the 3GPP RAN to EPC interface 1015 (as shown in FIG. 10), any and/or all of the WTRUs 1002 may be impacted. For example, any and/or all of the WTRUs 1002 may undergo (e.g., potentially excessive) data rate reduction and/or experience service denial. Even though each of the cells 1013a, 1013b and 1013c may have capacity to support the 1002a, 1002b, 1002c, 1002d, and 1002e, 1002f, the capacity of the 3GPP RAN to EPC interface 1012 may have an impact on each of the WTRUs 1003. In some instances, the limitation of the capacity of the 3GPP RAN to EPC interface 1012 may prevent the WTRUs 1003 from being offered any resources at all.

User-impacting congestion may occur when a service that is delivered to a user over the default bearer or a dedicated bearer does not meet the user's expected service experience due, at least in part, to RAN user plane congestion. The expectation for a service delivery is, generally, highly dependent on the particular service or application. The expected service experience may also differ between subscriber groups (e.g., a premium subscriber may have higher expectations than a subscriber with the lesser subscription). RAN resource shortage where the RAN can still fulfill the user expectations for a service delivery is generally not considered to be user-impacting congestion. It is rather an indication for full RAN resource utilization, and as such, is generally considered a normal mode of operation.

The terms "congestion", "user-plane congestion" as used herein encompass various types of congestion, including the RAN user-plane congestion and user-impacting congestion types (such as promulgated by 3GPP). And the use of the terms "RAN user-plane congestion" and/or "user-impacting congestion" may be used interchangeably with other types congestion without loss of generality.

RAN User Plane Congestion Mitigation and Awareness

Provided herein are solutions for mitigating and/or providing awareness of RAN user plane congestion. In various embodiments, the solutions may be directed to effectively mitigating RAN user plane congestion for mobile data traffic delivered over default bearers. Such solutions assume that an operator cannot (or decides not to) move such applications onto different bearers (e.g., guaranteed bearers) due to, for example, increased cost. It is important to note that the majority of the operators (if not all) has configured their networks to run all services via a default bearer. The congestion mitigation measures may include traffic prioritization, traffic reduction and limitation of traffic. The mitigation measures may be based on user subscription, type of application and type of content, for example.

In various embodiments, the solutions may be directed to identifying whether entities in the system (i.e., WTRU, RAN, core network) are (or need) to be made aware of RAN user plane congestion and/or to identify which entities in the system (i.e., WTRU, RAN, core network) are (or need) to be made aware of the RAN user plane congestion.

Mitigation of User Plane Congestion Based on Intra-QCI Level Traffic Differentiation Provided herein are methods, apparatuses and systems for carrying out hierarchical QoS differentiation of traffic within the same QCI (i.e., intra-QCI) level in view of user plane congestion. Among such methods, apparatuses and systems may be a method for (and/or an apparatus and/or a system adapted) for mitigating and/or otherwise affecting user plane congestion based on intra-QCI level traffic differentiation. Such other affectation may have, for example, (i) a positive effect on the user plane congestion, such as, e.g., a reduction in an amount of the user plane congestion; (ii) a negative effect on the user plane congestion, such as, e.g., an increase in an amount of the user plane congestion; or (iii) no net effect on the user plane congestion, such as e.g., a reduction in one amount of the user plane congestion and an corresponding increase in another amount of the user plane congestion. In various embodiments, the mitigation and/or other affection of the user plane congestion may have a positive effect in that such may cause a reduction in an amount of the user plane congestion with respect to a single user or multiple users. In various embodiments, the mitigation and/or other affection of the user plane congestion may have a negative effect in that such may cause an increase in an amount of the user plane congestion with respect to a single user or multiple users. In various embodiments, the mitigation and/or other affection of the user plane congestion may have a not net effect in that such may cause (i) a reduction in an amount of the user plane congestion with respect to a single user or multiple users, and (ii) an increase in an amount of the user plane congestion with respect to a single user or multiple users.

FIGS. 11-22 are flow diagrams illustrating examples of flows 1100-2200; each of which is directed to mitigating user plane congestion, such as user plane congestion in a RAN. For simplicity of exposition, the flows 1100-2200 are described with reference to the base station 260. The flows 1100-2200 may be carried out by other entities of the communications system 200 of FIGS. 2A-2B, including various other nodes of the network 203, such as, for example, SGW 264. The flows 1100-1200 may be carried out in other communications systems, as well.

Figures 11, 12:
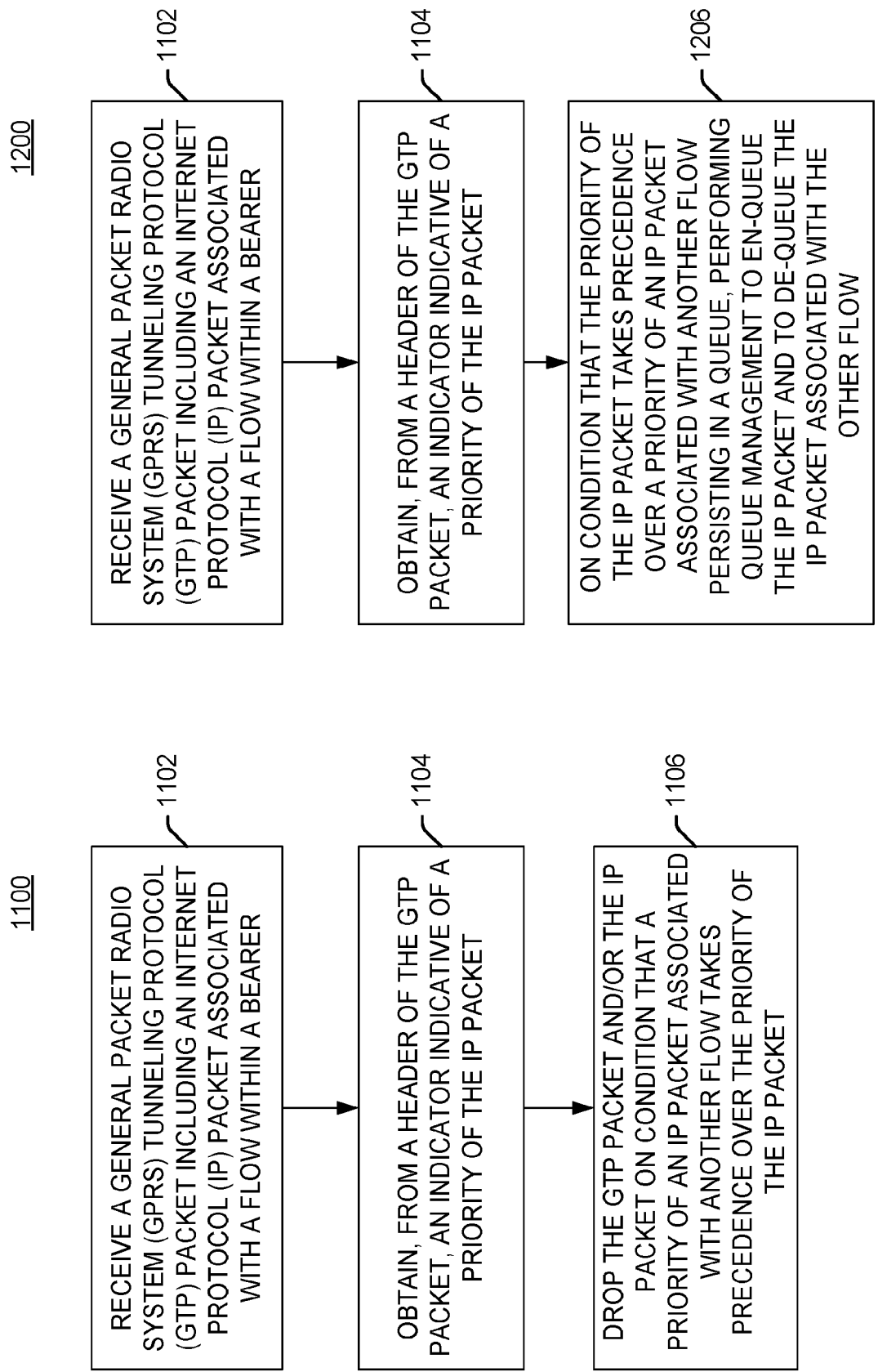

Referring now to FIG. 11 at process block 1102, the base station 260 may receive a GTP packet including a first IP packet associated with a first flow within a bearer. This bearer may be, for example a default bearer, or other bearer formed in accordance with a QoS class (QCI level). At process block 1104, the base station 260 may obtain, from a header of the GTP packet (GTP-packet header), an indicator indicative of a priority of the first IP packet. This indicator may be, for example, a sub-QCI (or sub-QCI label). In an embodiment, obtaining the indication may include performing packet inspection of the GTP-packet header to reveal the indicator. Due to the indicator being disposed in the GTP-packet header, deep packet inspection of the payload of the GTP packet is not necessary.

At process block 1106, the base station 260 may drop (filter) the GTP packet and/or the IP packet on condition that a priority of a second IP packet associated with a second flow takes precedence over the priority of the first IP packet. Such condition may exist, for example, if the second packet has a sub-QCI indicating a priority lower than the priority indicated by the sub-QCI of the first packet.

The flow 1200 of FIG. 12 is similar to the flow 1100 of FIG. 11, except that at process block 1206, the base station 260 may perform queue management to en-queue the first IP packet and to de-queue the second IP packet on condition that the priority of the first IP packet takes precedence over a priority of a second IP packet that is associated with a second flow and that persists in a queue. Such condition may exist, for example, if the second packet has a sub-QCI indicating a priority lower than the priority indicated by the sub-QCI of the first packet.

The flow 1300 of FIG. 13 is similar to the flows 1100, 1200 of FIGS. 11, 12, except that at process block 1306, the base station 260 may perform queue management to de-queue one or more IP packets associated with the first flow persisting in a queue on condition that a priority of a second IP packet associated with a second flow takes precedence over the priority of the first IP packet. This condition may exist, for example, if the second packet has a sub-QCI indicating a priority higher than the priority indicated by the sub-QCI of the first packet.

The flow 1400 of FIG. 14 is similar to the flows 1100-1300 of FIGS. 11-13, except as follows. At process block 1406, the base station 260 may perform a first queue management to de-queue the second IP packet on condition that a priority of a second IP packet persisting in a queue is the same as the priority of the first IP packet. This condition may exist, for example, if the priorities indicated by the sub-QCIs of the first and second packets are the same.

At process block 1408, the base station 260 may perform a second queue management to en-queue the first IP packet and/or de-queue the second IP packet on condition that the priority of the first IP packet takes precedence over a priority of the second IP packet. Such condition may occur when the second packet has a sub-QCI indicating a priority lower than the priority indicated by the sub-QCI of the first packet.

The flow 1500 of FIG. 15 is similar to the flows 1100-1400 of FIGS. 11-14, except that at process block 1506, the base station 260 may delay scheduling of the first IP packet on condition that a priority of a second IP packet associated with a second flow within the bearer takes precedence over the priority of the first IP packet. This condition may occur when the second packet has a sub-QCI indicating a priority higher than the priority indicated by the sub-QCI of the first packet.

The flow 1600 of FIG. 16 is similar to the flows 1100-1500 of FIGS. 11-15, except that at process block 1506, the base station 260 may schedule the first IP packet ahead of a second IP packet associated with a second flow within the bearer on condition that the priority of the first IP packet takes precedence over a priority of the second IP packet. This condition may occur when the second packet has a sub-QCI indicating a priority lower than the priority indicated by the sub-QCI of the first packet.

Referring now to flow 1700 of FIG. 17 at process block 1702, the base station 260 (and/or the RAN) may send a congestion indication to the core network 203. The congestion indication may be sent to the PCRF 220, for example. The congestion information may be sent through bearer traffic, and may include any information indicating that the base station and/or the RAN is experiencing congestion. At process block 1704, the base station 260 may receive a GTP packet including a first IP packet associated with a first flow within a bearer. The bearer may be a default bearer, or other bearer formed in accordance with a QoS class (QCI level). At process block 1706, the base station 260 may obtain, from the GTP-packet header, an indicator indicative of a priority of the first IP packet. This indicator may have been inserted into the GTP-packet header by the core network in responsive to the congestion indication. The indicator may be, for example, a sub-QCI (or sub-QCI label). In an embodiment, obtaining the indication may include performing packet inspection of the GTP-packet header to reveal the indicator. Due to the indicator being disposed in the GTP-packet header, deep packet inspection of the payload of the GTP packet is not necessary. In some embodiments, previously received GTP packets might not have included priority-indicating indicators. In which case, the base station 260 may assume that the priority of the first IP packet does not take precedence over any of the previously received GTP packets (e.g., select at random).

At process block 1708, the base station 260 may drop (filter) the GTP packet and/or the IP packet on condition that the priority of the first IP packet does not takes precedence over the priorities of the IP packets (from the previously received GTP packets). Such condition may exist, for example, if the previously received packets do not have sub-QCIs, and thus assumed to have a priority higher than the priority indicated by the sub-QCI of the first packet.

In some embodiments, the base station 260 may perform deep packet inspection of IP packets of the previously received GTP packets to determine the priorities of the received IP packets. In which case, the base station 260 may drop the GTP packet and/or the IP packet on condition that the priority of the first IP packet does not takes precedence over the priorities of the previously received IP packets.

The flow 1800 of FIG. 18 is similar to the flow 1700 of FIG. 17, except that at process block 1808, the base station 260 may perform queue management to en-queue the first IP packet and to de-queue the second IP packet on condition that the priority of the first IP packet takes precedence over a priority of a second IP packet that is associated with a second flow and that persists in a queue. Such condition may exist, for example, if the previously received packets do not have sub-QCIs, and are assumed to have a priority lower than the priority indicated by the sub-QCI of the first packet. Alternatively, the condition may exist, if after, the base station 260 performs deep packet inspection of IP packets of the previously received GTP packets, the priorities of the received IP packets are lower than the priority indicated by the sub-QCI of the first packet.

The flow 1900 of FIG. 19 is similar to the flows 1700, 1800 of FIGS. 17, 18, except that at process block 1908, the base station 260 may perform queue management to de-queue one or more IP packets associated with the first flow persisting in a queue on condition that a priority of a second IP packet associated with a second flow takes precedence over the priority of the first IP packet. Such condition may exist, for example, if the previously received packets do not have sub-QCIs, and thus assumed to have a priority higher than the priority indicated by the sub-QCI of the first packet. Alternatively, the condition may exist, if after, the base station 260 performs deep packet inspection of IP packets of the previously received GTP packets, the priorities of the received IP packets are higher than the priority indicated by the sub-QCI of the first packet.

The flow 2000 of FIG. 20 is similar to the flows 1700-1900 of FIGS. 17-19, except as follows. At process block 2008, the base station 260 may perform a first queue management to de-queue the second IP packet on condition that a priority of a second IP packet persisting in a queue is the same as the priority of the first IP packet. This condition may exist, for example, if the priorities of the previously received IP packets are assumed to be the same as the priority indicated by the sub-QCI of the first packet. Alternatively, the condition may exist, if after, the base station 260 performs deep packet inspection of IP packets of the previously received GTP packets, the priorities of the received IP packets are the same as the priority indicated by the sub-QCI of the first packet.

At process block 2010, the base station 260 may perform a second queue management to en-queue the first IP packet and/or de-queue the second IP packet on condition that the priority of the first IP packet takes precedence over a priority of the second IP packet. This condition may exist, if the priorities of the previously received IP packets are assumed to be lower than the priority indicated by the sub-QCI of the first packet. The condition may also exist, if after, the base station 260 performs deep packet inspection of IP packets of the previously received GTP packets, the priorities of the received IP packets are lower than the priority indicated by the sub-QCI of the first packet.

The flow 2100 of FIG. 21 is similar to the flows 1700-2000 of FIGS. 17-20, except that at process block 2108, the base station 260 may delay scheduling of the first IP packet on condition that a priority of a second IP packet associated with a second flow within the bearer takes precedence over the priority of the first IP packet. This condition may exist, if the priorities of the previously received IP packets are assumed to be higher than the priority indicated by the sub-QCI of the first packet, and/or, if after, the base station 260 performs deep packet inspection of IP packets of the previously received GTP packets, the priorities of the received IP packets are determined to be higher than the priority indicated by the sub-QCI of the first packet.

The flow 2200 of FIG. 22 is similar to the flows 1700-2100 of FIGS. 11-21, except that at process block 2208, the base station 260 may schedule the first IP packet ahead of a second IP packet associated with a second flow within the bearer on condition that the priority of the first IP packet takes precedence over a priority of the second IP packet. This condition may occur when the second packet has a priority lower than the priority indicated by the sub-QCI of the first packet.

Although not shown in FIGS. 11-17, the base station 260 may detect the user plane congestion, and/or be informed of the user plane congestion by another entity of the communications system 200 (e.g., the WTRU 202, NCMF 224, PCEF 270, MME 262, ANDSF 222, etc.). In any case, the base station 260 may drop packets, perform queue management, schedule packets, etc., responsive to the user plane traffic being detected, and on the conditions provided infra. In some embodiments of the flows 1100-2200, the first and second flows may be associated with different applications. In other embodiments of the flows 1100-2200, the first and second flows may be associated with the same application (e.g., the first and second flows may be sub-flows of the same application).

Utilizing PCC for Mitigation and/or Other Affectation of User Plane Congestion Based on Intra-QCI Level Traffic Differentiation Sub-QCI Attributes In various embodiments, mitigating and/or otherwise affecting user plane congestion based on intra-QCI level traffic differentiation may be carried out using a PCC system along with PCC policies and/or rules for reducing, and in turn, enforcing, QoS for IP flows/sub-flow by deriving and including (e.g., low priority) sub-QCIs. For simplicity of exposition, in the description that follows such PCC system, PCC rules and/rules are described with reference to the PCC system 219 of FIGS. 2A-B.

In an embodiment, the PCRF 220 may receive a user plane congestion report from the WTRU 202 or the base station 260. The UE 220 is assumed to have an active PDN connection with best effort traffic (e.g., using QCI=5).

Based on the congestion report, the PCRF 220 may decide to throttle or otherwise traffic shape traffic by providing updated PCC rules including sub-QCI rules within IP flows/ traffic that may require or otherwise be subject to traffic shaping and/or throttling. The updated PCC rules may be generated by the PCRF 220 or other entity, and may be provided to the PCEF 270 (or other PCEF that enforces the PCC rules) and/or to the BBERF 274 (or other BBERF that enforces QoS rules (for e.g., PMIP S5)).

The updated PCC rules may include (e.g., low priority) sub-QCIs. Other factors for the PCRF 200 to derive the PCC rules based on low priority sub-QCI may include, for example, user subscription profile(s) obtained from the HSS/SPR 218, volume usage (such as, in accordance with the usage monitoring clause 4.4 of 3GPP TS 23.203 v), and/or spending limits of one or more users. In embodiments in which the spending limits are utilized, the PCRF 220 may subscribe to the OCS 221 to be notified via Sy reference points if the users exceed respective spending thresholds.

The updated PCC rules may include QoS rules configured to reduce the MBRs of IP flows having the low priority sub-QCIs. The PCEF 270 and/or the BBERF 274 may enforce the rules by, for example, ensuring the bit rates of such traffic do not exceed the new, reduced MBRs. By enforcing such QoS rules, the PCC system 219 may effectively and/or intelligently throttle or otherwise traffic shape traffic of applications creating or contributing to the user plane congestion.

FIGS. 23-26 are block diagrams illustrating example call flows 2300-2600, respectively, for carrying out hierarchical QoS differentiation of traffic within the same QCI level, e.g., using one or more sub-QCIs, in view of user plane congestion. Each of the call flows 2300-2600 is described with reference to the communications system 200 of FIGS. 2A-2G, for simplicity of exposition. The call flows 2300-2600 may be carried out in other communications systems, as well.

In each of the call flows 2300-2600, user plane congestion information may be used by the PCC system 219 in enforcement of QoS for IP flows/sub-flow having low priority sub-QCIs. Enforcement of the QoS for IP flows/sub-flow having low priority sub-QCIs may positively, negatively, or otherwise affect the user plane congestion, and in turn, QoE(s) of the WTRU 202 and/or other user(s).

Figure 23:
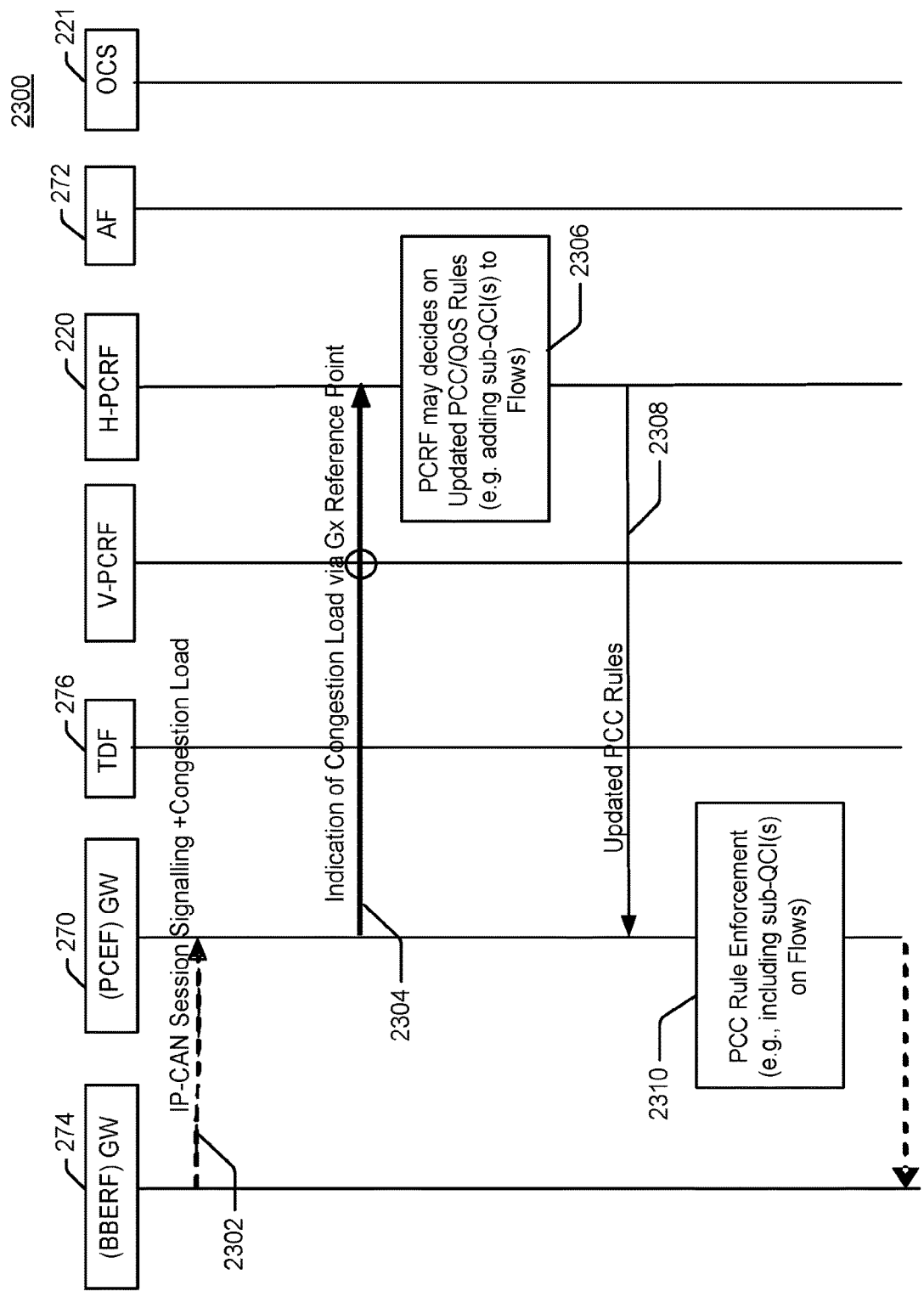
FIGS. 23-26 are block diagrams illustrating example call flows for carrying out hierarchical traffic differentiation in view of user-plane congestion.

The example call flow 2300 of FIG. 23 is directed to establishing PCC rules during a period of congestion, e.g., during and/or responsive to an indication of congestion load from the PCEF 270, such as during and/or responsive to an indication of IP-CAN session establishment or IP-CAN session modification. The PCC rules may be aimed at mitigating or otherwise affecting user plane congestion, and may include PCC rules for reducing, and in turn, enforcing, QoS for IP flows of low priority traffic as well as include sub-QCI information to differentiate the priority of IP flows sent over the same bearer (e.g., all traffic sent over the default bearer of QCI=9).

At call-flow part 2302, the PCEF 270 may receive IP-CAN session signaling, e.g., a request for IP CAN Bearer establishment. The PCEF 270 may also receive the congestion load information.

At call-flow part 2304, the PCEF 270 may send to the PCRF 220 a message requesting authorization of allowed service(s) and/or for PCC Rules information may. The PCEF 270 may do so, for example, after determining that a PCC authorization may be required. The PCEF 270 may also include the congestion load information.

At call-flow part 2306, the PCRF 220 may decide on PCC and/or QoS rules taking into account the subscription profile of the user. The PCRF 220 may make the authorization and policy decision. If congestion load reports are present for the user, the PCRF 220 may take the information into account.

For the solicited application reporting, if the PCRF 220 determines that policy decisions depends on the application used, the PCRF 220 may request the TDF 276 to establish the relevant session towards PCRF 220 and provides ADC Rules to the TDF 276, as per user profile configuration. The TDF 276 may transmit an ACK (accept or reject of the ADC rule operation(s)) to inform the PCRF 220 about the outcome of the actions related to the decision(s) received. The ACK may also include the list of Event Triggers to report. The Event Triggers may indicate to the PCRF 220 what events to be forwarded from the PCRF 220 to the TDF 276, once PCRF 220 gets the corresponding Event Report from the PCEF/BBERF.

The PCRF 220 may transmit the decision(s) which may include PCC rules to mitigate congestion. The PCRF 220 may provide the default charging method and may include the following information: the PCC Rules to activate and the Event Triggers to report. If PCEF 270 is enhanced with ADC, the applicable ADC rules may be provided, according to the user profile configuration. The Policy and Charging Rules may allow the enforcement of policy associated with the IP CAN session. The Event Triggers may indicate to the PCEF 270 what events must be reported to the PCRF 220. If the TDF 276 provided a list of Event Triggers to the PCRF 220 in the previous step, the PCRF 220 may also provide those Event Triggers to the PCEF. The PCRF 220 may also subscribe to the PCEF 270 to be informed of volume usage levels.

At call-flow part 2308, the PCRF 220 may send to the PCEF 270 an acknowledgement (ACK) message acknowledging IP CAN session establishment. The ACK message may include the decision(s). The decision(s) may include PCC rules aimed at mitigating congestion, including, for example, PCC rules for reducing QoS of IP flows and/or sub-flows by including low priority sub-QCIs to low priority traffic At call-flow part 2310, the PCEF 270 may enforce the PCC rules provided by the PCRF 220. If the PCC rules include sub-QCI information, the PCEF 220 may add sub-QCI information (e.g., sub-QCI label) within the IP flow(s) packets.

Figure 24:
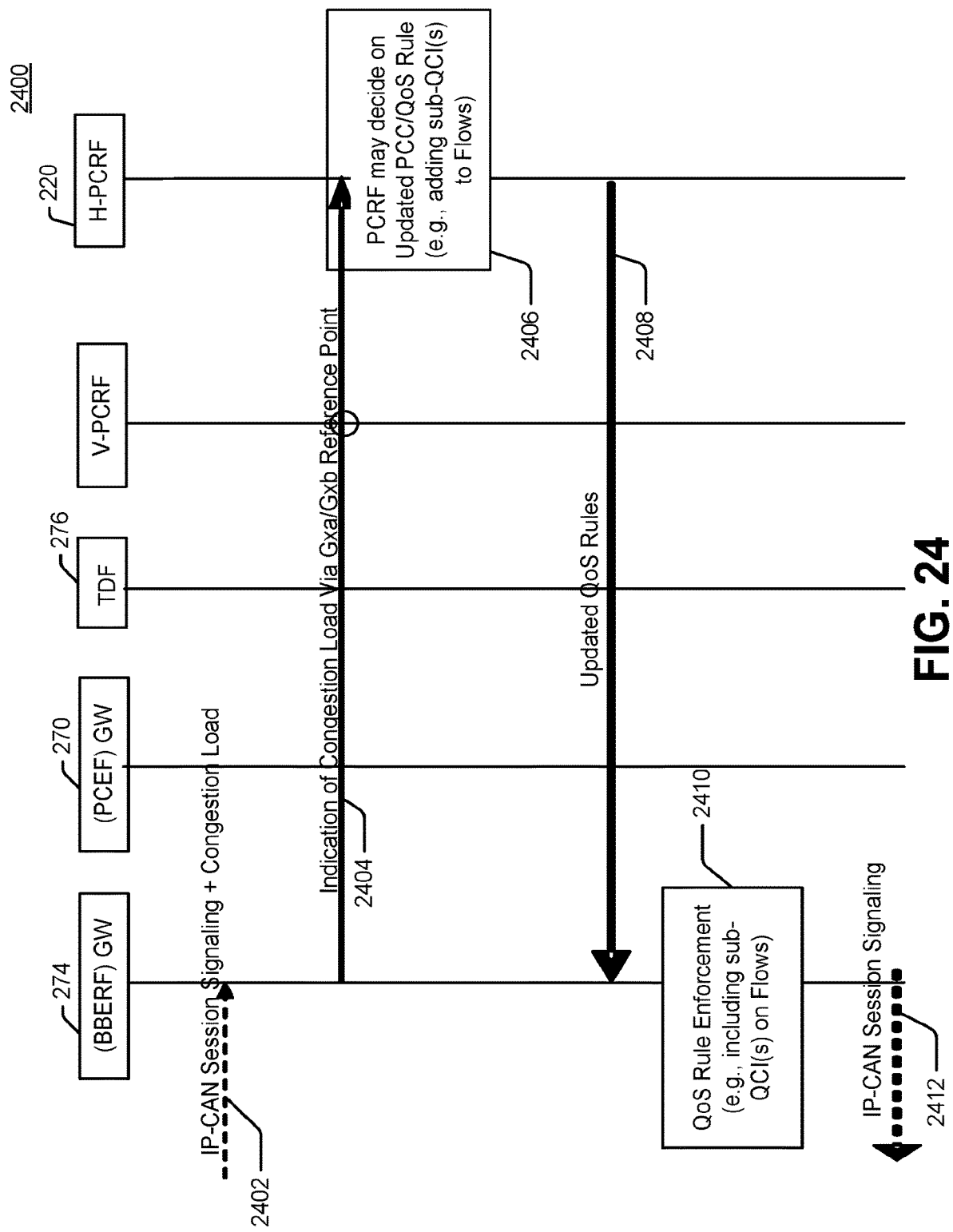

The example call flow 2400 of FIG. 24 is directed to establishing PCC and/or QoS rules during a period of congestion, e.g., during and/or responsive to an indication of congestion load from the BBERF. The PCC and/or QoS rules may be aimed at mitigating user plane congestion, and may include PCC and/or QoS rules for reducing, and in turn, enforcing, QoS for IP flows of low priority traffic as well as include sub-QCI information to differentiate the priority of IP flows sent over the same bearer (e.g. all traffic sent over the default bearer of QCI=9).

At call-flow part 2404, the BBERF 274 may send, and the PCRF 220 may receive user plane congestion load information. At call-flow part 2406, the PCRF 220 may make a PCC rule decision taking into account user plane congestion (if available). The PCRF 220 may make the authorization and policy decision. If congestion load reports are present for the user, the PCRF 220 may take the information into account.

For the solicited application reporting, if the PCRF 220 determines that policy decisions depends on the application used, the PCRF 220 may request the TDF 276 to establish the relevant session towards PCRF 220 and provides ADC Rules to the TDF 276, as per user profile configuration. The TDF 276 may transmit an ACK (accept or reject of the ADC rule operation(s)) to inform the PCRF 220 about the outcome of the actions related to the decision(s) received. The ACK may also include the list of Event Triggers to report. The Event Triggers may indicate to the PCRF 220 what events to be forwarded from the PCRF 220 to the TDF 276, once PCRF 220 gets the corresponding Event Report from the PCEF/BBERF.

The PCRF 220 may transmit the decision(s) which may include PCC rules to mitigate congestion. The PCRF 220 may provide the default charging method and may include the following information: the PCC Rules to activate and the Event Triggers to report. If PCEF 270 is enhanced with ADC, the applicable ADC rules may be provided, according to the user profile configuration. The Policy and Charging Rules may allow the enforcement of policy associated with the IP CAN session. The Event Triggers may indicate to the PCEF 270 what events must be reported to the PCRF 220. If the TDF 276 provided a list of Event Triggers to the PCRF 220 in the previous step, the PCRF 220 may also provide those Event Triggers to the PCEF. The PCRF 220 may also subscribe to the PCEF 270 to be informed of volume usage levels. The PCRF 220 may additionally include sub-QCIs within the PCC and/or QoS rules for low priority traffic.

At call-flow part 2408, the PCRF 220 may provision QoS rules (that include sub-QCI) information towards the BBERF 274. If the BBERF 274 asked for new QoS rules or IP CAN-specific parameters need to be delivered back to the BBERF or both, the PCRF 220 may transmit a Gateway Control and QoS Rules Reply to the BBERF 274. This interaction may include QoS Rules and Event Triggers. The BBERF 274 may initiate the IP CAN Bearer signaling if required for the QoS Rules and Event Triggers deployed. The BBERF 274 may receive the response for the IP CAN Bearer signaling. If new and/or modified QoS Rules are provided, the result of the QoS rule activation may be returned to the PCRF 220, indicating whether the resources requested have been successfully allocated.

At call flow part 2410, the BBERF 274 may enforce the QoS rules, and if the QoS rules include sub-QCI information, the BBERF 274 may add sub-QCI information within the packets of the various IP flows.

PCRF-Initiated Sub-QCI Provisioning

Figure 25:
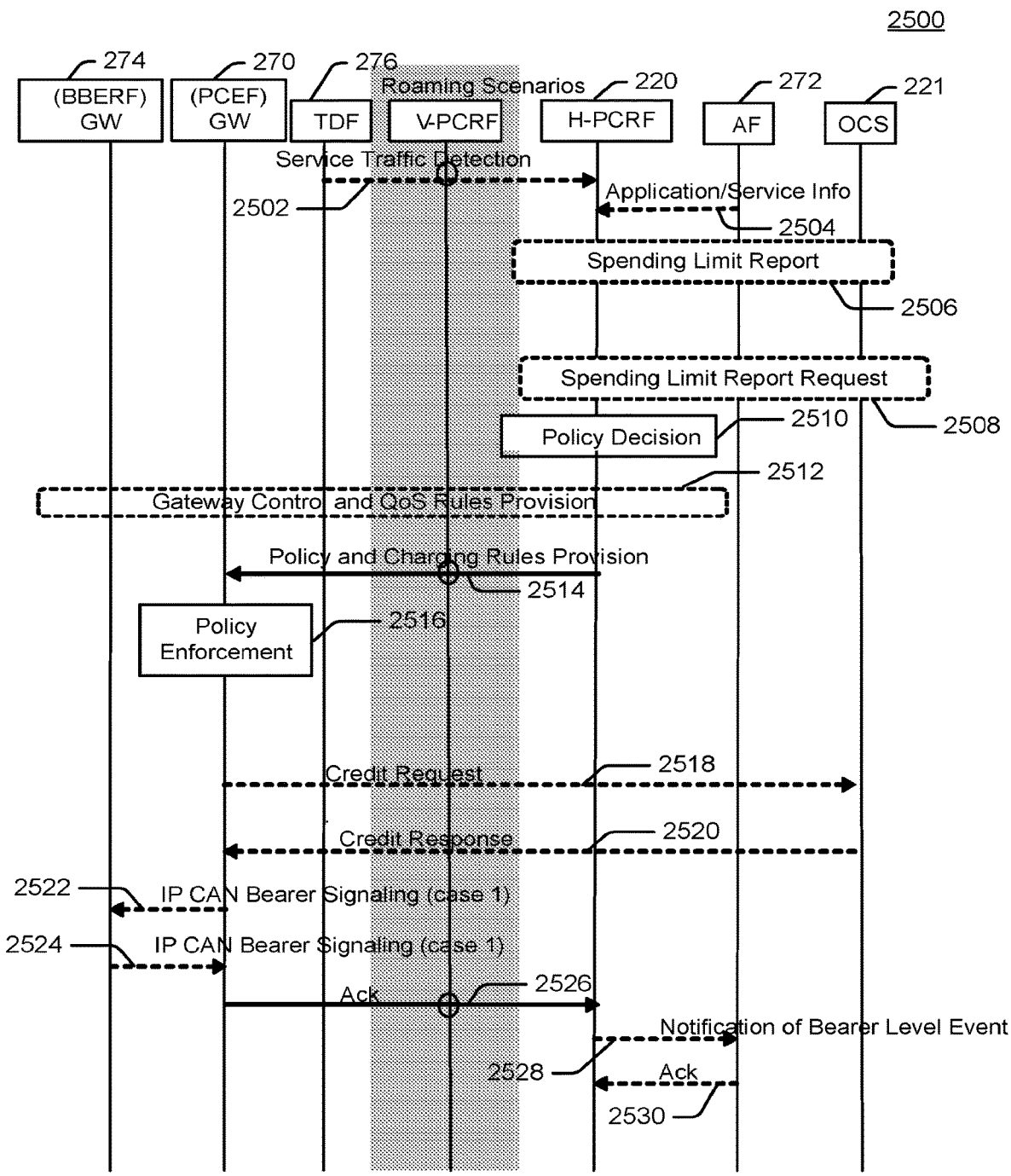

The example call flow 2500 of FIG. 25 is directed to establishing PCC rules that may include sub-QCI information. An example of such procedure can be carried out during a PCRF-initiated IP-CAN Session Modification. The PCC rules may be aimed at mitigating user plane congestion, and may include PCC rules for reducing, and in turn, enforcing, QoS for IP flows of low priority traffic as well as include sub-QCI information to differentiate the priority of IP flows sent over the same bearer (e.g. all traffic sent over the default bearer of QCI=9).

At call-flow part 2502, the AF 272 may provide/revoke service information to the PCRF 220 responsive to AF session signaling. The AF 272 may subscribe to notification of bearer level events related to the service information. To facilitate generating the applicable events, the PCRF 220 may instruct the PCEF 270 to report events related to the corresponding PCC rules.

At call-flow part 2504, an alternative to call-flow part 2502, is shown for the TDF 276, e.g. for when the TDF 276 may detect a start and/or stop of an application traffic that matches one or more active ADC Rules, such as, for example, in accordance with step 1b of clause 7.4.2 of 3GPP TS 23.203, or otherwise. The TDF 276 may provide application information responsive to solicited application reported (e.g., based on PCRF ADC rules, for example the PCRF 220 instructing the TDF 276 to report specific applications due to user plane congestion load) or unsolicited application reported (e.g., based on TDF pre-configuration).

At call-flow part 2506, as another alternative, the OCS 221 may provide a Spending Limit Report to the PCRF 220, such as, e.g., described in clause 7.9.4 of 3GPP TS 23.203, or otherwise. The PCRF 220 may have subscribed to be notified if the user spending limits have been met based on user plane congestion load policies provided by the HSS/SPR 218.

The PCRF 220 may store the service information, if available, and may respond to the AF 272 with an ACK message. This ACK message may be applicable to call-flow part 1902. Without AF interaction, a trigger event in the PCRF 220 may cause the PCRF 220 to determine that the PCC rules require updating at the PCEF 270, e.g. change to configured policy. This procedure may also be triggered by a GW Control and QoS Rules Request procedure.

At call-flow part 2508, the PCRF 220 may alter the subscribed list of policy counters using an Initial, Intermediate or Final Spending Limit Report Request procedure. The PCRF 220 may do so, for example, if the PCRF 220 determined a change to policy counter status reporting is required, such as e.g., responsive to congestion load reports.

At call-flow part 2510, the PCRF 220 may make an authorization and policy decision. The PCRF 220 may take into account the congestion load reported, the spending limit, the volume usage level, IP flows/sub-flows reported (from the AF 272) and application information reported (from the TDF 276), and/or HSS/SPR policies for user plane congestion load (that may include policies based on sub-QCI parameters of the IP flows/sub-flows), if available.

The PCRF 220 may store the application information (if provided), and may respond with an ACK message to the TDF 276 (for unsolicited application reporting) or a TDF session modification (for solicited application reporting). For the TDF solicited application reporting, the PCRF 220 may provide a new ADC decision to the TDF 276. If the last occurring ADC rule is deactivated, the PCRF 220 may request the TDF 276 to terminate the TDF session towards the PCRF 220. If there is no active TDF session yet between the TDF 276 and the PCRF 220, the PCRF 220 may request the TDF 276 to establish the TDF session towards PCRF 220 and provide an ADC decision to the TDF 276. In case of a local breakout, the V-PCRF may provide ADC rules as instructed by the H PCRF 220 over an S9 interface or reference point.

For the TDF solicited application reporting, in the case of an existing on-going session, if requested by PCRF 220, the TDF 276 may send a Provision ACK (accept or reject of the ADC Rule operation(s)). For a new session, the TDF 276 may send an Ack. This may inform the PCRF 220 about the outcome of the actions related to the received ADC decision(s). The Provision Ack/Ack may also include the list of Event Triggers to report. The Event Triggers indicate to the PCRF 220 which events are to be forwarded from the PCRF 220 to the TDF 276, once the PCRF 220 obtains the corresponding Event Report from the PCEF 270/BBERF 274.

At call-flow part 2512, the PCRF 220 may initiate a GW Control and QoS Rules Provision Procedure. The PCRF 220 may do so, for example, if there is no GW Control and QoS Rules Reply pending and there is a need to provision QoS rules. The PCRF 220 may initiate the GW Control and QoS Rules Provision Procedure in accordance with 7.7.4 of 3GPP TS 23.203 (applicable for PMIP S5 or S2c, as defined in clause 7.1 of 3GPP TS 23.203) or otherwise.

If there are multiple BBERFs associated with the IP CAN session, call flow part 1912, may be performed with the BBERFs that support UE/NW bearer establishment mode. If there is a GW Control and QoS Rules Reply pending, e.g. this procedure was invoked from a Gateway Control and QoS Rules Request procedure (e.g., as defined in clause 7.7.3 of 3GPP TS 23.203), the PCRF 220 may use that opportunity for provisioning the applicable QoS rules. If there are multiple BBERFs associated with the IP CAN session, and the procedure was previously invoked by a GW Control and QoS Rules Request procedure from a primary BBERF, then the PCRF 220 may receive a GW Control and QoS Rules Request from the non-primary BBERFs.

At call-flow part 2514, the PCRF 220 may sends the Policy and Charging Rules Provision (PCC Rules, Event Trigger, Event Report) to the PCEF 270. The PCRF 220 may also provide all new ADC decisions to the PCEF 270, if enhanced with ADC. If the TDF 276 provided a list of Event Triggers to the PCRF 220, the PCRF 220 may also provide those Event Triggers to the PCEF 270.

At call-flow part 2516, the PCEF 270 may enforce the decision. Call-flow parts 2518 to 2530 may be carried out in accordance with clause 7.4.2 of 3GPP TS 23.203. Call-flow parts 2518 to 2530 may be carried out in other ways, as well.

Congestion Mitigation in the Uplink

The WTRU 202 (e.g., a UE) may be able to mitigate congestion in the uplink direction based on operator policies provided by the ANDSF 222 via, e.g., the S14 reference point. The ANDSF policies may include information to drop low sub-QCI packets of specific applications based on the user plane congestion status in the uplink. The WTRU 202 may be able to differentiate between application based on the work carried out in 3GPP on data identification in ANDSF (DIDA). Alternatively, based on the sub-QCI information added by the WTRU 202 on the uplink direction the base station 260 (e.g., an eNode B) may drop low sub-QCI packets based on the user plane congestion status in the backhaul (e.g., between the RAN and SGW nodes).

Proactive Congestion Mitigation in the Uplink

In the uplink, a media access control (MAC) layer scheduler of the WTRU 202 may dynamically inspect a MAC SDU to identify the QCI sub layer priority for each packet, and perform prioritized scheduling to transmit the high priority packets first, and low priority packets next. If low priority packets become delayed in the queue past discard-Timer timeout (in a packet data convergence protocol (PDCP) layer), such packets may be discarded before transmission. Such discard may reduce or otherwise affect congestion.

The WTRU 202 may be configured with the rules to mark the packets of the same RB with a sub-priority by ANDSF or RB configuration or RRC configuration applicable to all RBs. The identification of the SDU packet priority may be obtained by packet inspection (e.g., DPI), such as packet inspection of a DSCP field in IP packet that has been configured in higher layers based on the ANDSF policies. The PDCP layer may obtain the packets with an additional parameter that indicates the sub-priority that should be assigned to the packet, which may be further relayed to the radio link control (RLC) and MAC layers. The MAC layer logical channel prioritization may use logical channel priority to decide on which logical channel to select next, and within each logical channel, may use the sub-priority information to prioritize the selection of the packet or transport block within the same logical channel.

Utilizing RAN for Mitigation and/or Other Affectation of User Plane Congestion Based on Intra-QCI Level Traffic Differentiation Sub-QCI Attributes In various embodiments, mitigating and/or otherwise affecting user plane congestion based on intra-QCI level traffic differentiation may be carried out at a base station or other RAN element. For simplicity of exposition, in the description that follows, the base station or other RAN element is described with reference to the communications system 200 of FIGS. 2A-B.

In various embodiments, the base station 260 may be able to detect user plane congestion. The base station 260 may be assumed to support a Deep Packet Inspection capability where inspection of the QoS parameters (i.e. sub-QCI parameters) of IP flows/sub-flows is possible.

The base station 260 may mitigate congestion (at least in part) by, for example, updating a UE context stored in the MME 262 with parameters to indicate base station behavior during user plane congestion for a particular user. The UE context may include, for example, information indicating that a particular user is a high priority user, and such user should receive high QoE even at cases of high user plane congestion.

During user plane congestion, the base station 260 may take into account a subscription profile stored in the UE context so as to identify how to mitigate congestion. For example, the base station 260 may discard packets of low priority sub-QCIs along with taking into account the subscription profile of the user stored in the UE context.

Figure 26:
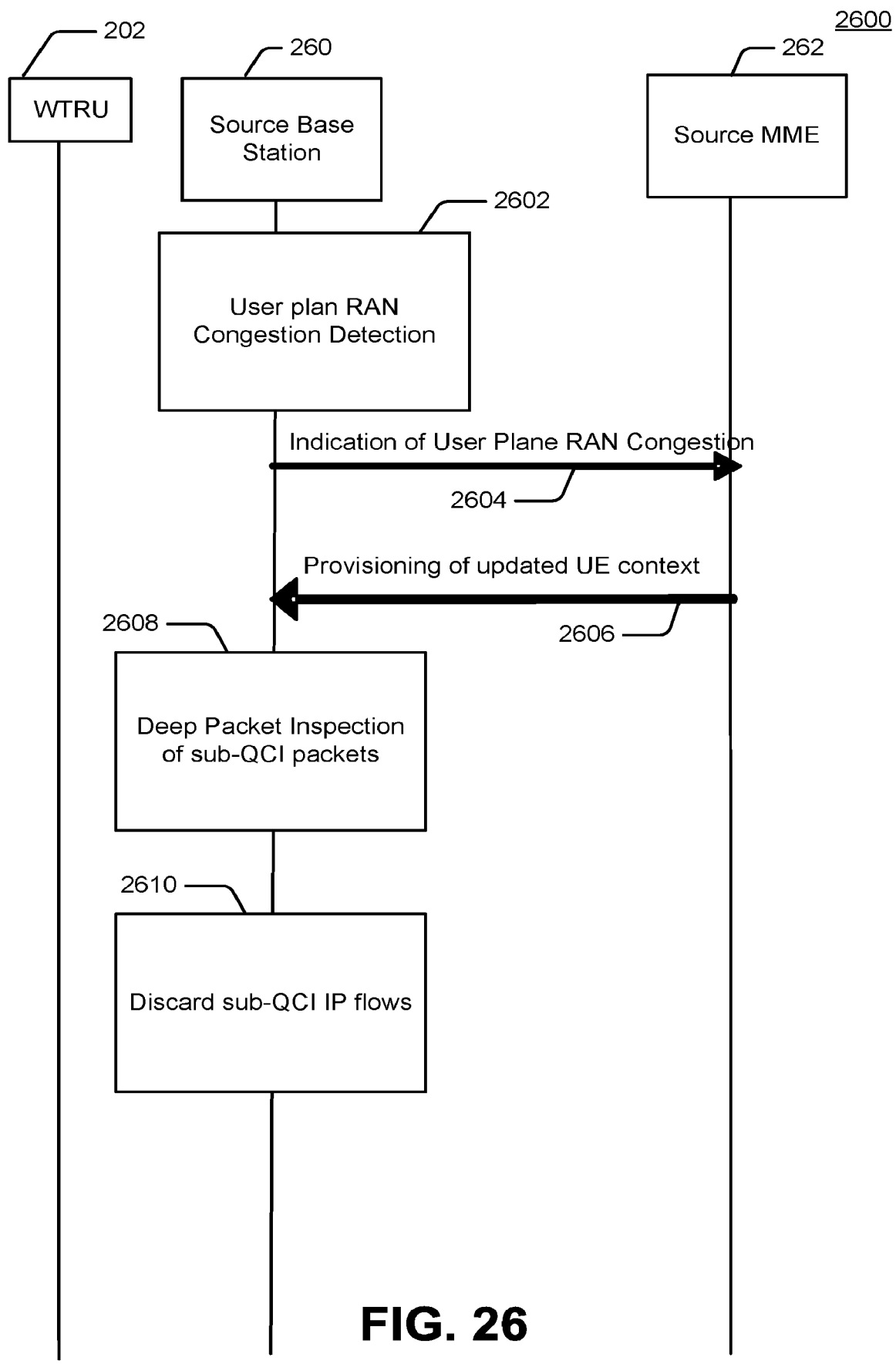

The example call flow 2600 of FIG. 26 is directed to mitigating and/or otherwise affecting user plane congestion based on intra-QCI level traffic differentiation carried out at a base station 260 or other RAN element. The base station 260 may take into account a subscription profile stored in the UE (WTRU) context so as to identify how to mitigate congestion, by for example, discarding packets of low priority sub-QCIs based on the subscription profile of the user stored in the UE context.

At call-flow part 2602, the base station 260 may detect that there are not enough resources to deliver all user plane traffic. At call-flow part 2604, the base station 260 may notify the MME 262 with user plane congestion information, The base station 260 may do so if, for example, the base station 260 does not possess UE context stored for a particular user. The base station 260 may report the user plane congestion information via NAS signaling, for instance.

At call-flow part 2606, the MME 262 may provide updated UE context information. At call-flow part 2608, the base station 260 may perform DPI on (e.g., all or some of) UE (WTRU) traffic.

At call-flow part 2610, the base station 260 may drop IP packets of the IP flows/sub-flows having low priority sub-QCIs. The IP packets of the IP flows/sub-flows having low priority sub-QCIs dropped by the base station 260 may be based on the UE context information provided by the MME 262 and the DPI performed.

Provided herein are methods, systems and apparatuses adapted for making a core network aware of RAN user plane congestion. Also provided herein are methods, systems and apparatuses adapted for determining how RAN user plane congestion can be mitigated for multiple applications running over a default bearer (i.e., QCI 5), such as, where the operator cannot and/or desired not to move such applications to different bearers (for example guaranteed/dedicated bearers).

In various embodiments, a core network approach for mitigating RAN user plane congestion may be used. To facilitate such core network approach, RAN user plane congestion information may be provided to the core network. The RAN user plane congestion information may be sent via NAS signalling, for example. In some embodiments, one or more of the MME 262, HSS 218, PGW 266, SGW 264, PCEF 270 and/or PCRF 220 may undertake actions to resolve the RAN user plane congestion. Congestion mitigation procedures after congestion reports are transmitted may be carried out at the MME 262, PGW 266 (or GGSN), SGW 264, PCEF 270 and/or PCRF 220.

In various embodiments, a RAN approach to mitigate RAN user plane congestion may be used. In some embodiments, the base station 260 and/or the MME 266 may be employed to handle the RAN user plane congestion, for example, by handing over WTRUs 202 to cells with less RAN user plane congestion.

In various embodiment that follow, it may be assumed that the base station 260 (e.g., eNodeB (E-UTRAN), RNC/BSS (for UTRAN) and H(e)NB for femtocells (E-UTRAN and UTRAN)) are capable of detecting RAN user plane congestion. Congestion measured by the base station 260 may be based on: the number of WTRUs 202 attached in the base station 260, the maximum throughput supported by the base station 260, and/or the number of active PDN connections.

The base station 260 may report congestion information to other nodes (e.g., other RAN nodes or CN nodes). The congestion information reported may include one or more of the following percentage of load in a cell (for example, high load=80%); current throughput and maximum throughput supported by a cell; current number of WTRUs 202 in ECM-CONNECTED state and maximum number of ECM-CONNECTED states supported by the cell (for E-UTRAN cells); current numbers of WTRUs in PMM-CONNECTED state and maximum number of PMM-CONNECTED states supported by the cell (for UTRAN cells supporting Iu reference point); and whether the WTRU initiated request is for attended or unattended data traffic. This information may be provided by the WTRUs 202 and may be forwarded by the RAN nodes.

In some embodiments, congestion load information may be exchanged via NAS signaling. For E-UTRAN accesses upon detecting RAN user plane congestion, the base station 260 may transmit congestion information to the core network by including congestion information within (e.g., every) S1-AP UPLINK NAS TRANSPORT message to the MME 262. The base station 260 may transmit S1-AP UPLINK messages to the MME 262 when the WTRU 202 transmits TAU messages in ECM-CONNECTED states. In such case, the core network may be aware that the WTRU 202 is in active state. In some embodiments, the base station 260 may transmit S1-AP UPLINK messages to the MME 266 during (i) WTRU Triggered Service Request, a WTRU PDN connectivity Request and/or an S1-based handover.

For UTRAN accesses, upon detecting RAN user plane congestion the RNC may transmit congestion information to the core network within one or more (e.g., every) location reports, an initial WTRU message, and one or more (e.g., every) UTRAN originated direct transfer control messages over Iu interface. In such case, the core network may be aware that the WTRU 202 is in active state.

Figure 27:
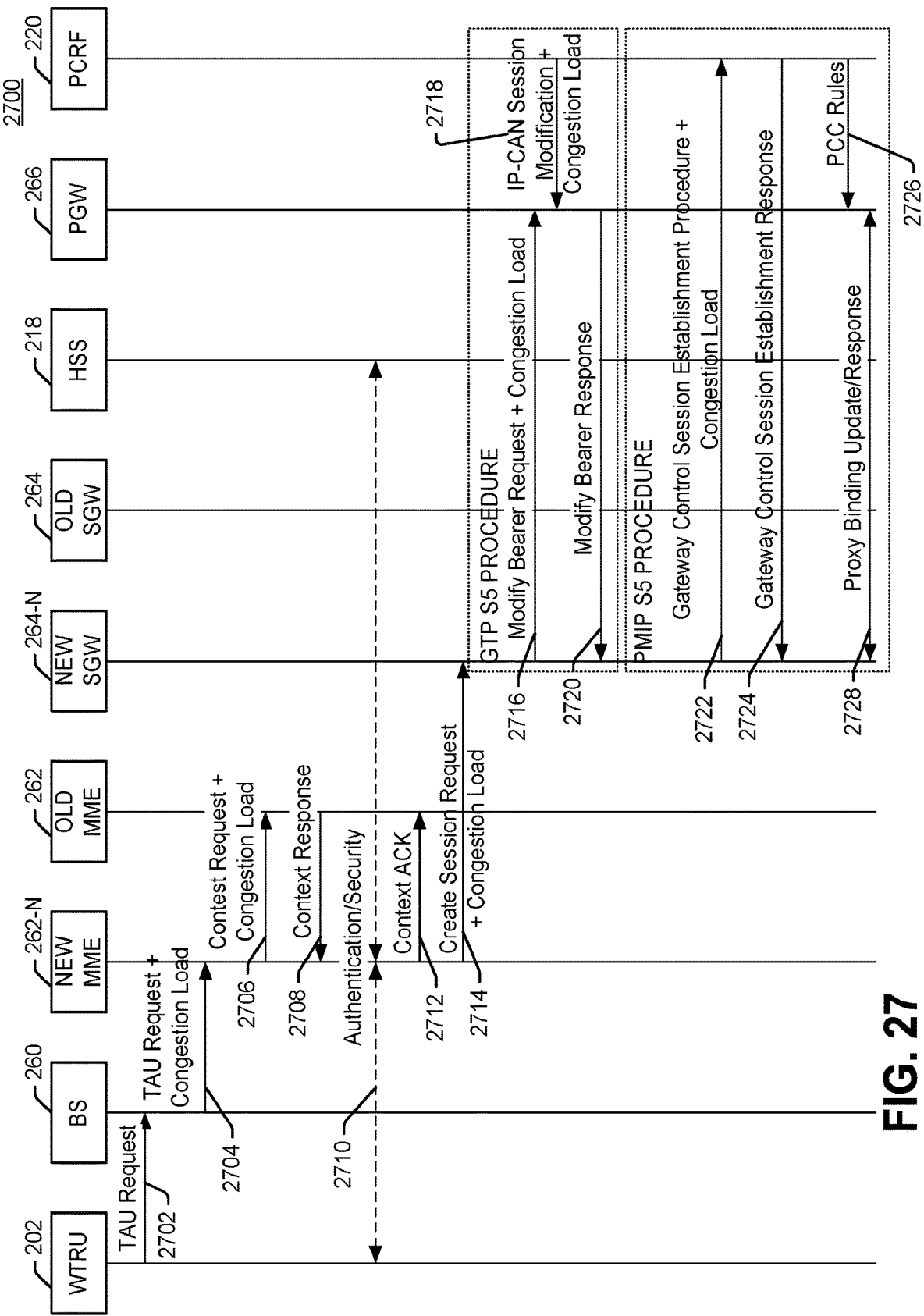
FIGS. 27-32 are a call flow diagram illustrating example call flows directed to congestion load reporting.

Referring now to FIG. 27, a call flow diagram illustrating an example call flow 2700 directed to congestion load reporting is shown. Congestion load reporting may be carried out during a tracking area update (TAU), and pursuant to call flow 2700, the congestion load reporting may be carried out using a TAU procedure with a change in SGW.

The WTRU 202 may trigger a TAU request. The TAU request may include a number of parameters. At call-flow part 2702, the WTRU 202 may transmit the TAU request to the base station 260. At call-flow part 2704, the base station 260 may forward the TAU request to a new MME. The forwarded TAU request message may include a number of parameters and/or congestion load information.

The new MME 262-N may use the GUTI received from the WTRU 202 to derive an address of the old MME 262 (or old S4 SGSN (not shown). At call flow part 2706, the new MME 262-N may transmit a Context Request message to the old MME 262 (or old S4 SGSN) to retrieve user information. The Context Request message may include an old GUTI, a complete TAU Request message, a P-TMSI Signature, an MME Address, and a WTRU validated set.

The WTRU validated set may indicate that the new MME 262-N has validated the integrity protection of the TAU message, for example, based on native EPS security context for the WTRU. To validate the Context Request message, the old MME may use the complete TAU Request message (the old S4 SGSN may use the P-TMSI signature, instead). The old MME 262 (or the old S4 SGSN) may respond with an appropriate error if integrity check fails. This may initiate the security functions in the new MME 262-N, as shown at call flow part 2708. If the security functions authenticate the WTRU 202 correctly, then the new MME 262-N may transmit a Context Request message to the old MME 262 (or the old S4 SGSN). This Context Request message may include an IMSI, a complete TAU Request message, a MME Address, and the WTRU Validated set. If the new MME 262-N indicates that it has authenticated the WTRU 202, and/or if the old MME (or the old S4 SGSN) correctly validates the WTRU 202, then the old MME 262 (or the old S4 SGSN) may start a timer.

If the Context Request message is transmitted to an old MME 262, then the old MME 262 may respond with a Context Response message, as shown at call flow part 2710. The Context Response message may include an ME Identity (if available), an MM Context, one or more EPS Bearer Contexts, a SGW signalling address and one or more TEIDs, an ISR Supported indication, a MS Info Change Reporting Action (if available), WTRU Core Network Capability, and/or WTRU Specific DRX parameters. If the Context Request message is transmitted to the old S4 SGSN, the old S4 SGSN may respond with a Context Response message, which may include an MM Context, one or more EPS Bearer Contexts, an SGW signalling address and one or more TEIDs, an ISR Supported indication, an MS Info Change Reporting Action (if available), WTRU Core Network Capability, and/or one or more WTRU Specific DRX parameters.

The MM Context may contain security related information along with other parameters. These parameters may include an IMSI, an ME Identity (if available) and an MSISDN. Unused Authentication Quintets in the MM Context may also be maintained in the SGSN.

The PGW Address and TEID(s) (for GTP-based S5/S8) or GRE Keys (PMIP-based S5/S8 at the PGW(s) for uplink traffic) and the TI(s), may be part of the EPS Bearer Context. If the WTRU 202 is not known in the old MME 262 (or the old S4 SGSN) and/or or if the integrity check for the TAU Request message fails, then the old MME 262 (or the old S4 SGSN) may respond with an appropriate error cause. The ISR Supported indication may be indicated if the old MME 262 (or the old S4 SGSN) is capable to activate ISR for the WTRU 202. The MSISDN may be included if the old MME 262 (or the old S4 SGSN) has it stored for the WTRU 202.

If the integrity check of TAU Request message fails, then authentication may be mandatory. If GUTI allocation is going to be done and the network supports ciphering, the NAS messages may be ciphered. If the TAU request is received for a WTRU which is already in ECM_CONNECTED state and the PLMN-ID of the TAI transmitted by the base station 260 is different from that of the GUTI in the TAU Request message, the MME may delay authenticating the WTRU until after TAU Complete message. The MME may delay the authentication such that the WTRU 202 first updates its registered PLMN-ID to the new PLMN-ID selected by the RAN during handover. The new PLMN-ID may be provided by the MME to the WTRU 202 as part of the GUTI in the TAU accept message. This may ensure that the same PLMN-ID is used in the derivation of the Kasme key by both the network and the WTRU.

The MME (e.g., the new MME 262-N if the MME has changed) may determine to relocate the SGW. The SGW may be relocated when the old SGW 264 cannot continue to serve the WTRU 202. The MME (e.g., the new MME 262-N if the MME has changed) may also decide to relocate the SGW if a new SGW 264-N is expected to serve the WTRU 202 longer and/or with a more optimal WTRU-to-PGW path, or if a new SGW 264-N is co-located with the PGW.

If the MME has changed, then the new MME 262-N may transmit a Context Acknowledge message to the old MME 262 (or the old S4 SGSN), as shown at call flow part 2712. This Context Acknowledge message may include a SGW-change indication to indicate a new SGW 264-N has been selected. The old MME 262 (or the old S4 SGSN) may mark in its WTRU context that the information in the GWs is invalid. And, if the old node is an MME, the old MME 262 may mark in its WTRU context that the information in the HSS is invalid. This may ensure that the old MME 262 (or the old S4 SGSN) updates the GWs, and the old MME 262 may update the HSS 218, if the WTRU 202 initiates a TAU or RAU procedure back to the old MME 262 (or the old S4 SGSN) before completing the ongoing TAU procedure. If the security functions do not authenticate the WTRU 202 correctly, then the TAU may be rejected, and the new MME 262-N may transmit a reject indication to the old MME 262 (or the old S4 SGSN). The old MME 262 (or the old S4 SGSN) may continue as if the Identification and Context Request message was never received. The ISR may not be indicated in the Context Acknowledge as ISR is not activated due to the SGW change.

At call flow part 2714, the new MME 262-N may generate and transmit a Create Session Request message to the new SGW 264-N. The Create Session Request message may include the congestion load information.

After call flow part 2714, a GTP-based S5 interface procedure and/or a PMIP-based S5 interface procedure between the SGW and the PGW may be carried out. Call flow parts 2716-2720 are applicable to the GTP based S5 interface procedure, and call flow parts 2722-2728 are applicable to the PMIP-based S5 interface procedure.

At call flow part 2716, the new SGW 264-N may generate and transmit a Modify Bearer Request message to PGW. The Modify Bearer Request message may include the congestion load information. If PCC is supported, the PCEF 270 (of the PGW 266) may initiate a (PCEF-initiated) IP-CAN Session Modification via the Gx reference point to PCRF 220, as shown at call flow part 2718. The PCEF 270 may provide the congestion load information to the PCRF 220 in connection with the IP-CAN Session Modification. At call flow part 2720, the PGW may transmit a Modify Bearer Response message to the new SGW 264-N.

At call flow part 2722, the new SGW 264-N may initiate a Gateway Control Session Establishment procedure to the PCRF 220 via the Gxx interface. The new SGW 264-N may include the congestion load information within a Gateway Control Session Establishment message sent to the PCRF 220 as part of the procedure.

At call flow part 2724, the PCRF 220 may generate and transmit a Gateway Control Session Establishment Response message to the new SGW 264-N. At call flow part 2726, the PCRF 220 may provide updated PCC rules to the PGW 266. At call flow part 2728, the new SGW 264-N may transmit a Proxy Binding Update message to the PGW 266, and the PGW 266 may respond with a Proxy Binding Ack message.

Although not shown, the new SGW 264-N may update its bearer context. This may allow the new SGW 264-N to route bearer PDUs to the PGW 266 when received from base station 260. The new SGW 264-N may return a Create Session Response message to the new MME. The Create Session Response message may include a SGW address and TEID for user plane and control plane and PGW TEIDs (for GTP-based S5/S8) or GRE keys (for PMIP-based S5/S8) for uplink traffic and control plane.

The new MME 262-N may verify whether it holds subscription data for the WTRU 202 identified by the GUTI, the additional GUTI or by the IMSI received with the context data from the old CN node. If there are no subscription data in the new MME 262-N for the WTRU 202, then the new MME 262-N may transmit an Update Location Request message to the HSS 218. The Update Location Request message may include an MME Identity, an IMSI, one or more ULR-Flags, and/or one or more MME Capabilities. The ULR-Flags may indicate that an update location is transmitted from an MME, and/or that the MME registration may be updated in HSS 218. The HSS 218 might not cancel any SGSN registration. The MME capabilities may indicate the MME's support for regional access restrictions functionality. The HSS 218 may transmit a Cancel Location message to the old MME. The Cancel Location message may include the IMSI, and a Cancellation Type. The Cancellation Type may be set to Update Procedure.

If the timer started previously is not running, the old MME 262 may remove the MM context. Otherwise, the contexts may be removed when the timer expires. It may also ensure that the MM context is kept in the old MME 262 for the case the WTRU 202 initiates another TAU procedure before completing the ongoing TAU procedure to the new MME 262-N. The old MME 262 may acknowledge with the message Cancel Location Ack (IMSI).

When the old S4 SGSN receives the Context Acknowledge message, and if the WTRU 202 is in Iu Connected, then the old S4 SGSN may transmit an Iu Release Command message to the RNC after the timer has expired. The RNC may respond with an Iu Release Complete message.

The HSS 218 may acknowledge the Update Location Request message by transmitting an Update Location Ack message, including the IMSI, and Subscription Data parameters, to the new MME 262-N. If the Update Location is rejected by the HSS 218, then the new MME 262-N may reject the TAU Request from the WTRU 202 with an appropriate cause. The new MME may validate the WTRU presence in the (new) TA. If, due to regional subscription restrictions and/or access restrictions, the WTRU 202 is not allowed to access the TA, then the MME 262-N may reject the TAU Request with an appropriate cause to the WTRU 202. If appropriate checks are successful then the new MME 262-N may construct a context for the WTRU 202.

If the MME has changed, when the timer expires the old MME 262 (or the old S4 SGSN) may release any local MME or SGSN bearer resources. If it received the SGW change indication in the Context Acknowledge message, then the old MME 262 (or the old S4 SGSN) may delete the EPS bearer resources by transmitting to the old SGW 264 one or more Delete Session Request messages, which messages may include Cause parameter, and/or one or more TEIDs. The Cause parameter may indicate to the old SGW 264 that the old SGW 264 may not initiate a delete procedure towards the PGW 266. If ISR is activated, then the cause parameter may also indicate to the old SGW 264 that the old SGW 264 may delete the bearer resources on the other old CN node by transmitting one or more Delete Bearer Request messages to such CN node. If the MME has not changed, then the release of EPS bearer resources may be triggered when a new SGW 264-N is allocated.

The SGW may acknowledge with one or more Delete Session Response messages, which response messages may include one or more TEIDs. The SGW may discard any packets buffered for the WTRU 202.

The MME may transmit a TAU Accept message to the WTRU 202. The TAU Accept message may include a GUTI, a TAI list, an EPS bearer status, a NAS sequence number, a NAS-MAC, and/or an IMS Voice over PS session supported Indication. If the active flag is set, the MME may provide the base station 260 with a Handover Restriction List. The GUTI may be included if the MME allocates a new GUTI. If the "active flag" is set in the TAU Request message, then the user plane setup procedure may be activated in conjunction with the TAU Accept message. The above sequence may be the same as for a WTRU triggered Service Request procedure, and applied after the MME establishes the bearer(s). The MME may indicate the EPS bearer status IE to the WTRU 202. The WTRU 202 may remove any internal resources related to bearers that are not marked active in the received EPS bearer status.

When receiving the TAU Accept message, and there is no ISR Activated indication, the WTRU 202 may set its TIN to "GUTI". For a SGW change, the ISR Activated may not be indicated by the MME as it needs a RAU with the same SGW first to activate ISR. For an MME change, the ISR may not be activated by the new MME 262-N to avoid context transfer procedures with two old CN nodes.

If GUTI was included in the TAU Accept, the WTRU 202 may acknowledge the received message by returning a TAU Complete message to the MME. When the "Active flag" is not set in the TAU Request message and the Tracking Area Update was not initiated in ECM-CONNECTED state, the new MME 262-N may release the signalling connection with WTRU 202.

The new MME 262-N may initiate E-RAB establishment after execution of the security functions, or wait until completion of the TA update procedure. For the WTRU 202, E-RAB establishment may occur anytime after the TA update request is transmitted. In the case of a rejected tracking area update operation, due to regional subscription, roaming restrictions, or access restrictions, the new MME 262-N may not construct an MM context for the WTRU 202. A reject may be returned to the WTRU 202 with an appropriate cause and the S1 connection may be released. Upon return to idle, the WTRU 202 may act conventionally. The new MME 262-N may determine the Maximum APN restriction based on the received APN Restriction of each bearer context in the Context Response message and then store the new Maximum APN restriction value.

The bearer contexts may be prioritized by the new MME 262-N. If the new MME 262-N is unable to support the same number of active bearer contexts as received from old MME 262 (or old S4 SGSN), the prioritization may be used to decide which bearer contexts to maintain active and which ones to delete. In various embodiments, the new MME 262-N may first update all contexts in one or more PGWs and then deactivate the bearer context(s) that it cannot maintain. This might not cause the MME to reject the tracking area update.

If the WTRU 202 was in PMM-CONNECTED state, the bearer contexts may already be transmitted in a Forward Relocation Request message. If the TAU procedure fails a maximum allowable number of times, or if the MME may return a Tracking Area Update Reject message with a cause indication, then the WTRU may enter EMM DEREGISTERED state.

For PMIP based systems, the following may apply. The old SGW may initiate the Gateway Control Session Termination Procedure with the PCRF 220, and the SGW may cease to perform Bearer Binding and associated policy controlled functions.

The new MME 262-N may include congestion load information in the Update Location Information towards the HSS 218.

Figure 28:
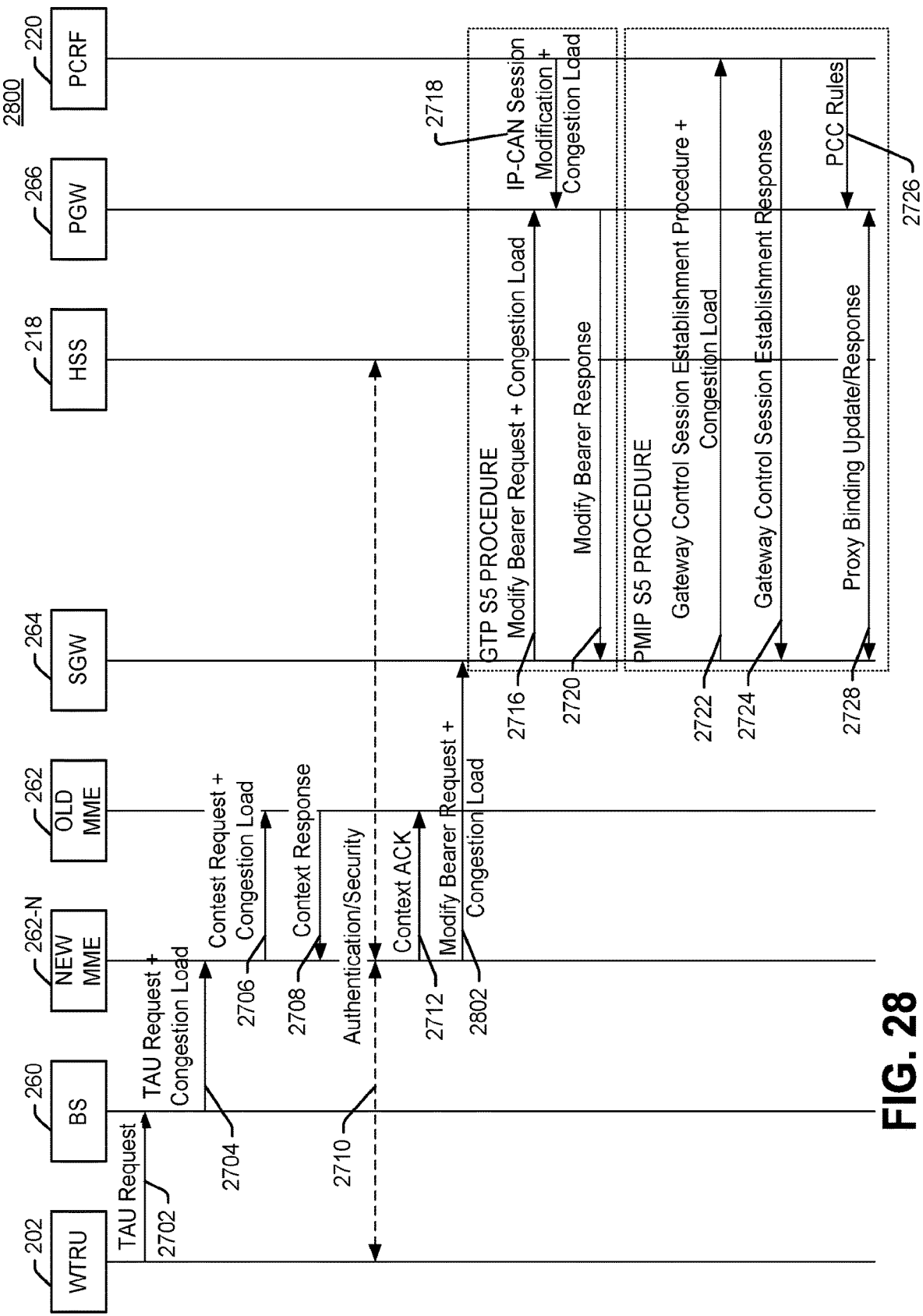

FIG. 28 is a call flow diagram illustrating an example call flow 2800 directed to congestion load reporting. Pursuant to call flow 2800, the congestion load reporting may be carried out using a TAU procedure without a change in SGW. The call flow 2800 of FIG. 28 is similar to the call flow 2700 of FIG. 27, except that the MME may generate and transmit a Modify Bearer Request message to the SGW, as shown at call flow part 2802, instead of a Create Session Request. The Modify Bearer request message may include the congestion load information. In addition, the new MME 262-N may include congestion load information in the Update Location Information towards the HSS 218.

Figure 29:
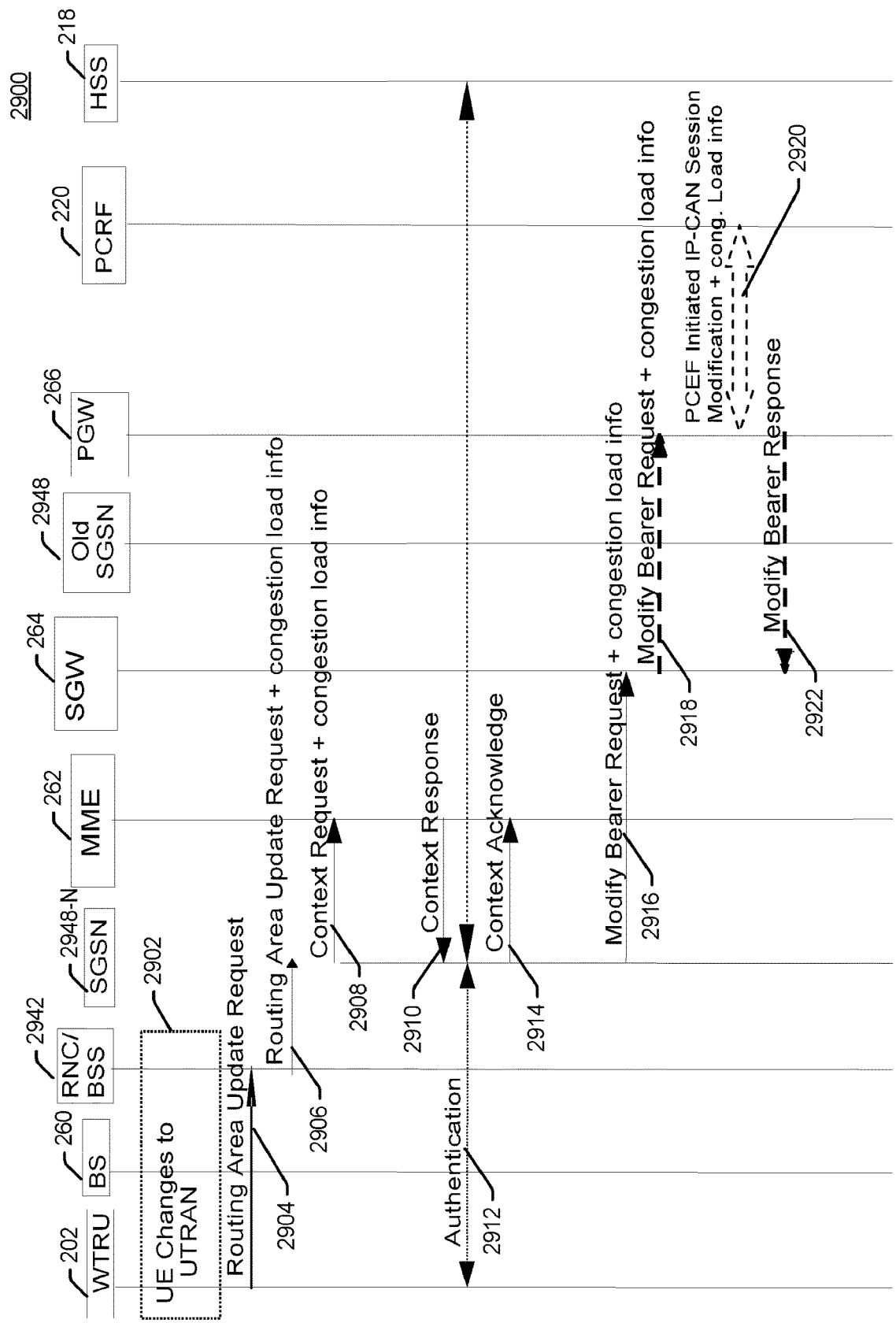

FIG. 29 is a call flow diagram illustrating an example call flow 2900 directed to congestion load reporting. Congestion load reporting may be carried out during a Routing Area Update (RAU), and pursuant to call flow 2900, the congestion load reporting may be carried out using a RAU procedure with MME interaction. The call flow 2900 may be applicable if the WTRU decides to change to a UTRAN cell, for example.

As shown in call flow part 2902, the WTRU 202 may decide to change to a UTRAN cell. At call flow part 2904, the WTRU 202 may transmit a Routing Area update to an RNC 2942. At call flow part 2906, the RNC 2942 may forward the RAU message to a SGSN 2948. The forwarded RAU message may include various (e.g., conventional) parameters and congestion load information. The SGSN 2948 may detect that the WTRU 202 switched from E-UTRAN, and may generate and transmit a context request message to the MME 262, as shown at call flow part 2908. The context request message may include the congestion load information.

Call flow parts 2910-2914 may be carried out as described infra with respect to the call flow parts 2708-2712 of call flow 2700 (FIG. 27). At call flow part 2916, the SGSN 2948 may generated and transmit a Modify Bearer Request message. The Modify Bearer Request message may include the congestion load information.

Call flow parts 2918-2922 may be carried out as described infra with respect to the call flow parts 2716-2720 of call flow 2700 (FIG. 27) for GTP S5. Although not shown, the call flow 2900 may include, in lieu of or in addition to, call flow parts 2918-2922, call flow parts akin to the call flow parts 2722-2728 of call flow 2700 (FIG. 27) for PMIP S5. The call flow 2900 may include additional call flow parts (not shown) based on call flow parts 11 to 22b of Figure 5.3.3.3-1 of 3GPP TS 23.401. In addition, the new MME 262-N may include congestion load information in the Update Location Information towards the HSS 218. A procedure similar to above may be carried out if there is a SGW change.

Figure 30:
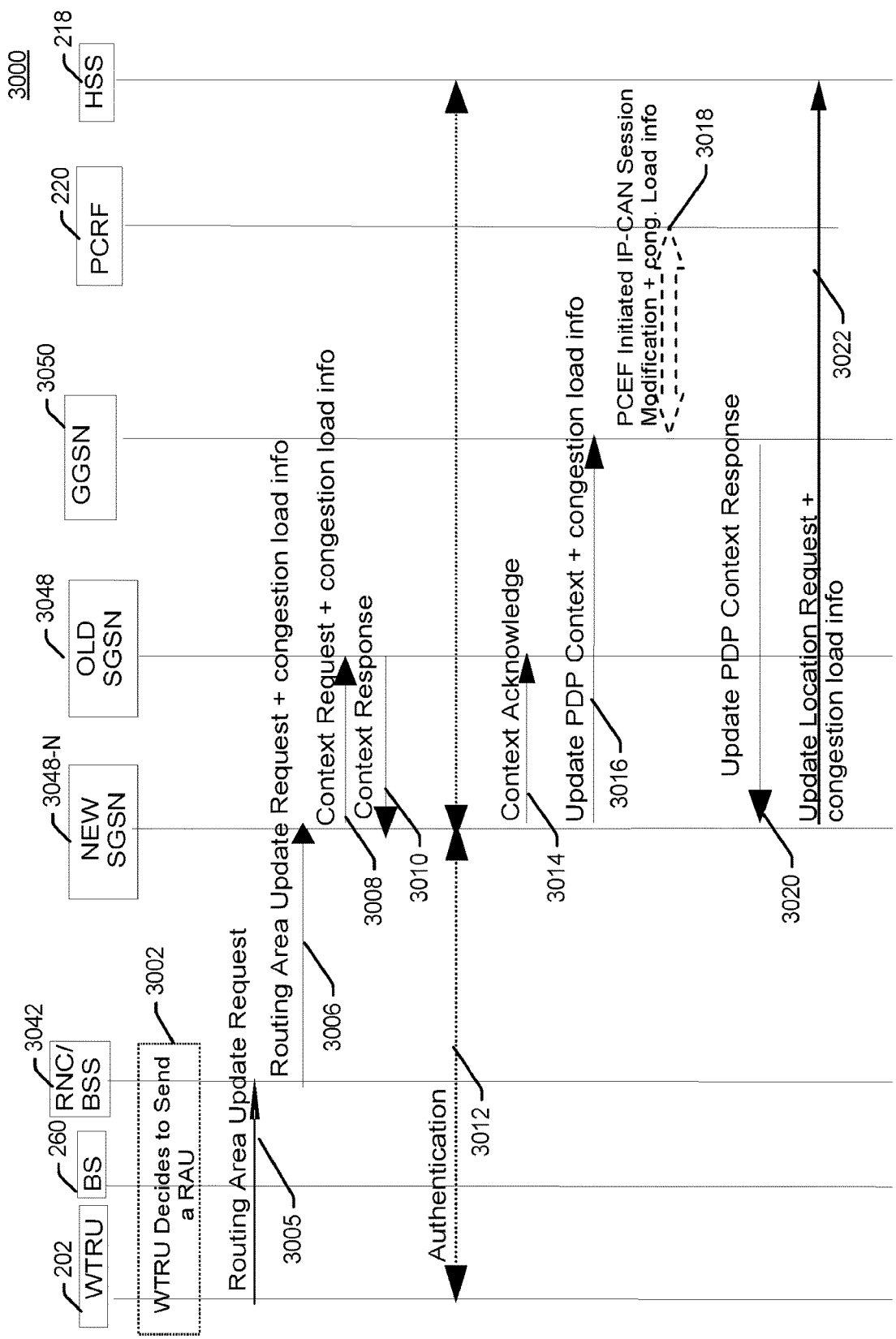

FIG. 30 is a call flow diagram illustrating an example call flow 3000 directed to congestion load reporting. Pursuant to call flow 3000, the congestion load reporting may be carried out in UTRAN using a Routing Area Update.

The WTRU 202 may decide to transmit a RAU, as shown in call flow part 3002. At call flow part 3004, the WTRU 202 may transmit the RAU to RNC/BSS 3042. At call flow part 3006, the RNC/BSS 3042 may forward the RAU message to a new SGSN 3048-N, and may include various parameters and/or congestion load information. At call flow part 3008, the new SGSN 3048-N may generate and transmit an SGSN Context Request message to an old SGSN 3048. The SGSN Context Request message may include the congestion load information.

Call flow parts 3010-3014 may be carried out as described infra with respect to the call flow parts 2708-2712 of call flow 2700 (FIG. 27). At call flow part 3016, the new SGSN may 3048-N generate and transmit an Update Context Request message to a GGSN 3050. The Update Context Request message may include the congestion load information. At call flow part 3018, the GGSN 3050 may transmit a (PCEF-initiated) IP-CAN session modification message to the PCRF 220. The PCEF-initiated IP-CAN session modification message may include the congestion load information (assuming the same was provided by the SGSN 3048-N). At call flow part 3020, the new SGSN 3048-N may transmit an UPDATE LOCATION request message to the HSS 218. The UPDATE LOCATION request message may include congestion load information.

Although not shown, the HLR 218 may transmit to the old SGSN 3048 a Cancel Location message. The Cancel Location message may include an IMSI and/or a Cancellation Type indicator. The Cancellation Type indicator may be set to Update Procedure. If the timer is not running, the old SGSN 3048 may remove the MM and PDP contexts/EPS Bearer Contexts, and an old S4-SGSN may release SGW resources when the new SGSN 3048-N is a Gn/Gp SGSN or when an SGW change is performed. GTPv1 SGSN context transfer signaling may indicate to the old S4-SGSN that the new SGSN 3048-N is a Gn/Gp SGSN, which may not signal any SGW change. When the timer is running, the MM and PDP/EPS Bearer Contexts and any affected SGW resources may be removed when the timer expires and the SGSN received a Cancel Location. The SGW may not initiate a delete procedure towards the PGW. If ISR is activated on the SGW that is going to be released, then the SGW may delete the bearer resources on the other old CN node by sending Delete Bearer Request message(s) to that CN node. When the timer expires and no Cancel Location was received, the S4-SGSN may remove the PDP contexts/EPS Bearer Contexts but preserves the MM context.

The timer may allow the old SGSN 3048 to complete the forwarding of N-PDUs. It may also ensure that the MM and PDP contexts/EPS Bearer Contexts are kept in the old SGSN 3048 in case the MS initiates another inter-SGSN routing area update before completing the ongoing routing area update to the new SGSN 3048-N. The old SGSN 3048 may acknowledge with Cancel Location Ack (IMSI). The HLR may transmit Insert Subscriber Data message to the new SGSN 3048-N. The Insert Subscriber Data message may include to the IMSI, and Subscription Data information. The new SGSN 3048-N may validate the MS's presence in the (new) RA. If due to regional subscription restrictions or access restrictions the MS may not be allowed to be attached in the RA, the SGSN may reject the Routing Area Update Request with an appropriate cause, and may return an Insert Subscriber Data Ack message to the HLR 218. The Insert Subscriber Data Ack may include the IMSI, and/or SGSN Area Restricted information. If appropriate checks are successful, then the SGSN may construct an MM context for the MS and may return an Insert Subscriber Data Ack (IMSI) message to the HLR. If an S6d interface is used between S4-SGSN and HSS 218, the Insert Subscriber Data and Insert Subscriber Data Ack messages may not used. Instead, the Subscription Data may be transmitted by HSS 218 in the Update Location Ack message.

The HLR 218 may acknowledge the Update Location by transmitting Update Location Ack message to the new SGSN 3048-N. The Update Location Ack message may include the IMSI, and/or GPRS Subscriber Data. The GPRS Subscriber Data may be provided, e.g., only if an S6d interface is used. The new SGSN 3048-N may validate the MS's presence in the new RA. If due to roaming restrictions or access restrictions the MS is not allowed to be attached in the SGSN, or if subscription checking fails, the new SGSN 3048-N may reject the routing area update with an appropriate cause. If appropriate checks are successful, the new SGSN 3048-N may construct MM and PDP contexts/EPS Bearer Contexts for the MS. A logical link may be established between the new SGSN and the MS. The new SGSN 3048-N may respond to the MS with Routing Area Update Accept (P-TMSI, P-TMSI Signature, Receive N-PDU Number, IMS voice over PS Session Supported Indication). The Receive N-PDU Number may contain the acknowledgements for each acknowledged-mode NSAPI used by the MS, thereby confirming all mobile-originated N-PDUs successfully transferred before the start of the update procedure. The IMS voice over PS Session Supported Indication may be set. ISR Activated might not (or may never) be indicated to the MS in case of inter SGSN RAU. The E-UTRAN capable WTRU 202 may set its TIN to "P-TMSI" or "RAT-related TMSI".

The MS may acknowledge the new P-TMSI by returning a Routing Area Update Complete (Receive N-PDU Number) message to the SGSN. The Receive N-PDU Number may contain the acknowledgements for each acknowledged-mode NSAPI used by the MS, thereby confirming all mobile-terminated N-PDUs successfully transferred before the start of the update procedure. If Receive N-PDU Number confirms reception of N-PDUs that were forwarded from the old SGSN, these N-PDUs may be discarded by the new SGSN. LLC and SNDCP in the MS are reset.

Figure 31:
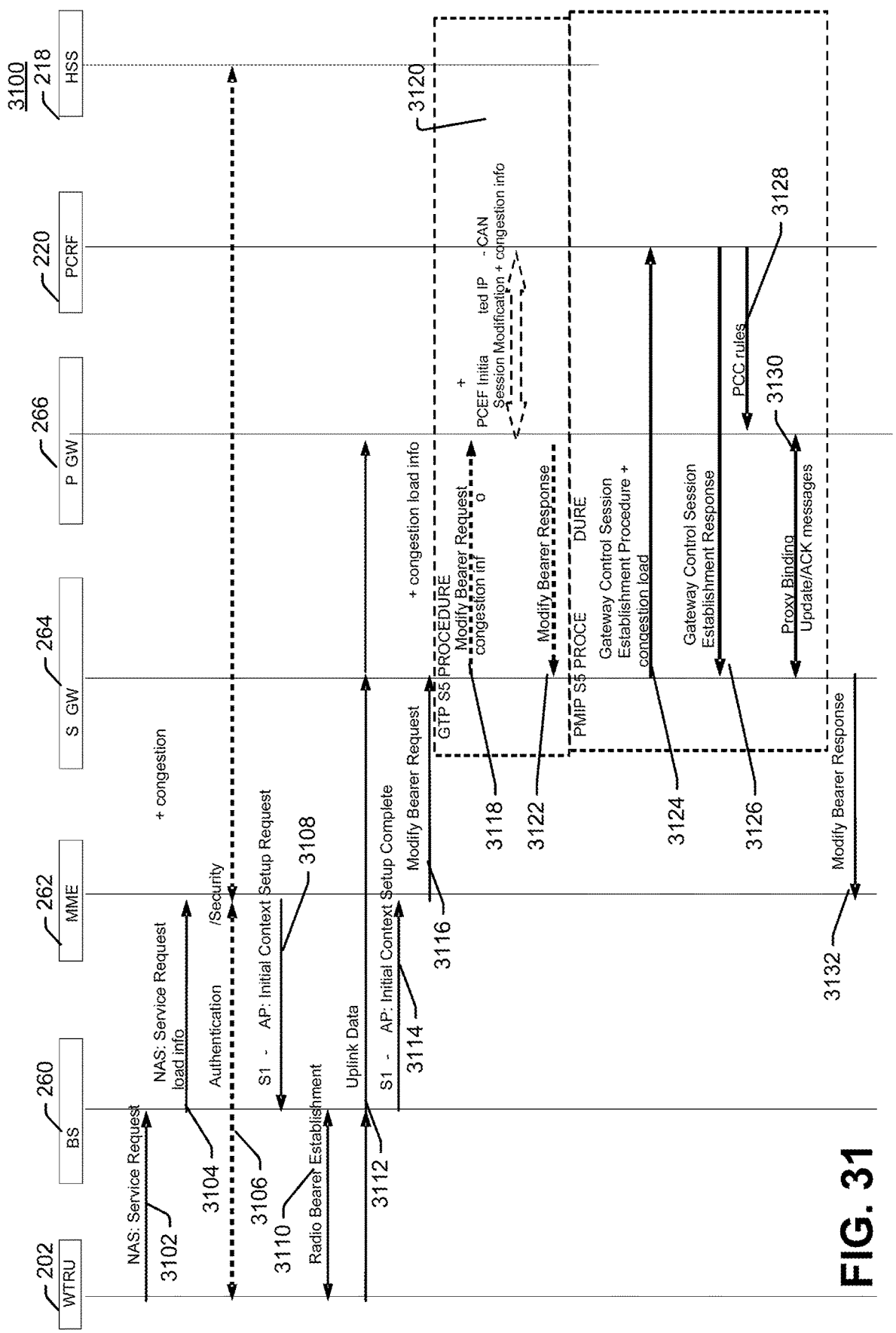

FIG. 31 is a call flow diagram illustrating an example call flow 3100 directed to congestion load reporting. Pursuant to call flow 3100, the congestion load reporting may be carried out using a NAS service request.

At call flow part 3102, the WTRU may generate and transmit a NAS service request message. The NAS service request message may include congestion load information. The congestion load information may include whether the traffic to be used is for attended or unattended traffic. The base station 260 may forward the NAS service request message to the MME 262, as shown at call flow part 3104. The forwarded NAS service request message may include the congestion load information. At call flow part 3106, NAS authentication/security procedures may be performed.

At call flow part 3108, the MME 262 may transmit S1-AP Initial Context Setup Request message to the base station 260. The S1-AP Initial Context Setup Request message may include a SGW address, one or more S1-TEIDs (UL), one or more EPS Bearer QoSs, a Security Context, an MME Signalling Connection Id, and a Handover Restriction List. Pursuant to the S1-AP Initial Context Setup Request message, radio and S1 bearers for all the active EPS Bearers may be activated. The base station 260 may store the Security Context, MME Signaling Connection Id, EPS Bearer QoSs and S1-TEIDs in the WTRU RAN context.

At call flow part 3110, the base station 260 may perform the radio bearer establishment procedure. User plane security may be established concurrently therewith. When the user plane radio bearers are setup, the Service Request may be completed and EPS bearer state may be synchronized between the WTRU 202 and the network 203 (and the WTRU 202 may remove the EPS bearer for which no radio bearers are setup).

At call flow part 3112, uplink data from the WTRU 202 may be forwarded by base station 260 to the SGW 264. The base station 260 may transmit the uplink data to the SGW address and TEID. The SGW 264 may forward the uplink data to the PGW 266.

At call flow part 3114, the base station 260 may transmit an S1-AP message Initial Context Setup Complete message to the MME 262. The S1-AP message Initial Context Setup Complete message may include an base-station (e.g. eNode B) address, a list of accepted EPS bearers, a list of rejected EPS bearers, and/or one or more S1 TEIDs (DL). In some embodiments, the base station 260 may decide to include the congestion load information within this message, instead of the NAS service request.

At call flow part 3116, the MME 262 may generate and transmit a Modify Bearer Request message. The Modify Bearer Request message may include the congestion load information. At call flow part 3118, the (e.g., new) SGW 264 may transmit a Modify Bearer Request message to the PGW 266. The SGW 264 may also include the congestion load information within the Modify Bearer Request message. If PCC is supported, the PGW 266 may initiate a (PCEF Initiated) IP-CAN Session Modification via Gx reference point to PCRF 220, as shown at call flow part 3120. The PCEF Initiated IP-CAN Session Modification may include the congestion load information. At call flow part 3122, the PGW 266 may transmit a Modify Bearer Response message to the 264.

At call flow part 3124, the SGW 264 may initiate a Gateway Control Session Establishment procedure to the PCRF 266 via Gxx interface. The SGW 264 may also include congestion load information within the GW Control Session Establishment message. At call flow part 3126, the PCRF 266 may transmit a Gateway Control Session Establishment Response message to the SGW 264. At call flow part 3128, the PCRF may provide updated PCC rules. At call flow part 31330, the SGW 264 may transmit a Proxy Binding Update message to the PGW 266, and the PGW 266 may respond with a Proxy Binding Ack message. At call flow part 3132, the SGW 264 may transmit a Modify Bearer Response message to the MME 262.

Figure 32:
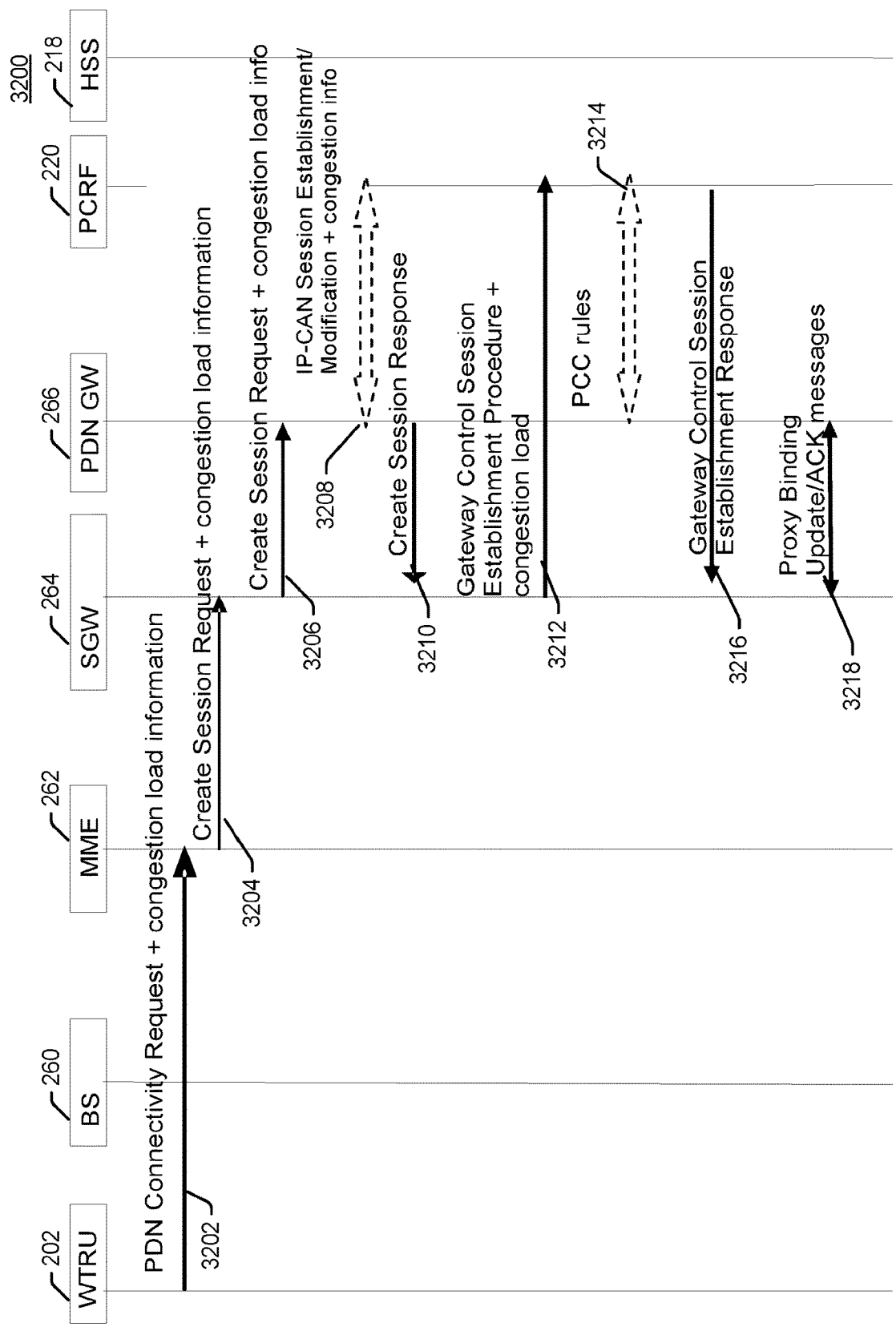

FIG. 32 is a call flow diagram illustrating an example call flow 3200 directed to congestion load reporting. Pursuant to call flow 3200, the congestion load reporting may be carried out when a WTRU initiates a WTRU initiated PDN connectivity request. The call flow 3200 may be applicable for cases where the base station may provide congestion load information towards the Core Network (e.g., MME/PGW/PCRF). The WTRU may include details whether the traffic initiated is for attended or unattended traffic.

At call flow part 3202, the WTRU 202 may initiate a WTRU initiated PDN connectivity request to the MME 262. The WTRU 202 may include within this NAS request whether the trigger to initiate the request was due to Attended or Unattended Data traffic. At call flow part 3204, the MME 262 may transmit a Create Session Request message to the SGW 264. The MME 262 may include within the request whether the trigger to initiate the request was due to Attended or Unattended Data traffic. The MME 262 may include congestion load information provided to the WTRU 202 during TAU/RAU updates.

After call flow part 3204, a GTP-based S5 interface procedure and/or a PMIP-based S5 interface procedure may be carried out. Call flow parts 3206-3210 are applicable to the GTP based S5 interface procedure, and call flow parts 3212-3218 are applicable to the PMIP-based S5 interface procedure.

At call flow part 3206, the SGW 264 may generate and transmit a Create Session Request message to the PGW 264. The Create Session Request message may include the congestion load information provided by the MME (such as, for example, the attended or unattended data traffic information). If PCC is supported, the PGW 266 may initiate a (PCEF Initiated) IP-CAN Session Modification via Gx reference point to the PCRF 220, as shown at call flow part 3208. The PCEF may also include congestion load information (e.g., the attended or unattended data traffic information). At call flow part 3210, the PGW 266 may transmit a Create Response message to the SGW 264 based.

At call flow part 3212, the (e.g., new) SGW 264 may initiate a Gateway Control Session Establishment procedure to the PCRF 220 via Gxx interface. The SGW 266 may include the congestion load information provided by the MME 262 within the Gateway Control Session Establishment message. The PCEF 270 may initiate an IP-CAN Session Establishment Procedure, as shown at call flow part 3214. At call flow part 3216, the PGW 266 may respond the Gateway Control Session Establishment message with a Gateway Control Session Establishment Response message. At call flow part 3218, the SGW 264 and PGW may exchange Proxy binding Update/ACK messages.

If the MS Info Change Reporting Action (Start) is received for this bearer context, then the SGW 264 may store this for the bearer context and the SGW 264 may report to the PGW 262 whenever a WTRU's Location Information change occurs that meets the PGW request. The SGW 264 may return a Create Session Response message to the MME 262. The Create Session Response message may include a PDN Type, a PDN Address, a SGW address for User Plane, a SGW TEID for User Plane, a SGW TEID for control plane, an EPS Bearer Id, an EPS Bearer QoS, one or more Protocol Configuration Options, Prohibit Payload Compression information, APN Restriction information, Cause information, MS Info Change Reporting Action (Start) information, and APN-AMBR information. The DL TFT for PMIP-based S5/S8 may be obtained from interaction between the SGW 264 and the PCRF 220, when PCC is deployed. Otherwise, the DL TFT IE may be wildcarded, matching any downlink traffic. If the WTRU 202 indicates the Request Type as "Handover", this message may also serve as an indication to the MME 262 that the S5/S8 bearer setup and update has been successful. At this step the GTP tunnel(s) over S5/S8 may be established.

If an APN Restriction is received, then the MME 262 may store this value for the Bearer Context, and the MME 262 may check this received value with the stored value for the Maximum APN Restriction to ensure there are no conflicts between values. If the consequence of this check results in the PDN connectivity being rejected, the MME 262 may initiate a Bearer Deactivation and return an appropriate error cause. If the PDN Connectivity Request is accepted, the MME 2612 may determine a (new) value for the Maximum APN Restriction. If there is no previously stored value for Maximum APN Restriction, then the Maximum APN Restriction may be set to the value of the received APN Restriction.

If the MS Info Change Reporting Action (Start) is received for this bearer context, then the MME 262 may store this for the bearer context, and the MME 2262 may report whenever a WTRU's Location Information change occurs that meets the request. The MME 262 may modify the WTRU AMBR, which has been assigned to the base station 260 based on the subscribed WTRU-AMBR and the updated set of APN-AMBRs in use.

The MME 262 may transmit PDN Connectivity Accept message to the base station 260. The PDN Connectivity Accept message may include an APN, a PDN Type, a PDN Address, an EPS Bearer Id, a Session Management Request, and one or more Protocol Configuration Options. This message may be contained in an S1_MME control message Bearer Setup Request (EPS Bearer QoS, WTRU-AMBR, PDN Connectivity Accept, and S1-TEID) to the base station 260. This S1 control message may include the TEID at the SGW used for user plane and the address of the SGW for user plane. In the PDN Connectivity Accept message, the MME 262 may not include the IPv6 prefix within the PDN Address. The MME 262 may include the APN-AMBR and the EPS Bearer QoS parameter QCI into the Session Management Request. If the WTRU 202 has UTRAN or GERAN capabilities, the MME 262 may use the EPS bearer QoS parameters to derive the corresponding PDP context parameters QoS Negotiated (R99 QoS profile), Radio Priority, Packet Flow Id and TI and includes them in the Session Management Request. If the WTRU 202 indicated in the WTRU Network Capability that it does not support BSS packet flow procedures, then the MME 262 might not include the Packet Flow Id. The MME 262 might not transmit the S1 Bearer Setup Request message until any outstanding S1 Bearer Setup Response message for the same WTRU 202 has been received or timed out. If the APN-AMBR has changed, the MME 262 may update the UE-AMBR if appropriate. If the MME 262 or the PGW 266 has changed the PDN Type, an appropriate reason cause may be returned to the WTRU 202.

The base station 260 may transmit RRC Connection Reconfiguration to the WTRU 202 including the PDN Connectivity Accept message. The WTRU 202 may store the QoS Negotiated, Radio Priority, Packet Flow Id and TI, which it received in the Session Management Request IE, for use when accessing via GERAN or UTRAN. The WTRU 202 may provide EPS Bearer QoS parameters to the application handling the traffic flow. The application usage of the EPS Bearer QoS may be implementation dependent. The WTRU 202 may not reject the RRC Connection Reconfiguration on the basis of the EPS Bearer QoS parameters contained in the Session Management Request. If the WTRU 202 receives an IPv4 address set to 0.0.0.0, it may negotiate the IPv4 address with DHCPv4. If the WTRU 202 receives an IPv6 interface identifier, it may wait for the Router Advertisement from the network with the IPv6 prefix information or it may transmit a Router Solicitation if necessary.

The WTRU 202 may transmit the RRC Connection Reconfiguration Complete to the base station 260. The base station 260 may transmit an S1-AP Bearer Setup Response to the MME 262. The S1-AP message may include the TEID of the base station 260 and the address of the base station 260 used for downlink traffic on the S1_U reference point. The WTRU NAS layer may build a PDN Connectivity Complete message including EPS Bearer Identity. The WTRU 202 may then transmit a Direct Transfer (PDN Connectivity Complete) message to the base station 260.

The base station 260 may transmit an Uplink NAS Transport (PDN Connectivity Complete) message to the MME. After the PDN Connectivity Accept message and once the WTRU 202 has obtained a PDN Address Information, the WTRU 202 may then transmit uplink packets towards the base station 260 which will then be tunneled to the SGW 264 and the PGW 266. If the WTRU 202 requested for a dual address PDN type (IPv4v6) to a given APN and was granted a single address PDN type (IPv4 or IPv6) by the network with a reason cause indicating that only single IP version per PDN connection is allowed, the WTRU 202 may request for the activation of a parallel PDN connection to the same APN with a single address PDN type (IPv4 or IPv6) other than the one already activated. If the WTRU 202 receives no reason cause in response to an IPv4v6 PDN type and it receives an IPv6 Interface Identifier apart from the IPv4 address or 0.0.0.0 in the PDN Address field, it may consider that the request for a dual address PDN was successful. The WTRU 202 may wait for the Router Advertisement from the network with the IPv6 prefix information or it may transmit Router Solicitation if necessary.

Upon reception of the Bearer Setup Response message and the PDN Connectivity Complete message, the MME 262 may transmit a Modify Bearer Request (EPS Bearer Identity, eNodeB address, eNodeB TEID, Handover Indication) message to the SGW 264. If Request Type indicates "handover", the Handover Indication may also be included. If the Handover Indication is included, the SGW 264 may transmit a Modify Bearer Request (Handover Indication) message to the PGW 266 to prompt the PGW 266 to tunnel packets from non 3GPP IP access to 3GPP access system and immediately start routing packets to the SGW 264 for the default and any dedicated EPS bearers established. The PGW 266 may acknowledge by transmitting a Modify Bearer Response to the SGW 264.

The SGW 264 may acknowledge by transmitting a Modify Bearer Response (EPS Bearer Identity) to the MME 262. The SGW 264 may then transmit its buffered downlink packets. After the MME 262 receives Modify Bearer Response, if Request type does not indicate handover and an EPS bearer was established and if the subscription data indicates that the user is allowed to perform handover to non-3GPP accesses and if this is the first PDN connection associated with this APN and if the MME selected a PGW that is different from the PGW identity which was previously indicated by the HSS 218 in the PDN subscription context, the MME 262 may transmit a Notify Request including the PGW address and the APN to the HSS 218 for mobility with non-3GPP accesses. The message may also include information that identifies the PLMN in which the PGW is located. The HSS 218 may store the PGW identity and the associated APN, and may transmit a Notify Response to the MME 262. For handover from non-3GPP access, the PGW 266 may initiate resource allocation deactivation procedure in the trusted/untrusted non-3GPP IP.

The MME 262 upon receiving congestion load information may carry out the following. The MME 262 may reject the request due to indications of high RAN user plane congestion load. The MME 262 may use conventional procedures defined for overload control. The MME 262 may query the HSS 218 for subscriber profile for updated QoS information. The HSS 218 upon receiving congestion load information (i.e. during TAU or RAU updates) may carry out an HSS-initiated Subscribed QoS modification procedure using modified QoS parameters to handle RAN user plane congestion.

The PGW 266 may have pre-configured policies installed that may define specific QoS behavior for specific IP flows based on the congestion level reported. The PGW 266 upon receiving congestion load information (i.e. during TAU/RAU updates, PDN connectivity requests or WTRU triggered service requests) may carry out or otherwise cause enforcement of one or more of such policies.

The PCRF 220 upon receiving congestion load information from the PCEF 270 via Gx (located in PDNGW/GGSN) or via the BBERF for PMIP based S5 via Gxx (located at the SGW or AGW) may carry out the following. The PCRF 270 may provide updated QoS rules for specific services based on the congestion status reported, the time of date, the usage threshold of the user and/or the subscription profile requirements stored in the SPR 218.

When the MME 262 receives congestion load information, the MME 262 may re-use of conventional MME procedures to control overload. Such procedures may mainly be used to control overload on MMEs. However, these procedures may be reused to control congestion in the eNodeBs. The MME 262 may carry out the following procedures when receiving high congestion load indications from eNodeB cells. The MME 262 may invoke the S1 interface overload procedure by transmitting the OVERLOAD START. Within the OVERLOAD START message the MME 262 may carry out the following procedures.

The MME 262 may select congested eNodeB cells and re-use the procedure by including a Traffic Load Reduction Indication in the OVERLOAD START message. In this case, the congested eNodeB may, if supported, reduce the type of traffic indicated according the requested percentage. The MME 262 may reject RRC connection requests that are for non-emergency and non-high priority mobile originated services, or only permit RRC connection requests for emergency sessions and mobile terminated services for the congested eNodeB. The MME 262 may only permit RRC connection requests for high priority sessions and mobile terminated services for the congested eNodeB. The MME 262 may reject new RRC connection requests from WTRUs 202 configured for low access priority. When rejecting an RRC connection request for congestion reasons the eNodeB may indicate to the WTRU 202 an appropriate timer value that limits further RRC connection requests for a while.

The MME 262 may initiate the procedures defined for APN based Session Management congestion control to eNodeB/HeNB that are congested. The MME 262 may reuse the procedures defined for APN based Session Management congestion control for all signaling to/from congested eNodeB/HeNB.

The procedures described above may also be used if the MME 262 receives information whether traffic is for attended or unattended data traffic. For example, if the MME 262 is aware that the traffic is for unattended data traffic, the MME 262 may indicate to the congested eNodeB to reduce the traffic of the unattended data traffic by using the Traffic Reduction Indication in the OVERLOAD START message.

Figure 33:
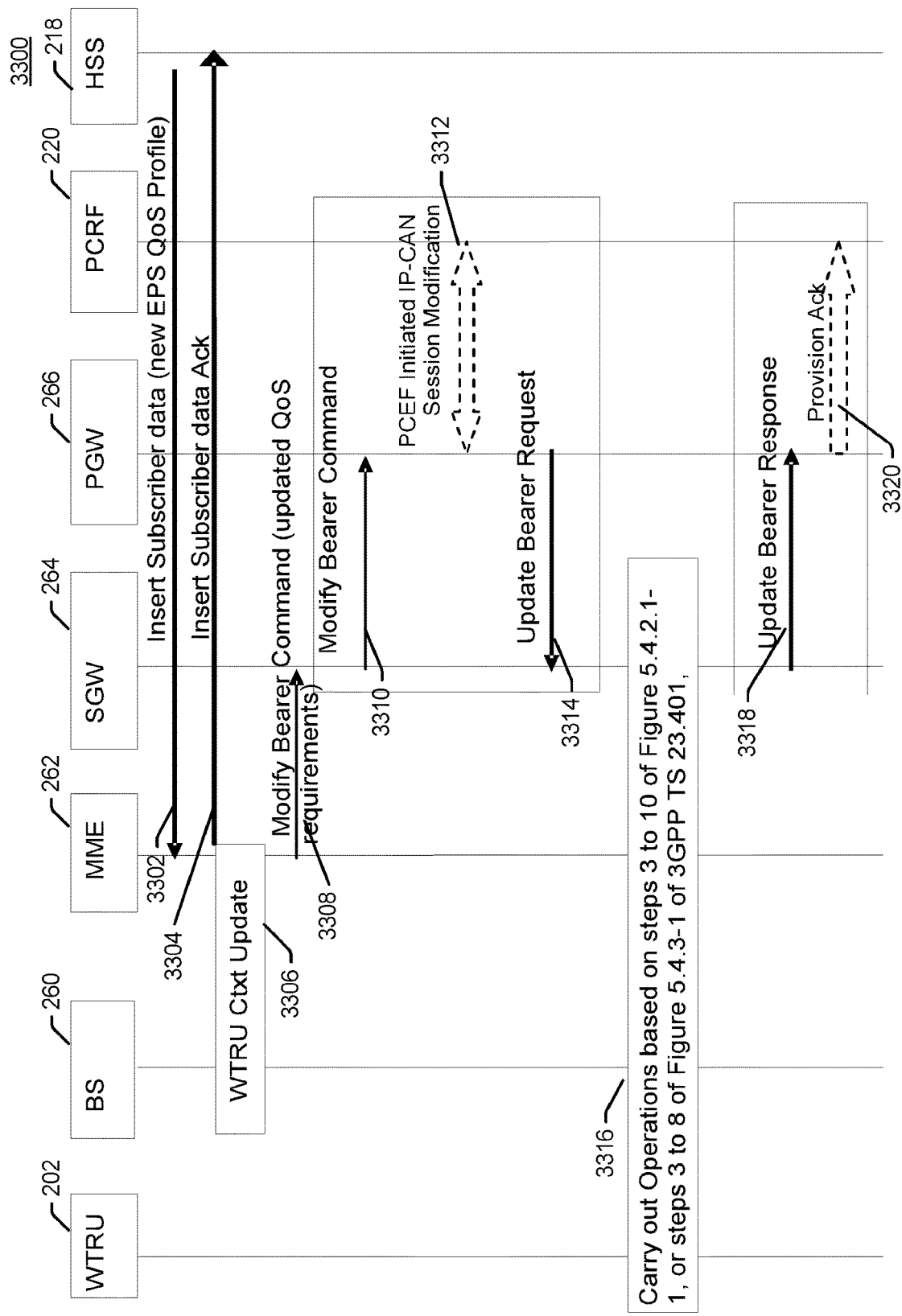
FIG. 33 is a call flow diagram illustrating an example call flow directed to congestion load mitigation.

FIG. 33 is a call flow diagram illustrating an example call flow 3300 directed to congestion load mitigation. Pursuant to call flow 3300, the congestion load mitigation may be carried out via the HSS 218. The HSS 218 upon receiving congestion load information may carry out an HSS initiated Subscribed QoS modification procedure.

The HSS 218 may receive RAN user plane congestion information, for example, in TAU. The HSS 218 may check that there is an updated QoS profile for the subscriber based on the congestion load reported. At call flow part 3302, the HSS 218 may transmit an Insert Subscriber Data (IMSI, Subscription Data) message to the MME 262. The HSS 218 may transmit updated Subscription Data including EPS subscribed QoS (QCI, ARP) and the subscribed WTRU-AMBR and APN-AMBR based on the congestion load reported or alternatively additional EPS subscribed QoS (QCI, ARP) and subscribed WTRU-AMBR and APN-AMBR parameters in case of RAN user plane congestion. The MME 262 may update the stored Subscription Data. At call flow part 3304, the MME 2262 may acknowledge the Insert Subscriber Data message by returning an Insert Subscriber Data Ack (IMSI) message to the HSS 218. The MME 262 may check the subscription parameters, if only the subscribed WTRU-AMBR has been modified or there is a specific UE-AMBR for high RAN user plane congestion, the MME 262 may calculate a new WTRU-AMBR value. At call flow part 3306, the MME 262 may signal a modified WTRU-AMBR value to the base station 262 by using S1-AP WTRU Context Modification Procedure. The HSS Initiated Subscribed QoS Modification Procedure may end after completion of the WTRU Context Modification Procedure.

If the QCI and/or ARP and/or subscribed APN-AMBR has been modified or there are specific QCI and/or ARP and/or subscribed APN-AMBR values for high RAN user plane congestion and there is related active PDN connection with the modified QoS Profile, the MME 262 may transmit the Modify Bearer Command (EPS Bearer Identity, EPS Bearer QoS, APN-AMBR) message to the SGW 264, as shown at call flow part 3308. The EPS Bearer Identity may identify the default bearer of the affected PDN connection. The EPS Bearer QoS may contain the EPS subscribed QoS profile to be updated.

At call flow part 3310, the SGW 264 may transmit the Modify Bearer Command (EPS Bearer Identity, EPS Bearer QoS, and APN-AMBR) message to the PGW 266. If PCC infrastructure is deployed, the PGW 266 may inform the PCRF 220 about the updated EPS Bearer QoS and APN-AMBR. At call flow part 3312, the PCRF 220 may transmit new updated PCC decision to the PGW 266. This may correspond to a PCEF-initiated IP-CAN Session Modification procedure. The PCRF 220 may modify the APN-AMBR and the QoS parameters (QCI and ARP) associated with the default bearer in the response to the PGW 266.

The PGW 266 may modify the default bearer of each PDN connection corresponding to the APN for which subscribed QoS has been modified. If the subscribed ARP parameter has been changed, the PGW 266 may also modify all dedicated EPS bearers having the previously subscribed ARP value unless superseded by PCRF decision. At call flow part 3314, the PGW 266 may transmit the Update Bearer Request (EPS Bearer Identity, EPS Bearer QoS, TFT, and APN-AMBR) message to the SGW 264. As no PTI is included, the MME 262 may use protocol specific details to determine if the Update Bearer Request was triggered by this procedure or not.

At call flow part 3316, If the QCI and/or ARP parameter(s) have been modified, operations based on steps 3 to 10 in clause 5.4.2.1, Figure 5.4.2.1-1 of 3GPP TS 23.401, may be invoked. Also At call flow part 3216, If neither the QCI nor the ARP have been modified, but instead only the APN-AMBR was updated, operations based on steps 3 to 8 in clause 5.4.3, Figure 5.4.3-1 of 3GPP TS 23.401, may be invoked.

At call flow part 3318, the SGW 264 may acknowledge the bearer modification to the PDN GW by transmitting an Update Bearer Response (EPS Bearer Identity, User Location Information (ECGI)) message. If the bearer modification fails, the PGW 266 may delete the concerned EPS Bearer. At call flow part 3320, the PGW 266 may indicate to the PCRF 220 whether the requested PCC decision was enforced or not by transmitting a Provision Ack message.

Although not shown, he PGW 266 may receive congestion information from the SGW 264 via a Modify Bearer Request message for E-UTRAN GTP S5, from the SGSN via UPDATE PDN CONTEXT request. The SGW 264 may receive congestion information from the MME 262 based on the example described above.

The PGW 266 (for GTP S5 E-UTRAN), GGSN (for UTRAN) and SGW 264 (for PMIP S5 E-UTRAN) may have pre-configured policy rules that may be activated based on the RAN user plane congestion status received. If PCC is supported the PCEF 270 (for PGW 266 or GGSN) or the BBERF (for SGW 264) may have such pre-configured PCC rules. The pre-configured policy rules may be defined per IP flow, per application type (application is identified by a TDF), per APN (all flows subject to the APN will be modified) or per WTRU. Such pre-configured policy rules may include the following information: Updated Maximum Bit Rate values for specific IP flows, Updated APN-AMBR values, and Updated UE-AMBR values. The assumption is that all services may be run over the default bearer so only best effort bearers are taken into consideration.

If congestion mitigation is carried out per IP flow, then the PGW 266 or the SGW 264 may inspect the traffic flow template of the WTRU traffic and may detect that the Maximum Bit Rate of certain IP flows needs to be reduced due to high level of congestion based on the pre-configured per IP flow congestion policy. If congestion mitigation is carried out per application, then the TDF may report specific applications to the PGW 266 (either via Sy reference point or to the PCEF 270 if the TDF is collocated with the TDF). The PGW 266 may detect that the bandwidth of certain applications (i.e. MBR) may need to be reduced due to high level of RAN user plane congestion based on the pre-configured per application congestion policy. If congestion mitigation is carried out per APN, then the PGW 266 and/or the SGW 264 may detect that the MBR of all traffic of a particular APN need to be reduced due to high level of RAN user plane congestion. In such a case, the PGW 266 and/or the SGW 264 may enforce a lower APN-AMBR value based on the pre-configured APN-AMBR policy. If congestion mitigation is carried out per WTRU then the PGW 266 and/or the SGW 264 may detect that the MBR of all traffic of a particular WTRU may need to be reduced due to high level of RAN user plane congestion. In such a case, the PGW 266 and/or the SGW 264 may enforce a lower WTRU-AMBR value based on the pre-configured UE-AMBR policy.

The PCRF 220 may receive congestion information as described above, i.e., either via a PCEF-initiated IP-CAN session Establishment or Modification (for GTP S5 cases in E-UTRAN accesses or for UTRAN accesses) or via a Gateway Control Session Establishment or Modification (for PMIP S5 case). Upon receiving congestion information, based on the level of RAN user plane congestion reported, the PCRF 220 may carry out congestion mitigation dynamically based on the subscription profile of the user, based on usage of data by the user, based on IP flow or based on the type of application (reported by the TDF) and/or based on the charging requirements of the user (based on the subscription profile or the operator). Under the aforementioned scenarios the PCRF may provide updated PCC rules over Gx to the PCEF and updated QoS rules over Gxx to BBERF (applicable for PMIP S5 only).

If the PCRF 220 receives congestion information, whether traffic is for unattended or attended data, the PCRF 220 may have policies (for example, based on the subscription profile of the user) or other operator policies to throttle the traffic of unattended data traffic based on the RAN user plane congestion reports received.

When making policy decisions based on the RAN user plane congestion reported, the PCRF 220 may take into account the subscription profile stored in the Subscription Profile Repository (SPR) over Sp reference point. The subscription profile may contain information that specific subscribers can run services even at high congestion load (for example, a "gold" subscriber) or that specific subscribers have a flat rate scheme where during congestions such services need to be throttled down. For example, the PCRF 220 may decide to reduce the traffic of flat-rate subscribers by providing updated.

The PCRF 220 may have subscribed to the TDF over Sy reference point (for the standalone TDF case) or over Gx (for the TDF/PCEF collocated case) to be reported of certain applications. The PCRF 220 may make dynamic policies based on the application type reported (by the TDF) and the level of RAN user plane congestion reported. For example, if the user is running Skype and the user plane in the RAN node is congested, the PCRF 220 may decide to throttle the traffic taking into account other parameters such as the subscription profile of the user. In such a case, the PCRF 220 may provide updated PCC rules over Gx to PCEF and QoS rules over Gxx to BBERF (if applicable) with reduced MBR values based on the subscription profile of the user.

The PCRF 220 may have subscribed to the PCEF 270 to monitor the usage of a particular user. The PCRF 220 may indicate to the PCEF 270 to be notified if a usage threshold (volume based) has been met. If the usage thresholds have been met by a subscriber and there is high RAN user plane congestion, the PCRF 220 may decide to throttle traffic to the user (by providing updated PCC and QoS rules with reduced MBR values) or by initiating a PCRF-initiated IP-CAN session termination (denying access).

When the PCRF 220 receives a Gateway Control Session Establishment/Modification over Gxx reference point or PCEF-initiated IP-CAN Session Establishment Modification over Gx reference point or indication from an Application Function over Rx reference point, the PCRF 220 may also receive TFT information. The PCRF 220 may have policies that the traffic of certain IP flows need to be reduced (i.e. reduced MBR) in case of high RAN user plane congestion. If such IP flows are detected and there is high RAN user plane congestion reported, the PCRF 220 may provide updated PCC rules over Gx to PCEF and QoS rules over Gxx to BBERF (if applicable) with reduced MBR values.

The PCRF 220 may subscribe to the OCS over Sy reference points to be notified if the user exceeds a specific spending threshold. If the user exceed the spending threshold and there is high RAN user plane congestion, the PCRF 220 may either throttle the user's traffic by providing updated rules over Gx to PCEF and QoS rules over Gxx to BBERF (if applicable) with reduced MBR values or by initiating a PCRF-initiated IP-CAN session termination (denying access).

The PCRF 220 may base its decision on PCC rules taking into account all or some the aforementioned input, i.e. subscription profile, volume/charging usage levels, application type and IP flow information.

Figure 34:
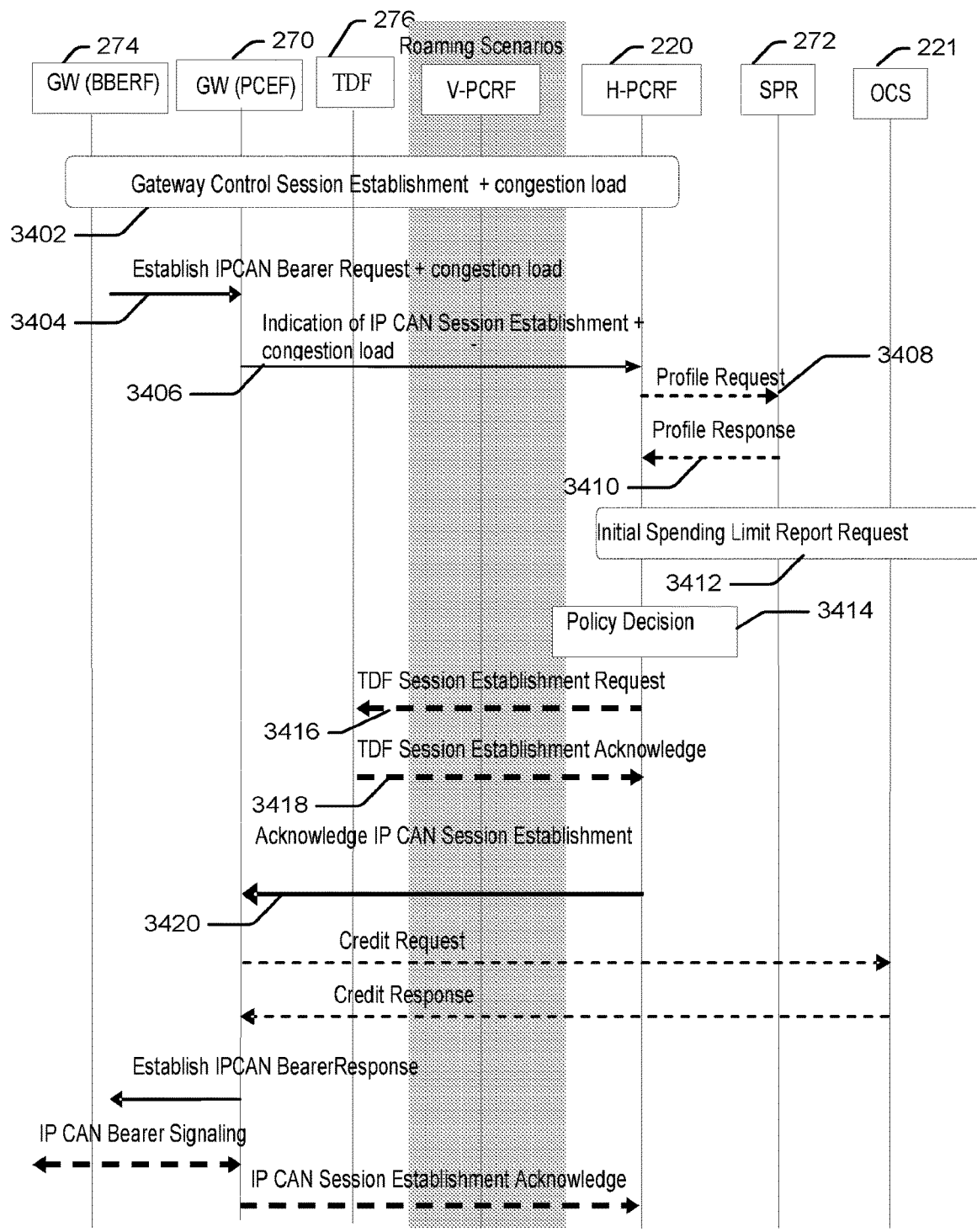
FIG. 34 is an example flow diagram of PCC rules during IP-CAN session establishment.

FIG. 34 is an example flow diagram of PCC rules during IP-CAN session establishment. At call flow part 3402, the BBERF 274 may initiate a Gateway Control Session Establishment procedure. The BBERF 274 may also include congestion load information. At call flow part 3404, the GW(PCEF) 270 may receive a request for IP-CAN Bearer establishment. The PCEF 270 may also receive congestion load information. At call flow part 3406, the PCEF 270 may determine that the PCC authorization is required, requests the authorization of allowed service(s) and PCC Rules information. The PCEF 270 may include congestion load information.

If the PCRF 220 does not have the subscriber's subscription related information, it may transmit a request to the SPR 272 to receive the information related to the IP-CAN session, as shown at call flow part 3408. The SPR 272 may have policies based on RAN user plane congestion load, and may provide them to the PCRF 220 in a profile response message, shown in at call flow part 3410. The SPR policies on RAN user plane congestion load may include policies based on the type of the subscriber (i.e. gold subscriber); IP flows reported, the application type reported, the volume usage level, the user spending limits. The PCRF may store the subscription related information containing the information about the allowed service(s) and PCC Rules information, and may include MPS EPS Priority, MPS Priority Level and IMS Signalling Priority for establishing a PS session with priority and may also include user profile configuration indicating whether application detection and control should be enabled for the IP-CAN session.

If the PCRF determines that the policy decision depends on the status of the policy counters available at the OCS (for example, policies on congestion load based on the spending limits) and such reporting is not established for the subscriber, the PCRF may transmit an Initial Spending Limit Report Request, as shown at call flow part 3412. If policy counter status reporting is already established for the subscriber, and the PCRF determines that the status of additional policy counters are required, the PCRF may transmit an Intermediate Spending Limit Report Request (not shown).

At call flow part 3414, the PCRF 220 may make the authorization and policy decision. If congestion load reports are present for the user, the PCRF 220 may take the information into account.

For the solicited application reporting, if the PCRF 220 determines that policy decisions depends on the application used, the PCRF 220 may request the TDF 276 to establish the relevant session towards PCRF 220 and provides ADC Rules to the TDF 276, as shown call flow part 3416. At call flow part 3418, the TDF 276 may transmit an Ack (accept or reject of the ADC rule operation(s)) to inform the PCRF 220 about the outcome of the actions related to the decision(s) received. The Ack may also include the list of Event Triggers to report. The Event Triggers may indicate to the PCRF 220 what events to be forwarded from the PCRF 220 to the TDF 276, once PCRF 220 gets the corresponding Event Report from the PCEF/BBERF 270.

At call flow part 3420, the PCRF 220 may transmit the decision(s) which may include PCC rules to mitigate congestion. The PCRF 220 may provide the default charging method and may include the following information: the PCC Rules to activate and the Event Triggers to report. If PCEF 270 is enhanced with ADC, the applicable ADC rules may be provided, according to the user profile configuration. The Policy and Charging Rules may allow the enforcement of policy associated with the IP-CAN session. The Event Triggers may indicate to the PCEF 270 what events must be reported to the PCRF 220. If the TDF 276 provided a list of Event Triggers to the PCRF in previously, the PCRF 220 may also provide those Event Triggers to the PCEF 270. The PCRF 220 may also subscribe to the PCEF 270 to be informed of volume usage levels.

Figure 35:
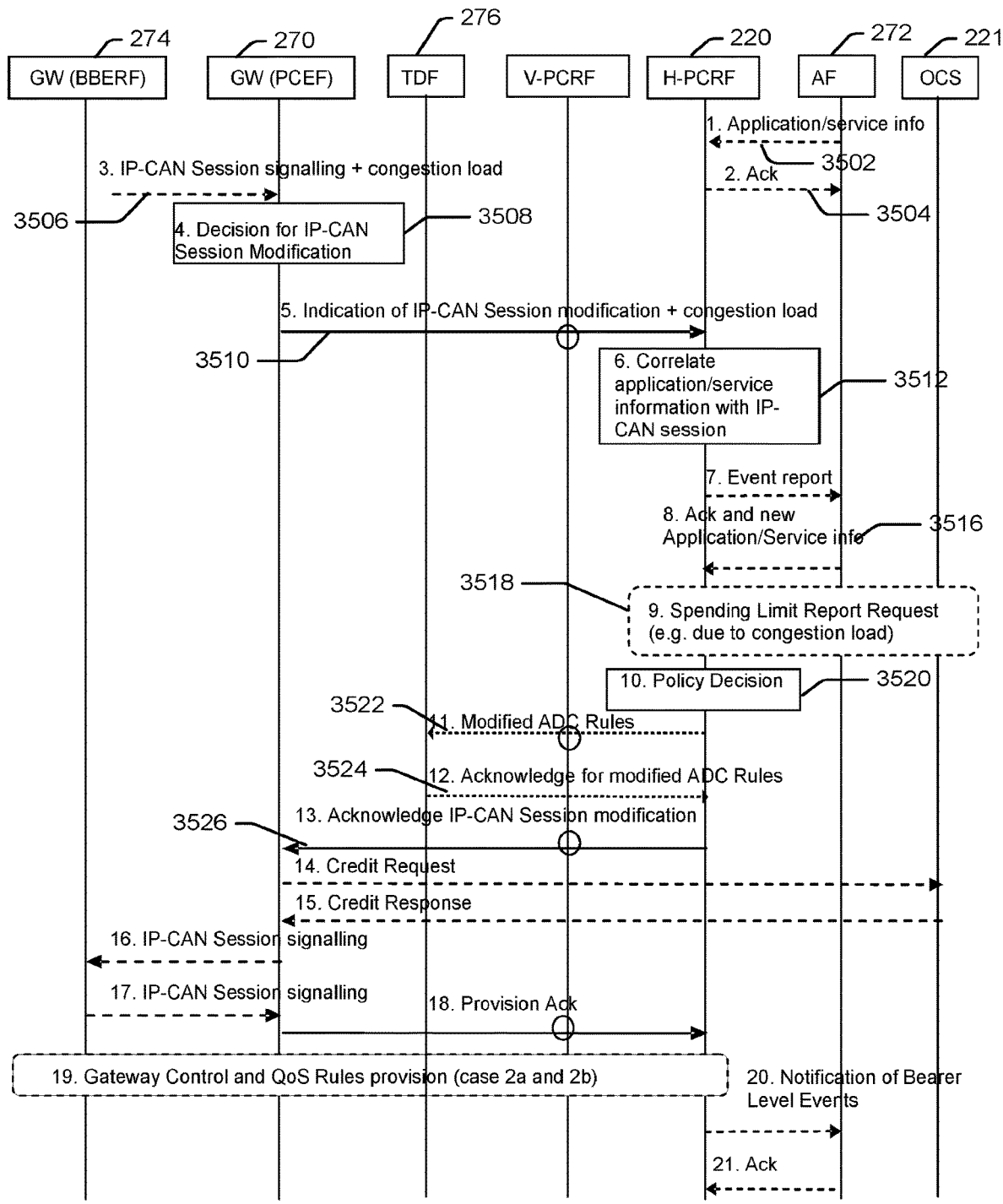
FIG. 35 is an example flow diagram of PCC rules during PCEF-initiated IP-CAN session modification.

FIG. 35 is an example flow diagram of PCC rules during PCEF-initiated IP-CAN session modification. Optionally, the AF 272 may provide/revoke service information to the PCRF 220 due to AF session signalling. At call flow part 3502, the AF 272 may subscribe at this point to notification of bearer level events related to the service information. For the PCRF 220 to generate the applicable events, the PCRF 220 may instruct the PCEF 270 to report events related to the corresponding PCC rules. Such events are not shown. The PCRF 220 may store the service information and responds with the Acknowledgement to the AF 272, as shown at call flow part 3504. At call flow part 3506, the GW (PCEF) 270 may receive IP-CAN session signaling for IP-CAN Session modification.

At call flow part 3508, the GW (PCEF) 270 may make a decision to trigger IP-CAN Session modification either caused by the previous step or based on an internal decision or, for example, if the GW (PCEF) 270 enhanced with ADC, has detected the start/stop of application traffic, requested by one of the activated ADC Rules. An additional trigger may be that the TDF 272 within the PCEF 270 has detected an application that needs to be reported due to high congestion load. The GW (PCEF) may determine that the PCC interaction is required, and at call flow part 3510, may transmit an Indication of IP-CAN Session modification. The PCEF 270 may include the congestion load information in such message.

At call flow part 3512, the PCRF may correlate the request for PCC Rules with the IP-CAN session and service information available at the GW (PCEF) 270. The PCRF 220 may report to the AF 272 an event related to the transmission resources if the AF requested it at initial authorization, as shown at call flow part 3514. At call flow part 3516, the AF 272 may acknowledge the event report and/or responds with the requested information. If the PCRF 220 determines a change to policy counter status reporting is required, it may alter the subscribed list of policy counters using the Initial, Intermediate or Final Spending Limit Report Request procedures as shown at call flow part 3518. For example, the PCEF 270 may decide to check if the spending limit has been met for the user based on RAN user plane congestion reported and/or RAN user plane congestion policies provided by the SPR. At call flow part 3520, the PCRF 220 may make the authorization and policy decision. If the PCRF 220 makes the decision also taking into account the congestion load reported, the PCRF 220 may also take into account the following information (if available): the spending limits of the user, the volume usage levels, and specific IP flows/application reported.

For the TDF solicited application reporting, following steps may take place. The PCRF 220 may provide all new ADC decisions to the TDF 276, as shown at call flow part 3522. This may include ADC Rules activation, deactivation and modification. For example, the PCRF 220 may indicate the TDF 276 to report specific applications that need to be monitored in case of high RAN user plane congestion load. This may also include the list of Event triggers and also Event Report for the Event triggers, if reported by the PCEF/BBERF 270/274 to the PCRF 220, if the TDF 272 has previously subscribed for such an Event Report. In case of local breakout, the V-PCRF may provide ADC rules as instructed by the H-PCRF over S9. For unsolicited application reporting and if the PCRF 220 has recorded the release of an IPv4 address in step 5, the PCRF 220 may terminate the related TDF session. At call flow part 3524, the TDF 276 may transmit an Ack (accept or reject of the ADC rule operation(s)) to inform the PCRF 220 about the outcome of the actions related to the decision(s) received. The Ack may also include the list of Event Triggers to report. The Event Triggers may indicate to the PCRF 220 what events to be forwarded from the PCRF 220 to the TDF 276, once PCRF 220 gets the corresponding Event Report from the PCEF/BBERF 270/274.

At call flow part 3526, the PCRF 220 may transmit an Acknowledge of IP-CAN Session modification (PCC Rules, Event Triggers and, if changed, the chosen IP-CAN bearer establishment mode) to the GW (PCEF) 270. The GW (PCEF) 270 may enforce the decision. The PCRF 220 may also provide all new ADC decisions to the PCEF 270, enhanced with ADC. If the TDF 276 provided a list of Event Triggers to the PCRF 220 previously, the PCRF 220 may also provide those Event Triggers to the PCEF 270. The remaining call flow parts may be based on clause 7.4.1 of 3GPP TS 23.203.

Figure 36:
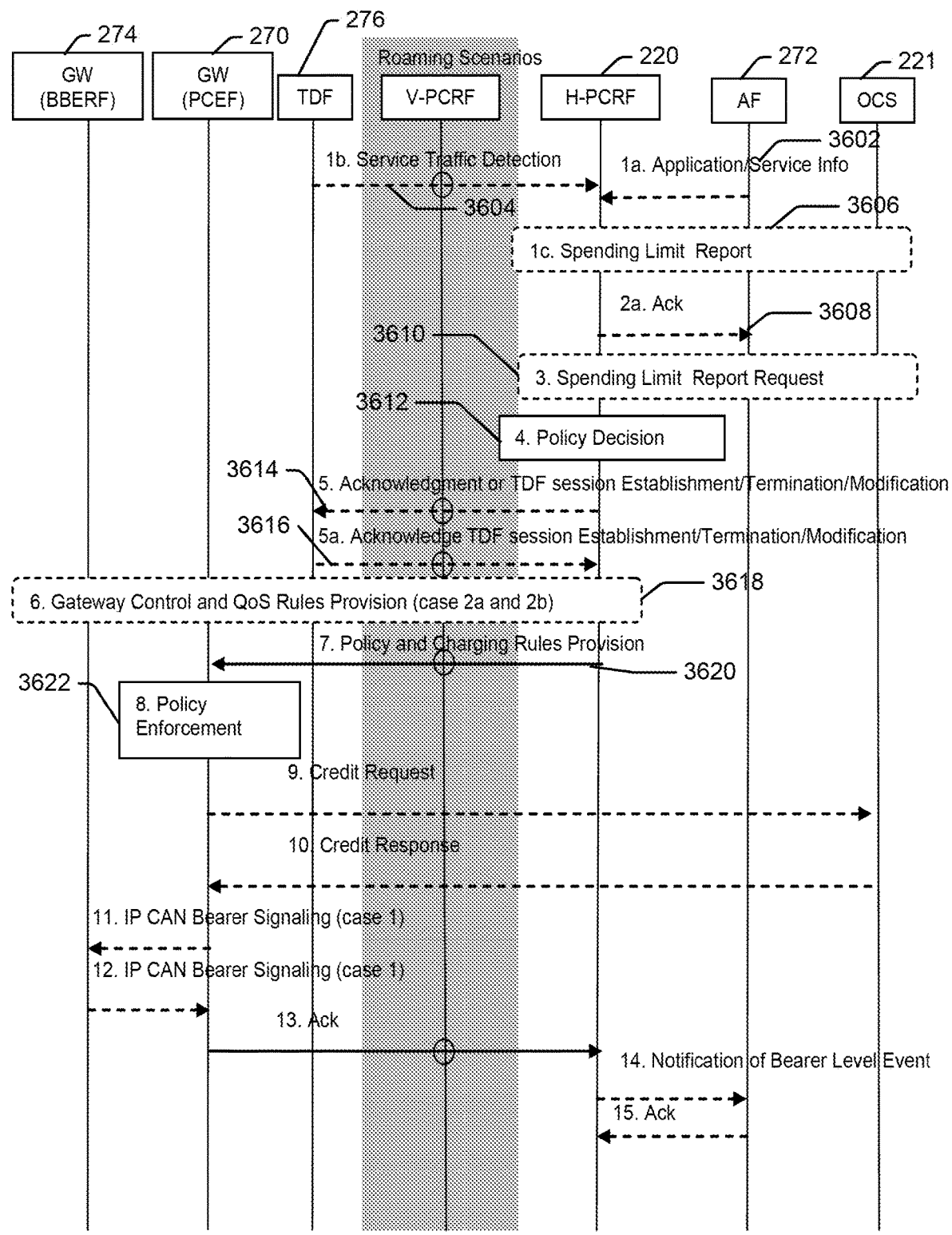
FIG. 36 is an example flow diagram of PCC rules during PCRF-initiated IP-CAN session modification.

FIG. 36 is an example flow diagram of PCC rules during PCRF-initiated IP-CAN session modification. Optionally, the AF 272 may provide/revoke service information to the PCRF 220 due to AF session signalling, as shown at call flow part 3602. The AF 272 may subscribe at this point to notification of bearer level events related to the service information. For the PCRF 220 to generate the applicable events, the PCRF 220 may instruct the PCEF 270 to report events related to the corresponding PCC rules. Such events are not shown.

Alternatively, for TDF, for example, the TDF 276 may detect the start/stop of an application traffic that matches with one of the active ADC Rules, as shown at call flow part 3604. The TDF 272 may provide application information due to solicited application reported (i.e. based on PCRF ADC rules, for example PCRF 220 instructing TDF 276 to report specific applications due to RAN user plane congestion load) or unsolicited application reported (based on TDF pre-configuration).

Alternatively, the OCS 221 may provide a Spending Limit Report to the PCRF 220, as shown at call flow part 3606. For example, the PCRF 220 may have subscribed to be notified if the user's spending limit has been met based on RAN user plane congestion load policies provided by the SPR (not shown).

The PCRF 220 may store the service information if available, and at call flow part 3608, may respond with the Acknowledgement to the AF 272. This is applicable to call flow part 3602. Without AF interaction, a trigger event in the PCRF 220 may cause the PCRF 220 to determine that the PCC rules require updating at the PCEF 270, for example, change to configured policy. This procedure may also be triggered by the Gateway Control and QoS Rules Request procedure.

If the PCRF 220 determines a change to policy counter status reporting is required, for example, due to congestion load reports, it may alter the subscribed list of policy counters using the Initial, Intermediate or Final Spending Limit Report Request procedures, as shown at call flow part 3610. The PCRF 220 may make the authorization and policy decision, as shown at call flow part 3612. The PCRF 220 may take into account the congestion load reported, the spending limit, the volume usage level as well as IP flows reported (from the AF 272) and application information reported (from the TDF 276), and SPR policies for RAN user plane congestion load, if available. The PCRF 220 may store the application information if provided, and at call flow part 3614, may respond with an Acknowledgement to the TDF 276 (for unsolicited application reporting) or a TDF session modification (for solicited application reporting). For the TDF solicited application reporting, the PCRF 220 may provide a new ADC decision to the TDF 276. If the last ADC rule is deactivated, the PCRF 220 may request the TDF 276 to terminate the TDF session towards the PCRF 220. If there is no active TDF session yet between the TDF 276 and the PCRF 220, the PCRF 220 may request the TDF 276 to establish the TDF session towards PCRF 220, and may provide an ADC decision to the TDF 276. In case of local breakout, the V-PCRF may provide ADC rules as instructed by the H-PCRF over S9.

For the TDF solicited application reporting, in the case of an existing on-going session, if requested by PCRF 220, the TDF 220 may transmit a Provision Ack (accepting or rejecting the ADC Rule operation(s)), as shown at call flow part 3616. For a new session, the TDF 276 may transmit an Ack. This may be to inform the PCRF 220 about the outcome of the actions related to the received ADC decision(s). The Provision Ack/Ack may also include the list of Event Triggers to report. The Event Triggers may indicate to the PCRF 220 what events to be forwarded from the PCRF 220 to the TDF 276, once PCRF 220 gets the corresponding Event Report from the PCEF/BBERF.

If there is no Gateway Control and QoS Rules Reply pending and there is a need to provision QoS rules, the PCRF may initiate a Gateway Control and QoS Rules Provision Procedure, as shown at call flow part 3618. If there are multiple BBERFs associated with the IP-CAN session, call flow part 3414 may be performed with the BBERFs that support WTRU/NW bearer establishment mode. If there is a Gateway Control and QoS Rules Reply pending, for example, this procedure was invoked from the Gateway Control and QoS Rules Request procedure, the PCRF 220 may use that opportunity for provisioning the applicable QoS rules. If there are multiple BBERFs associated with the IP-CAN session, and the procedure was invoked by a Gateway Control and QoS Rules Request procedure from the primary BBERF 274, the PCRF 220 may receive a Gateway Control and QoS Rules Request from the non-primary BBERFs.

At call flow part 3620, the PCRF 220 may transmit the Policy and Charging Rules Provision (PCC Rules, Event Trigger, and Event Report) to the PCEF 270. The PCRF 270 may also provide all new ADC decisions to the PCEF 270, enhanced with ADC. If the TDF 276 provided a list of Event Triggers to the PCRF 220 previously, the PCRF 220 may also provide those Event Triggers to the PCEF 270. The PCEF 270 may enforce the decision, as shown at call flow part 3620. The remaining call flow parts may be based on clause 7.4.2 of 3GPP TS 23.203.

Figure 37:
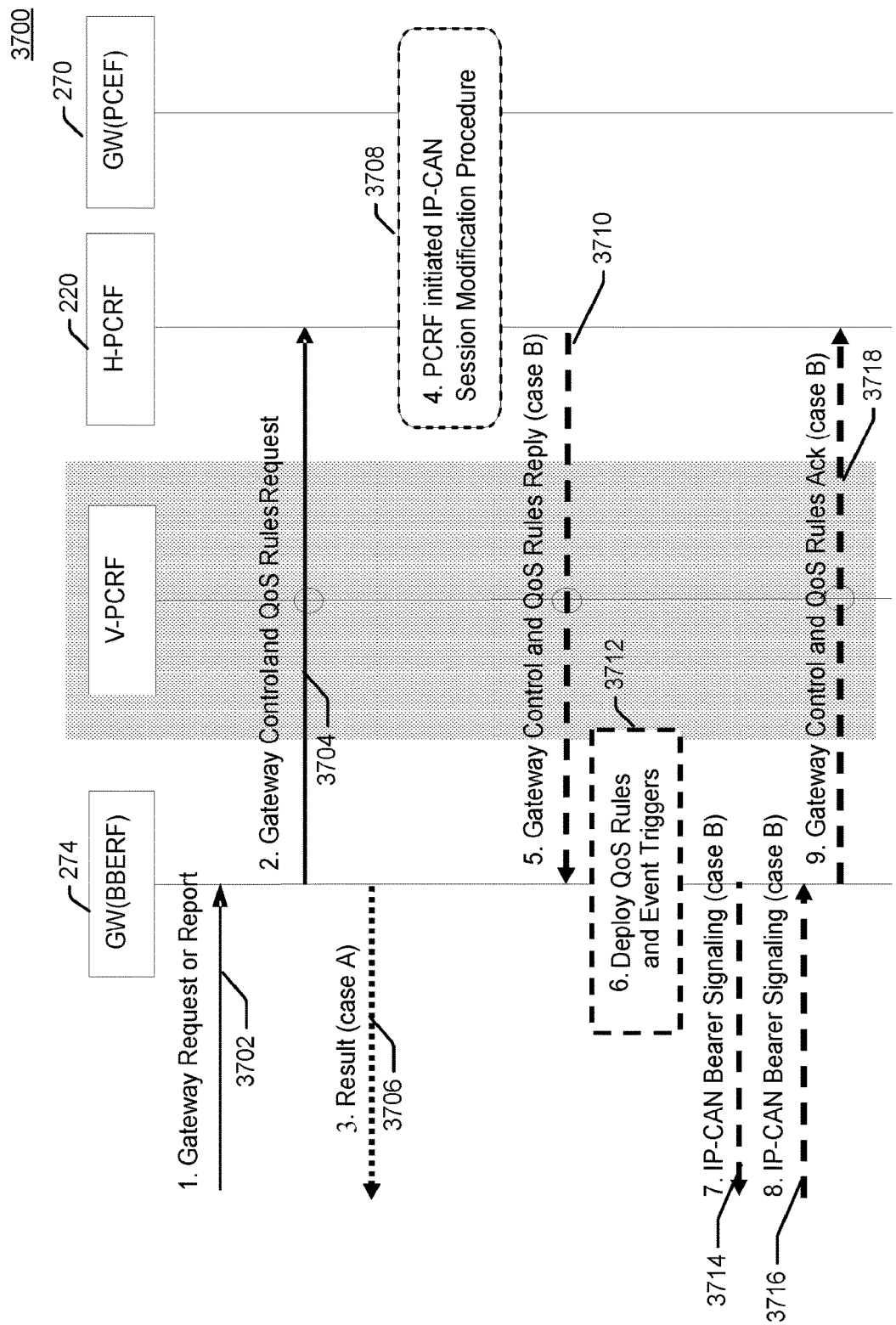
FIG. 37 is an example flow diagram of PCC rules during GW control session procedures

FIG. 37 is an example flow diagram of PCC rules during GW control session procedures. The GW(BBERF) 274 may be requested to either report an event or obtain QoS rules or both for a Gateway Control Session, as shown at call flow part 3702. For example, receiving RAN user plane congestion load information. The GW(BBERF) 274 may transmit a Gateway Control and QoS Rules Request to the PCRF, as shown at call flow part 3704. The BBERF 274 may also include congestion load information. If the GW(BBERF) 274 is only requested to report an event, the GW(BBERF) 274 may acknowledge the call flow part 3702 by transmitting a result to the entity that triggered this procedure, as shown at call flow part 3706. At call flow part 3708, the PCRF initiated IP-CAN Session Modification Procedure may occur as the result of the Gateway Control and QoS Rules Request procedure as described in FIG. 36. The PCRF 220 may make PCC rule decision taking into account RAN user plane congestion (if available).

If the GW(BBERF) 274 asked for new QoS rules or IP-CAN-specific parameters need to be delivered back to the GW(BBERF) 274 or both, the PCRF 220 may transmit a Gateway Control and QoS Rules Reply to the GW(BBERF) 274, as shown at call flow part 3710. This interaction may include QoS Rules and Event Triggers. The QoS Rules and Event Triggers, if any, received by the GW(BBERF) 274 may be deployed, as shown at call flow part 3712. At call flow part 3714, the GW(BBERF) 274 may initiate the IP-CAN Bearer signalling if required for the QoS Rules and Event Triggers. At call flow part 3716, the GW(BBERF) 274 may receive the response for the IP-CAN Bearer signalling.

If the Gateway Control and QoS Rules Reply to the GW(BBERF) 274 contained new and/or modified QoS Rules, the result of the QoS rule activation may be returned to the PCRF 220, indicating whether the resources requested have been successfully allocated, as shown at call flow part 3718.

In various embodiments, the RAN user plane congestion may be handled internally within the RAN nodes. In such a case, the core network may not be required to be aware or notified of RAN user plane congestion. In such embodiments, the RAN cells (eNodeBs, nodeBs, HeNB, HNBs) may be allowed to manage RAN user plane congestion by triggering handovers taking into account the level of RAN user plane congestion. In some embodiments, the RAN user plane congestion may be managed internally between the eNodeBs, i.e., via X2 handovers or by allowing the MME to decide whether handover should take place based on the RAN user plane congestion level reported by the eNodeBs.

Figure 38:
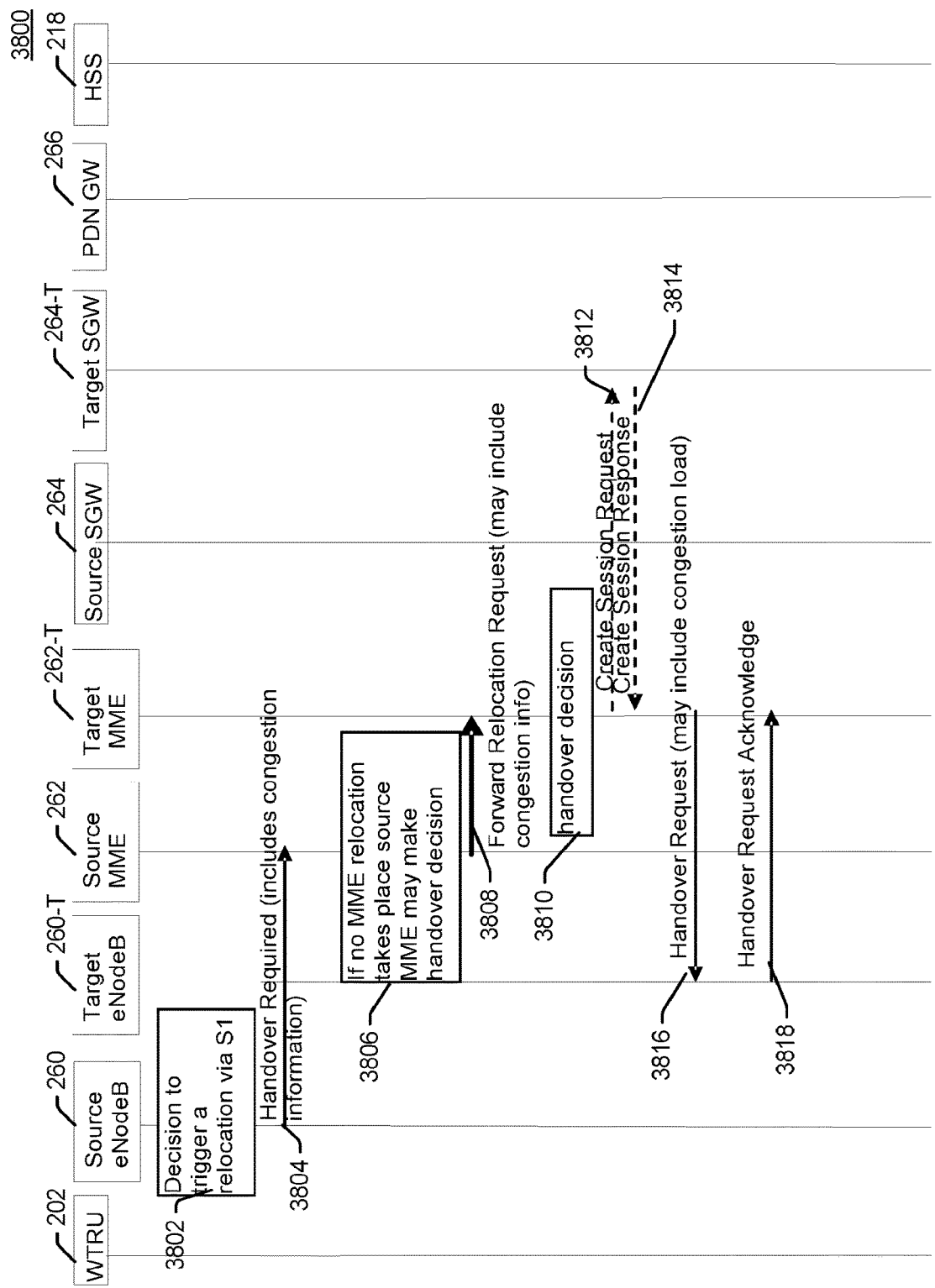
FIG. 38 is an example flow diagram of a handover procedure taking into account congestion load information.

FIG. 38 is an example flow diagram of a handover procedure taking into account congestion load information.

The following procedure may be applicable when congestion load information is provided during the handover procedure. At call flow part 3802, the source eNodeB 260 may decide that an S1-based handover to the target eNodeB 260-T is required. The source eNodeB 260 may decide to initiate a handover, for example, by no X2 connectivity to the target eNodeB 260-T, or by an error indication from the target eNodeB 260-T after an unsuccessful X2-based handover, or by dynamic information learnt by the source eNodeB 260. An additional factor may be that the source eNodeB 260 may decide to initiate handover based on the current congestion load.

At call flow part 3804, the source eNodeB 360 may generate and transmit a Handover Required message to Source MME 360-T including the various parameters and/or congestion load information. If no MME relocation takes place, the source MME 260 may decide whether handover should continue based on the congestion load reported by the source eNodeB 260 and the current congestion load in the target eNodeB 260-T (if known). The source MME 262 may have an up to date congestion load information of the target eNodeB 260-T based, for example, on an earlier handover indication from the target eNodeB 260-T or from TAU of WTRUs attached in the target eNodeB 260-T. If no MME relocation takes place then call flow parts 3806-3808 might not be carried out.

If the source MME 262 detects that target eNodeB 260-T is served by a different MME, the source MME 262 may transmit a Forward Relocation Request including various parameters and/or the congestion load information, as shown at call flow part 3808. At call flow part 3810, the target MME 262-T may decide whether handover may proceed taking into account the procedure of call flow part 3806. The Source MME/Target MME 262/262-T may transmit a create session request to target SGW 264-T, as shown at call flow part 3812. At call flow part 3814, the SGW 264-T may transmit a Create Session Response to the Source/Target MME. At call flow part 3616, the Source/Target MME 262/262-T may transmit a Handover Request to target eNodeB 260-T. The Source/Target MME 262/262-T may include the source MME congestion load information in the Handover Request message. The target eNodeB 260-T may store source eNodeB congestion load status in order to be aware of the congestion load in all adjacent eNodeB cells and dynamically decide whether a future handover should proceed in the source eNodeB 260. If the target eNodeB 260-T has resources to allocate the bearer required, the eNodeB 260-T may respond with a Handover Request ACK, as shown at call flow part 3818.

In the description that follows, the call flow 3800 may include addition call flow parts not shown. These call flow parts may be based on clause 5.5.1.2.2 of 3GPP TS 23.401. If indirect forwarding applies and the Serving GW is relocated, the target MME 262-T may set up forwarding parameters by transmitting Create Indirect Data Forwarding Tunnel Request (target eNodeB addresses and TEIDs for forwarding) to the Serving GW. The Serving GW may transmit a Create Indirect Data Forwarding Tunnel Response (target Serving GW addresses and TEIDs for forwarding) to the target MME 262-T. If the Serving GW is not relocated, indirect forwarding may be set up. Indirect forwarding may be performed via a Serving GW which is different from the Serving GW used as the anchor point for the WTRU.

If the MME has been relocated, the target MME 262-T may transmit a Forward Relocation Response (Cause, Target to Source transparent container, Serving GW change indication, EPS Bearer Setup list, Addresses and TEIDs) message to the source MME 262. For indirect forwarding, this message may include Serving GW Address and TEIDs for indirect forwarding (source or target). The serving GW change indication may indicate a new Serving GW has been selected. If indirect forwarding applies, the source MME 262 may transmit Create Indirect Data Forwarding Tunnel Request (addresses and TEIDs for forwarding) to the Serving GW. If the Serving GW is relocated it may include the tunnel identifier to the target serving GW. The Serving GW may respond with a Create Indirect Data Forwarding Tunnel Response (Serving GW addresses and TEIDs for forwarding) message to the source MME. Indirect forwarding may be performed via a Serving GW which is different from the Serving GW used as the anchor point for the WTRU 220.

The source MME 262 may transmit a Handover Command (Target to Source transparent container, Bearers subject to forwarding, Bearers to Release) message to the source eNodeB 260. The Bearers subject to forwarding may include a list of addresses and TEIDs allocated for forwarding. The Bearers to Release may include the list of bearers to be released. The Handover Command may be constructed using the Target to Source transparent container and may be transmitted to the WTRU 202. Upon reception of this message the WTRU 202 may remove any EPS bearers for which it did not receive the corresponding EPS radio bearers in the target cell.

The source eNodeB 260 may transmit the eNodeB Status Transfer message to the target eNodeB 260-T via the MME(s) to convey the PDCP and HFN status of the E-RABs for which PDCP status preservation applies. The source eNodeB 260 may omit transmitting this message if none of the E-RABs of the WTRU 202 may be treated with PDCP status preservation. If there is a MME relocation, the source MME 262 may transmit this information to the target MME 262-T via the Forward Access Context Notification message which the target MME acknowledges. The source MME 262 or, if the MME is relocated, the target MME 262-T may transmit the information to the target eNodeB 260-T via the eNodeB Status Transfer message.

The source eNodeB 260 may start forwarding of downlink data from the source eNodeB 260 towards the target eNodeB 260-T for bearers subject to data forwarding. This may be either direct or indirect forwarding. After the WTRU 202 has successfully synchronized to the target cell, it may transmit a Handover Confirm message to the target eNodeB 260-T. Downlink packets forwarded from the source eNodeB 260 may be transmitted to the WTRU 260. Also, uplink packets may be transmitted from the WTRU 202, which may be forwarded to the target Serving GW and on to the PGW 266. The target eNodeB 260-T may transmit a Handover Notify (TAI+ECGI) message to the target MME 262-T. If the MME has been relocated, the target MME 262-T may transmit a Forward Relocation Complete Notification ( ) message to the source MME 262. The source MME 262, in response, may transmit a Forward Relocation Complete Acknowledge ( ) message to the target MME 262-T. Regardless if MME has been relocated or not, a timer in source MME 262 may be started to supervise when resources in Source eNodeB 260 and if the Serving GW is relocated, also resources in Source Serving GW may be released. Upon receipt of the Forward Relocation Complete Acknowledge message, the target MME 262-T may start a timer if the target MME 262-T allocated S-GW resources for indirect forwarding.

The MME may transmit a Modify Bearer Request (eNodeB address and TEID allocated at the target eNodeB 260-T for downlink traffic on S1-U for the accepted EPS bearers, ISR Activated) message to the target Serving GW for each PDN connection, including the PDN connections that need to be released. If the PGW 266 requested WTRU's location info (determined from the UE context), the MME may also include the User Location Information IE in this message. For the case that neither MME nor S-GW changed, if ISR was activated before this procedure, the MME may maintain ISR. The WTRU 202 may be informed about the ISR status in the Tracking Area Update procedure. The MME may release the non-accepted dedicated bearers by triggering the bearer release procedure. If the Serving GW receives a DL packet for a non-accepted bearer, the Serving GW may drop the DL packet and does may transmit a Downlink Data Notification to the MME. If the default bearer of a PDN connection has not been accepted by the target eNodeB 260-T and there are other PDN connections active, the MME may handle it in the same way as if all bearers of a PDN connection have not been accepted. The MME may release these PDN connections by triggering the MME requested PDN disconnection procedure. When the Modify Bearer Request does not indicate ISR Activated, the Serving GW may delete any ISR resources by transmitting a Delete Bearer Request to the other CN node that has bearer resources on the Serving GW reserved.

If the Serving GW is relocated, the target Serving GW may assign addresses and TEIDs (one per bearer) for downlink traffic from the PGW 266. It may transmit a Modify Bearer Request (Serving GW addresses for user plane and TEID(s)) message per PDN connection to the PDN GW(s). The S-GW may also include User Location Information IE. The Serving GW may allocate DL TEIDs on S5/S8 even for non-accepted bearers. The PDN GW may update its context field and may return a Modify Bearer Response (Charging Id, MSISDN) message to the target Serving GW. The MSISDN may be included if the PGW 266 has it stored in its WTRU context. The PGW 266 may begin transmitting downlink packets to the target GW using the newly received address and TEIDs. These downlink packets may use the new downlink path via the target Serving GW to the target eNodeB 260-T. If the Serving GW is not relocated, no message may be transmitted in this step and downlink packets from the Serving-GW may be immediately transmitted on to the target eNodeB 260-T.

The target Serving GW may transmit a Modify Bearer Response message to the target MME 262-T. The message may be a response to a message transmitted earlier. If the Serving GW does not change, the Serving GW may transmit one or more "end marker" packets on the old path immediately after switching the path in order to assist the reordering function in the target eNodeB 260-T. The WTRU 202 may initiate a Tracking Area Update procedure when one of the conditions listed in clause "Triggers for tracking area update" applies. The target MME may know that it is a Handover procedure that has been performed for this WTRU as it received the bearer context(s) by handover messages and therefore the target MME may perform only a subset of the TA update procedure, specifically it excludes the context transfer procedures between source MME and target MME.

When the timer expires, the source MME 264 may transmit a WTRU Context Release Command ( ) message to the source eNodeB 260. The source eNodeB 260 may release its resources related to the WTRU 202, and may respond with a WTRU Context Release Complete ( ) message. When the timer expires and if the source MME 260 received the Serving GW change indication in the Forward Relocation Response message, it may delete the EPS bearer resources by transmitting Delete Session Request (Cause, LBI) messages to the Source Serving GW. Cause may indicate to the Source Serving GW that the Serving GW changes and the Source Serving GW may not initiate a delete procedure towards the PDN GW. The Source Serving GW may acknowledge with Delete Session Response ( ) messages. If ISR has been activated before this procedure, the cause may also indicate to the Source S-GW that the Source S-GW shall delete the bearer resources on the other old CN node by transmitting Delete Bearer Request message(s) to that CN node.

If indirect forwarding was used, then the expiry of the timer at source MME may trigger the source MME 262 to transmit a Delete Indirect Data Forwarding Tunnel Request message to the S-GW to release the temporary resources used for indirect forwarding that were allocated. If indirect forwarding was used and the Serving GW is relocated, then the expiry of the timer at target MME 262-T may trigger the target MME 262-T to transmit a Delete Indirect Data Forwarding Tunnel Request message to the target S-GW to release temporary resources used for indirect forwarding that were allocated.

The MME may transmit congestion load information, and the SGW may include congestion load information to the PGW 266.

The congestion load information may be the percentage of load in the cell as described above or alternatively the source eNodeB may simply indicate to the target eNodeB 260-T that the reason for initiating handover is due to congestion (i.e. include an additional Cause code within the handover messages indicating congestion).

Figure 39:
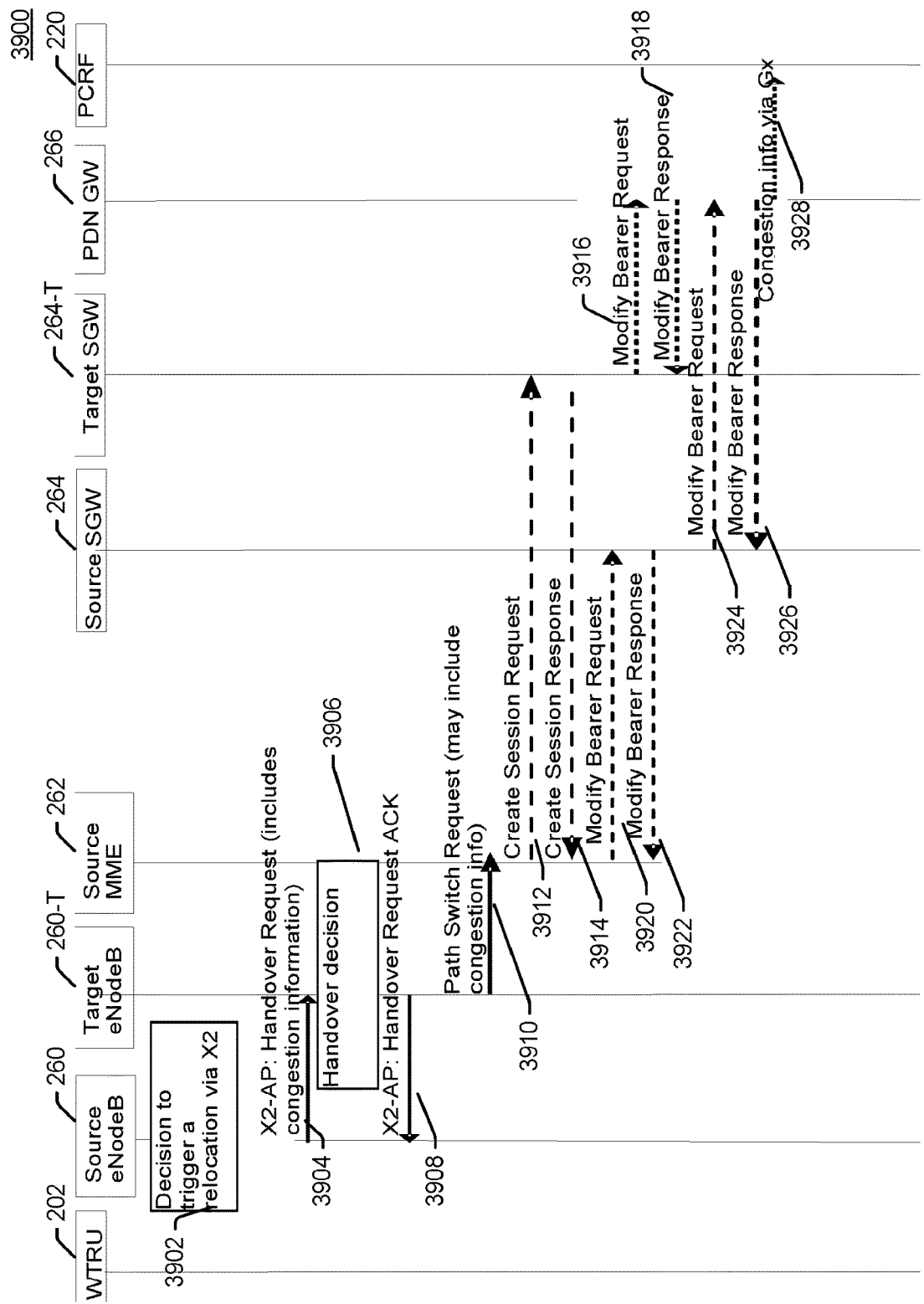
FIG. 39 is an example flow diagram of X2-based handover congestion load reporting.

FIG. 39 is an example flow diagram of X2-based handover congestion load reporting. At call flow part 3902, the source eNodeB 260 may decide to initiate an X2-based handover. The trigger to initiate X2-based handover may also take into account user plane congestion in the cell. At call flow part 3904, the source eNodeB 260 may transmit an X2-AP Handover Request command to target eNodeB 260-T. The source eNodeB 260 may also include congestion load with X2-AP Handover Request command. At call flow part 3906, the target eNodeB 260-T may decide to accept handover. The target eNodeB may also take into account its current congestion load status. At call flow part 3908, the target eNodeB may accept handover responding to source eNodeB 260 with an ACK message.

The following procedure may be optional since congestion load information may simply be provided via TAU/RAU messages. At call flow part 3910, the target eNodeB 260 may transmit a path switch request to MME 262. If the SGW relocation takes place this step may be carried out where the MME transmits a Create Session Request to target SGW 264-T, as shown at call flow part 3912. The MME may also include congestion load information within the Create Session Request message. At call flow part 3914, the target SGW 264-T may respond to the MME 262 with an ACK message. At call flow part 3916, the target SGW 264-T may transmit a Modify Bearer Request message to PGW 266. The target SGW 264-T may also include congestion load information within the Modify Bearer Request message. At call flow part 3918, the PGW 266 may respond to target SGW 264-T with an ACK message.

If no SGW relocation takes place, the following may be carried out. At call flow part 3920, the MME 262 may transmit a Modify Bearer Request message. The MME 262 may include congestion load information within the Modify Bearer Request message. At call flow part 3922, the source SGW 264 may respond to the MME 262 with an ACK message. At call flow part 3924, the source SGW 262 may transmit a Modify Bearer Request message to PGW 266. The source SGW may include congestion load information within Modify Bearer Request message. At call flow part 3926, the PGW 266 may respond to Source SGW with an ACK message. If PCC is supported, the PGW 266 may initiate a PCEF Initiated IP-CAN Session Modification via Gx reference point to PCRF 220, as shown at call flow part 3928. The PCEF 220 may also include congestion load information within the Modify Bearer Request message.

The source eNodeB 260 and target eNodeB 260-T may also be aware of the congestion load status of each cell through the X2-AP: A Load Indication message may be used to convey cell interference information. It may be proposed to enhance the conventional Load Indication message by including the congestion load information within X2-AP Load indication message. By conveying congestion load indication via X2, all adjacent eNodeB cells may be aware of the congestion status of each cell and thus be able to dynamically decide whether an adjacent eNodeB cell is less congested and thus initiate an X2-based handover request (or an S1-based handover request) procedure towards an eNodeB that is not congested.

Congestion load information may also assist inter RAT handover. Currently the source eNodeB 260 may decide to initiate handover mainly based on WTRU radio conditions. The eNodeB 260 may take into account its congestion load as criteria to initiate a handover procedure. In case handover takes place between E-UTRAN to UTRAN, i.e., E-UTRAN to UTRAN Iu mode inter RAT handover, the source eNodeB 260 may include congestion load information within the Handover Required message.

Figure 40:
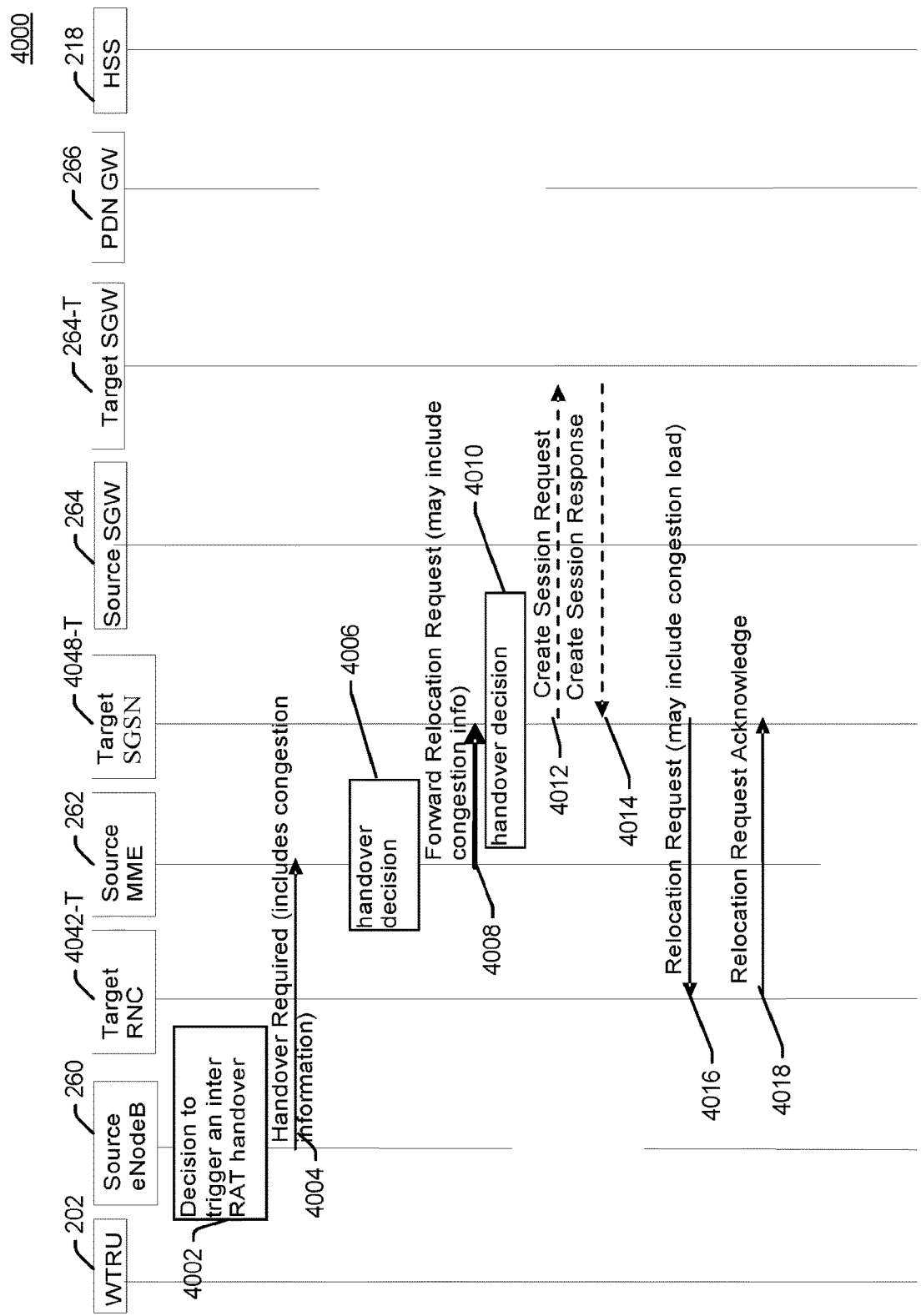
FIG. 40 is an example flow diagram of congestion load information during E-UTRAN to UTRAN Iu inter RAT handover.

FIG. 40 is an example flow diagram of congestion load information during E-UTRAN to UTRAN Iu inter RAT handover. At call flow part 4002, the source eNodeB 260 may decide that an inter RAT handover is required. The source eNodeB may take into account the current congestion load when deciding to initiate handover. At call flow part 4004, the source eNodeB 260 may transmit a Handover Required message to the source MME 262. The Handover Required message may including various parameters and/or the congestion load information.

At call flow part 4006, the source MME 262 may decide whether inter RAT handover should take place. The MME may also use the congestion load in the source eNodeB in the decision process. At call flow part 4008, the source MME 262 may transmit a Forward Relocation Request to Target SGSN 4048-T. The Forward Relocation Request message may include various parameters and/or the source eNodeB congestion load information.

At call flow part 4010, the target SGSN 4048-T may decide whether handover can proceed. The target SGSN may take into account the congestion load in the Target RNC 4042-T. The SGSN 4042-T may be aware of the congestion load in the target RNC 4042-T, for example, via periodic RAU updates. At call flow part 4012, the target SGSN 4048-T may transmit a create session request to target SGW 264-T. At call flow part 4014, the SGW 264-T may transmit a Create Session Response to Target SGSN 4048-T. At call flow part 4016, the target SGSN 4048-T may transmit a Relocation Request to target RNC 4042-T. The target SGSN 4048-T may also include the source eNodeB congestion load information in the message. The target RNC 4042-T may use this information and store the source eNodeB congestion load status in order to be aware of the congestion load in all adjacent eNodeB/RNC cells and may dynamically decide whether a future handover should proceed in the source eNodeB.

If the target RNC 4042-T has resources to allocate the bearer required, the RNC 4042-T may respond with a Relocation Request ACK, as shown at call flow part 4018. If 'Indirect Forwarding' and relocation of Serving GW apply and Direct Tunnel is used, the target SGSN 4048-T may transmit a Create Indirect Data Forwarding Tunnel Request message (Target RNC Address and TEID(s) for DL user plane data forwarding) to the Serving GW. If 'Indirect Forwarding' and relocation of Serving GW apply and Direct Tunnel is not used, then the target SGSN 4048-T may transmit a Create Indirect Data Forwarding Tunnel Request message (SGSN Address and TEID(s) for DL data forwarding) to the Serving GW. Indirect forwarding may be performed via a Serving GW which is different from the Serving GW used as the anchor point for the WTRU. The Serving GW may return a Create Indirect Data Forwarding Tunnel Response (Cause, Serving GW Address(es) and Serving GW DL TEID(s) for data forwarding) message to the target SGSN 4048-T.

The target SGSN 4048-T may transmit the message Forward Relocation Response (Cause, SGSN Tunnel Endpoint Identifier for Control Plane, SGSN Address for Control Plane, Target to Source Transparent Container, Cause, RAB Setup Information, Additional RAB Setup Information, Address(es) and TEID(s) for User Traffic Data Forwarding, Serving GW change indication) to the source MME 262. The Serving GW change indication may indicate a new Serving GW has been selected. The Target to Source Transparent Container may contain the value from the Target RNC to Source RNC Transparent Container received from the target RNC. The IE 'Address(es) and TEID(s) for User Traffic Data Forwarding' may define the destination tunneling endpoint for data forwarding in target system, and it is set as follows. If 'Direct Forwarding' applies, or if 'Indirect Forwarding' and no relocation of Serving GW apply and Direct Tunnel is used, then the IE 'Address(es) and TEID(s) for User Traffic Data Forwarding' may contain the addresses and GTP-U tunnel endpoint parameters to the target RNC 4048-T previously received. If 'Indirect Forwarding' and relocation of Serving GW apply, then the IE 'Address(es) and TEID(s) for User Traffic Data Forwarding' may contain the address and DL GTP-U tunnel endpoint parameters to the Serving GW previously received. This may be independent from using Direct Tunnel or not. If 'Indirect Forwarding' applies and Direct Tunnel is not used and relocation of Serving GW does not apply, then the IE 'Address(es) and TEID(s) for User Traffic Data Forwarding' may contain the DL GTP-U tunnel endpoint parameters to the target SGSN 4048-T.

If "Indirect Forwarding" applies, the Source MME 262 may transmit the message Create Indirect Data Forwarding Tunnel Request (Address(es) and TEID(s) for Data Forwarding (received in step 7)), EPS Bearer ID(s)) to the Serving GW used for indirect forwarding. Indirect forwarding may be performed via a Serving GW which is different from the Serving GW used as the anchor point for the WTRU. The Serving GW may return the forwarding parameters by transmitting the message Create Indirect Data Forwarding Tunnel Response (Cause, Serving GW Address(es) and TEID(s) for Data Forwarding). If the Serving GW doesn't support data forwarding, an appropriate cause value may be returned and the Serving GW Address(es) and TEID(s) will not be included in the message.

The RNC may take into account its congestion load as criteria to initiate handover. Similarly to the previous procedures, the RNC may provide its congestion load information to an SGSN.

Figure 41:
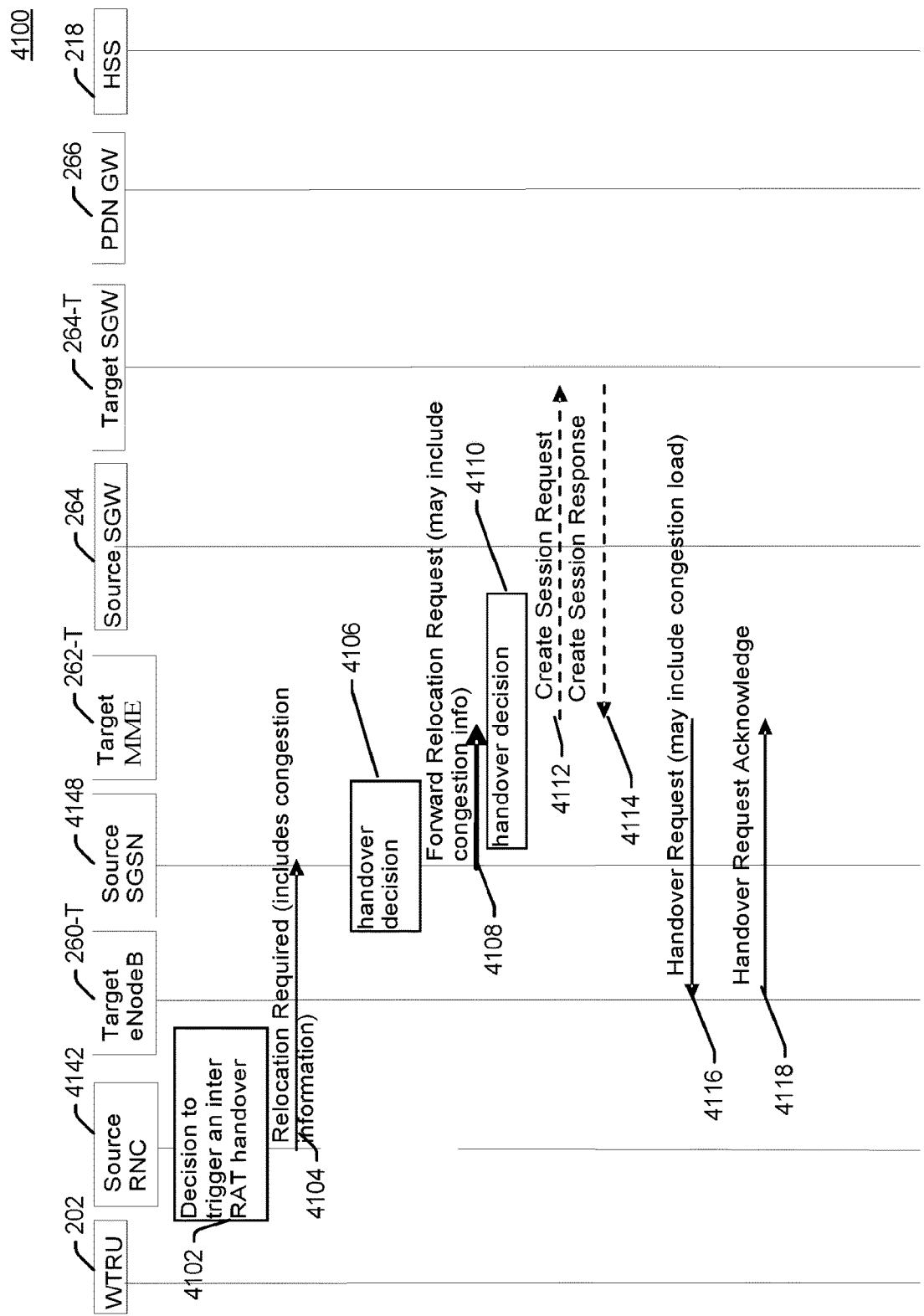
FIG. 41 is an example flow diagram of congestion load information during UTRAN to E-UTRAN inter RAT handover.

FIG. 41 is an example flow diagram of congestion load information during UTRAN to E-UTRAN inter RAT handover. At call flow part 4102, the source RNC 4142 may decide that an inter RAT handover is required. The source RNC 4142 may take into account the current congestion load when deciding to initiate handover. At call flow part 4104, the source RNC 4142 may transmit a Relocation Required message to Source SGSN 4148 including the various parameters The source RNC 4142 may also include congestion load information within the Handover Required message. At call flow part 4106, the source SGSN 4148 may decide whether inter RAT handover should take place. The SGSN 4148 may also use the congestion load in the source eNodeB 260-T in the decision process. At call flow part 4108, the source SGSN 4148 may transmit a Forward Relocation Request to the target MME including various parameters. The source SGSN 418 may also include the source RNC 4142 congestion load information within Forward Relocation Request message.

At call flow part 4111, the target MME 262-T may decide whether handover can proceed. The target MME 262-T may take into account the congestion load in the target eNodeB 260-T. The target MME 262-T may be aware of the congestion load in the target eNodeB, for example, via periodic TAU updates. At call flow part 4112, the target MME 262-T may transmit a create session request to target SGW 262-T. At call flow part 4114, the SGW 262-T may transmit a Create Session Response to target MME 262-TT. At call flow part 4116, the target MME 262-T may transmit a Handover Request to target eNodeB 260-T. The target MME 262-T may also include the source RNC 4142 congestion load information in the message. At call flow part 3908, the target eNodeB 260-T may use this information and store the source RNC congestion load status in order to be aware of the congestion load in all adjacent eNodeB/RNC cells and may dynamically decide whether a future handover should proceed in the source RNC.

If the target eNodeB 260 has resources to allocate the bearer required, the eNodeB may respond with a Relocation Request ACK, as shown at call flow part 4118. If 'Indirect Forwarding' and relocation of Serving GW apply, the target MME 262-T may transmit a Create Indirect Data Forwarding Tunnel Request message (Target eNodeB Address, addresses and TEID(s) for DL data forwarding) to the Serving GW. Indirect forwarding may be performed via a Serving GW which is different from the Serving GW used as the anchor point for the WTRU 202. The Serving GW may return a Create Indirect Data Forwarding Tunnel Response (Cause, Serving GW Address(es) and Serving GW DL TEID(s) for data forwarding) message to the target MME 262-T.

The target MME 262-T may transmit the message Forward Relocation Response (Cause, List of Set Up RABs, MME Tunnel Endpoint Identifier for Control Plane, RAN Cause, MME Address for control plane, Target to Source Transparent Container, Address(es) and TEID(s) for Data Forwarding, Serving GW change indication) to the source SGSN 4148. The Serving GW change indication may indicate whether a new Serving GW has been selected. The Target to Source Transparent Container includes the value from the Target to Source Transparent Container received from the target eNodeB. The IE 'Address(es) and TEID(s) for Data Forwarding' may define the destination tunneling endpoint for data forwarding in target system, and it is set as follows. If 'Direct Forwarding' applies or if 'Indirect Forwarding' but no relocation of Serving GW applies, then the IEs 'Address(es) and TEID(s) for Data Forwarding' may contain the forwarding DL GTP-U tunnel endpoint parameters to the eNodeB received in step 5a. If 'Indirect Forwarding' and relocation of Serving GW apply, the IEs 'Address(es) and TEID(s) for Data Forwarding' may contain the DL GTP-U tunnel endpoint parameters to the Target eNodeB or to the forwarding Serving GW previously received.

If "Indirect Forwarding" applies, the source SGSN 4148 may transmit the message Create Indirect Data Forwarding Tunnel Request (Address(es) and TEID(s) for Data Forwarding (received in step 7)) to the Serving GW used for indirect forwarding. Indirect forwarding may be performed via a Serving GW which is different from the Serving GW used as the anchor point for the WTRU 202. The Serving GW may return the forwarding user plane parameters by transmitting the message Create Indirect Data Forwarding Tunnel Response (Cause, Serving GW Address(es) and TEID(s) for DL Data Forwarding). If the Serving GW doesn't support data forwarding, an appropriate cause value may be returned and the Serving GW Address(es) and TEID(s) may not be included in the message.

Example Systems and Methods for Congestion Management

Figure 42:
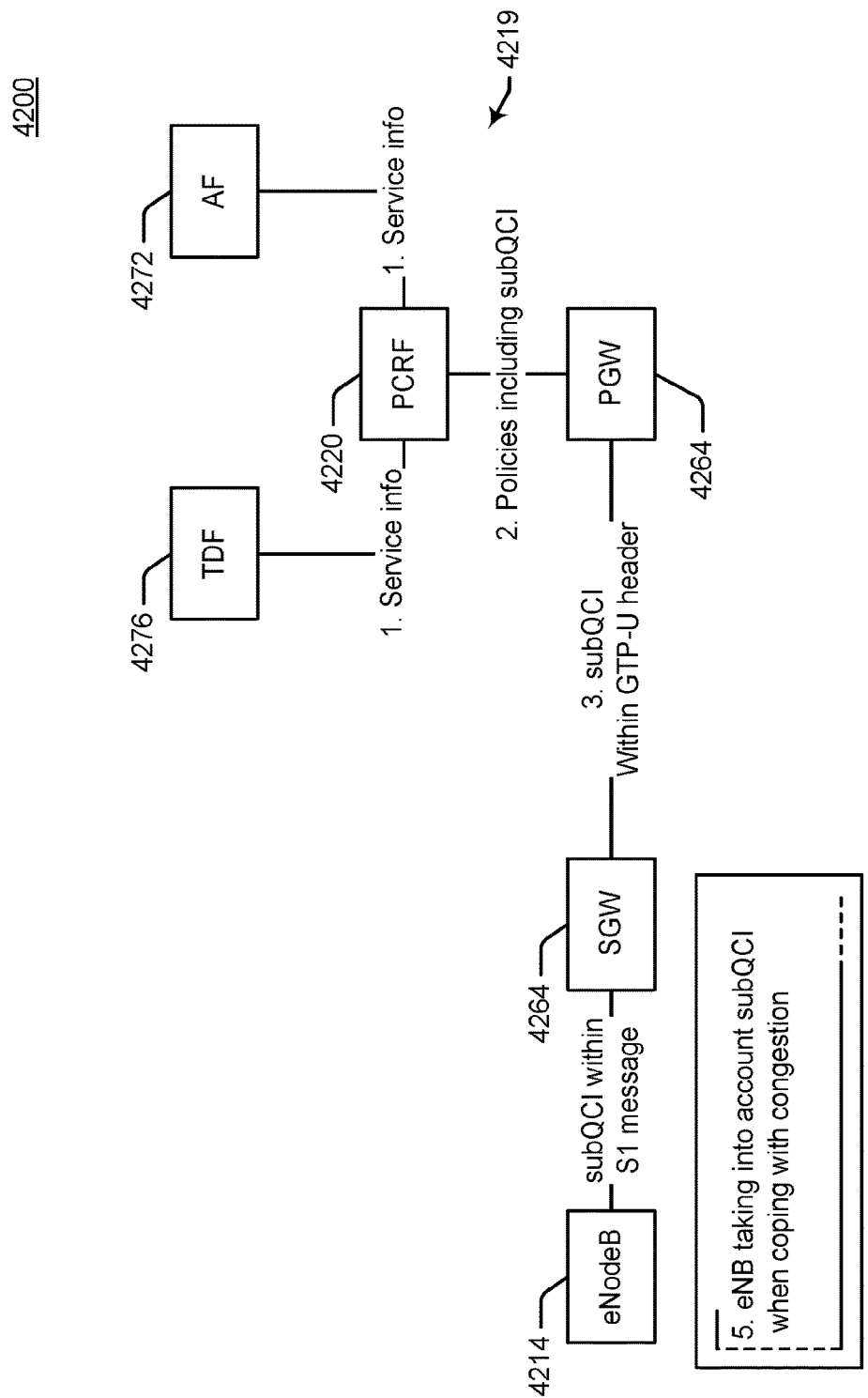
FIG. 42 is a block diagram illustrating an example of a communications system in which one or more embodiments may be implemented

FIG. 42 is a block diagram illustrating an example of a communications system 4200 in which one or more embodiments may be implemented. The communications system 4200 may include an eNodeB 4214, a SGW 4264, a PGW 4266, and elements of a PCC system 4219, including a PCRF 4220, a TDF 4276 and an AF 4272.

The communications system 4200 may be well suited for carrying out one or more methods for managing or otherwise handling (e.g., detecting, reporting, reacting to, mitigating and/or abating) congestion. These methods may be suitable for managing or otherwise handling congestion that persists for a short time period ("short-term congestion"), a long time period ("long-term" or "sustained" congestion), and/or various other time periods, including, for example, short-to-long time periods ("short-term to long-term/sustained congestion"). Overlaid on the communications system 4200 are (i) various types of information that the elements of the communications system 4200 might exchange, and/or (ii) high-level statements that the elements of the communications system 4200 might carry out when performing one or more of the methods for managing or otherwise handling congestion.

In various embodiments, the methods may manage or otherwise handle the congestion, at least in part, by differentiating traffic (e.g., IP flows) within a default or dedicated bearer (e.g., a bearer with an assigned QCI) into multiple traffic sub-classes, and prioritizing the traffic (IP flows) sent over such bearer. The differentiation and prioritization may be based on respective priorities assigned to the multiple traffic sub-classes (e.g., by way of sub-QCIs, such as provided infra and/or supra).

In an embodiment, traffic/IP flows sent over the same bearer (e.g., a bearer with an assigned QCI) may be differentiated and/or prioritized by assigning to different portions of the traffic (e.g., to the IP flows or portions thereof) respective sub-QCIs. Such differentiation and/or prioritization, in an embodiment, may be useful for mitigating congestion on a downlink. For example, the PCRF 4220 may assign and/or apply sub-QCIs (and/or accompanying parameters, if any) to traffic/IP flows that are sent over the same bearer (e.g., a bearer with an assigned QCI) within PCC rules provided to the PGW 4266. The PCRF 4220 may decide on which sub-QCIs to assign and/or apply to the traffic/IP flows based on (e.g., taking into account) various information. This information may include information available to, or otherwise obtainable by, the PCRF 4220. Examples of the information may include user subscriber information from a HSS/SPR (not shown), service information (denoted "1." in FIG. 42) provided by the TDF 4276 and/or the AF 4272, and the like.

By taking into account application information from the TDF 4276 and/or the AF 4272 when deciding on which sub-QCIs to assign and/or apply to the traffic/IP flows, the PCRF 4220 may select a sub-QCI (and/or accompanying parameters) that is commensurate with the application(s) sensitivity to congestion. For example, the PCRF 4220 may select, assign and/or apply a sub-QCI (and/or accompanying parameters) for signaling low priority traffic ("low-priority sub-QCI") to traffic/IP flows of applications that can usually cope with congestion (e.g., are less sensitive than other applications), such as social networking, chat applications, etc. Alternatively and/or additionally, the PCRF 4220 may select, assign and/or apply a sub-QCI (and/or accompanying parameters) for signaling high priority traffic ("high-priority sub-QC") to traffic/IP flows of applications that are usually sensitive to congestion, such as, video streams, ftp downloads, etc.

By taking into account subscription information from the HSS/SPR when deciding on which sub-QCIs to assign and/or apply to the traffic/IP flows, the PCRF 4220 may select a sub-QCI (and/or accompanying parameters) that is commensurate with a user's service level or multiple users' service levels. For example, if the PCRF 4220 is aware (e.g., via interaction with the HSS/SPR) that a particular user is a "gold" or other premium level subscriber, the PCRF 4220 may assign a high-priority sub-QCI (and/or accompanying parameters) to all the traffic/IP flows of the services run by such user.

The sub-QCIs selected, assigned and/or applied in any of the examples infra and/or supra may be sub-QCIs for signaling priorities with more granularity than merely low-priority and high priority. For example, the sub-QCIs selected, assigned and/or applied may be sub-QCIs for signaling priorities based on three or more levels of priority.

In an embodiment, multiple levels of sub-QCI based traffic/flow differentiation may be used by allowing a range of sub-QCIs (and/or accompanying parameters) to differentiate between various levels of priorities (e.g., low-priority and high-priority) traffic sent over the same bearer (e.g., a bearer with an assigned QCI). Such approach may allow the PCRF 4220 to separate packets to prevent or minimize traffic shaping by the eNodeB 4214. This may occur, for example, as a result of assigning appropriate (e.g., higher) priority sub-QCIs (and/or accompanying parameters) to the packets that are to separated to prevent or minimize traffic shaping by the eNodeB 4214, and by assigning an appropriate (e.g., low) priority sub-QCI (and/or accompanying parameters) to packets that do not impact the QoE of a service and/or can be efficiently discarded.

Different operators may have different levels of sub-QCI based traffic/flow differentiation. This may be problematic when roaming. One method to resolve this issue may be to define a set of standardized sub-QCIs (and/or accompanying parameters). Examples of such sub-QCIs (and/or accompanying parameters) are provided above in Tables 2, 3 and 4 along with accompanying text. Other standardized sub-QCIs (and/or accompanying parameters) may be based on or derived from the recommended QCI parameters defined in Table 6.1.7 of 3GPP TS 42.203.

The PGW 4266 may receive PCC rules containing the sub-QCI(s) (and/or accompanying parameters). For a packet subject to sub-QCI based flow differentiation, the PGW 4266 may append, insert, populate or otherwise dispose sub-QCI information in a GTP header and/or other layer header of such packet. The GTP header may be, for example, a GTP-U header (as denoted "3." in FIG. 42). Alternatively and/or additionally, the GTP header may be a GTP-C header. The sub-QCI information carried in the (e.g., GTP-U) header may include the sub-QCI(s) and/or the accompanying parameters. The sub-QCI information may be represented as a scalar value (e.g., a number from 0-255). The sub-QCI information may be represented and/or formatted in other ways, as well (e.g., as a composite value multiplexed with other information).

The eNodeB 4214 may inspect (e.g., GTP-U) headers of received traffic/IP flows for sub-QCI information. The eNodeB 4214 may identify and/or keep track of priorities of the traffic/IP flows, if any, based on the sub-QCI information disposed in and/or garnered from the headers of the received traffic/IP flows. As an example, the eNodeB 4214 may maintain and/or have access to standardized sub-QCI characteristics. These standardized sub-QCI characteristics may include standardized priorities for traffic/IP flows labeled or associated with standardized sub-QCIs and/or their accompanying parameters. The eNodeB 4214 may determine the priorities of the received traffic/IP flows by performing a mapping between (or otherwise comparing) the sub-QCI information disposed in and/or garnered from the (e.g., GTP-U) headers and the standardized sub-QCI characteristics (e.g., the standardized priorities). The standardized sub-QCI characteristics may be pre-configured or dynamically provisioned into the eNodeB 4214.

Alternatively and/or additionally, the eNodeB 4214 may determine the priorities of traffic/IP flows by interpreting (or based on interpretation(s) of) the sub-QCI information disposed in and/or garnered from the (e.g., GTP-U) headers. In an embodiment, determining the priorities of traffic/IP flows by interpreting (or based on interpretation(s) of) the sub-QCI information may avoid an overhead associated with mapping and/or look-up operations.

The eNodeB 4214 may use the sub-QCI information to prioritize traffic/IP flows sent over the same bearer (e.g., a bearer with an assigned QCI) when congestion occurs. For example, the eNodeB 4214 may discard/drop some or all of the traffic/IP flows having priorities that fail to satisfy a threshold ("lower-priority traffic/IP flows"). By discarding the lower-priority traffic/IP flows, user-impacting congestion might be mitigated and/or prevented. Such mitigation and/or prevention may depend on the congestion situation. For example, the eNodeB 4214 may mitigate congestion by discarding packets of the lower-priority traffic/IP flows for short-term congestion scenarios. In cases of sustained congestion when discarding/dropping packets of the lower-priority traffic/IP flows does not resolve user plane congestion, the eNodeB 4214 may start discarding/dropping packets of some or all of the traffic/IP flows having priorities that satisfy the threshold ("higher-priority traffic/IP flows"). The eNodeB 4214 may, for example, discard/drop packets of the higher-priority traffic/IP flows in reverse order of precedence. Notwithstanding this hierarchical approach, end user-impacting congestion might occur due to discarding packets of higher-priority traffic/IP flows might result in application service degradation and/or reduced QoE.

Although inclusion of sub-QCI information in the GTP header for use in differentiating and/or prioritizing traffic/IP flows mapped to the same QCI (bearer) in support of congestion mitigation as provided above, it is to be understood that the usage of sub-QCI(s) and/or accompanying parameters may or may not imply classification of traffic/IP flows mapped to the same QCI (bearer) into sub-classes. Each IP flow may be individually discriminated using the sub-QCI information. In an embodiment, an IP flow may be identified directly from one or more other IP flows mapped to the same QCI (bearer) by the inclusion of a packet flow identifier within the GTP header. The packet flow identifier may be coded to convey both an identity and priority of a specific packet flow. In an embodiment, the packet flow identifier may be coded over a number of bits (e.g., 8 bits). A portion (e.g, half) of the bits may be used to represent the packet flow identity, and another portion (e.g., half) may used to represent the priority value of each of the packet flow. Similarly, the sub-QCI may be coded over a number of bits (e.g., 8 bits). A portion (e.g, half) of the bits may be used to represent the sub-QCI scalar value, and another portion (e.g., half) may be used to represent the priority value of each of the sub-QCIs.

In cases of sustained congestion, the procedure for mitigating congestion using the sub-QCI based traffic/flow differentiation (e.g., by discarding packets based priorities signaled by sub-QCI information) might not be adequate to protect against user-impacting congestion. For example, the packet drop rate at the eNodeB 4214 may be higher than an application minimum packet drop requirements to deliver the service. In such cases (as well as in others), the eNodeB 4214 may inform the PCRF 4220, through bearer traffic, that the eNodeB 4214 is experiencing sustained congestion. The PCRF 4220 may decide on measures to mitigate the congestion. The measures may be, for example, throttling of certain traffic. The PCRF 4220 may take into account user subscription profile as well as the application(s) run by the user.

Figure 43:
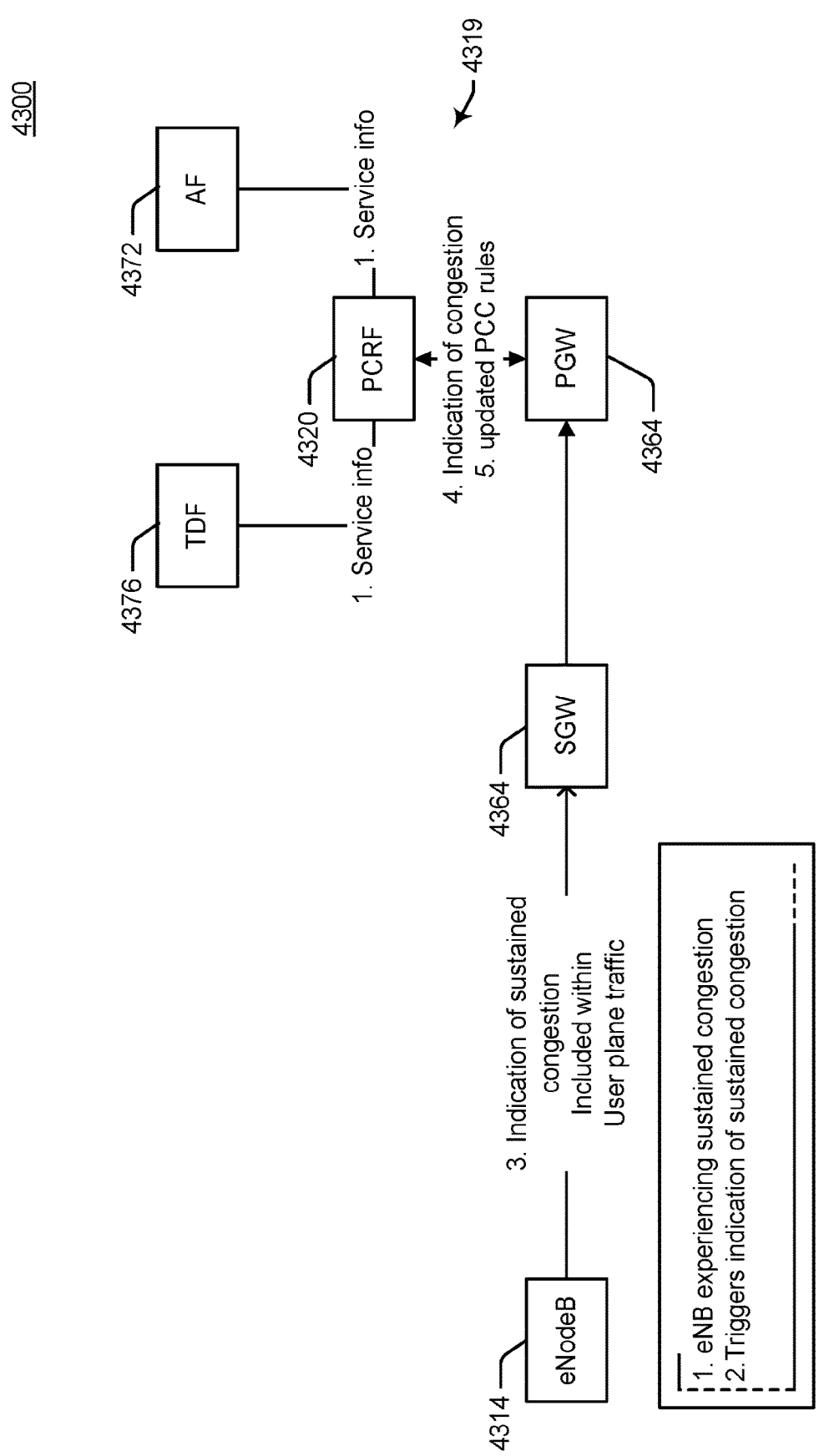
FIG. 43 is a block diagram illustrating an example of a communications system in which one or more embodiments may be implemented.

FIG. 43 is a block diagram illustrating an example of a communications system 4300 in which one or more embodiments may be implemented. The communications system 4300 may include an eNodeB 4314, a SGW 4364, a PGW 4366, and elements of a PCC system 4319, including a PCRF 4320, a TDF 4376 and an AF 4372.

The communications system 4300 may be well suited for carrying out one or more methods for managing or otherwise handling (e.g., detecting, reporting, reacting to, mitigating and/or abating) congestion. These methods may be suitable for managing or otherwise handling congestion that persists for a short time period ("short-term congestion"), a long time period ("long-term" or "sustained" congestion), and/or various other time periods, including, for example, short-to-long time periods ("short-term to long-term/sustained congestion"). Overlaid on the communications system 4300 are (i) various types of information that the elements of the communications system 4300 might exchange, and/or (ii) high-level statements that the elements of the communications system 4300 might carry out when performing one or more of the methods for managing or otherwise handling congestion.

The eNodeB 4314 may report its congestion status when the measures taken at the eNodeB 4314 to mitigate congestion are not sufficient to resolve congestion (e.g., according to operator requirements). The eNodeB 4314 may report its congestion status to the network (e.g., the core network) based on an operator configuration. For example, an operator may configure the eNodeB 4314 to report its congestion when more than 30% of the packets of low-priority traffic/IP flows are discarded/dropped due to congestion and/or congestion mitigation procedures. In an embodiment, an operator may configure the eNodeB 2114 to report its congestion when the eNodeB 2114 starts discarding packets of higher-priority traffic/IP flows. In an embodiment, an operator may configure the eNodeB 4314 to report congestion when the QoS requirements of the bearer can no longer be fulfilled. For example, for Services using a Non_GBR QCI, if after dropping packets as a result of congestion, more than a given percentage (e.g., 2%) of the packets that have not been dropped due to congestion experience a delay exceeding the QCI packet delay budget, the eNodeB 4314 may report its congestion to the PCRF 4320. Similarly, for services using a GBR QCI, if more than a given percentage (e.g., 2%) of the packets experience a delay exceeding the QCI packet delay budget, then the eNodeB 4314 may report its congestion to the PCRF 4320.

Congestion status reporting by the eNodeB 4314 may be carried out in different ways, including, for example, based on the scope of congestion ("congestion-scope reporting"). Congestion-scope reporting by the eNodeB 4314 may include one or more of the following:

Per PDN connection reporting: the eNodeB 4314 may use the "per PDN connection reporting" to indicate that the scope of the congestion indication applies to all of the bearers within the PDN connection. The eNodeB 4314 may include its congestion status, for example, within GTP-U headers via S1-U on user PDN connection(s) that experience congestion, such as user-impacting congestion (e.g. higher packet drop rate) due to RAN user plane congestion. In an embodiment, the congestion indication may apply to all of bearers within the PDN connections regardless of tunnel or bearer within that PDN connection over which the packet(s) carrying the congestion indication is received.

Per eNodeB reporting: the eNodeB 4314 may use the "per eNodeB reporting" to indicate that the scope of the congestion indication applies to all of the bearers and PDN connections bound to the (this) eNodeB 4314. The eNodeB 4314 may include its congestion status for all PDN connections sent over the congested eNodeB 4314 within, for example, GTP-U headers via S1-U. The eNodeB 4314 may include its eNodeB ID. Such approach may allow the PCRF 2120 to be aware of all of the PDN connections sent over the congested eNodeB 4314. In an embodiment where multiple PCRFs are deployed within an operator realm, all traffic under a certain eNodeB likely need to be routed towards the same PCRF.

Per APN reporting: the eNodeB 4314 may use the "per APN reporting" to indicate that the scope of the congestion indication applies to all PDN connections toward a particular packet data network or internet domain.

Per UE reporting: the eNodeB 4314 may use the "per UE reporting" to indicate that the scope of the congestion indication applies to all PDN connections bound to a particular WTRU.

Per Bearer reporting: the eNodeB 4314 may use the "per Bearer reporting" to indicate that the scope of the congestion indication applies to the bearer over which the traffic/IP flow packet (e.g., GTP-U packet) carrying the indication is received.

Per service data flow reporting: the eNodeB 4314 may use the "per service data flow reporting" to indicate that the scope of the congestion indication applies to a service data flow.

Per sub-QCI reporting: the eNodeB 4314 may use the "per sub-QCI reporting" to indicate that the scope of the congestion indication applies at a sub-QCI level.

Per IP flow or packet flow reporting: the eNodeB 4314 may use the "per IP flow or packet flow reporting" to indicate that the scope of the congestion indication applies at an IP flow level.

In an embodiment, the eNodeB 4314 may indicate the congestion scope together with the congestion indication or other congestion information in the GTP-U header.

The type of congestion scope reporting to be used may be negotiated between a WTRU and the core network (e.g., a MME (not shown), the SGW 4364, and/or PGW 4366 over S1C/GTP-C). Alternatively the type of congestion indication scope reporting to be used may be established via configuration (e.g., pre-configuration or OA&M).

The PGW 4366 (and/or PCEF) may extract the information (congestion indication and/or eNodeB ID) from the GTP-U packets, and report such information to the PCRF 4320. The reporting may be carried out over the Gx reference point.

The PCRF 4320 may avail itself to one or more of the following.

Per PDN connection congestion mitigation: The PCRF 4320 may use "per PDN connection congestion mitigation" when, for example, the PCRF 4320 is aware that a particular PDN connection of a user may experience user-impacting congestion due to sustained RAN user plane congestion. The PCRF 4320 may take action(s) to ensure that PDN connections sent via a congested cell have sufficient resources to run services without resulting in user-impacting congestion. The PCRF 4320 may take into account the user subscription profile and application(s) type when determining which actions to take.

Per eNodeB congestion mitigation: The PCRF 4320 may use "per eNodeB congestion mitigation", when, for example, the PCRF 4320 is aware that PDN connection(s) sent via a RAN congested eNodeB may result in user-impacting congestion. The PCRF 4320 may take action(s) to resolve congestion on the particular eNodeB by managing all user traffic sent over the congested eNodeB. The PCRF 4320 may take into account the subscription profile, application type and other parameters available at the PCRF 4320 (e.g. volume usage) to decide on updated PCC rules to mitigate congestion.

Per APN congestion mitigation: The PCRF 4320 may use "per APN congestion mitigation", when, for example, the PCRF 4320 is aware that PDN connections sent to particular packet data network domain are subject to congestion mitigation procedures. The PCRF may take into account the subscription profile, application type and other parameters available at the PCRF 4320 (e.g. volume usage) to decide on updated PCC rules to mitigate congestion.

Per UE congestion mitigation: The PCRF 4320 may use "per UE congestion mitigation", when, for example, the PCRF 4320 is aware that all active PDN connection(s) of a user may experience user-impacting congestion due to sustained RAN user plane congestion. The PCRF 4320 may take action(s) to ensure that PDN connections sent via a congested cell have sufficient resources to run services without resulting in user-impacting congestion. The PCRF 4320 may take into account the user subscription profile and application(s) type when determining which actions to take.

Per service data flow congestion mitigation: The PCRF 4320 may use "per service data flow congestion mitigation", when, for example, the PCRF 4320 is aware that particular service data flows of a PDN connection sent via a RAN congested eNodeB may experience user-impacting congestion. The PCRF 4320 may take into account the subscription profile, application type and other parameters available at the PCRF 4320 (e.g. volume usage) to decide on updated PCC rules to mitigate congestion for the particular service data flow.

Per sub-QCI congestion mitigation: The PCRF 4320 may use "per sub-QCI congestion mitigation", when, for example, the PCRF 4320 is aware that service data flows of a PDN connection having a specific sub-QCI sent via a RAN congested eNodeB may experience user-impacting congestion. The PCRF 4320 may take into account the subscription profile, application type and other parameters available at the PCRF (e.g. volume usage) to decide on updated PCC rules to mitigate congestion for the service data flows of the same sub-QCI.

Per IP flow or packet flow congestion mitigation: The PCRF 4320 may use "per IP flow or packet flow congestion mitigation", when, for example, the PCRF 4320 is aware that particular IP flow(s) of a PDN connection sent via a RAN congested eNodeB may experience user-impacting congestion. The PCRF may take into account the subscription profile, application type and other parameters available at the PCRF 4320 (e.g. volume usage) to decide on updated PCC rules to mitigate congestion for the particular IP flows.

Figure 44:
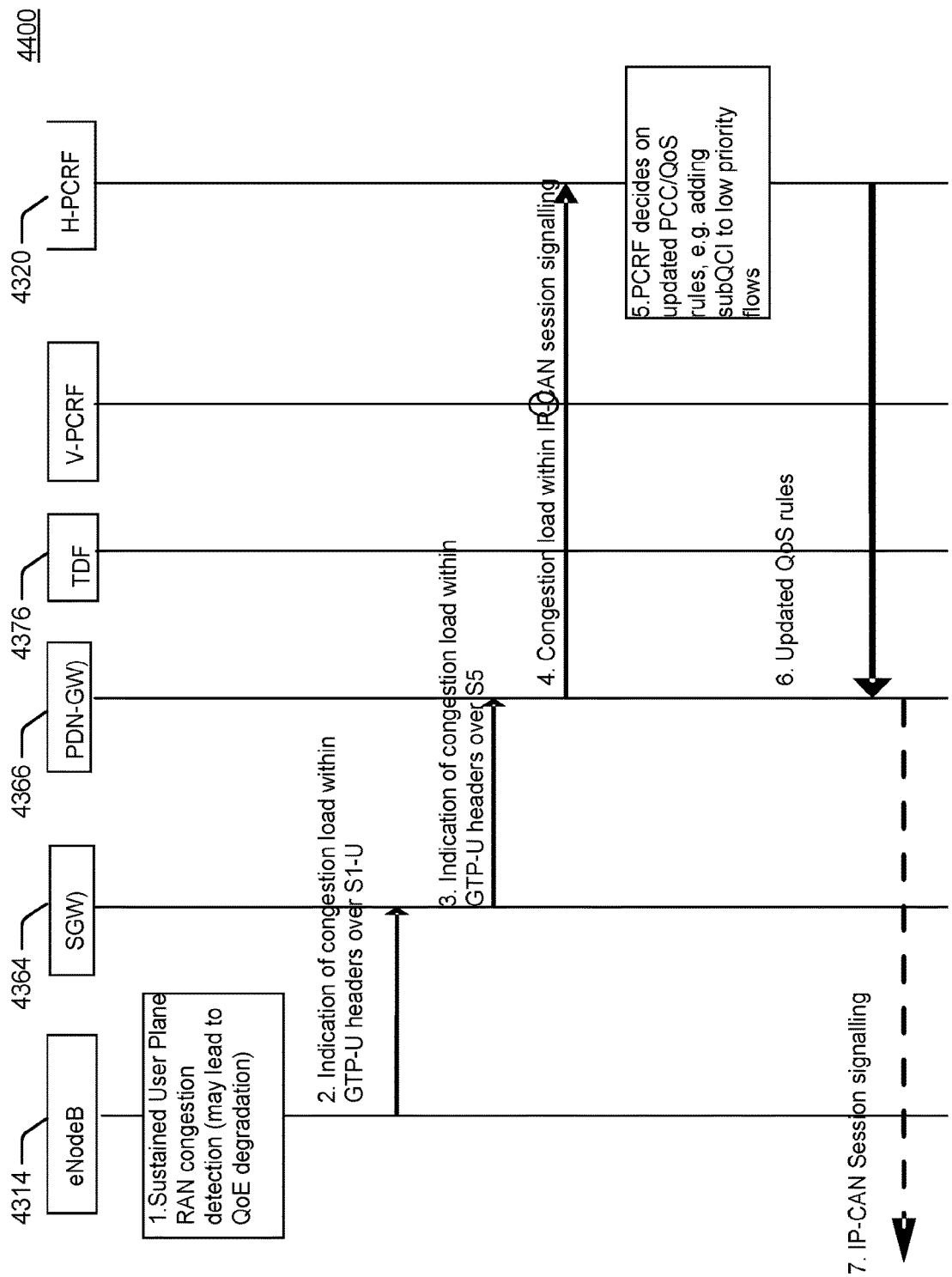
FIG. 44 is a call-flow diagram illustrating an example call flow in accordance with one or more embodiments.

Per bearer congestion mitigation: The PCRF 4320 may use "per bearer congestion mitigation", when, for example, the PCRF 4320 is aware that a particular bearer of a PDN connection sent via a RAN congested eNodeB may experience user-impacting congestion. The PCRF 4320 may take into account the subscription profile, application type and other parameters available at the PCRF 4320 (e.g. volume usage) to decide on updated PCC rules to mitigate congestion for the particular IP flows Referring now to FIG. 44, a call-flow diagram illustrating an example call flow 4400 is shown. The call flow 4400 is described with reference to the communications system 4300 for simplicity of exposition. The call flow 4400 may be carried out in other communications systems, as well. The call flow 4400 may be suitable for managing and/or handling congestion pursuant to RAN congestion feedback to PCRF 4320.

At call flow part 1, the eNodeB 4314 may detect that measures for mitigating congestion using the sub-QCI based traffic/flow differentiation (e.g., by discarding packets based priorities signaled by sub-QCI information) might not be adequate to resolve congestion. For example, the packet drop rate of IP flows is high for a long period of time that may lead to QoE degradation of the service delivered.

At call flow part 2, the eNodeB 4314 may decides to inform the core network of sustained RAN user plane congestion that may lead to service QoE degradation. The eNodeB 4314 may include a congestion indication and/or its cell ID within GTP-U headers sent over S1-U reference point to SGW 4364.

At call flow part 3, the SGW 4364 may extract the information and send the congestion indication and/or cell id within GTP-U headers over GTP S5 towards PGW 4366.

At call flow part 4, the PGW 4366 may extract the congestion indication and/or cell ID (if available), and inform the PCRF 4320 (e.g., through PCC signaling via Gx reference point).

At call flow part 5, the PCRF 4320 may decide on updated PCC rules in view of the congestion indication. The PCRF 4320 may take into account the subscription profile from the HSS/SPR (e.g., over Sp reference point); application type from TDF (e.g., over Sy reference point); usage monitoring reports from the PGW 4366; and/or charging limit reports. For example, the PCRF 4320 may decide to throttle low priority traffic/IP flows by reducing the assigned MBR value. Alternatively and/or additionally, the PCRF 4320 may add sub-QCI for signaling lower-priority traffic/IP flows to such traffic. Details on PCRF decision based on congestion information are provided above and in the '550 application.

At call flow part 6, the PCRF may provide updated PCC rules to a PCEF (e.g., in PGW 4366). The updated rules may be provided over the Gx reference point.

At call flow part 7, the PCEF (e.g., in PGW 4366) may enforce the updated PCC rules on the applicable bearers.

The congestion indication may be used to support other congestion mitigation solutions. For example, the congestion indication may be sent to an ANDSF server over an interface between an eNodeB and the ANDSF server; such as the interface shown in FIGS. 2C-2G. In an embodiment, the ANDSF MO may include a new IE that accounts for network congestion status, and has different rules if the congestion is indicated. On obtaining the congestion indication, the ANDSF server may simply relay the information to the WTRUs. The ANDSF offload rules may take the congestion status into account in deciding which traffic flows should be offloaded. If, for example, the congestion status is set, additional traffic flows or all traffic flows may become eligible to be offloaded.

The congestion status may be a binary (on/off) or a number within a range or a percentage indicating the level of congestion in the cell or a level (high/medium/low). The ANDSF MO may have policy rules to include congestion level in the decision rules to decide how traffic should be considered for offloading.

In an embodiment, the thresholds that trigger offload may be reconfigured by the ANDSF server for all or subset of WTRUs in the congested cells.

Congestion Indication Transmission Examples

An eNodeB may use different mechanisms to determine whether a congestion indication (flag) should be sent for a particular S1-U flow. In an embodiment, if the cell is congested, then the eNodeB may set the congestion indication for all traffic bearers for all WTRUs with downlink traffic in the cell. In an embodiment, the congestion may be determined only in downlink or uplink direction, and the eNodeB may set the congestion indication for WTRUs that have significant traffic in the direction of the congestion. In an embodiment, the eNodeB may set S1-U congestion indication in the S1-U of the default bearer for every user in the cell. In an embodiment, the congestion indication may be sent for the WTRUs the eNB explicitly needs to be throttled.

The congestion indication may also indicate the level of congestion, either explicitly or implicitly. In an embodiment, the receiving core network entity may maintain a statistical average of all the congestion indication notifications received from a particular cell, and may use such information to determine a degree of congestion in the particular cell. The degree of congestion information may be used either by the PCRF/PGW to throttle flows, and/or may be sent to the ANDSF server to determine how many flows need to be offloaded.

The congestion indication may also indicate the cell Id that is congested.

The ANDSF policy rules may be considered to prioritize RATs to take congestion into account. In an embodiment, in case there is no congestion on a cellular access, the cellular RAT/access may be considered as a primary RAT/access. In case of congestion, the offload to a Wi-Fi is configured for all traffic flows.

The congestion indications may be sent to the core network in many ways. In one embodiment and as discussed above, the eNodeB may send congestion indication and the supporting information such as congestion direction, congestion scope and the congestion level (low, medium, high, extreme or a value between a range of 0 and 100 for example where each value is standardized to correspond to a certain congestion level), to the PGW (via SGW) in the GTP-U header. The PGW may use all or any of the received information to decide on congestion mitigation action.

In an embodiment, the eNodeB may send the congestion indication and the supporting information such as congestion direction, congestion scope and congestion level may be signaled to the CN in the control plane for example using the S1-C and GTP-C interfaces. In this case (and other cases as well), the MME may receive from the eNodeB, the congestion indication and the supporting information and relay that information over the GTP-C interface to the SGW which then relates it to the PGW over the GTP-C interface. The PGW may use all or any of the received information to decide on congestion mitigation action.

In an embodiment, a hybrid procedure may be used. This hybrid procedure may be a combination of at least a portion of each of the other embodiments above For example, the congestion scope reporting may be signaled/negotiated with the CN (e.g. MME/SGW/PGW) over S1-C/GTP-C while the congestion indication, congestion direction or congestion level are signaled to the PGW (via SGW) over the GTP-U interface. The PGW may use all or any of the received information to decide on congestion mitigation action.

Details of other procedures for reporting congestion to the core network and for mitigating such reported congestion may be found in U.S. Patent application Ser. No. 61/673, 366, filed 19 Jul. 2012, which is incorporated herein by reference.

Embodiments

In at least one representative embodiment, a method for mitigating user plane congestion may include any of: receiving a general packet radio system (GPRS) tunneling protocol (GTP) packet including a first internet protocol (IP) packet associated with a first flow within a bearer; and obtaining, from a header of the GTP packet, an indicator indicative of a priority of the first IP packet.

In at least one representative embodiment, the method may include dropping any of the GTP packet and the first IP packet on condition that a priority of a second IP packet associated with a second flow within the bearer takes precedence over the priority of the first IP packet. In at least one representative embodiment, dropping any of the GTP packet and the first IP packet may include dropping any of the GTP packet and the first IP packet responsive to user plane congestion and on condition that the priority of the second IP packet takes precedence over the priority of the first IP packet.

In at least one representative embodiment, the method may include performing queue management to en-queue the first IP packet and to de-queue a second IP packet that is associated with a second flow and that persists in a queue on condition that the priority of the first IP packet takes precedence over a priority of the second IP packet. In at least one representative embodiment, the queue management may be performed responsive to user plane congestion and on condition that the priority of the first IP packet takes precedence over the priority of the second IP packet.

In at least one representative embodiment, the method may include performing queue management to de-queue one or more of IP packets associated with the first flow on condition that a priority of a second IP packet associated with a second flow takes precedence over the priority of the first IP packet. In at least one representative embodiment, the queue management may be performed responsive to user plane congestion and on condition that the priority of the second IP packet takes precedence over the priority of the first IP packet.

In at least one representative embodiment, the method may include: (i) performing a first queue management to de-queue a second IP packet persisting in a queue on condition that a priority of the second IP packet is the same as the priority of the first IP packet; and/or (ii) performing a second queue management to de-queue the second IP packet on condition that the priority of the first IP packet takes precedence over a priority of the second IP packet.

In at least one representative embodiment, the first queue management may be performed responsive to user plane congestion and on condition that a priority of a second IP packet persisting in a queue is the same as the priority of the first IP packet. In at least one representative embodiment, the second queue management may be performed responsive to user plane congestion and on condition that the priority of the first IP packet takes precedence over the priority of the second IP packet.

In at least one representative embodiment, the method may include delaying scheduling of the first IP packet on condition that a priority of a second IP packet associated with another flow within the bearer takes precedence over the priority of the first IP packet. In at least one representative embodiment, delaying scheduling of the IP packet may include delaying scheduling of the IP packet responsive to user plane congestion and on condition that the priority of the second IP packet takes precedence over the priority of the first IP packet.

In at least one representative embodiment, the method may include scheduling the first IP packet ahead of second IP packet associated with a second flow within the bearer on condition that the priority of the first IP packet takes precedence over a priority of the second IP packet associated. In at least one representative embodiment, scheduling the first IP packet occurs responsive to user plane congestion and on condition that the priority of the first IP packet takes precedence over a priority of the second IP packet.

In at least one representative embodiment, the first and second flows may be associated with first and second applications, respectively. In at least one representative embodiment, the first and second flows are associated with the same application.

In at least one representative embodiment, the method may include detecting the user plane congestion.

In at least one representative embodiment, the method may be implementable by a base station and/or a serving gateway.

In at least one representative embodiment, an apparatus may include a processor, wherein the processor may be configured to: receive a general packet radio system (GPRS) tunneling protocol (GTP) packet including a first internet protocol (IP) packet associated with a first flow within a bearer; and/or obtain, from a header of the GTP packet, an indicator indicative of a priority of the first IP packet.

In at least one representative embodiment, the processor may be configured to drop any of the GTP packet and the first IP packet on condition that a priority of a second IP packet associated with a second flow within the bearer takes precedence over the priority of the first IP packet. In at least one representative embodiment, the processor may be configured to drop any of the GTP packet and the first IP packet responsive to user plane congestion and on condition that the priority of the second IP packet takes precedence over the priority of the first IP packet.

In at least one representative embodiment, the processor may be configured to perform queue management to en-queue the first IP packet and to de-queue a second IP packet that is associated with a second flow and that persists in a queue on condition that the priority of the first IP packet takes precedence over a priority of the second IP packet. In at least one representative embodiment, the queue management may be performed responsive to user plane congestion and on condition that the priority of the first IP packet takes precedence over the priority of the second IP packet.

In at least one representative embodiment, the processor may be configured to perform queue management to de-queue one or more of IP packets associated with the first flow on condition that a priority of a second IP packet associated with a second flow takes precedence over the priority of the first IP packet. In at least one representative embodiment, the queue management may be performed responsive to user plane congestion and on condition that the priority of the second IP packet takes precedence over the priority of the first IP packet.

In at least one representative embodiment, the processor may be configured to (i) perform a first queue management to de-queue a second IP packet persisting in a queue on condition that a priority of the second IP packet is the same as the priority of the first IP packet; and/or (ii) perform a second queue management to de-queue the second IP packet on condition that the priority of the first IP packet takes precedence over a priority of the second IP packet.

In at least one representative embodiment, the first queue management may be performed responsive to user plane congestion and on condition that a priority of a second IP packet persisting in a queue is the same as the priority of the first IP packet. In at least one representative embodiment, the second queue management may be performed responsive to user plane congestion and on condition that the priority of the first IP packet takes precedence over the priority of the second IP packet.

In at least one representative embodiment, the processor may be configured to delay scheduling of the first IP packet on condition that a priority of a second IP packet associated with another flow within the bearer takes precedence over the priority of the first IP packet. In at least one representative embodiment, the processor may be configured to delay scheduling of the IP packet responsive to user plane congestion and on condition that the priority of the second IP packet takes precedence over the priority of the first IP packet.

In at least one representative embodiment, the processor may be configured to schedule the first IP packet ahead of a second IP packet associated with a second flow within the bearer on condition that the priority of the first IP packet takes precedence over a priority of the second IP packet. In at least one representative embodiment, scheduling of the first IP packet may occur responsive to user plane congestion and on condition that the priority of the first IP packet takes precedence over a priority of the second IP packet.

In at least one representative embodiment, the processor may be configured to detect the user plane congestion.

In at least one representative embodiment, the first and second flows may be associated with first and second applications, respectively. In at least one representative embodiment, the first and second flows may be associated with the same application.

In at least one representative embodiment, an apparatus may include a processor, wherein the processor may be configured to: send a congestion indication to a core network; receive a general packet radio system (GPRS) tunneling protocol (GTP) packet including an first internet protocol (IP) packet associated with a first flow within a bearer; and/or obtain, from a header of the GTP packet, an indicator indicative of a priority of the IP packet, wherein the indicator was inserted into the header of the GTP packet by the core network responsive to the congestion indication.

In at least one representative embodiment, the processor may be configured to drop any of the GTP packet and the first IP packet on condition that a priority of a second IP packet associated with second flow within the bearer takes precedence over the priority of the first IP packet. In at least one representative embodiment, the processor may be configured to drop any of the GTP packet and the first IP packet responsive to user plane congestion and on condition that the priority of the second IP packet takes precedence over the priority of the first IP packet.

In at least one representative embodiment, the processor may be configured to perform queue management to en-queue the first IP packet and to de-queue a second IP packet that is associated with a second flow and that persists in a queue on condition that the priority of the first IP packet takes precedence over a priority of the second IP packet. In at least one representative embodiment, the queue management may be performed responsive to user plane congestion and on condition that the priority of the first IP packet takes precedence over the priority of the second IP packet.

In at least one representative embodiment, the processor may be configured to perform queue management to de-queue one or more of IP packets associated with the first flow on condition that a priority of a second IP packet associated with a second flow takes precedence over the priority of the first IP packet. In at least one representative embodiment, the queue management may be performed responsive to user plane congestion and on condition that the priority of the second IP packet takes precedence over the priority of the first IP packet.

In at least one representative embodiment, the processor may be configured to (i) perform a first queue management to de-queue a second IP packet persisting in a queue on condition that a priority of the second IP packet is the same as the priority of the first IP packet; and/or (ii) perform a second queue management to de-queue the second IP packet on condition that the priority of the first IP packet takes precedence over a priority of the second IP packet.

In at least one representative embodiment, the first queue management may be performed responsive to user plane congestion and on condition that a priority of a second IP packet persisting in a queue is the same as the priority of the first IP packet. In at least one representative embodiment, the second queue management may be performed responsive to user plane congestion and on condition that the priority of the first IP packet takes precedence over the priority of the second IP packet.

In at least one representative embodiment, the processor may be configured to delay scheduling of the first IP packet on condition that a priority of a second IP packet associated with another flow within the bearer takes precedence over the priority of the first IP packet. In at least one representative embodiment, the processor may be configured to delay scheduling of the IP packet responsive to user plane congestion and on condition that the priority of the second IP packet takes precedence over the priority of the first IP packet.

In at least one representative embodiment, the processor may be configured to schedule the first IP packet ahead of a second IP packet associated with a second flow within the bearer on condition that the priority of the first IP packet takes precedence over a priority of the second IP packet. In at least one representative embodiment, scheduling of the first IP packet may occur responsive to user plane congestion and on condition that the priority of the first IP packet takes precedence over a priority of the second IP packet.

In at least one representative embodiment, the processor may be configured to detect the user plane congestion.

In at least one representative embodiment, the first and second flows may be associated with first and second applications, respectively. In at least one representative embodiment, the first and second flows may be associated with the same application.

In at least one representative embodiment, the processor being configured to send a congestion indication to a core network includes the processor being configured to: send from the base station and/or a radio access network (RAN) to a policy and charging rules function (PCRF), through bearer and/or control-signaling traffic, information indicating that the base station and/or the radio access network (RAN) is experiencing congestion.

In at least one representative embodiment, the bearer is a default bearer. In at least one representative embodiment, the GTP packet is received on a S1-U interface.

In at least one representative embodiment, a method for mitigating user plane congestion may include: receiving a congestion indication, and generating a general packet radio system (GPRS) tunneling protocol (GTP) packet including an first internet protocol (IP) packet associated with a first flow within a bearer, and a header having an indicator indicative of a priority of the IP packet, wherein the indicator was inserted into the header of the GTP packet by the core network responsive to the congestion indication.

In at least one representative embodiment, the method may include sending the GTP packet to cause a base station to drop any of the GTP packet and the first IP packet on condition that a priority of a second IP packet associated with second flow within the bearer takes precedence over the priority of the first IP packet.

In at least one representative embodiment, the method may include sending the GTP packet to cause a base station to perform queue management to en-queue the first IP packet and to de-queue the second IP packet on condition that the priority of the first IP packet takes precedence over a priority of a second IP packet that is associated with a second flow and that persists in a queue.

In at least one representative embodiment, the method may include sending the GTP packet to cause a base station to perform queue management to de-queue one or more of IP packets associated with the first flow on condition that a priority of a second IP packet associated with a second flow takes precedence over the priority of the first IP packet.

In at least one representative embodiment, the method may include sending the GTP packet to cause a base station to: (i) perform a first queue management to de-queue a second IP packet persisting in a queue on condition that a priority of the second IP packet is the same as the priority of the first IP packet, performing a first queue management to de-queue the second IP packet; and/or (ii) perform a second queue management to de-queue the second IP packet on condition that the priority of the first IP packet takes precedence over a priority of the second IP packet.

In at least one representative embodiment, the method may include sending the GTP packet to cause a base station to delay scheduling of the first IP packet on condition that a priority of a second IP packet associated with another flow within the bearer takes precedence over the priority of the first IP packet.

In at least one representative embodiment, the method may include sending the GTP packet to cause a base station to schedule the first IP packet ahead of a second IP packet associated with a second flow within the bearer on condition that the priority of the first IP packet takes precedence over a priority of the second IP packet.

In at least one representative embodiment, the first and second flows are associated with first and second applications, respectively. In at least one representative embodiment, the first and second flows are associated with the same application.

In at least one representative embodiment, the method may include the congestion indication may be received from the base station and/or a radio access network (RAN) at a policy and charging rules function (PCRF), through bearer and/or control signaling traffic, information indicating that the base station and/or the radio access network (RAN) is experiencing congestion.

In at least one representative embodiment, the bearer is a default bearer. In at least one representative embodiment, the GTP packet is received on a S1-U interface.

In at least one representative embodiment, the method may be implementable by a SGW and/or a PGW.

In at least one representative embodiment, a method may include: receiving at a policy and charging rules function (PCRF) through bearer and/or control signaling traffic information indicating that a base station and/or a radio access network (RAN) is experiencing congestion.

In at least one representative embodiment, the method may include deciding at the PCRF one or more measures to mitigate the congestion In at least one representative embodiment, the measures may include throttling or otherwise traffic shaping certain traffic.

In at least one representative embodiment, the PCRF may take into account a user subscription profile when deciding the one or more measures.

In at least one representative embodiment, the PCRF may take into account an application run by a user when deciding the one or more measures.

In at least one representative embodiment, the method may include applying, at the base station, one or more measures to mitigate the congestion based on corresponding one or more measures taken by the PCRF. In at least one representative embodiment, the measures applied at the base station may include throttling or otherwise traffic shaping certain traffic.

In at least one representative embodiment, the one or more measures to mitigate the congestion applied at the base station may be based, at least in part, on a user subscription profile. In at least one representative embodiment, the one or more measures to mitigate the congestion applied at the base station are based, at least in part, on an application run by a user.

In at least one representative embodiment, a method may include: receiving at a base station and/or a radio access network (RAN) from a policy and charging rules function (PCRF) a rule specifying one or more measures, e.g., a PCC rule including a sub-QCI rule, the base station and/or the radio access network (RAN) to apply to mitigate congestion.

In at least one representative embodiment, the method may include: applying, at the base station and/or the radio access network (RAN), the one or more measures specified by the rule provided from the PCRF.

In at least one representative embodiment, the measures may include throttling or otherwise traffic shaping certain traffic. In at least one representative embodiment, the one or more measures to mitigate the congestion applied at the base station are based, at least in part, on a user subscription profile. In at least one representative embodiment, the one or more measures to mitigate the congestion applied at the base station are based, at least in part, on an application run by a user.

In at least one representative embodiment, a method may include: receiving at a policy and charging rules function (PCRF) through bearer and/or control signaling traffic a congestion status report. In at least one representative embodiment, receipt of the congestion status report may be indicative of congestion being experienced by a base station and/or a radio access network (RAN). In at least one representative embodiment, receipt of the congestion status report may be indicative of sustained congestion being experienced by a base station and/or a radio access network (RAN) when measures taken at the base station to mitigate congestion are not sufficient to resolve the congestion.

In at least one representative embodiment, a method may include: sending, from a base station to a policy and charging rules function (PCRF) through bearer traffic, a congestion status report. In at least one representative embodiment, the congestion status report may be sent responsive to congestion being experienced by a base station and/or a radio access network (RAN).

In at least one representative embodiment, the congestion status report may be sent responsive to congestion being experienced by a base station and/or a radio access network (RAN) when measures taken at the base station to mitigate congestion are not sufficient to resolve the congestion.

In at least one representative embodiment, the base station may report the congestion status report based on an operator configuration. In at least one representative embodiment, the base station may report the congestion status report based a certain percentages of packets of traffic/IP flows are discarded/dropped due to congestion and/or congestion mitigation procedures. In at least one representative embodiment, the base station may report the congestion status report based on discarding of packets of higher-priority traffic/IP flows. the base station nay report the congestion status report based on when QoS requirements of a bearer can no longer be fulfilled. In at least one representative embodiment, the base station may report the congestion status report based on a given percentage of packets that have not been dropped due to congestion experience a delay exceeding a QCI packet delay budget. In at least one representative embodiment, the base station may report the congestion status report based on scope of congestion. In at least one representative embodiment, the congestion status report may include a congestion indication indicative of the scope of congestion.

In at least one representative embodiment, the base station may report the congestion status report using "per PDN connection reporting". In at least one representative embodiment, the base station may report using "per PDN connection reporting" to indicate that the scope of the congestion applies to all of the bearers within a PDN connection. In at least one representative embodiment, the congestion status report may include a congestion indication indicative of the scope of the congestion applies to all of the bearers within a PDN connection.

In at least one representative embodiment, the congestion status report and/or indication may be included within a GTP-U header via S1-U on user PDN connection(s) that experience congestion.

In at least one representative embodiment, the base station may report the congestion status report using "per base station reporting". In at least one representative embodiment, the base station may report using the "per base station reporting" to indicate that the scope of the congestion applies to all of the bearers and PDN connections bound to the base station. In at least one representative embodiment, the congestion status report may include a congestion indication indicative of the scope of the congestion applies to all of the bearers and PDN connections bound to the base station.

In at least one representative embodiment, the congestion status report and/or indication may be included within a GTP-U header. In at least one representative embodiment, a base station ID may be included within the GTP-U header.

In at least one representative embodiment, the base station may report the congestion status report using "per APN reporting". In at least one representative embodiment, the base station may report using "per APN reporting" to indicate that the scope of the congestion applies to all PDN connections toward a particular packet data network or internet domain. In at least one representative embodiment, the congestion status report may include a congestion indication indicative of the scope of the congestion applies to all PDN connections toward a particular packet data network or internet domain.

In at least one representative embodiment, the base station may report the congestion status report using "per UE reporting". In at least one representative embodiment, the base station reports using the "per UE reporting" to indicate that the scope of the congestion applies to all PDN connections bound to a particular WTRU. In at least one representative embodiment, the congestion status report may include a congestion indication indicative of the scope of the congestion applies to all PDN connections bound to a particular WTRU.

In at least one representative embodiment, the base station may report the congestion status report using "per bearer reporting". In at least one representative embodiment, the base station may report using the "per bearer reporting" to indicate that the scope of the congestion applies to the bearer over which the traffic/IP flow packet (e.g., GTP-U packet) carrying the indication is received. In at least one representative embodiment, the congestion status report may include a congestion indication indicative of the scope of the congestion applies to the bearer over which the traffic/IP flow packet (e.g., GTP-U packet) carrying the indication is received.

In at least one representative embodiment, the base station may report the congestion status report using "per service data flow reporting". In at least one representative embodiment, the base station may report using the "per service data flow reporting" to indicate that the scope of the congestion applies to a service data flow. In at least one representative embodiment, the congestion status report may include a congestion indication indicative of the scope of the congestion applies to a service data flow.

In at least one representative embodiment, the base station may report the congestion status report using "per sub-QCI reporting". In at least one representative embodiment, the base station may report using the "per sub-QCI reporting" to indicate that the scope of the congestion applies at a sub-QCI level. In at least one representative embodiment, the congestion status report comprises a congestion indication indicative of the scope of the congestion applies at a sub-QCI level.

In at least one representative embodiment, the base station may report the congestion status report using "per IP flow or packet flow reporting". In at least one representative embodiment, the base station may report using the "per IP flow or packet flow reporting" to indicate that the scope of the congestion applies at an IP flow level. In at least one representative embodiment, the congestion status report comprises a congestion indication indicative of the scope of the congestion applies at an IP flow level.

In at least one representative embodiment, the base station indicates congestion scope together with a congestion indication and/or other congestion information in a GTP-U header.

In at least one representative embodiment, the method may include negotiating a type of congestion scope reporting to be used. In at least one representative embodiment, the type of congestion scope reporting is negotiated between a WTRU and a core network, including any of an MME, SGW and PGW, over S1C/GTP-C.

In at least one representative embodiment, the method may include establishing a type of congestion indication scope reporting to be used via a configuration.

In at least one representative embodiment, the method may include extracting the congestion status report from GTP-U packets.

In at least one representative embodiment, the method may include reporting the congestion status report to the PCRF.

In at least one representative embodiment, a method may include receiving, at a policy and charging rules function (PCRF) through bearer and/or control signaling traffic, a congestion status report.

In at least one representative embodiment, the method may further include using "per PDN connection congestion mitigation". In at least one representative embodiment, using "per PDN connection congestion mitigation" may include taking into user subscription profile and/or application(s) type.

In at least one representative embodiment, the method may further include using "per base station congestion mitigation". In at least one representative embodiment, using "per base station congestion mitigation" may include taking into user subscription profile and/or application(s) type.

In at least one representative embodiment, the method may further include using "per APN congestion mitigation". In at least one representative embodiment, using "per APN congestion mitigation" may include taking into user subscription profile and/or application(s) type.

In at least one representative embodiment, the method may further include using "per WTRU congestion mitigation". In at least one representative embodiment, using "per WTRU congestion mitigation" may include taking into user subscription profile and/or application(s) type.

In at least one representative embodiment, the method may further include using "per service data flow congestion mitigation". In at least one representative embodiment, using "per service data flow congestion mitigation" may include taking into user subscription profile and/or application(s) type.

In at least one representative embodiment, the method may further include using "per sub-QCI congestion mitigation. In at least one representative embodiment, using "per sub-QCI congestion mitigation" may include taking into user subscription profile and/or application(s) type.

In at least one representative embodiment, the method may further include using "per IP flow or packet flow congestion mitigation". In at least one representative embodiment, using "per IP flow or packet flow congestion mitigation" comprises taking into user subscription profile and/or application(s) type.

In at least one representative embodiment, the method may further include using "per bearer congestion mitigation". In at least one representative embodiment, using "per bearer congestion mitigation" comprises taking into user subscription profile and/or application(s) type.

In at least one representative embodiment, a method may include: a base station detecting that measures for mitigating congestion using a sub-QCI based traffic/flow differentiation might not be adequate to resolve congestion; a base station sending a congestion status report to a core network; a SGW extracting the congestion status report from a GTP-U header; the SGW sending the congestion status report within GTP-U headers over GTP S5 towards a PGW; the PGW extracting the congestion status report from the GTP-U headers; the PGW sending the extracted congestion status information to a PCRF; the PCRF deciding on updated PCC rules in view of the congestion status information; the PCRF providing the updated PCC rules to a PCEF; and/or the PCEF enforcing the updated PCC rules on applicable bearers.

In at least one representative embodiment, the congestion status report may include a congestion indication. In at least one representative embodiment, the congestion status report may include a congestion indication and/or a cell ID.

In at least one representative embodiment, deciding on updated PCC rules may include taking into account any of a subscription profile; application type; usage monitoring reports; and charging limit reports.

In at least one representative embodiment, a method may include: sending a congestion status indication to an ANDSF server over an interface between an eNodeB and the ANDSF server.

In at least one representative embodiment, the method may further include, responsive to obtaining the congestion indication, the ANDSF server relaying offload rules to a WTRU, the offload rules being configured for handling the congestion. In at least one representative embodiment, the ANDSF offload rules take the congestion status into account in deciding which traffic flows should be offloaded.

In at least one representative embodiment, the congestion status indication comprises at least one of a binary or a number within a range or a percentage indicating the level of congestion in the cell or a level.

In at least one representative embodiment, a method may include: updating PCC rules in view of congestion status information received through bearer traffic, and/or enforcing the updated PCC rules on applicable bearers. In at least one representative embodiment, the congestion status information is a congestion status report. In at least one representative embodiment, receipt of the congestion status information is indicative of sustained congestion being experienced by a base station and/or a radio access network (RAN).

In at least one representative embodiment, an apparatus, which may include any of receiver, transmitter and processor, may be configured to perform a method as in at least one of the preceding claims. In at least one representative embodiment, a system may be configured to perform a method as in at least one of the preceding claims.

In at least one representative embodiment, a tangible computer readable storage medium may have stored thereon computer executable instructions for performing a method as in at least one of the preceding claims.

In at least one representative embodiment, a method for use in a wireless communication system may include carrying out user plane Radio Access Network (RAN) congestion detection and mitigation.

In at least one representative embodiment, an eNodeB, a Radio Network Controller (RNC), and a home eNodeB (H(e)NB) may be capable of detecting RAN user plane congestion.

In at least one representative embodiment, the congestion may be measured based on a number of wireless transmit/receive units (WTRUs) attached in an eNodeB. In at least one representative embodiment, the congestion may be measured based on a maximum throughput supported by an eNodeB. In at least one representative embodiment, the congestion may be measured based on a number of active Packed Data Network (PDN) connections.

In at least one representative embodiment, an eNodeB reports the congestion to other nodes. In at least one representative embodiment, the congestion report may include a percentage of a load in a cell. In at least one representative embodiment, the congestion report nay include a current throughput and maximum throughput supported by the cell. In at least one representative embodiment, the congestion report may include a current number of WTRUs in an ECM-CONNECTED state and a maximum number of ECM-CONNECTED states supported by the cell.

In at least one representative embodiment, the method may further include the congestion report may include a current number of WTRUs in a PMM-CONNECTED state and a maximum number of PMM-CONNECTED states supported by the cell. In at least one representative embodiment, the congestion report may include whether the WTRU initiated request is for attended or unattended data traffic.

In at least one representative embodiment, the eNodeB may transmit congestion information to the core network by including congestion information within every S1-AP uplink NAS transport message to the mobility management entity (MME). In at least one representative embodiment, the eNodeB may transmit an S1-AP uplink message to the MME when the WTRU transmits a tracking area update (TAU) message in an ECM-CONNECTED state. In at least one representative embodiment, the eNodeB may transmit an S1-AP uplink message to the MME during a WTRU triggered service request. In at least one representative embodiment, the eNodeB may transmit an S1-AP uplink message to the MME during a WTRU PDN connectivity request. In at least one representative embodiment, the eNodeB may transmit an S1-AP uplink message to the MME during an S10 based handover.

In at least one representative embodiment, the RNC may transmits congestion information to the core network within a location report, initial WTRU message, and a UTRAN originated direct transfer control message over an Iu interface.

In at least one representative embodiment, the WTRU may trigger a TAU request.

In at least one representative embodiment, the WTRU may transmit a TAU request to the eNodeB.

In at least one representative embodiment, the eNodeB may forward the TAU request to a new MME.

In at least one representative embodiment, the new MME may transmits a create session request to a new serving gateway (SGW). In at least one representative embodiment, the create session request may include congestion load information.

In at least one representative embodiment, a new SGW may transmit a modify bearer request message to a PGW. In at least one representative embodiment, the modify bearer request message may include congestion load information.

In at least one representative embodiment, a PGW may initiates a Policy and Charging Enforcement Function (PCEF) initiated IP-CAN session modification via a Gx reference point to a Policy Charging and Rules Function (PCRF). In at least one representative embodiment, the PCEF may includes congestion load information in the modify bearer request message.

In at least one representative embodiment, the PGW may transmit a modify bearer response message to the SGW.

In at least one representative embodiment, a new SGW may initiate a gateway control session establishment procedure to PCRF via a Gxx interface. In at least one representative embodiment, the new SGW may include congestion load information in the GW control session establishment message.

In at least one representative embodiment, the PCRF may provide updated PCC rules.

In at least one representative embodiment, the SGW may transmit a proxy binding update message. In at least one representative embodiment, the PGW may respond with a proxy binding update acknowledgement (ACK).

In at least one representative embodiment, the new MME may include congestion load information in an update location information to the home subscriber server (HSS).

In at least one representative embodiment, the MME may transmit a modify bearer request message to the SGW. In at least one representative embodiment, the MME may include congestion load information in the modify bearer request message.

In at least one representative embodiment, the WTRU may change to a UTRAN cell.

In at least one representative embodiment, the WTRU may transmit a routing area update (RAU) to the RNC.

In at least one representative embodiment, the RNC forwards the RAU message to the Serving General Packet Radio Service (GPRS) Support Node (SGSN). In at least one representative embodiment, the RNC may include congestion load information in such message.

In at least one representative embodiment, the SGSN may detect that the WTRU switched from E-UTRAN, and may transmit a context request to the MME.

In at least one representative embodiment, the SGSN may transmit a modify bearer request message. In at least one representative embodiment, the SGSN may include congestion load information in such message.

In at least one representative embodiment, the WTRU determines to transmit an RAU.

In at least one representative embodiment, the WTRU may transmit the RAU to the RNC/BSS.

In at least one representative embodiment, the RNC/BSS may forward the RAU to the SGSN. In at least one representative embodiment, the RNC/BSS may include congestion load information in the forwarded RAU.

In at least one representative embodiment, a new SGSN may transmit an SGSN context request to an old SGSN. In at least one representative embodiment, the new SGSN may includes congestion load information in such message.

In at least one representative embodiment, the SGSN may transmit an update context request message.

In at least one representative embodiment, a GGSN may transmit a PCEF-initiated IP-CAN session modification to the PCRF. In at least one representative embodiment, the GGSN may include congestion load information in such message.

In at least one representative embodiment, the SGSN may transmit an update location to the HSS.

In at least one representative embodiment, the WTRU may transmit a Non-Access Stratum (NAS) service request.

In at least one representative embodiment, the eNodeB may forward the NAS service request message to the MME. In at least one representative embodiment, the eNodeB may include congestion load information within the NAS service request.

In at least one representative embodiment, the eNodeB may transmit an S1-AP initial context setup complete message. In at least one representative embodiment, the eNodeB may include congestion load information within the S1-AP initial context setup complete message.

In at least one representative embodiment, the MME may transmit a modify bearer response message.

In at least one representative embodiment, the WTRU may initiate a WTRU initiated PDN connectivity request. In at least one representative embodiment, the WTRU may include within the NAS request whether a trigger to initiate the request was due to attended or unattended traffic. In at least one representative embodiment, the create session request may includes whether the trigger to initiate the request was due to attended or unattended traffic.

In at least one representative embodiment, the MME may include congestion load information to the WTRU during TAU/RAU updates. In at least one representative embodiment, the SGW may include whether the trigger to initiate the request was due to attended or unattended traffic. In at least one representative embodiment, the PCEF may include whether the trigger to initiate the request was due to attended or unattended traffic.

In at least one representative embodiment, the MME may reject the request based on indications of high RAN user plane congestion load.

In at least one representative embodiment, the MME may query the HSS for a subscriber profile for update quality of service (QoS) information. In at least one representative embodiment, the HSS may carry out an HSS initiated subscribed QoS modification procedure.

In at least one representative embodiment, the PGW may have pre-configured policies installed that defined specific QoS behavior for specific IP flows based on reported congestion level. In at least one representative embodiment, the PCRF may provide updated QoS rules for specific services based on a congestion status reported, a time of date, a usage threshold of the user, and/or a subscription profile requirements stored in a subscriber profile repository (SPR).

In at least one representative embodiment, the MME may revokes a S1 interface overload procedure by transmitted an overload start.

In at least one representative embodiment, the MME may select congested eNodeB cells and based on a traffic reduction indication.

In at least one representative embodiment, the eNodeB may reduce the type of traffic indicated in the overload start message according to a requested percentage.

In at least one representative embodiment, the MME may reject RRC connection request for non-emergency and non-high priority mobile originated services.

In at least one representative embodiment, the MME may permits RRC connection request for emergency sessions and mobile terminated services for the congested eNodeB.

In at least one representative embodiment, the MME may permits RRC connection request for high priority session and mobile terminated services for the congested eNodeB.

In at least one representative embodiment, the MME may reject new RRC connection requests from WTRUs configured for low access priority.

In at least one representative embodiment, the MME may indicates to a WTRU an appropriate timer value that limits further RRC connection request for a pre-determined time.

In at least one representative embodiment, the MME may initiate procedures defined for APN based session management congestion control to the eNodeB that is congested.

In at least one representative embodiment, the MME may reuse procedures defined for APN based session management congestion control for all signaling to and from the congestion eNodeB.

In at least one representative embodiment, the HSS may receive RAN user plane congestion information.

In at least one representative embodiment, the HSS may check that there is an updated QoS profile for the subscriber based on the congestion load reported.

In at least one representative embodiment, the HSS may transmit an insert subscriber data message to the MME.

In at least one representative embodiment, the HSS may transmit an updated subscription data including EPS subscribed QoS and the subscribed WTRU-AMBR and APN-AMBR based on the congest load reported.

In at least one representative embodiment, the MME may update the stored subscription data and transmits an insert subscriber data ACK message to the HSS.

In at least one representative embodiment, the MME may check the subscription parameters.

In at least one representative embodiment, the MME may calculate a new WTRU-AMBR if only the subscribed WTRU-AMBR is modified or if there is a specific WTRU-AMBR for high RAN user plane congestion.

In at least one representative embodiment, the MME may signal a modified WTRU-AMBR value to the eNodeB using an S1-AP WTRU context modification procedure.

In at least one representative embodiment, the HSS initiated subscribed QoS medication procedure ends after completion of the WTRU context modification procedure.

In at least one representative embodiment, the MME may transmits a modify bearer command message to the SGW if there is a specific quality control indicator (QCI) value for high RAN user plane congestion.

In at least one representative embodiment, the EPS bearer identity identifies a default bearer of the affected PDN connection.

In at least one representative embodiment, the EPS bearer QoS contains the EPS subscribed QoS profile to be updated.

In at least one representative embodiment, the SGW may transmit the modify bearer command to the PDN GW.

In at least one representative embodiment, the PGW may inform the PCRF about the updated EPS bearer QoS and APN-AMBR if PCC infrastructure is deployed.

In at least one representative embodiment, the PCRF may transmit a new updated PCC decision to the PGW.

In at least one representative embodiment, the PCRF may modify the APN-AMBR and the QoS parameters associated with the default bearer in response to the PDN GW.

In at least one representative embodiment, the PGW may modify the default bearer of each PDN connection corresponding to the APN for which subscribed QoS has been modified.

In at least one representative embodiment, the PGW may transmit the update bearer request message to the SGW.

In at least one representative embodiment, the SGW may transmit an update bearer response message to the PGW.

In at least one representative embodiment, the PGW may delete the concerned EPS if the bearer modification fails.

In at least one representative embodiment, the PGW may transmit a provision ACK message to the PCRF indicating whether the requested PCC decision was enforced or not.

In at least one representative embodiment, a PDN GW, GGSN, and SGW have pre-configured policy rules that are activated based on the RAN user plane congestion status.

In at least one representative embodiment, the pre-configured policy rules may be defined per IP flow, per application type, per APN, or per WTRU. In at least one representative embodiment, the pre-configured policy rules may include updated maximum bit rate values for specific IP flows, updated APN-AMBR values, and updated WTRU-AMBR values.

In at least one representative embodiment, the PGW may inspect a traffic flow template of the WTRU traffic if congestion mitigation is carried out per IP flow.

In at least one representative embodiment, the PGW may detect a maximum bit rate of certain IP flows that need to be reduced due to high level congestion based on the pre-configured per IP flow congestion policy.

In at least one representative embodiment, a traffic detection function may report specific application to the PGW if congestion mitigation is carried out per application. In at least one representative embodiment, the PGW may detect that a bandwidth of certain applications needs to be reduced due to high levels of RAN user plane congestion based on the pre-configured per application congestion policy.

In at least one representative embodiment, the PGW may detects that an MBR of all traffic of a particular APN needs to be reduced due to high levels of RAN user plane congestion if congestion mitigation is carried out per APN.

In at least one representative embodiment, the PGW may detect that an MBR of all traffic of a particular WTRU needs to be reduced due to high levels of RAN user plane congestion if congestion mitigation is carried out per WTRU.

In at least one representative embodiment, the PCRF may carry out congestion mitigation based on a subscription profile of the user, usage data by the user, IP flow, the type of application, or charging requirements of the user.

In at least one representative embodiment, the PCRF may provide updated PCC rules over Gx to the PCEF and updated QoS rules over Gxx to Bearer Binding and Event Reporting Function (BBERF).

In at least one representative embodiment, a subscription profile may include information that specific subscribers can run services even at high congestion loads.

In at least one representative embodiment, the PCRF may make dynamic policies based on the application type reported and the level of RAN user plane congestion reported.

In at least one representative embodiment, the PCRF may indicate to the PCEF to be notified if a usage threshold has been met.

In at least one representative embodiment, the PCRF may throttle traffic to the user if the usage thresholds have been met by a subscriber and there is high RAN user plane congestion.

In at least one representative embodiment, the PCRF may have policies that traffic of certain IP flows needs to be reduced in case of high RAN user plane congestion.

In at least one representative embodiment, the PCRF may throttle user traffic if the user exceeds a spending threshold and there is high RAN user plane congestion.

In at least one representative embodiment, the BBERF may initiate a gateway control session establishment procedure.

In at least one representative embodiment, the BBERF may include congestion load information.

In at least one representative embodiment, a GW(PCEF) may receive a request for an IP-CAN bearer establishment.

In at least one representative embodiment, the PCEF may receive congestion load information.

In at least one representative embodiment, the PCEF may determine that the PCC authorization is required and request the authorization of allowed services and PCC rules information. In at least one representative embodiment, the PCEF may include congestion load information om such request.

In at least one representative embodiment, the PCRF may transmit a request to the SPR to receive information related to the IP-CAN session if the PCRF does not have the subscription related information of the subscriber. In at least one representative embodiment, the SPR may have policies based on RAN user plane congestion load. In at least one representative embodiment, the SPR policies on RAN user plane congestion load may include policies based on the types of subscriber, IP flow reported, application type reported, volume usage level, and user spending limits.

In at least one representative embodiment, the PCRF may store the subscription related information containing the information about allowed services and PCC rules formation.

In at least one representative embodiment, the PCRF may transmits an initial spending limit report request if the PCRF determines that the policy decision depends on the status of the policy counters available at the OCS. In at least one representative embodiment, the PCRF may makes the authorization and policy decisions. In at least one representative embodiment, the PCRF may take congestion load reports into account.

In at least one representative embodiment, the PCRF may request a Traffic Detection Function (TDF) to establish the relevant session towards the PCRF and provides ADC rules to the TDF if the PCRF determines that the policy decisions depend on the application used. In at least one representative embodiment, the TDF may transmit an ACK to the PCRF regarding the outcome of the actions related to the decision. In at least one representative embodiment, the ACK may include a list of event triggers.

In at least one representative embodiment, the PCRF may transmit the decision including PCC rules to mitigate congestion.

In at least one representative embodiment, an Application Function (AF) may provide service information to the PCRF due to AF session signaling.

In at least one representative embodiment, the AF may subscribe to notification of bearer level events related to service information. In at least one representative embodiment, the PCRF may store the service information and may transmit an acknowledgement to the AF.

In at least one representative embodiment, the GW(PCEF) may receive an IP-CAN session signaling for IP-CAN session modification. 1 In at least one representative embodiment, the GW(PCEF) may make a decision to trigger IPC-CAN session modification.

In at least one representative embodiment, the TDF, within the PCEF, may detect an application that needs to be reported due to high congestion.

In at least one representative embodiment, the GW(PCEF) may determine that PCC interaction is required and transmits an indication of IP-CAN session modification.

In at least one representative embodiment, the PCRF may correlate the request for PCC rules with the IP-CAN session and service information available at the GW(PCEF).

In at least one representative embodiment, the PCRF may report to the AF an event related to the transmission resources if the AP requested it at initial authorization. In at least one representative embodiment, the AF may acknowledge the event report and/or may responds with the requested information.

In at least one representative embodiment, the PCRF may alter the subscribed list of policy counters using an initial spending limit report if the PCRF determines a change to policy counter status reporting is required.

In at least one representative embodiment, the PCEF may decide to check if the spending limit has been met for the user based on RAN user plane congestion reported.

In at least one representative embodiment, the PCRF may make the authorization and policy decision.

In at least one representative embodiment, the PCRF may take into account spending limits of the user, volume usage levels, and specific IP flows/applications reported if the PCRF makes the decision taking into account the congestion load reported.

In at least one representative embodiment, the PCRF may provide all new ADC decision to the TDF.

In at least one representative embodiment, the PCRF may indicate the TDF to report specific application that need to be monitored in case of high RAN user plane congestion.

In at least one representative embodiment, the TDF may transmit an ACK to inform the PCRF of the outcome.

In at least one representative embodiment, the PCRF may transmits an acknowledge of IP-CAN session modification to the GW.

In at least one representative embodiment, the PCRF may instruct the TDF to report specific applications due to RAN user plane congestion load.

In at least one representative embodiment, the PCRF may subscribe to be notified if the spending limit of the user has been met based on RAN user plane congestion load policies provided by the SPR.

In at least one representative embodiment, the PCRF may store application information if provided and responds with an acknowledgement to the TDF.

In at least one representative embodiment, the PCRF may provide a new ADC decision to the TDF.

In at least one representative embodiment, the PCRF may request the TDF to terminate the TDF session towards the PCRF if the last ADC rule is deactivated.

In at least one representative embodiment, the TDF may transmit a provision ACK to the PCRF.

In at least one representative embodiment, the PCRF may initiate a gateway control and QoS rules provision procedure.

In at least one representative embodiment, the PCRF may transmit a Policy and Charging Rules Provision to the PCEF.

In at least one representative embodiment, the PCEF may enforce the decision.

In at least one representative embodiment, the GW(B-BERF) may be requested to report an event for a gateway control session.

In at least one representative embodiment, the GW(B-BERF) may be requested to obtain QoS rules for a gateway control session.

In at least one representative embodiment, the GW(B-BERF) may transmits a gateway control and QoS rules request to the PCRF. In at least one representative embodiment, the BBERF includes congestion load information in such request.

In at least one representative embodiment, the GW(B-BERF) may transmits a result to the entity that triggered the procedure if the GW(BBERF) is only requested to report an event.

In at least one representative embodiment, the PCRF initiated IP-CAN session modification procedure occurs as a result of the gateway control and QoS rules request procedure.

In at least one representative embodiment, the PCRF may transmit a gateway control and QoS rules response to the GW (BBERF).

In at least one representative embodiment, the QoS rules and events triggers may be deployed.

In at least one representative embodiment, the GW(B-BERF) may initiates the IP-CAN bearer signaling.

In at least one representative embodiment, the GW(B-BERF) may receive the response for the IP-CAN bearer signaling.

In at least one representative embodiment, a source eNodeB may determine that an S1-based handover to a target eNodeB is required.

In at least one representative embodiment, the source eNodeB may initiate a handover based on the current congestion load.

In at least one representative embodiment, the source eNodeB may transmit a handover required message to a source MME. In at least one representative embodiment, the source eNodeB may include congestion load information in the handover required message.

In at least one representative embodiment, the source MME may determine whether handover can continue based on the congestion load reported by the source eNodeB and the current congestion load in the target eNodeB.

In at least one representative embodiment, the source MME may transmit a forward relocation request including the source eNodeB congestion load information.

In at least one representative embodiment, a target MME may determine whether handover can proceed based on the congestion load reported by the source MME and the current congestion load in the target eNodeB.

In at least one representative embodiment, the source MME/target MME may transmit a create session request to a target SGW. In at least one representative embodiment, wherein the SGW may transmits a create session response to the source MME/target MME.

In at least one representative embodiment, the source MME/target MME may transmit a handover request to the target eNodeB. In at least one representative embodiment, the handover request may include the source MME congestion load information.

In at least one representative embodiment, the target eNodeB may store source eNodeB congestion load status to be aware of the congestion load in all adjacent eNodeB cells.

In at least one representative embodiment, the target eNodeB may respond with a handover ACK.

In at least one representative embodiment, the source eNodeB may initiate an X2-based handover. In at least one representative embodiment, the trigger to initiate the X2-based handover may take into account user plane congestion in the cell.

In at least one representative embodiment, the source eNodeB may transmit an X2-based handover request to the target eNodeB.

In at least one representative embodiment, the target eNodeB may decide to accept handover taking into account its current congestion load status.

In at least one representative embodiment, the target eNodeB may transmit a path switch request to the MME.

In at least one representative embodiment, the MME may transmit a create session request to a target SGW. In at least one representative embodiment, the target SGW may transmit an ACK to the MME.

In at least one representative embodiment, the target SGW may transmit a modify bearer request message to the PGW including congestion load information.

In at least one representative embodiment, the MME may transmit a modify bearer request message. In at least one representative embodiment, a source SGW may transmits an ACK to the MME.

In at least one representative embodiment, the source SGW may transmit a modify bearer request message to the PGW including congestion load information. In at least one representative embodiment, the PGW may transmit an ACK to the source SGW.

In at least one representative embodiment, congestion load information may be transmitted within an X2-AP load indication message.

In at least one representative embodiment, the source eNodeB may determine that an inter RAT handover is required taking into account the current congestion load.

In at least one representative embodiment, the source MME may determine whether inter RAT handover should take place based on congestion load in the source eNodeB.

In at least one representative embodiment, the source MME may transmit a forward relocation request to a target SGSN including the source eNodeB congestion load information.

In at least one representative embodiment, the target SGSN may determine whether handover can proceed based on congestion load in a target RNC.

In at least one representative embodiment, the target SGSN may transmit a create session request to the target SGW.

In at least one representative embodiment, the target SGW may transmits a create session response to the target SGSN.

In at least one representative embodiment, the target SGSN may transmit a relocation request to the target RNC including the source eNodeB congestion load information.

In at least one representative embodiment, the target RNC may use the source eNodeB congestion load information and stores it in order to be aware of the congestion load in all adjacent eNodeB/RNC cells.

In at least one representative embodiment, the RNC may transmit a relocation request ACK if the target RNC has resources to allocate the bearer required.

In at least one representative embodiment, a source RNC may determines that an inter RAT handover is required taking into account the current congestion load.

In at least one representative embodiment, the source RNC may transmit a relocation required message to the source SGSN including the source RNC congestion load information.

In at least one representative embodiment, the source SGSN may determine whether inter RAT handover should take place based on the congestion load of the source RNC.

In at least one representative embodiment, the source SGSN may transmit a forward relocation request to the target MME including the source RNC congestion load information.

In at least one representative embodiment, the target MME may determine whether handover can proceed taking into account the congestion load in the target eNodeB.

In at least one representative embodiment, the target MME may transmit a create session request to the target SGW.

In at least one representative embodiment, the target SGW may transmit a create session response to the target MME.

In at least one representative embodiment, the target MME may transmit a handover request to the target eNodeB including the source RNC congestion load information.

In at least one representative embodiment, the target eNodeB may use the source RNC congestion information and stores it in order to be aware of the congestion load in all adjacent eNodeB/RNC cells.

In at least one representative embodiment, the eNodeB may transmit a relocation request ACK if the target eNodeB has resources to allocate the bearer required.

In at least one representative embodiment, a method for carrying out user plane Radio Access Network (RAN) congestion detection and mitigation in a mobility management entity may include: receiving a handover required message from a source eNodeB, wherein the handover required message includes congestion load information for the source eNodeB; receiving a tracking area update (TAU) of a wireless transmit/receive unit (WTRU) attached to a target eNodeB, wherein the TAU includes a current congestion load in the target eNodeB; determining whether handover can occur based on the congestion load information for the source eNodeB and the current congestion load in the target eNodeB; transmitting a handover request to the target eNodeB; and/or receiving a handover request acknowledgement from the target eNodeB.

In at least one representative embodiment, an apparatus, which may include any of receiver, transmitter and processor, is configured to perform a method as in at least one of the preceding the representative embodiments.

In at least one representative embodiment, a system may be configured to perform a method as in at least one of the preceding representative embodiments.

In at least one representative embodiment, a tangible computer readable storage medium may have stored thereon computer executable instructions for performing a method as in at least one of the preceding representative embodiments.

In at least one representative embodiment, an integrated circuit may be configured to perform a method as in at least one of the preceding the representative embodiments.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As another example, when referred to herein, the terms "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the exemplary embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

What is claimed is:

1. A method implemented by a first network node associated with a network, the method comprising:
receiving a request from a second network node, the request indicating that the second network node is requesting that the first network node monitor resource usage, the resource usage being associated with at least one wireless transmit/receive unit (WTRU), wherein the request indicates a threshold, wherein the request is related to a specific service and a specific quality of service (QoS) for the specific service;
monitoring the resource usage;
determining that the threshold indicated in the request has been exceeded; and
sending a report to the second network node based on determining that the threshold indicated in the request has been exceeded.

2. The method of claim 1, further comprising:
performing a policy and charging execution function by the first network node.

3. The method of claim 1, wherein the request further comprises a separate threshold for a low-priority service.

4. The method of claim 1, further comprising, based upon the report indicating that the resource usage exceeded the threshold indicated in the request, providing updated policy and charging control rules comprising a reduced maximum bit rate value.

5. The method of claim 1, further comprising, based upon the report indicating that the resource usage has exceeded the threshold indicated in the request, providing updated quality of service rules comprising a reduced maximum bit rate value.

6. The method of claim 1, further comprising, based upon the report indicating that the resource usage has exceeded the threshold indicated in the request, initiating a session termination.

7. The method of claim 1, further comprising, based upon the report indicating that the resource usage has exceeded the threshold indicated in the request, providing updated policy and charging control rules based on a subscription profile associated with the specific service.

8. The method of claim 1, further comprising, based upon the report indicating that the resource usage has exceeded the usage threshold indicated in the request, performing service data flow congestion mitigation.

9. The method of claim 1, further comprising, based upon the report indicating that the resource usage has exceeded the threshold indicated in the request, performing bearer congestion mitigation.

10. The method of claim 1, further comprising, based upon the report indicating that the resource usage has exceeded the threshold indicated in the request, performing packet flow congestion mitigation.

11. A first network node comprising a processor and a transceiver, the processor configured to:
receive, via the transceiver, a request from a second network node, the request indicating that the second network node is requesting that the first network node monitor resource usage the resource usage being associated with at least one wireless transmit/receive unit (WTRU), wherein the request indicates a threshold, wherein the request is related to a specific service and a specific quality of service (QoS) for the specific service;
monitor the resource usage;
determine that the usage has exceeded the threshold indicated in the request; and
send, via the transceiver, a report to the second network node based on a determination that the threshold indicated in the request has been exceeded.

12. The first network node of claim 11, wherein:
the first network node is configured to perform a policy and charging execution function.

13. The first network node of claim 11, wherein the request further comprises a separate usage threshold for a low-priority service.

14. A method implemented by a first network node associated with a network, the method comprising:
sending a request, to a second network node, for the second network node to monitor resource usage, wherein the request indicates a threshold, and wherein the request is related to a specific service and a specific quality of service (QoS) for the specific service; and
receiving a report from the second network node, the report indicating that the threshold indicated in the request has been exceeded.

15. The method of claim 14, further comprising performing a policy and charging rules function by the first network node.

16. The method of claim 14, wherein the request further comprises a separate threshold for a low-priority service.

\* \* \* \* \*